(12) United States Patent
Kozuma et al.

(10) Patent No.: US 12,499,828 B2
(45) Date of Patent: Dec. 16, 2025

(54) ELECTRONIC DEVICE

(71) Applicant: Semiconductor Energy Laboratory Co., Ltd., Atsugi (JP)

(72) Inventors: Munehiro Kozuma, Atsugi (JP); Tatsuya Onuki, Atsugi (JP); Hidetomo Kobayashi, Isehara (JP); Takanori Matsuzaki, Atsugi (JP); Yuki Okamoto, Ebina (JP); Minato Ito, Atsugi (JP); Yusuke Koumura, Atsugi (JP); Yoshiyuki Kurokawa, Sagamihara (JP); Hisao Ikeda, Zama (JP); Hiromichi Godo, Isehara (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/575,975

(22) PCT Filed: Jun. 30, 2022

(86) PCT No.: PCT/IB2022/056096
§ 371 (c)(1),
(2) Date: Jan. 2, 2024

(87) PCT Pub. No.: WO2023/285908
PCT Pub. Date: Jan. 19, 2023

(65) Prior Publication Data
US 2024/0331630 A1     Oct. 3, 2024

(30) Foreign Application Priority Data

Jul. 16, 2021 (JP) ................................. 2021-117576
Jul. 30, 2021 (JP) ................................. 2021-125354

(Continued)

(51) Int. Cl.
*G06F 3/01* (2006.01)
*G09G 3/3233* (2016.01)
(Continued)

(52) U.S. Cl.
CPC ........... *G09G 3/3233* (2013.01); *G06F 3/013* (2013.01); *H10K 59/1213* (2023.02);
(Continued)

(58) Field of Classification Search
CPC ................. G09G 3/3233; G09G 3/001; G09G 2300/0465; G09G 2300/0852;
(Continued)

(56) References Cited

U.S. PATENT DOCUMENTS 5,442,734 A    8/1995   Murakami et al.
7,248,232 B1   7/2007   Yamazaki et al.
(Continued)

FOREIGN PATENT DOCUMENTS

CN    106782268 A    5/2017
CN    108986749 A    12/2018
(Continued)

OTHER PUBLICATIONS

International Search Report (Application No. PCT/IB2022/056096), dated Sep. 27, 2022.
(Continued)

*Primary Examiner* — Ricardo Osorio
(74) *Attorney, Agent, or Firm* — Eric J. Robinson; Robinson Intellectual Property Law Office, P.C.

(57) ABSTRACT

A novel electronic device is provided. The electronic device includes a display apparatus, an arithmetic portion, and a gaze detection portion, and the display apparatus includes a functional circuit and a display portion divided into a plurality of sub-display portions. The gaze detection portion has a function of detecting a user's gaze. The arithmetic
(Continued)

portion has a function of dividing the plurality of sub-display portions between a first section and a second section using a detection result of the gaze detection portion. The first section includes a region overlapping with a user's gaze point. The functional circuit has a function of making a driving frequency of the second section lower than a driving frequency of the first section.

8 Claims, 44 Drawing Sheets

(30) Foreign Application Priority Data

| | | | |
|---|---|---|---|
| Jul. 30, 2021 | (JP) | ................................ | 2021-125356 |
| Aug. 11, 2021 | (JP) | ................................ | 2021-131052 |

(51) Int. Cl.
  *H10K 59/121* (2023.01)
  *G09G 3/00* (2006.01)

(52) U.S. Cl.
  CPC ..... *G09G 3/001* (2013.01); *G09G 2300/0465* (2013.01); *G09G 2300/0852* (2013.01); *G09G 2310/04* (2013.01); *G09G 2310/08* (2013.01); *G09G 2330/021* (2013.01); *G09G 2354/00* (2013.01)

(58) Field of Classification Search
  CPC ........... G09G 2310/04; G09G 2310/08; G09G 2330/021; G09G 2354/00; G09G 2300/0452; G09G 3/32; G09G 2300/0417; G09G 2300/0842; G09G 2320/0257; G09G 2320/0261; G09G 2330/10; G09G 2340/0407; G09G 2340/0435; G09G 2360/148; G09G 3/3225; G09G 2360/04; G06F 3/013; H10K 59/1213; G02B 27/0093; G02B 27/017; G09F 9/00; G09F 9/30; G09F 9/40; H05B 33/02; H05B 33/12; H05B 33/14
  See application file for complete search history.

(56) References Cited

U.S. PATENT DOCUMENTS

| | | | |
|---|---|---|---|
| 8,605,010 B2 | 12/2013 | Yamazaki et al. | |
| 11,423,844 B2 | 8/2022 | Ikeda et al. | |
| 11,574,575 B2 | 2/2023 | Zong et al. | |
| 11,798,491 B2 | 10/2023 | Ikeda et al. | |
| 2007/0097021 A1 | 5/2007 | Yamazaki et al. | |
| 2016/0267716 A1* | 9/2016 | Patel | G06F 3/013 |
| 2017/0212587 A1* | 7/2017 | Noda | G06F 3/0487 |
| 2017/0365230 A1* | 12/2017 | Hu | G09G 5/003 |
| 2018/0366068 A1 | 12/2018 | Liu et al. | |
| 2019/0057647 A1* | 2/2019 | Hack | G06F 3/013 |
| 2019/0139246 A1* | 5/2019 | Yu | G02B 27/0075 |
| 2019/0371243 A1 | 12/2019 | Yang et al. | |
| 2020/0203382 A1 | 6/2020 | Jung et al. | |
| 2021/0035481 A1* | 2/2021 | Atkinson | G06F 3/147 |
| 2021/0143209 A1* | 5/2021 | Yamazaki | G06F 3/0446 |
| 2021/0295780 A1 | 9/2021 | Ikeda et al. | |
| 2021/0375224 A1* | 12/2021 | Liu | G09G 3/3666 |
| 2023/0196975 A1* | 6/2023 | Zong | G06F 3/013 345/55 |
| 2025/0037654 A1 | 1/2025 | Kozuma et al. | |

FOREIGN PATENT DOCUMENTS

| | | | | |
|---|---|---|---|---|
| CN | 105531660 B | * | 8/2019 | ........... G06F 1/3231 |
| CN | 111341279 A | | 6/2020 | |
| CN | 112119446 A | | 12/2020 | |
| CN | 112992247 A | | 6/2021 | |
| EP | 0502643 A | | 9/1992 | |
| JP | 04-277871 A | | 10/1992 | |
| JP | 06-348253 A | | 12/1994 | |
| JP | 2000-002856 A | | 1/2000 | |
| KR | 2020-0076302 A | | 6/2020 | |
| KR | 2021-0007989 A | | 1/2021 | |
| WO | WO-2018/126654 | | 7/2018 | |
| WO | WO-2018/223656 | | 12/2018 | |
| WO | WO-2019/220278 | | 11/2019 | |

OTHER PUBLICATIONS

Written Opinion (Application No. PCT/IB2022/056096), dated Sep. 27, 2022.

* cited by examiner

FIG. 42A
Intermediate state
New crystalline phase
| Amorphous | Crystalline | Crystal |
|---|---|---|
| •completely amorphous | •CAAC<br>•nc<br>•CAC<br><br>excluding single crystal and poly crystal | •single crystal<br>•poly crystal |
FIG. 42B
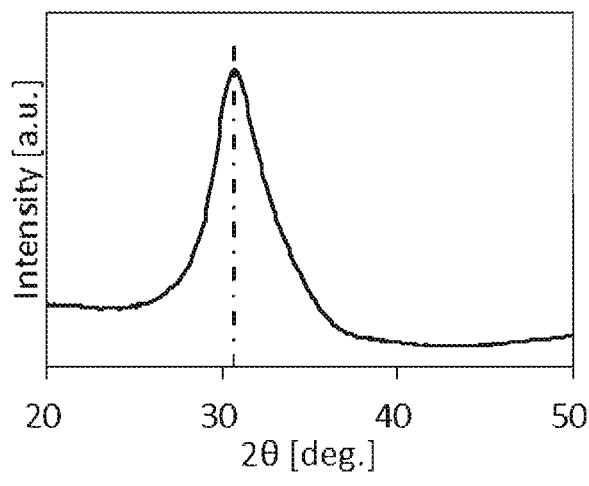
FIG. 42C
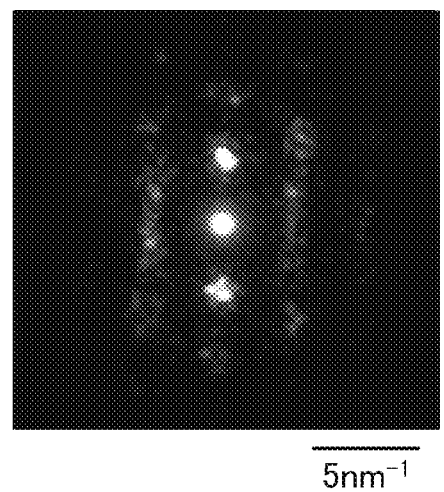

ELECTRONIC DEVICE

TECHNICAL FIELD

One embodiment of the present invention relates to an electronic device. One embodiment of the present invention relates to a wearable electronic device including a display apparatus.

Note that one embodiment of the present invention is not limited to the above technical field. Examples of the technical field of one embodiment of the present invention disclosed in this specification and the like include a semiconductor device, a display apparatus, a light-emitting apparatus, a power storage device, a memory device, an electronic device, a lighting device, an input device, an input/output device, a driving method thereof, and a manufacturing method thereof.

BACKGROUND ART

In recent years, HMD (Head Mounted Display)-type electronic devices suitable for applications such as virtual reality (VR) and augmented reality (AR) have been widely used. HMDs are capable of displaying a video showing 360-degree view of the user's surroundings in accordance with the motion of the user's head or the user's gaze or operation; thus, the user can have a high sense of immersion and a high realistic sensation.

An HMID has a structure in which an optical member or the like magnifies an image displayed on a display apparatus and the user sees the magnified image. In this case, the size of a housing might increase because of the presence of the optical member or the user might easily see pixels and strongly sense graininess; hence, the display apparatus is required to have a high resolution and a smaller size. For example, Patent Document 1 discloses an HMD that includes minute pixels by using transistors capable of high-speed driving.

REFERENCE

Patent Document

[Patent Document 1] Japanese Published Patent Application No. 2000-2856

SUMMARY OF THE INVENTION

Problems to be Solved by the Invention

An HMD-type electronic device needs to have high drawing processing capacity for responding to the motion of the user's head and the user's gaze or operation. The power consumption might increase in the case where an arithmetic circuit with high drawing processing capacity drives a display apparatus having an increased resolution and a reduced size. In addition, the arithmetic circuit with high drawing processing capacity necessitates providing a heat dissipation mechanism for cooling the arithmetic circuit, which might increase the size of the electronic device.

Alternatively, drawing processing capacity might run short in the case where a functional circuit such as an application processor for driving the display apparatus is provided in a region overlapping with a display portion and the display apparatus has an increased resolution and a reduced size.

An object of one embodiment of the present invention is to provide an electronic device having reduced power consumption. Another object of one embodiment of the present invention is to provide an electronic device having a reduced size and a reduced weight. Another object of one embodiment of the present invention is to provide an electronic device having superior drawing processing capacity. Another object of one embodiment of the present invention is to provide a novel electronic device.

Note that the description of these objects does not preclude the existence of other objects. One embodiment of the present invention does not need to achieve all these objects. Note that objects other than these can be derived from the description of the specification, the drawings, the claims, and the like.

Means for Solving the Problems

One embodiment of the present invention is an electronic device including a display apparatus, an arithmetic portion, and a gaze detection portion; the display apparatus includes a functional circuit and a display portion divided into a plurality of sub-display portions; the gaze detection portion has a function of detecting a user's gaze; the arithmetic portion has a function of dividing the plurality of sub-display portions between a first section and a second section using a detection result of the gaze detection portion; and the functional circuit has a function of making a second driving frequency that is a driving frequency of the sub-display portions included in the second section lower than a first driving frequency that is a driving frequency of the sub-display portions included in the first section.

The first section includes a region overlapping with a user's gaze point. The second section is set outside the first section. The second driving frequency is preferably lower than or equal to half of the first driving frequency, and further preferably lower than or equal to one fifth of the first driving frequency.

The sub-display portion may include a plurality of pixel circuits and a plurality of light-emitting elements. The display apparatus may include a plurality of gate driver circuits and a plurality of source driver circuits. For example, one of the plurality of gate driver circuits and one of the plurality of source driver circuits are electrically connected to one of the plurality of sub-display portions. The display apparatus may include a first layer, a second layer over the first layer, and a third layer over the second layer. For example, each of the plurality of gate driver circuits and the plurality of source driver circuits may be provided in the first layer, the plurality of pixel circuits may be provided in the second layer, and the plurality of light-emitting elements may be provided in the third layer.

The pixel circuit may include a first transistor, a second transistor whose one of a source and a drain is electrically connected to a gate of the first transistor, and a capacitor electrically connected to the gate of the first transistor, and a channel formation region of the second transistor may include an oxide semiconductor. As the light-emitting element, an organic EL element can be used, for example.

The electronic device may include a memory device having a function of retaining image data of each of the plurality of sub-display portions.

Effect of the Invention

According to one embodiment of the present invention, an electronic device having reduced power consumption can be provided. According to another embodiment of the present invention, an electronic device having a reduced size and a reduced weight can be provided. According to another embodiment of the present invention, an electronic device having superior drawing processing capacity can be provided. According to another embodiment of the present invention, a novel electronic device can be provided.

Note that the description of these effects does not preclude the existence of other effects. One embodiment of the present invention does not need to have all the effects. Note that other effects can be derived from the description of the specification, the drawings, the claims, and the like.

BRIEF DESCRIPTION OF THE DRAWINGS

FIG. 22 is a diagram illustrating a structure example of a display apparatus.

FIG. 23 is a diagram illustrating a structure example of a display apparatus.

FIG. 24B1 to FIG. 24B7 are diagrams illustrating structure examples of pixels.

FIG. 42A is a diagram showing classification of crystal structures. FIG. 42B is a diagram showing an XRD spectrum of a CAAC-IGZO film. FIG. 42C is a diagram showing nanobeam electron diffraction patterns of the CAAC-IGZO film.

MODE FOR CARRYING OUT THE INVENTION

Hereinafter, embodiments will be described with reference to the drawings. However, the embodiments can be implemented with various modes, and it will be readily appreciated by those skilled in the art that modes and details can be changed in various ways without departing from the spirit and scope of the present invention. Thus, the present invention should not be construed as being limited to the following description of the embodiments.

Furthermore, unless otherwise specified, an off-state current in this specification and the like refers to a drain current of a transistor in an off state (also referred to as a non-conduction state or a cutoff state). Unless otherwise specified, an off state refers to, in an n-channel transistor, a state where a voltage $V_{gs}$ between its gate and source is lower than a threshold voltage $V_{th}$ (in a p-channel transistor, higher than $V_{th}$).

In this specification and the like, a metal oxide is an oxide of a metal in a broad sense. Metal oxides are classified into an oxide insulator, an oxide conductor (including a transparent oxide conductor), an oxide semiconductor (also simply referred to as an OS), and the like. For example, in the case where a metal oxide is used in an active layer of a transistor, the metal oxide is referred to as an oxide semiconductor in some cases. That is, in this specification and the like, an "OS transistor" can also be called a transistor including an oxide or an oxide semiconductor.

Embodiment 1

In this embodiment, an electronic device of one embodiment of the present invention will be described. The electronic device of one embodiment of the present invention can be suitably used also as a wearable electronic device for VR or AR applications.

<Structure Example of Electronic Device>

Figure 1A:
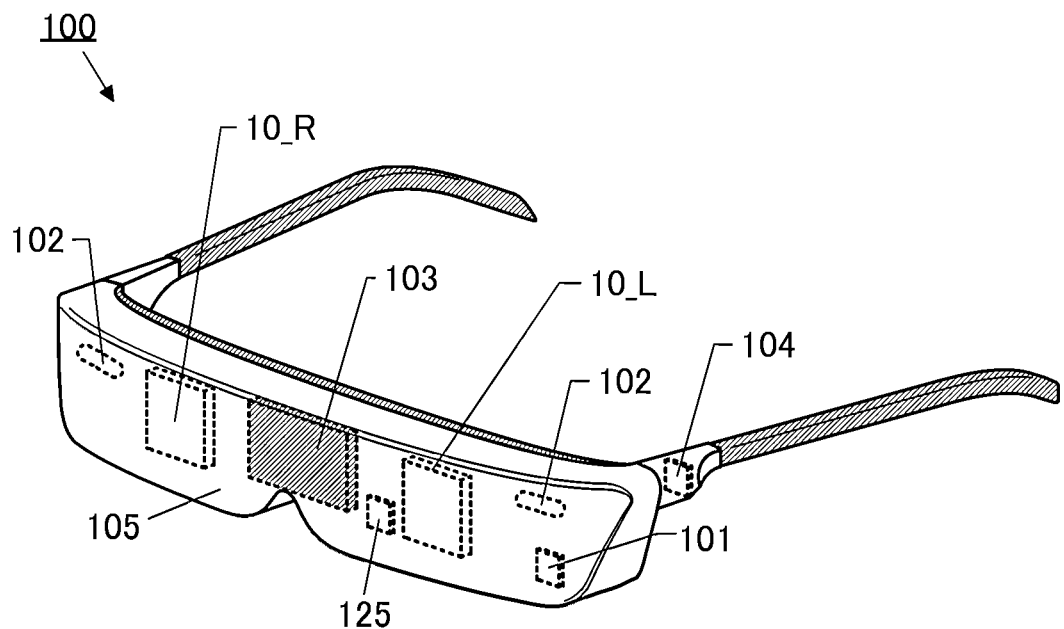
FIG. 1A and FIG. 1B are diagrams illustrating a structure example of an electronic device.

FIG. 1A shows a perspective view of a glasses-type (goggle-type) electronic device 100 as an example of a wearable electronic device. FIG. 1A shows the electronic device 100 that includes, in a housing 105, a pair of display apparatuses 10 (a display apparatus 10_L and a display apparatus 10_R), a motion detection portion 101, gaze detection portions 102, an arithmetic portion 103, and a communication portion 104.

Figure 1B:
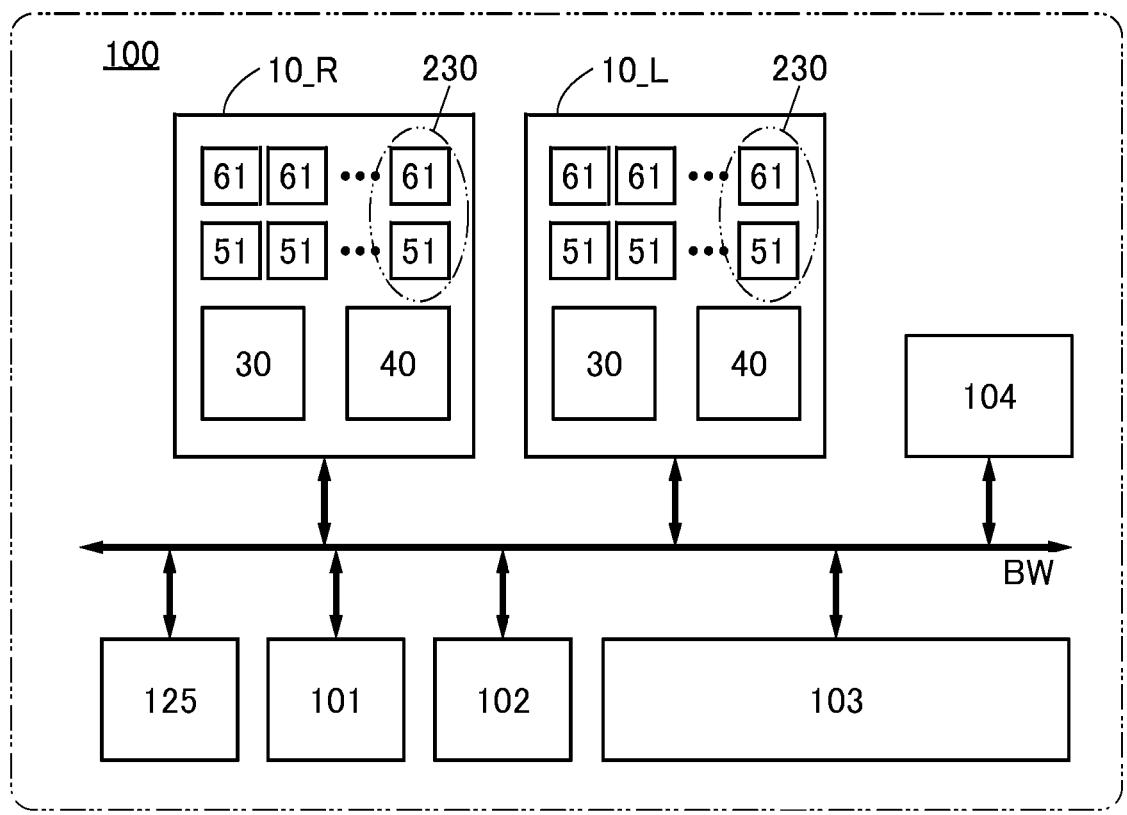

FIG. 1B is a block diagram of the electronic device 100 in FIG. 1A. As in FIG. 1A, the electronic device 100 includes the display apparatus 10_L, the display apparatus 10_R, the motion detection portion 101, the gaze detection portions 102, the arithmetic portion 103, and the communication portion 104, and a variety of signals are transmitted and received between these components through a bus wiring BW. Each of the display apparatus 10_L and the display apparatus 10_R includes a plurality of pixels 230, a driver circuit 30, and a functional circuit 40. One pixel 230 includes one light-emitting element 61 and one pixel circuit 51. Thus, each of the display apparatus 10_L and the display apparatus 10_R includes a plurality of light-emitting elements 61 and a plurality of pixel circuits 51.

The motion detection portion 101 has a function of detecting the motion of the housing 105, i.e., the motion of the head of the user who wears the electronic device 100. The motion detection portion 101 can include a motion sensor using a MEMS technology, for example. As the motion sensor, a three-axis motion sensor, a six-axis motion sensor, or the like can be used. Information on the motion of the housing 105 detected by the motion detection portion 101 may be referred to as first information, first data, motion data, or the like.

The gaze detection portion 102 has a function of obtaining information regarding the user's gaze. Specifically, the gaze detection portion 102 has a function of detecting the user's gaze. The user's gaze, for example, may be obtained by a gaze measurement (eye tracking) method such as a pupil center corneal reflection method or a bright/dark pupil effect method. Alternatively, the user's gaze may be obtained by a gaze measurement method using a laser, an ultrasonic wave, or the like. Detection of the user's gaze may be performed for one eye of the user or may be performed for both eyes of the user. For example, a distance from the user to a gaze point can be estimated by performing detection of the gaze for both eyes.

The arithmetic portion 103 has a function of calculating the user's gaze point by using a gaze detection result in the gaze detection portion 102. For example, a gaze point on the display apparatus 10 can be found. That is, an object the user is gazing in the image being displayed on the display apparatus 10_L and the display apparatus 10_R can be found. In addition, whether or not the user is gazing at a part other than the screen can be found. Note that information regarding the user's gaze obtained by the gaze detection portion 102 (the gaze detection result) may be referred to as second information, gaze information, or the like in some cases.

The arithmetic portion 103 has a function of performing drawing processing in accordance with the motion of the housing 105. The arithmetic portion 103 performs the drawing processing in accordance with the motion of the housing 105 with the use of the first information and image data that is input from the outside through the communication portion 104. As the image data, for example, a 360-degree omnidirectional image data can be used. The 360-degree omnidirectional image data is data generated by a celestial sphere camera (an omnidirectional camera or a 360° camera), computer graphics, or the like. Specifically, the arithmetic portion 103 has a function of converting the 360-degree omnidirectional image data on the basis of the first information into image data that can be displayed on the display apparatus 10_L and the display apparatus 10_R.

The arithmetic portion 103 has a function of determining the size and shape of a plurality of regions that are set for each of the display portions of the display apparatus 10_L and the display apparatus 10_R with use of the second information. Specifically, the arithmetic portion 103 calculates a gaze point on the display portion on the basis of the second information and sets a first region S1 to a third region S3 and the like described later on the display portion with use of the gaze point as a reference.

A microprocessor such as a central processing unit (CPU), a DSP (Digital Signal Processor), or a GPU (Graphics Processing Unit) can be used alone or in combination as the arithmetic portion 103. A structure may be employed in which such a microprocessor is obtained with a PLD (Programmable Logic Device) such as an FPGA (Field Programmable Gate Array) or an FPAA (Field Programmable Analog Array).

The arithmetic portion 103 interprets and executes instructions from various programs with the use of a processor to perform various kinds of data processing and program control. The programs that might be executed by the processor may be stored in a memory region included in the processor or a memory portion which is additionally provided. As the memory portion, a memory device using a nonvolatile memory element, such as a flash memory, an MRAM (Magnetoresistive Random Access Memory), a PRAM (Phase change RAM), an ReRAM (Resistive RAM), or an FeRAM (Ferroelectric RAM); a memory device using a volatile memory element, such as a DRAM (Dynamic RAM) and an SRAM (Static RAM); or the like may be used, for example.

The communication portion 104 has a function of communicating with an external device by wire or wirelessly to obtain a variety of data, including image data. The communication portion 104 is provided with a high frequency circuit (RF circuit), for example, to transmit and receive an RF signal. The high frequency circuit is a circuit for performing mutual conversion between an electromagnetic signal and an electrical signal in a frequency band that is set by national laws to perform wireless communication with another communication apparatus using the electromagnetic signal. In the case of performing wireless communication, it is possible to use, as a communication protocol or a communication technology, a communication standard such as LTE (Long Term Evolution), GSM (Global System for Mobile Communication: registered trademark), EDGE (Enhanced Data Rates for GSM Evolution), CDMA 2000 (Code Division Multiple Access 2000), or WCDMA (Wideband Code Division Multiple Access: registered trademark), or a communication standard developed by IEEE such as Wi-Fi (registered trademark), Bluetooth (registered trademark), or ZigBee (registered trademark). The third-generation mobile communication system (3G), the fourth-generation mobile communication system (4G), or the fifth-generation mobile communication system (5G) defined by the International Telecommunication Union (ITU) or the like can be used.

The communication portion 104 may include an external port such as a LAN (Local Area Network) connection terminal, a digital broadcast-receiving terminal, or an AC adaptor connection terminal.

Each of the display apparatus 10_L and the display apparatus 10_R includes the plurality of light-emitting elements 61, the plurality of pixel circuits 51, the driver circuit 30, and the functional circuit 40. The pixel circuit 51 has a function of controlling light emission of the light-emitting element 61. The driver circuit 30 has a function of controlling the pixel circuit 51.

Information on the plurality of regions in the display portion of the display apparatus 10 determined by the arithmetic portion 103 can be used for driving such that the definition differs from region to region. The functional circuit 40 has a function of controlling the driver circuit 30 such that the display definition is high in a region close to a gaze point and controlling the driver circuit 30 such that the display definition is low in a region distant from the gaze point.

For example, when rewriting of image data is performed for every other pixel or every other plurality of pixels, low display definition can be achieved. By reducing the number of pixels that perform rewriting of image data, power consumption of the display apparatus can be reduced.

As in one embodiment of the present invention, the arithmetic portion 103 may be provided in addition to the functional circuit 40. Providing the arithmetic portion 103 makes it possible for the arithmetic portion 103 to perform heavy-load arithmetic processing such as drawing processing in accordance with the motion of the housing 105 and determining a plurality of regions described later (the first region S1 to the third region S3) in accordance with a gaze point. Meanwhile, the functional circuit 40 performs the processing of controlling the driver circuit 30, so that reductions in circuit size and power consumption can be achieved. A wearable electronic device in particular is required to detect the motion of the user's head, gaze, or the like in a short period, and thus high speed arithmetic processing is required, leading to high power consumption for an arithmetic operation. By contrast, in one embodiment of the present invention, the function of outputting a control signal for the driver circuit 30 is separated from the arithmetic portion 103 and can be performed by the functional circuit 40. This prevents concentration of load on one arithmetic portion and can reduce the load on the arithmetic portion. Thus, low power consumption as a whole can be achieved.

The electronic device 100 may be provided with a sensor 125. The sensor 125 has a function of obtaining information on one or more of the senses of sight, hearing, touch, taste, and smell of the user. Specifically, the sensor 125 has a function of sensing or measuring one or more of the following information: force, displacement, position, speed, acceleration, angular velocity, rotational frequency, distance, light, magnetism, temperature, sound, time, electric field, current, voltage, electric power, radiation, humidity, gradient, oscillation, smell, and infrared rays. The electronic device 100 may be provided with one or more sensors 125.

With use of the sensor 125, ambient temperature, humidity, illumination, odor, and the like may be measured. Furthermore, with use of the sensor 125, information for personal authentication using a fingerprint, a palm print, an iris, a retina, a shape of a blood vessel (including the shape of a vein and a shape of an artery), a face, or the like may be obtained, for example. Moreover, with use of the sensor 125, the number of blinks, eyelid behavior, pupil size, body temperature, pulse, oxygen saturation in blood, or the like of the user may be measured, so that the user's fatigue level, health condition, and the like can be detected. The electronic device 100 may sense the user's fatigue level, health condition, and the like and display an alert or the like on the display apparatus 10.

The operation of the electronic device 100 may be controlled by detecting the user's gaze and eyelid movement. Detection of the user's gaze and eyelid movement may be performed for one eye of the user or may be performed for both eyes of the user. For example, the operation of the electronic device 100 may be controlled by a combination of movement of the left and right eyelids. Since the user does not use both hands to operate the electronic device 100, an input operation or the like can be achieved with holding nothing in both hands (in a state where both hands are free).

Figure 2A:
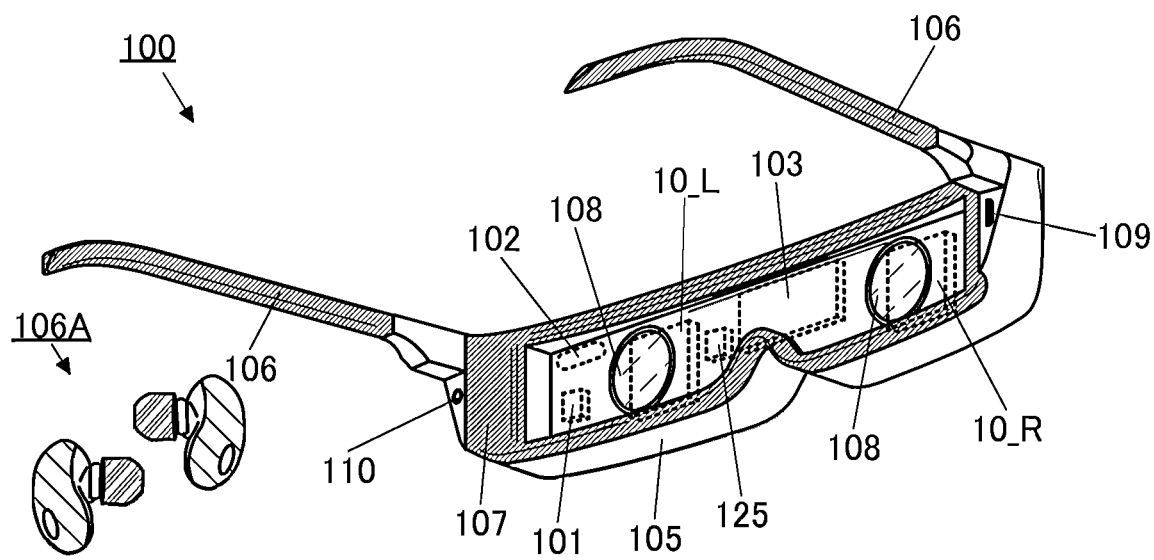
FIG. 2A and FIG. 2B are diagrams illustrating structure examples of an electronic device.

FIG. 2A is a perspective view illustrating the electronic device 100. In FIG. 2A, the housing 105 of the electronic device 100 includes, for example, a wearing portion 106, a cushion 107, a pair of lenses 108, and the like, in addition to the pair of the display apparatus 10_L and the display apparatus 10_R and the arithmetic portion 103. The pair of the display apparatus 10_L and the display apparatus 10_R are positioned inside the housing 105 so as to be seen through the lenses 108.

In addition, an input terminal 109 and an output terminal 110 are provided in the housing 105 illustrated in FIG. 2A. To the input terminal 109, a cable for supplying an image signal (image data) from a video output device or the like, power for charging a battery provided in the housing 105, or the like can be connected. The output terminal 110 can function as, for example, an audio output terminal to which earphones, headphones, or the like can be connected.

In addition, the housing 105 preferably includes a mechanism by which the left and right positions of the lenses 108 and the display apparatus 10_L and the display apparatus 10_R can be adjusted to the optimal positions in accordance with the positions of the user's eyes. Moreover, the housing 105 preferably includes a mechanism for adjusting focus by changing the distance between the lenses 108 and the display apparatus 10_L and the display apparatus 10_R.

The cushion 107 is a portion to be in contact with the user's face (forehead, cheek, or the like). When the cushion 107 is in close contact with the user's face, light leakage can be prevented, which increases the sense of immersion. A soft material is preferably used for the cushion 107 so that the cushion 107 is in close contact with the user's face when the user wears the electronic device 100. Using such a material is preferable because it provides a soft texture and the user does not feel cold when wearing the electronic device in a cold season, for example. The member to be in contact with the user's skin, such as the cushion 107 or the wearing portion 106, is preferably detachable, in which case cleaning or replacement can be easily performed.

The electronic device of one embodiment of the present invention may further include earphones 106A. The earphones 106A include a communication portion (not illustrated) and have a wireless communication function. The earphones 106A can output audio data with the wireless communication function. The earphones 106A may include a vibration mechanism to function as bone-conduction earphones.

Figure 2B:
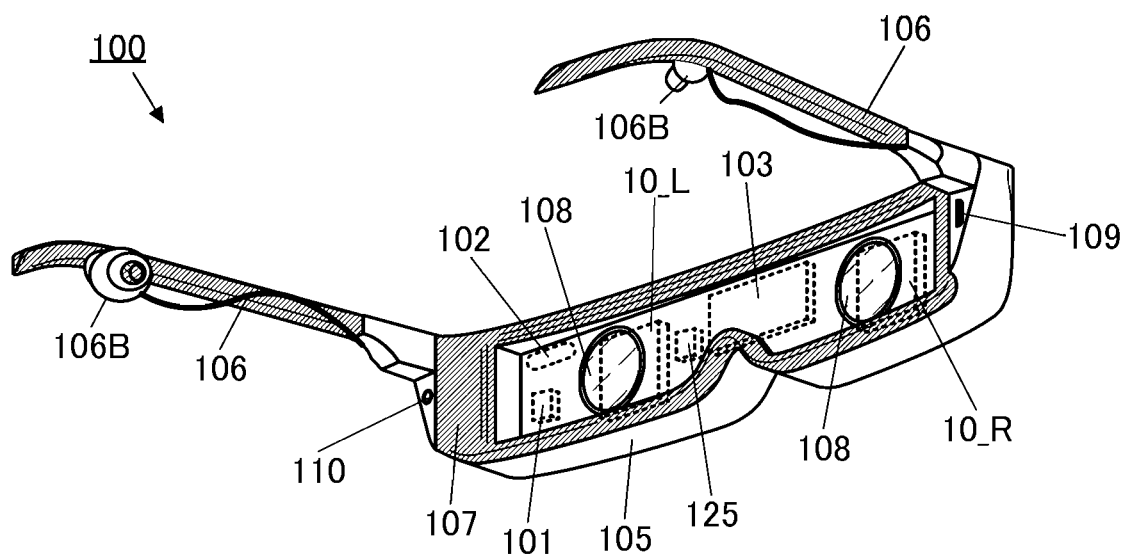

The earphones 106A can be connected to the wearing portion 106 directly or by wire like earphones 106B illustrated in FIG. 2B. The earphones 106B and the wearing portion 106 may each have a magnet. This is preferable because the earphones 106B can be fixed to the wearing portion 106 with magnetic force and thus can be easily housed.

<Structure Example of Display Apparatus>

A structure of a display apparatus 10A that can be used for the display apparatus 10_L and the display apparatus 10_R illustrated in FIG. 1A and FIG. 1B will be described with reference to FIG. 3A, FIG. 3B, and FIG. 4.

Figure 3A:
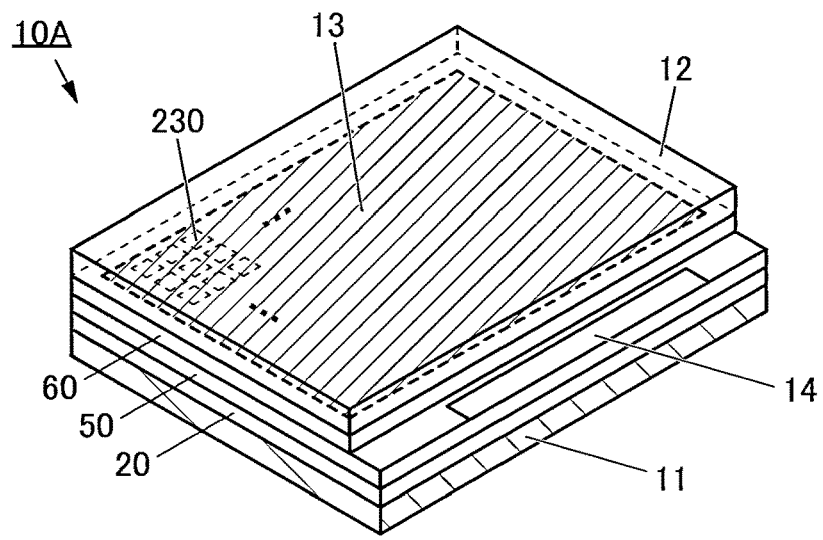
FIG. 3A and FIG. 3B are diagrams illustrating a structure example of a display apparatus.

FIG. 3A is a perspective view of the display apparatus 10A that can be used for the display apparatus 10_L and the display apparatus 10_R illustrated in FIG. 1A and FIG. 1B.

The display apparatus 10A includes a substrate 11 and a substrate 12. The display apparatus 10A includes a display portion 13 composed of elements provided between the substrate 11 and the substrate 12. The display portion 13 is a region where an image is displayed in the display apparatus 10A. The display portion 13 includes the plurality of pixels 230. The pixels 230 each include the pixel circuit 51 and the light-emitting element 61.

By using the pixels 230 arranged in a matrix of 1920× 1080 pixels, the display portion 13 can achieve display with a definition of a so-called full hi-vision (also referred to as "2K definition", "2K1K", "2K", or the like). For example, by using the pixels 230 arranged in a matrix of 3840×2160 pixels, the display portion 13 can achieve display with a definition of a so-called ultra hi-vision (also referred to as "4K definition", "4K2K", "4K", or the like). For example, by using the pixels 230 arranged in a matrix of 7680×4320 pixels, the display portion 13 can achieve display with a definition of a so-called super hi-vision (also referred to as "8K definition", "8K4K", "8K", or the like). By increasing the number of pixels 230, the display portion 13 that can perform display with 16K or 32K definition can also be obtained.

Furthermore, the pixel density (resolution) of the display portion 13 is preferably higher than or equal to 1000 ppi and lower than or equal to 10000 ppi. For example, the resolution may be higher than or equal to 2000 ppi and lower than or equal to 6000 ppi, or higher than or equal to 3000 ppi and lower than or equal to 5000 ppi.

Note that there is no particular limitation on the screen ratio (aspect ratio) of the display portion 13. For example, the display portion 13 is compatible with a variety of screen ratios such as 1:1 (a square), 4:3, 16:9, and 16:10.

In this specification and the like, the term "element" can be replaced with the term "device" in some cases. For example, a display element, a light-emitting element, and a liquid crystal element can be rephrased as a display device, a light-emitting device, and a liquid crystal device, respectively.

Various kinds of signals and power supply potentials are input to the display apparatus 10A from the outside via a terminal portion 14, so that image display can be performed using a display element provided in the display portion 13. Any of a variety of elements can be used as the display element. Typically, a light-emitting element having a function of emitting light, such as an organic EL element or an LED element, a liquid crystal element, a MEMS (Micro Electro Mechanical Systems) element, or the like can be used.

A plurality of layers are provided between the substrate 11 and the substrate 12, and each of the layers is provided with a transistor for a circuit operation, or a display element which emits light. A pixel circuit having a function of controlling an operation of the display element, a driver circuit having a function of controlling the pixel circuit, a functional circuit having a function of controlling the driver circuit, and the like are provided in the plurality of layers.

Figure 3B:
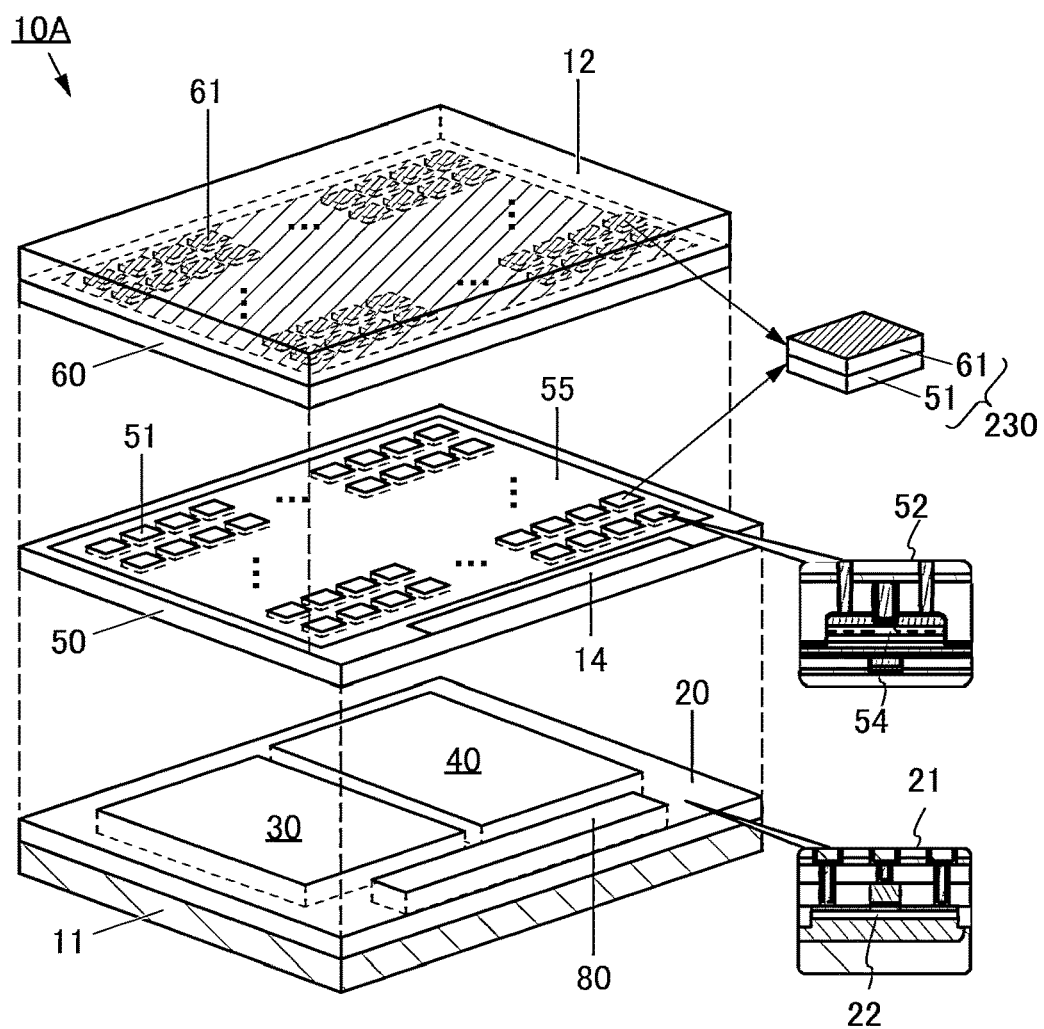

FIG. 3B is a perspective view schematically illustrating the structures of the layers provided between the substrate 11 and the substrate 12.

A layer 20 is provided over the substrate 11. The layer 20 includes the driver circuit 30, the functional circuit 40, and an input/output circuit 80. The layer 20 includes a transistor 21 containing silicon in a channel formation region 22 (such a transistor is also referred to as a Si transistor). The substrate 11 is, for example, a silicon substrate. A silicon substrate is preferable because it has higher thermal conductivity than a glass substrate. By providing the driver circuit 30, the functional circuit 40, and the input/output circuit 80 in the same layer, wirings electrically connecting the driver circuit 30, the functional circuit 40, and the input/output circuit 80 can be short. As a result, charge and discharge time of a control signal used when the functional circuit 40 controls the driver circuit 30 becomes short, leading to a reduction in power consumption. In addition, charge and discharge time during which a signal is supplied from the input/output circuit 80 to the functional circuit 40 and the driver circuit 30 becomes short, leading to a reduction in power consumption.

The transistor 21 can be a transistor containing single crystal silicon in its channel formation region (also referred to as a "c-Si transistor"), for example. In particular, the use of a transistor containing single crystal silicon in a channel formation region as the transistor provided in the layer 20 can increase the on-state current of the transistor. This enables high-speed driving of circuits included in the layer 20 and is thus preferable. The Si transistor can be formed by microfabrication to have a channel length greater than or equal to 3 nm and less than or equal to 10 nm, for example; thus, a CPU, an accelerator such as a GPU, an application processor, or the like can be integral with the display portion in the display apparatus 10A.

A transistor containing polycrystalline silicon in its channel formation region (also referred to as a "Poly-Si transistor") may be provided in the layer 20. As the polycrystalline silicon, low-temperature poly silicon (LTPS) may be used. Note that a transistor containing LTPS in its channel formation region is also referred to as an "LTPS transistor". An OS transistor may be provided in the layer 20.

Any of a variety of circuits such as a shift register, a level shifter, an inverter, a latch, an analog switch, and a logic circuit can be used as the driver circuit 30. The driver circuit 30 includes a gate driver circuit, a source driver circuit, or the like, for example. In addition, an arithmetic circuit, a memory circuit, a power supply circuit, and the like may be included. Since the gate driver circuit, the source driver circuit, and other circuits can be placed to overlap with the display portion 13, the width of a non-display region (also referred to as a bezel) provided along the outer periphery of the display portion 13 of the display apparatus 10A can be extremely narrow compared with the case where these circuits and the display portion 13 are arranged side by side, whereby the display apparatus 10A can be reduced in size.

The functional circuit 40 has a function of an application processor for controlling the circuits in the display apparatus 10A and generating signals used for controlling the circuits, for example. The functional circuit 40 may include a CPU and a circuit used for correcting image data such as a GPU. The functional circuit 40 may include an LVDS (Low Voltage Differential Signaling) circuit, an MIPI (Mobile Industry Processor Interface) circuit, and a D/A (Digital to Analog) converter circuit, for example, having a function of an interface for receiving image data or the like from the outside of the display apparatus 10A. The functional circuit 40 may include a circuit for compressing and decompressing image data and a power supply circuit, for example.

A layer 50 is provided over the layer 20. The layer 50 includes a pixel circuit group 55 including the plurality of pixel circuits 51. An OS transistor may be provided in the layer 50. Each of the pixel circuits 51 may include an OS transistor. Note that the layer 50 can be stacked over the layer 20.

A Si transistor may be provided in the layer 50. For example, the pixel circuits 51 may each include a transistor containing single crystal silicon or polycrystalline silicon in its channel formation region. As the polycrystalline silicon, LTPS may be used. For example, the layer 50 can be formed over another substrate and bonded to the layer 20.

As another example, the pixel circuits 51 may each include a plurality of kinds of transistors using different semiconductor materials. In the case where the pixel circuits 51 each include a plurality of kinds of transistors using different semiconductor materials, the transistors may be provided in different layers for each kind of transistor. For example, in the case where the pixel circuits 51 each include a Si transistor and an OS transistor, the Si transistor and the OS transistor may be provided to overlap with each other. Providing the transistors to overlap with each other reduces the area occupied by the pixel circuits 51. Thus, the resolution of the display apparatus 10A can be improved. Note that a structure in which an LTPS transistor and an OS transistor are combined is referred to as LTPO in some cases.

It is preferable to use, as the transistor 52 that is an OS transistor, a transistor including an oxide containing at least one of indium, an element M (the element M is aluminum, gallium, yttrium, or tin), and zinc in a channel formation region. Such an OS transistor has a characteristic of an extremely low off-state current. Thus, it is particularly preferable to use the OS transistor as a transistor provided in the pixel circuit, in which case analog data written to the pixel circuit can be retained for a long period.

A layer 60 is provided over the layer 50. Over the layer 60, the substrate 12 is provided. The substrate 12 is preferably a light-transmitting substrate or a layer formed of a light-transmitting material. The layer 60 includes the plurality of light-emitting elements 61. The layer 60 can be stacked over the layer 50. As the light-emitting element 61, an organic electroluminescent element (also referred to as an organic EL element) or the like can be used, for example. However, the light-emitting element 61 is not limited thereto, and an inorganic EL element formed of an inorganic material may be used, for example. Note that an "organic EL element" and an "inorganic EL element" are collectively referred to as "EL element" in some cases. The light-emitting element 61 may contain an inorganic compound such as quantum dots. For example, when used for a light-emitting layer, the quantum dots can function as a light-emitting material.

As shown in FIG. 3B, the display apparatus 10A of one embodiment of the present invention can have a structure in which the light-emitting elements 61, the pixel circuits 51, the driver circuit 30, and the functional circuit 40 are stacked; thus, the aperture ratio (effective display area ratio) of the pixels can be extremely high. For example, the pixel aperture ratio can be higher than or equal to 40% and lower than 100%, preferably higher than or equal to 50% and lower than or equal to 95%, further preferably higher than or equal to 60% and lower than or equal to 95%. Furthermore, the pixel circuits 51 can be arranged extremely densely, and thus the resolution of the pixels can be extremely high. For example, the pixels can be arranged in the display portion 13 of the display apparatus 10A (a region where the pixel circuits 51 and the light-emitting elements 61 are stacked) with a resolution higher than or equal to 2000 ppi, preferably higher than or equal to 3000 ppi, further preferably higher than or equal to 5000 ppi, still further preferably higher than or equal to 6000 ppi, and lower than or equal to 20000 ppi or lower than or equal to 30000 ppi.

The display apparatus 10A described above has an extremely high resolution, and thus can be suitably used for a device for VR such as a head-mounted display or a glasses-type device for AR. For example, even in the case of a structure in which the display portion of the display apparatus 10A is seen through an optical member such as a lens, pixels of the extremely-high-resolution display portion included in the display apparatus 10A are not seen when the display portion is magnified by the lens, so that display providing a high sense of immersion can be performed.

Note that in the case where the display apparatus 10A is used as a wearable display apparatus for VR or AR, the display portion 13 can have a diagonal size greater than or equal to 0.1 inches and less than or equal to 5.0 inches, preferably greater than or equal to 0.5 inches and less than or equal to 2.0 inches, further preferably greater than or equal to 1 inch and less than or equal to 1.7 inches. For example, the display portion 13 may have a diagonal size of 1.5 inches or approximately 1.5 inches. When the display portion 13 has a diagonal size less than or equal to 2.0 inches, the number of times of light exposure treatment using a light exposure apparatus (typically, a scanner apparatus) can be one; thus, the productivity of a manufacturing process can be improved.

The display apparatus 10A according to one embodiment of the present invention can be used for an electronic device other than a wearable electronic device. In that case, the display portion 13 can have a diagonal size greater than 2.0 inches. The structure of transistors used in the pixel circuits 51 may be selected as appropriate depending on the diagonal size of the display portion 13. In the case where single crystal Si transistors are used in the pixel circuits 51, for example, the diagonal size of the display portion 13 is preferably greater than or equal to 0.1 inches and less than or equal to 3 inches. In the case where LTPS transistors are used in the pixel circuits 51, the diagonal size of the display portion 13 is preferably greater than or equal to 0.1 inches and less than or equal to 30 inches, further preferably greater than or equal to 1 inch and less than or equal to 30 inches. In the case where LTPO transistors are used in the pixel circuits 51, the diagonal size of the display portion 13 is preferably greater than or equal to 0.1 inches and less than or equal to 50 inches, further preferably greater than or equal to 1 inch and less than or equal to 50 inches. In the case where OS transistors are used in the pixel circuits 51, the diagonal size of the display portion 13 is preferably greater than or equal to 0.1 inches and less than or equal to 200 inches, further preferably greater than or equal to 50 inches and less than or equal to 100 inches.

A size increase of a display apparatus using single crystal Si transistors is extremely difficult because a size increase of a single crystal Si substrate is difficult. Furthermore, in the case where LTPS transistors are used in a display apparatus, LTPS transistors are unlikely to respond to a size increase (typically to a screen diagonal size greater than 30 inches) since a laser crystallization apparatus is used in the manufacturing process. By contrast, since the manufacturing process does not necessarily require a laser crystallization apparatus or the like or can be performed at a relatively low process temperature (typically, lower than or equal to 450° C.), OS transistors can be used for a display apparatus with a relatively large area (typically, a diagonal size greater than or equal to 50 inches and less than or equal to 100 inches). In addition, LTPO can be applied to a diagonal size midway between the case of using LTPS transistors and the case of using OS transistors (typically, greater than or equal to 1 inch and less than or equal to 50 inches).

Specific structure examples of the driver circuit 30 and the functional circuit 40 will be described with reference to FIG. 4. FIG. 4 is a block diagram showing a plurality of wirings connecting the pixel circuits 51, the driver circuit 30, and the functional circuit 40 in the display apparatus 10A, a bus wiring in the display apparatus 10A, and the like.

Figure 4:
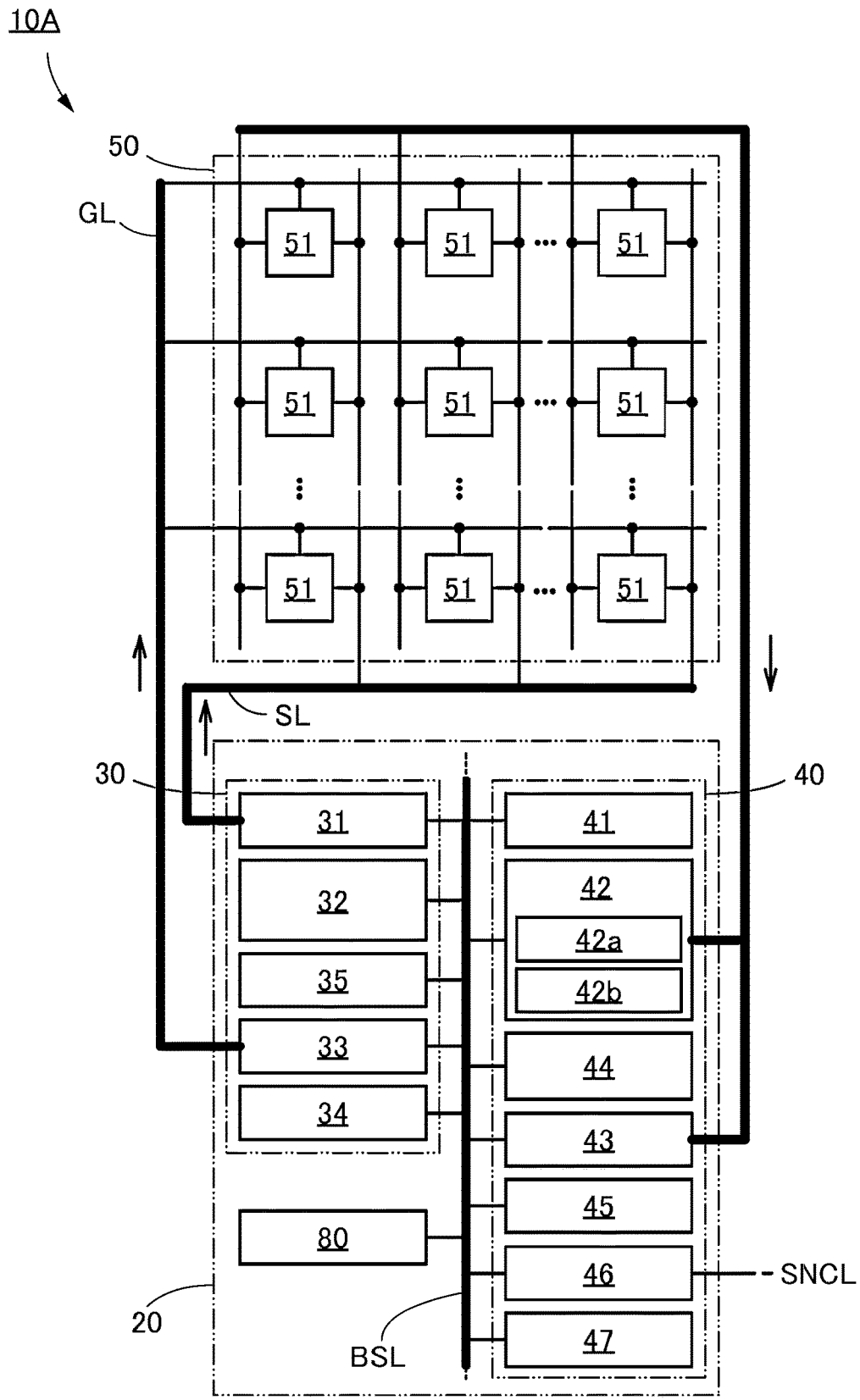
FIG. 4 is a diagram illustrating a structure example of a display apparatus.

In the display apparatus 10A shown in FIG. 4, the plurality of pixel circuits 51 are arranged in a matrix in the layer 50.

Furthermore, the driver circuit 30, the functional circuit 40, and the input/output circuit 80 are provided in the layer 20 in the display apparatus 10A shown in FIG. 4. The driver circuit 30 includes, for example, a source driver circuit 31, a digital-analog converter (DAC) circuit 32, an amplifier circuit 35, a gate driver circuit 33, and a level shifter 34. The functional circuit 40 includes, for example, a memory device 41, a GPU (AI accelerator) 42, an EL correction circuit 43, a timing controller 44, a CPU 45, a sensor controller 46, and a power supply circuit 47. The functional circuit 40 has a function of an application processor.

The input/output circuit 80 is compatible with a transmission method such as LVDS (Low Voltage Differential Signaling), and the input/output circuit 80 has a function of dividing control signals, image data, and the like input via the terminal portion 14 between the driver circuit 30 and the functional circuit 40. Furthermore, the input/output circuit 80 has a function of outputting information of the display apparatus 10A to the outside via the terminal portion 14.

In the display apparatus 10A in FIG. 4, an example of a structure in which the circuits included in the driver circuit 30 and the circuits included in the functional circuit 40 are each electrically connected to a bus wiring BSL is illustrated.

The source driver circuit 31 has a function of transmitting image data to the pixel circuits 51 included in the pixels 230, for example. Thus, the source driver circuit 31 is electrically connected to the pixel circuits 51 through a wiring SL. Note that a plurality of source driver circuits 31 may be provided.

The digital-analog converter circuit 32 has a function of converting image data that has been digitally processed by a GPU, a correction circuit, or the like described later, into analog data, for example. The image data converted into analog data is amplified by the amplifier circuit 35 such as an operational amplifier and is transmitted to the pixel circuits 51 via the source driver circuit 31. Note that the image data may be transmitted to the source driver circuit 31, the digital-analog converter circuit 32, and the pixel circuits 51 in this order. The digital-analog converter circuit 32 and the amplifier circuit 35 may be included in the source driver circuit 31.

The gate driver circuit 33 has a function of selecting the pixel circuit to which image data is to be transmitted among the pixel circuits 51, for example. Thus, the gate driver circuit 33 is electrically connected to the pixel circuits 51 through a wiring GL. Note that a plurality of gate driver circuits 33 may be provided such that the number of the gate driver circuits 33 corresponds to the number of the source driver circuits 31.

The level shifter 34 has a function of converting signals to be input to the source driver circuit 31, the digital-analog converter circuit 32, the gate driver circuit 33, and the like into appropriate levels, for example.

The memory device 41 has a function of storing image data to be displayed by the pixel circuits 51, for example. Note that the memory device 41 can be configured to store the image data as digital data or analog data.

In the case where the memory device 41 stores image data, the memory device 41 is preferably a nonvolatile memory. In that case, a NAND memory or the like can be used as the memory device 41, for example.

In the case where the memory device 41 stores temporary data generated in the GPU 42, the EL correction circuit 43, the CPU 45, or the like, the memory device 41 is preferably a volatile memory. In that case, an SRAM (Static Random Access Memory), a DRAM (Dynamic Random Access Memory), or the like can be used as the memory device 41, for example.

The GPU 42 has a function of performing processing for outputting, to the pixel circuits 51, image data read from the memory device 41, for example. Specifically, the GPU 42 is configured to perform pipeline processing in parallel and thus can perform high-speed processing of image data to be output to the pixel circuits 51. The GPU 42 can also have a function of a decoder for decoding an encoded image.

The functional circuit 40 may include a plurality of circuits that can improve the display quality of the display apparatus 10A. As such circuits, for example, correction (toning and dimming) circuits that detect color irregularity of a displayed image and correct the color irregularity to obtain an optimal image may be provided. In the case where a light-emitting device utilizing organic EL is used as the display element, for example, an EL correction circuit that corrects image data in accordance with the properties of the light-emitting device may be provided in the functional circuit 40. The functional circuit 40 includes, for example, the EL correction circuit 43.

The above-described image correction may be performed using artificial intelligence. For example, a current flowing in a pixel circuit (or a voltage applied to the pixel circuit) may be monitored and obtained, a displayed image may be obtained with an image sensor or the like, the current (or voltage) and the image may be used as input data in an arithmetic operation of the artificial intelligence (e.g., an artificial neural network), and the output result may be used to judge whether the image should be corrected.

Such an arithmetic operation of artificial intelligence can be applied to not only image correction but also upconversion for increasing the definition of image data. As an example, FIG. 4 illustrates the GPU 42 that includes blocks for performing arithmetic operations for various kinds of correction (e.g., color irregularity correction 42a and upconversion 42b).

The upconversion processing of image data can be performed with an algorithm selected from a Nearest neighbor method, a Bilinear method, a Bicubic method, a RAISR (Rapid and Accurate Image Super-Resolution) method, an ANR (Anchored Neighborhood Regression) method, an A+ method, an SRCNN (Super-Resolution Convolutional Neural Network) method, and the like.

The algorithm used for the upconversion processing may be different for each region determined in accordance with a gaze point. For example, upconversion processing for a region including the gaze point and the vicinity of the gaze point is performed using an algorithm with a low processing speed but high accuracy, and upconversion processing for a region other than the above region is performed using an algorithm with low accuracy but a high processing speed. In that case, the time required for upconversion processing can be shortened. In addition, power consumption required for upconversion processing can be reduced.

Without limitation to upconversion processing, downconversion processing for decreasing the definition of image data may be performed. In the case where the definition of image data is higher than the definition of the display portion 13, part of the image data is not displayed on the display portion 13, in some cases. In that case, downconversion processing enables the entire image data to be displayed on the display portion 13.

The timing controller 44 has a function of controlling driving frequency (e.g., frame frequency, frame rate, or refresh rate) for displaying an image, for example. In the case where a still image is displayed on the display apparatus 10A, for example, the driving frequency is lowered by the timing controller 44, so that power consumption of the display apparatus 10A can be reduced.

The CPU 45 has a function of performing general-purpose processing such as execution of an operating system, control of data, and execution of various kinds of arithmetic operations and programs, for example. The CPU 45 has a role in, for example, giving an instruction for a writing operation or a reading operation of image data in the memory device 41, an operation for correcting image data, an operation for a later-described sensor, or the like. Furthermore, the CPU 45 may have a function of transmitting a control signal to at least one of the circuits included in the functional circuit 40, for example.

The sensor controller 46 has a function of controlling a sensor, for example. FIG. 4 illustrates a wiring SNCL as a wiring for electrical connection to the sensor.

The sensor can be, for example, a touch sensor that can be provided in the display portion 13. Alternatively, the sensor can be an illuminance sensor, for example.

The power supply circuit 47 has a function of generating voltages to be supplied to the pixel circuits 51, the driver circuit 30, and the functional circuit 40, for example. Note that the power supply circuit 47 may have a function of selecting a circuit to which a voltage is to be supplied. The power supply circuit 47 can stop supply of a voltage to the CPU 45, the GPU 42, and the like during a period in which a still image is displayed so that the power consumption of the whole display apparatus 10A is reduced, for example.

As described above, the display apparatus of one embodiment of the present invention can have a structure in which display elements, pixel circuits, a driver circuit, and the functional circuit 40 are stacked. The driver circuit and the functional circuit, which are peripheral circuits, can be provided so as to overlap with the pixel circuits and thus the width of the bezel can be made extremely small, so that a reduction in size of the display apparatus can be achieved. A structure of the display apparatus of one embodiment of the present invention in which circuits are stacked enables its wirings connecting the circuits to be shortened, resulting in a reduction in weight of the display apparatus. The display apparatus of one embodiment of the present invention can include a display portion with an increased pixel resolution; thus, the display apparatus can have high display quality.

<Structure Example of Display Module>

Next, a structure example of a display module including the display apparatus 10A will be described.

Figure 5A:
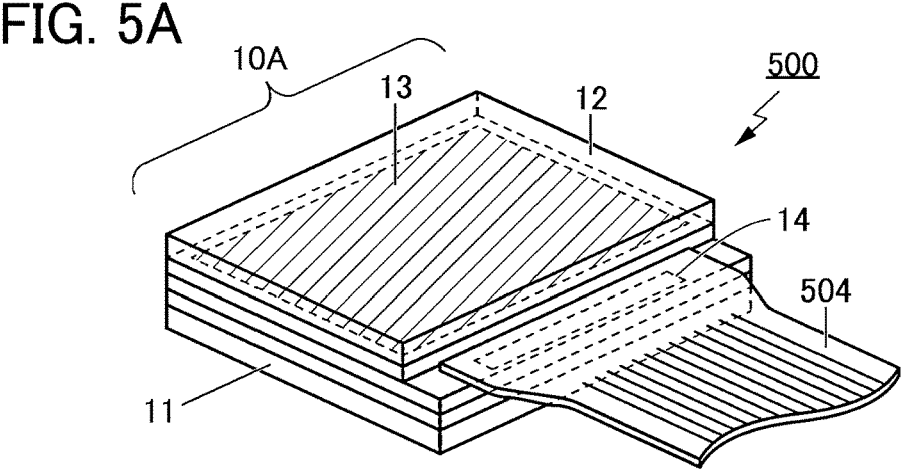
FIG. 5A to FIG. 5C are perspective views of a display module.
Figure 5B:
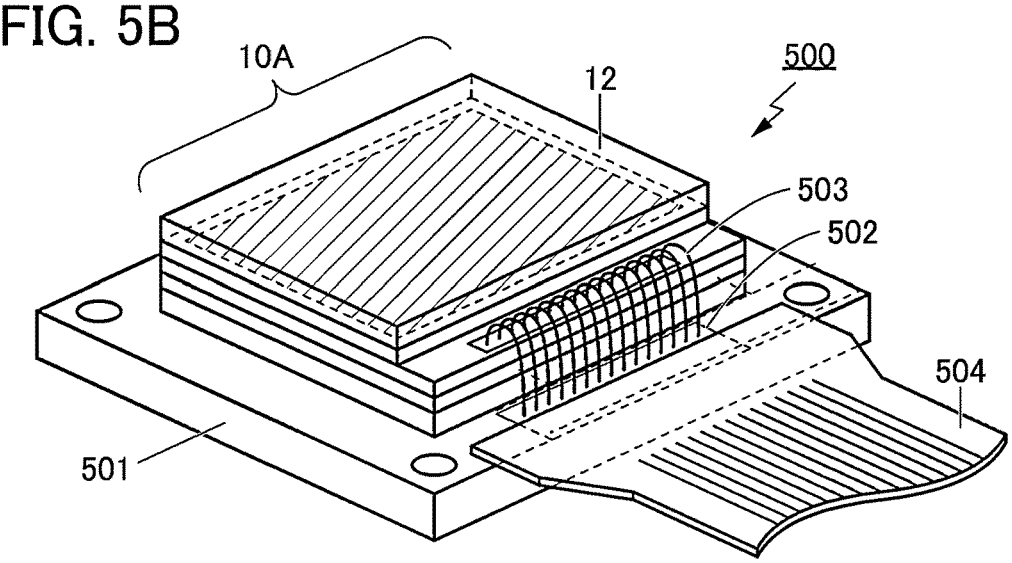
Figure 5C:
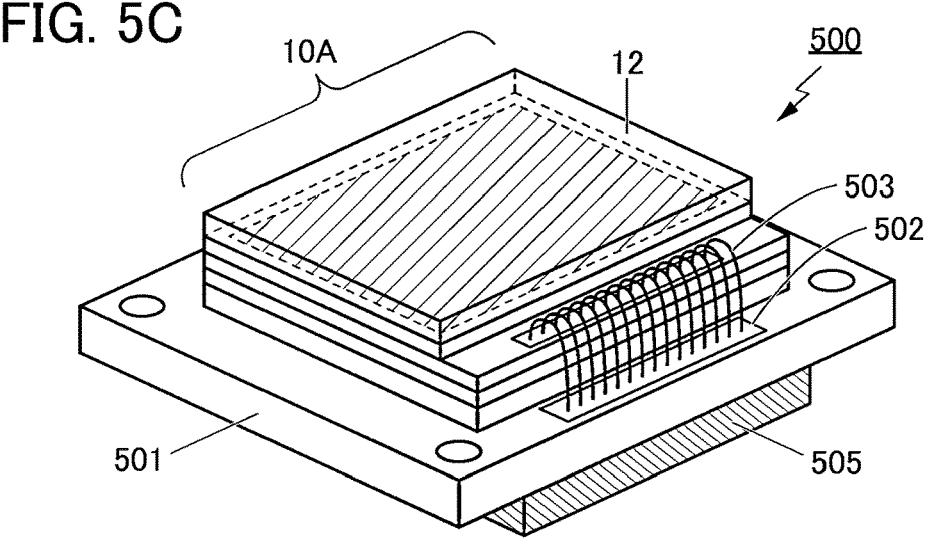

FIG. 5A to FIG. 5C are each a perspective view of a display module 500. The display module 500 has a structure in which an FPC (Flexible printed circuit) 504 is provided on the terminal portion 14 of the display apparatus 10A. The FPC 504 has a structure in which a film formed of an insulator is provided with a wiring. The FPC 504 is flexible. The FPC 504 functions as a wiring for supplying a video signal, a control signal, a power supply potential, and the like to the display apparatus 10A from the outside. An IC may be mounted on the FPC 504.

The display module 500 illustrated in FIG. 5B includes the display apparatus 10A over a printed wiring board 501. The printed wiring board 501 includes wirings inside a substrate formed of an insulator and/or on the surface of the substrate.

In the display module 500 illustrated in FIG. 5B, the terminal portion 14 of the display apparatus 10A is electrically connected to a terminal portion 502 of the printed wiring board 501 through a wire 503. The wire 503 can be formed in wire bonding. Ball bonding or wedge bonding can be used as the wire bonding.

After the wire 503 is formed, the wire 503 may be covered with a resin material or the like. Note that the display apparatus 10A and the printed wiring board 501 may be electrically connected to each other by a method other than the wire bonding. For example, the display apparatus 10A and the printed wiring board 501 may be electrically connected to each other using an anisotropic conductive adhesive or a bump.

In the display module 500 illustrated in FIG. 5B, the terminal portion 502 of the printed wiring board 501 is electrically connected to the FPC 504. In the case where the electrode pitch in the terminal portion 14 of the display apparatus 10A is different from the electrode pitch in the FPC 504, for example, the terminal portion 14 may be electrically connected to the FPC 504 via the printed wiring board 501. Specifically, the interval (pitch) between a plurality of electrodes in the terminal portion 14 can be converted into the interval between a plurality of electrodes in the terminal portion 502 using wirings formed on the printed wiring board 501. Accordingly, even when the electrode pitch in the terminal portion 14 is different from the electrode pitch in the FPC 504, electrical connection between the electrodes can be achieved.

The printed wiring board 501 can be provided with a variety of elements such as a resistor, a capacitor element, and a semiconductor element.

As in the display module 500 illustrated in FIG. 5C, the terminal portion 502 may be electrically connected to a connection portion 505 provided on a bottom surface (a surface where the display apparatus 10A is not provided) of the printed wiring board 501. With the use of a socket-type connection portion as the connection portion 505, for example, the display module 500 can be easily attached to and detached from another device.

<Operation Example of Electronic Device>

Figure 6:
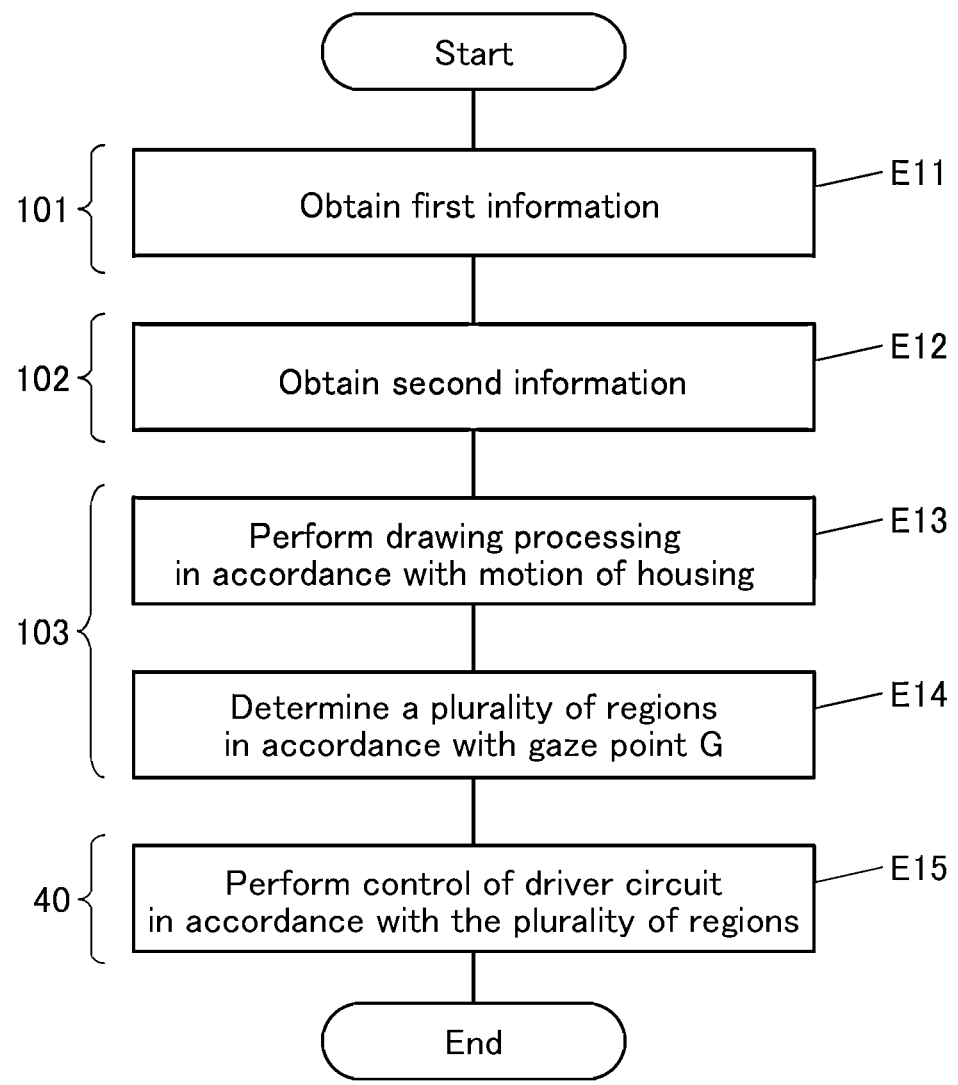
FIG. 6 is a diagram illustrating an operation example of an electronic device.

An operation example of the electronic device 100 will be described with reference to drawings. FIG. 6 is a flow chart for illustrating the operation example of the electronic device 100.

The motion detection portion 101 obtains the first information (the information on the motion of the housing 105) (Step E11).

The gaze detection portion 102 obtains the second information (the information on the user's gaze) (Step E12).

The arithmetic portion 103 performs drawing processing of 360-degree omnidirectional image data on the basis of the first information (Step E13).

Figure 7A:
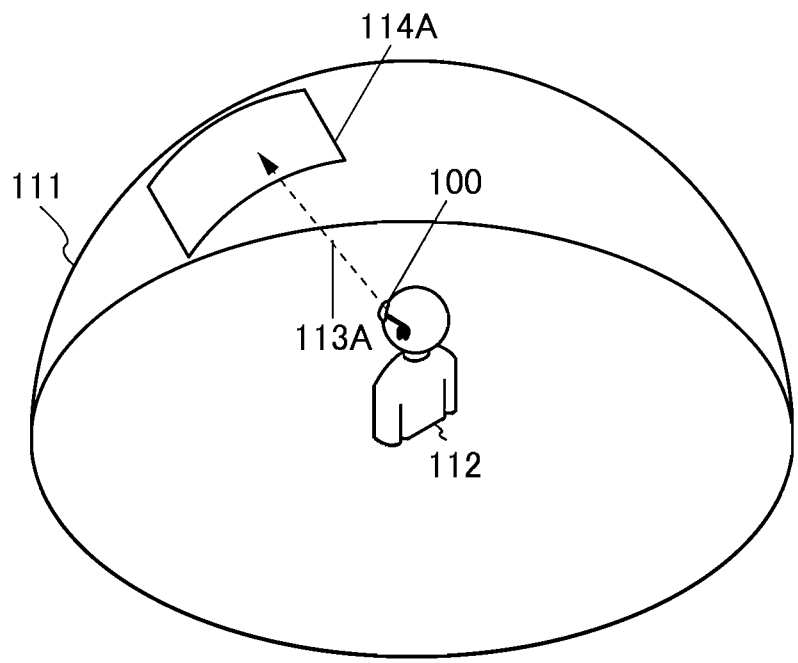
FIG. 7A and FIG. 7B are schematic views illustrating a structure example of an electronic device.

Step E13 is described by giving a specific example. The schematic view in FIG. 7A illustrates a user 112 positioned at the center of a 360-degree omnidirectional image data 111. The user 112 can see an image 114A that is displayed on the display apparatus 10A of the electronic device 100 and that is in a direction 113A.

Figure 7B:
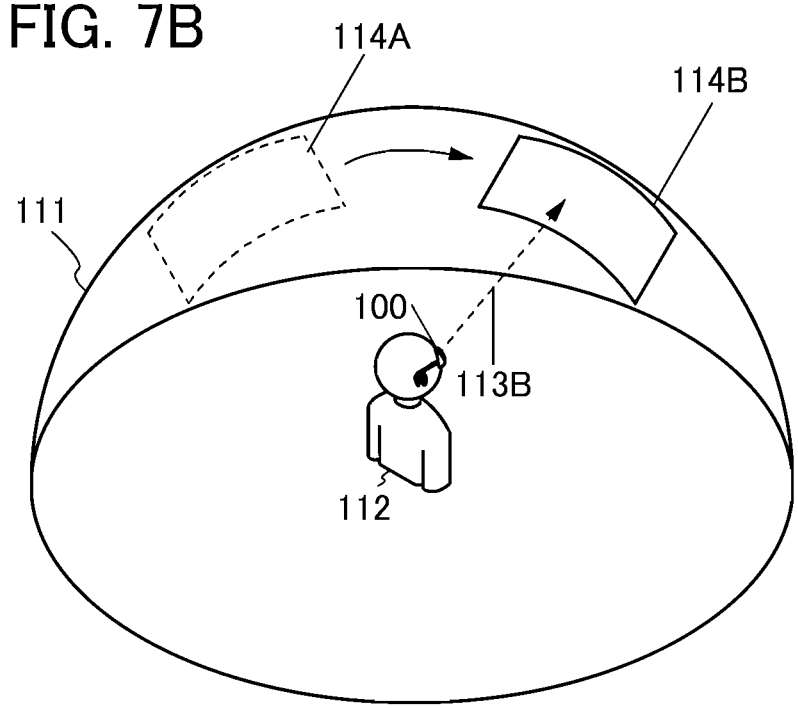

The schematic view in FIG. 7B shows the state where the user 112 that has been in the state of the schematic view in FIG. 7A moves his/her head to see an image 114B that is in a direction 113B. The image 114A changes into the image 114B in accordance with the motion of the housing of the electronic device 100, so that the user 112 can perceive the space expressed by the 360-degree omnidirectional image data 111.

As shown in FIG. 7A and FIG. 7B, the user 112 moves the housing of the electronic device 100 in accordance with the motion of his/her head. When an image obtained from the 360-degree omnidirectional image data 111 in accordance with the motion of the electronic device 100 is processed with higher drawing processing capacity, the user 112 can perceive a virtual space closer to the real world.

Figure 8A:
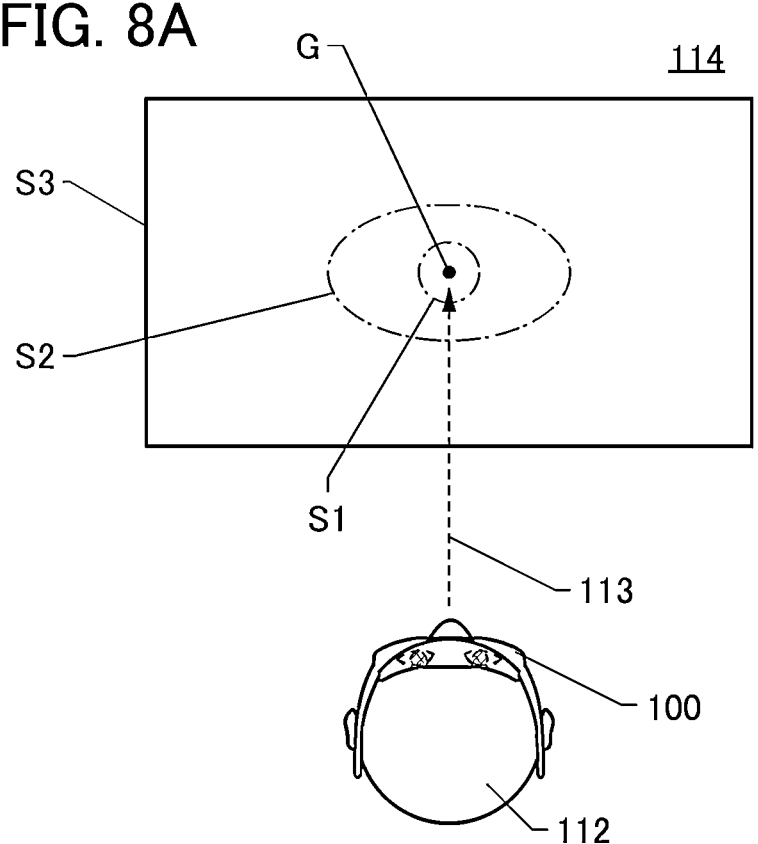
FIG. 8A and FIG. 8B are schematic views illustrating structure examples of an electronic device.

The arithmetic portion 103 determines a plurality of regions of the display portion in the display apparatus in accordance with a gaze point G based on the second information (Step E14). As illustrated in FIG. 8A, the first region S1 including the gaze point G is determined, the second region S2 adjacent to the first region S1 is determined, for example. Furthermore, the outside of the second region is the third region S3.

Step E14 is described by giving a specific example.

In general, the human visual field is roughly classified into the following five fields, although varying between individuals. The discrimination visual field refers to the region (a region including a gaze point) within approximately 5° from the center of vision, where visual performance such as eyesight and color identification is the most excellent. The effective visual field refers to the region that is horizontally within approximately 30° and vertically within approximately 20° from the center of vision (a gaze point) and adjacent to the outside of the discrimination visual field, where instant identification of particular information is possible only with an eye movement. The stable visual field refers to the region that is horizontally within approximately 90° and vertically within approximately 70° from the center of vision and adjacent to the outside of the effective visual field, where identification of particular information is possible without any difficulty with a head movement. The inducting visual field refers to the region that is horizontally within approximately 100° and vertically within approximately 85° from the center of vision and adjacent to the outside of the stable visual field, where the existence of a particular target can be sensed but the identification ability is low. The supplementary visual field refers to the region that is horizontally within approximately 100° to 200° and vertically within approximately 85° to 130° from the center of vision and adjacent to the outside of the inducting visual field, where the identification ability for a particular target is significantly low to an extent that the existence of a stimulus can be sensed.

From the above, it is found that the image quality in the discrimination visual field and the effective visual field is important in the image 114. The image quality in the discrimination visual field is particularly important.

FIG. 8A is a schematic view illustrating the state where the user 112 sees an image 114 displayed on the display portion of the display apparatus 10A of the electronic device 100 from the front (image display surface). The image 114 shown in FIG. 8A also corresponds to the display portion. The gaze point G in the direction of a gaze 113 of the user 112 is illustrated on the image 114. In this specification and the like, a region including the discrimination visual field and a region including the effective visual field on the image 114 are referred to as the "first region S1" and the "second region S2", respectively. Furthermore, a region including the stable visual field, the inducting visual field, and the supplementary visual field is referred to as the "third region S3".

Figure 8B:
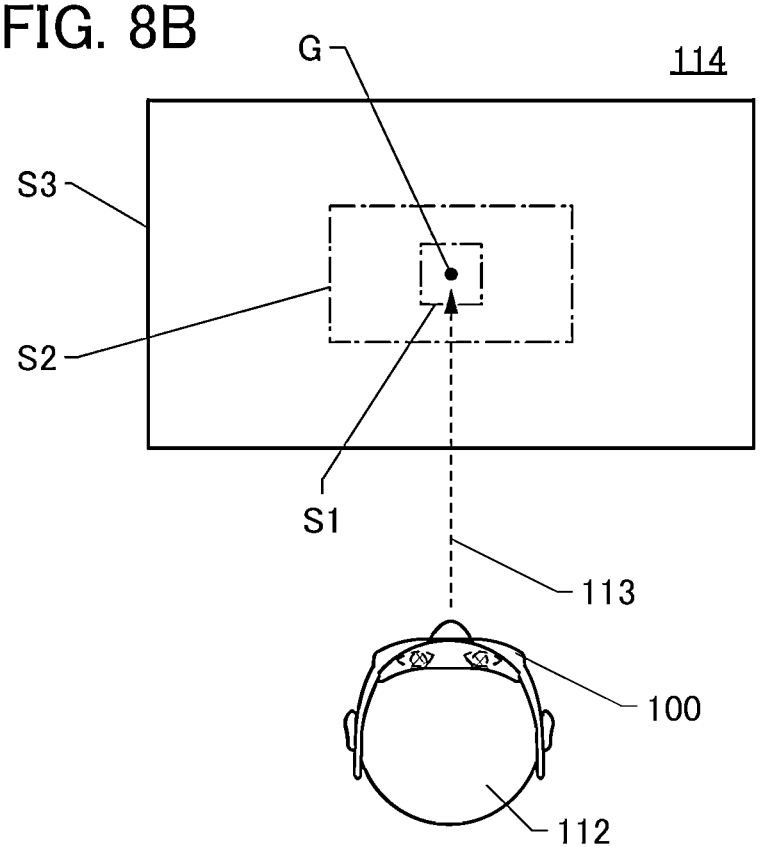

Although the boundary (outline) between the first region S1 and the second region S2 is illustrated by a curved line in FIG. 8A, one embodiment of the present invention is not limited thereto. As illustrated in FIG. 8B, the boundary (outline) between the first region S1 and the second region S2 may be rectangular or polygonal. Alternatively, the boundary may have a shape in which a straight line and a curved line are combined. The display portion of the display apparatus 10A may be divided into two regions; one of the regions including the discrimination visual field and the effective visual field may be referred to as the first region S1, and the other region may be referred to as the second region S2. In this case, the third region S3 is not formed.

Figure 9A:
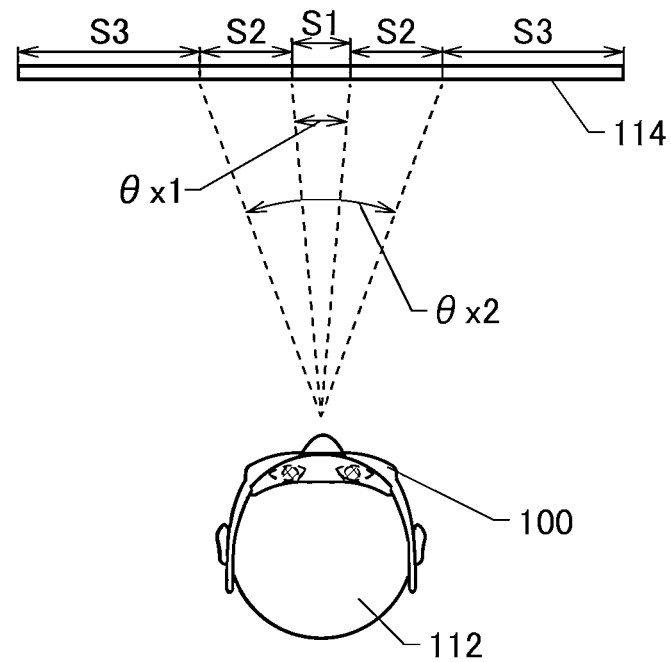
FIG. 9A and FIG. 9B are schematic views illustrating a structure example of an electronic device.
Figure 9B:
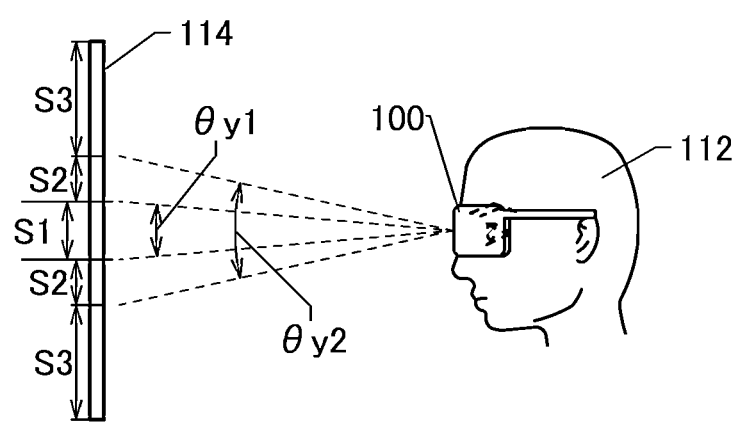

FIG. 9A is a top view of the image 114 displayed on the display portion of the display apparatus 10A of the electronic device 100, and FIG. 9B is a side view of the image 114 displayed on the display portion of the display apparatus 10A of the electronic device 100. In this specification and the like, the angle of the first region S1 in the horizontal direction is shown by "angle $\theta x1$", and the angle of the second region S2 in the horizontal direction is shown by "angle $\theta x2$" (see FIG. 9A). In this specification and the like, the angle of the first region S1 in the vertical direction is shown by "angle $\theta y1$", and the angle of the second region S2 in the vertical direction is shown by "angle $\theta y2$" (see FIG. 9B).

For example, by setting the angle $\theta x1$ to 10° and the angle $\theta y1$ to 10°, the area of the first region S1 can be widened. In that case, part of the effective visual field is included in the first region S1. Furthermore, by setting the angle $\theta x2$ to 45° and the angle $\theta y2$ to 35°, the area of the second region S2 can be widened. In that case, part of the stable visual field is included in the second region S2.

The position of the gaze point G varies to some extent by a swing of the gaze of the user 112. Thus, the angle $\theta x1$ and the angle $\theta y1$ are each preferably greater than or equal to 5° and smaller than 20°. When the area of the first region S1 is set larger than the discrimination visual field, the operation of the display apparatus 10A is stabilized and the image visibility is improved.

When the gaze 113 of the user 112 moves, the gaze point G also moves. Accordingly, the first region S1 and the second region S2 also move. For example, in the case where the fluctuation amount of the gaze 113 exceeds a certain value, it is judged that the gaze 113 is moving. That is, in the case where the fluctuation amount of the gaze point G exceeds a certain value, it is judged that the gaze point G is moving. Furthermore, in the case where the fluctuation amount of the gaze 113 becomes lower than or equal to the certain value, it is judged that the gaze 113 has stopped moving, and the first region S1 to the third region S3 are determined. That is, in the case where the fluctuation amount of the gaze point G becomes lower than or equal to the certain value, it is judged that the gaze point G has stopped moving, and the first region S1 to the third region S3 are determined.

The functional circuit 40 performs control of the driver circuit 30 differing between a plurality of regions (the first region S1 to the third region S3) (Step E15).

<Structure Example of Pixel Circuit>

Figure 10A:
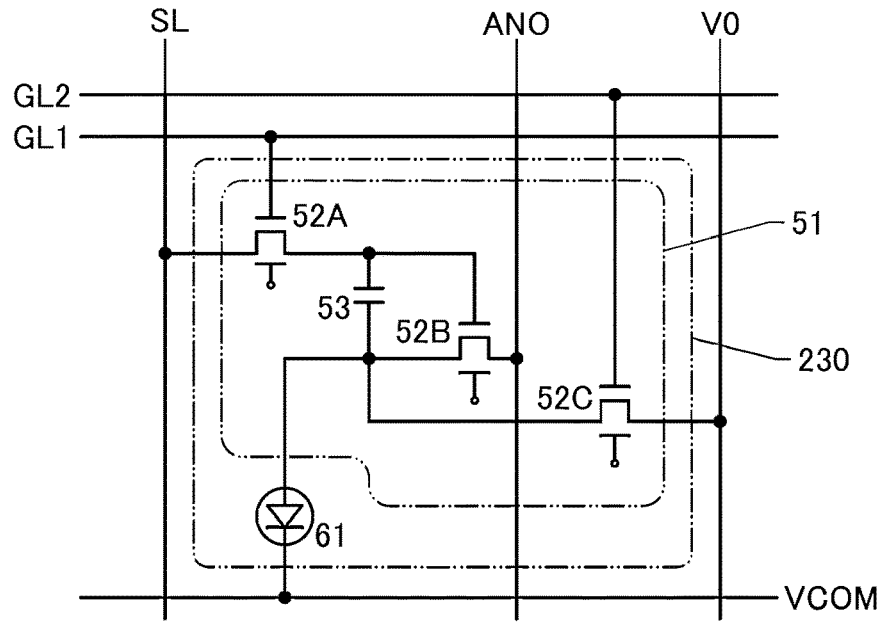
FIG. 10A and FIG. 10B are diagrams illustrating a structure example of a display apparatus.
Figure 10B:
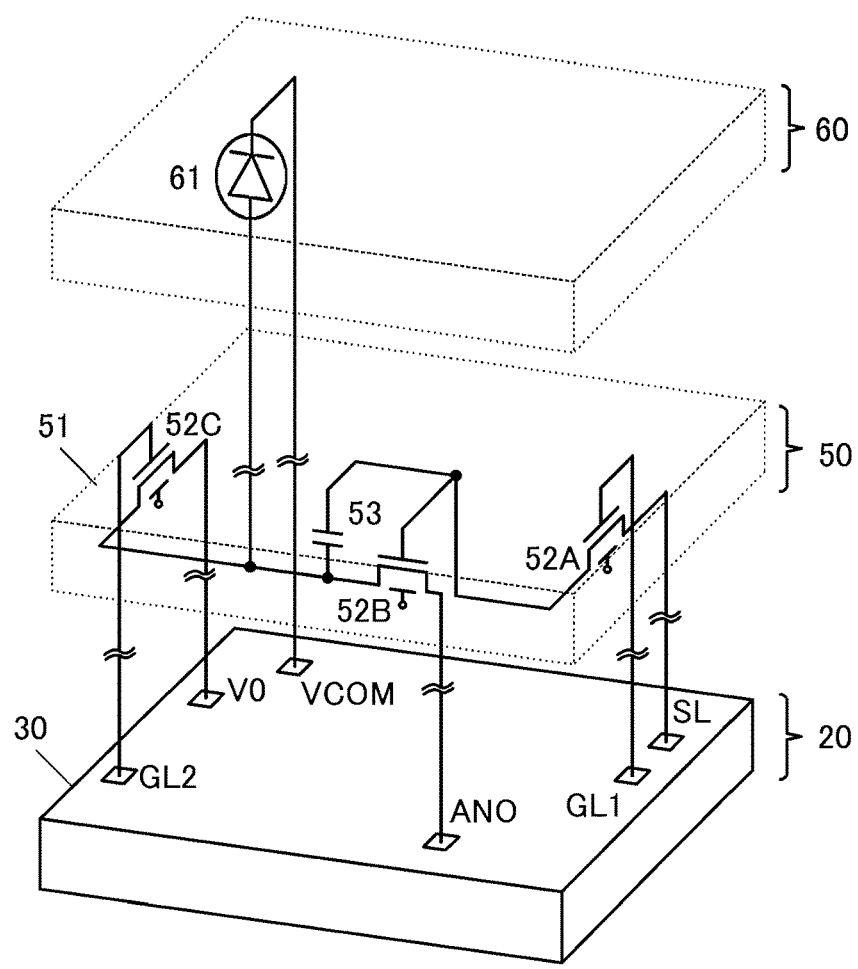

FIG. 10A and FIG. 10B illustrate a structure example of the pixel circuit 51 and the light-emitting element 61 connected to the pixel circuit 51. FIG. 10A schematically illustrates connection of the elements, and FIG. 10B schematically illustrates the vertical position relation of the layer 20 including the driver circuit, the layer 50 including a plurality of transistors of the pixel circuit, and the layer 60 including a light-emitting element.

The pixel circuit 51 illustrated as an example in FIG. 10A and FIG. 10B includes a transistor 52A, a transistor 52B, a transistor 52C, and a capacitor 53. The transistor 52A, the transistor 52B, and the transistor 52C can be OS transistors. Each of the OS transistors of the transistor 52A, the transistor 52B, and the transistor 52C preferably includes a back gate electrode, in which case the structure in which the back gate electrode is supplied with the same signals as those supplied to the gate electrode or the structure in which the back gate electrode is supplied with signals different from those supplied to the gate electrode can be used.

The transistor 52B includes the gate electrode electrically connected to the transistor 52A, a first electrode electrically connected to the light-emitting element 61, and a second electrode electrically connected to a wiring ANO. The wiring ANO is a wiring for supplying a potential for supplying a current to the light-emitting element 61.

The transistor 52A includes a first terminal electrically connected to the gate electrode of the transistor 52B, a second terminal electrically connected to the wiring SL which functions as a source line, and the gate electrode having a function of controlling the conduction state or non-conduction state on the basis of the potential of a wiring GL1 which functions as a gate line.

The transistor 52C includes a first terminal electrically connected to a wiring V0, a second terminal electrically connected to the light-emitting element 61, and the gate electrode having a function of controlling the conduction state or non-conduction state on the basis of the potential of a wiring GL2 which functions as a gate line. The wiring V0 is a wiring for supplying a reference potential and a wiring for outputting a current flowing through the pixel circuit 51 to the driver circuit 30 or the functional circuit 40.

The capacitor 53 includes a conductive film electrically connected to the gate electrode of the transistor 52B and a conductive film electrically connected to the second electrode of the transistor 52C.

The light-emitting element 61 includes a first electrode electrically connected to the first electrode of the transistor 52B and a second electrode electrically connected to a wiring VCOM. The wiring VCOM is a wiring for supplying a potential for supplying a current to the light-emitting element 61.

Accordingly, the intensity of light emitted from the light-emitting element 61 can be controlled in accordance with an image signal supplied to the gate electrode of the transistor 52B. Furthermore, variations in a potential difference between the gate and the source of the transistor 52B can be inhibited by the reference potential of the wiring V0 supplied through the transistor 52C.

A current value that can be used for setting of pixel parameters can be output from the wiring V0. Specifically, the wiring V0 can function as a monitor line for outputting a current flowing through the transistor 52B or a current flowing through the light-emitting element 61 to the outside. A current output to the wiring V0 is converted into a voltage by a source follower circuit or the like and output to the outside. Alternatively, the current output to the wiring V0 can be converted into a digital signal by an A-D converter or the like and output to the functional circuit 40 or the like.

Note that the light-emitting element described in one embodiment of the present invention refers to a self-luminous display element such as an organic EL element (also referred to as an OLED (Organic Light Emitting Diode)). Note that the light-emitting element electrically connected to the pixel circuit can be a self-luminous light-emitting element such as an LED (Light Emitting Diode), a micro LED, a QLED (Quantum-dot Light Emitting Diode), or a semiconductor laser.

Note that in the structure illustrated as an example in FIG. 10B, the wirings electrically connecting the pixel circuit 51 and the driver circuit 30 can be shortened, so that wiring resistance of the wirings can be reduced. Thus, data can be written at high speed, which enables high-speed driving of the display apparatus 10A. Therefore, even when the number of the pixel circuits 51 included in the display apparatus 10A is increased, a sufficiently long frame period can be ensured, and thus, the pixel density of the display apparatus 10A can be increased. In addition, the increased pixel density of the display apparatus 10A can increase the resolution of an image displayed by the display apparatus 10A. For example, the pixel density of the display apparatus 10A can be higher than or equal to 1000 ppi, higher than or equal to 5000 ppi, or higher than or equal to 7000 ppi. Thus, the display apparatus 10A can be, for example, a display apparatus for AR or VR and can be suitably used in an electronic device with a short distance between a display portion and the user, such as an HMD.

Although FIG. 10A and FIG. 10B illustrate, as an example, the pixel circuit 51 including three transistors in total, one embodiment of the present invention is not limited thereto. Structure examples and a driving method example of a pixel circuit which can be used for the pixel circuit 51 will be described below.

Figure 11A:
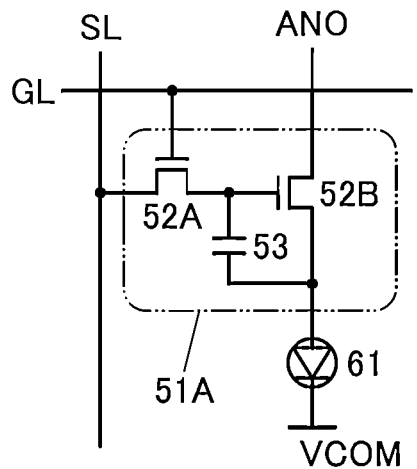
FIG. 11A to FIG. 11D are diagrams illustrating structure examples of a display apparatus.

A pixel circuit 51A illustrated in FIG. 11A includes the transistor 52A, the transistor 52B, and the capacitor 53. FIG. 11A illustrates the light-emitting element 61 connected to the pixel circuit 51A. The wiring SL, the wiring GL, the wiring ANO, and the wiring VCOM are electrically connected to the pixel circuit 51A. The pixel circuit 51A has a structure in which the transistor 52C is removed from the pixel circuit 51 illustrated in FIG. 10A and the wiring GL1 and the wiring GL2 are replaced with the wiring GL.

A gate of the transistor 52A is electrically connected to the wiring GL, one of a source and a drain of the transistor 52A is electrically connected to the wiring SL, and the other of the source and the drain of the transistor 52A is electrically connected to a gate of the transistor 52B and one electrode of a capacitor C1. One of a source and a drain of the transistor 52B is electrically connected to the wiring ANO and the other of the source and the drain of the transistor 52B is electrically connected to an anode of the light-emitting element 61. The other electrode of the capacitor C1 is electrically connected to the anode of the light-emitting element 61. A cathode of the light-emitting element 61 is electrically connected to the wiring VCOM.

Figure 11B:
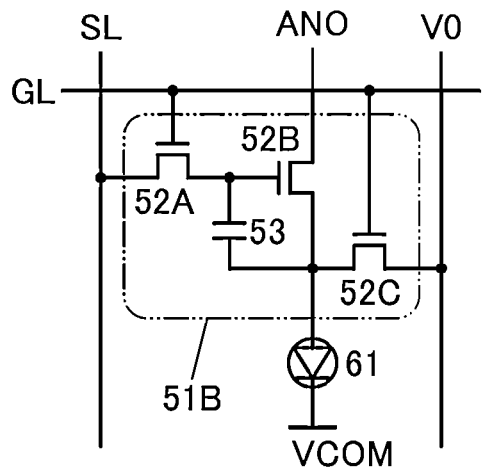

A pixel circuit 51B illustrated in FIG. 11B has a structure in which a transistor 52C is added to the pixel circuit 51A. In addition, the wiring V0 is electrically connected to the pixel circuit 51B.

Figure 11C:
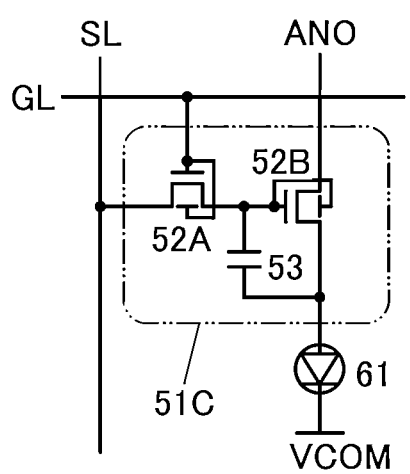
Figure 11D:
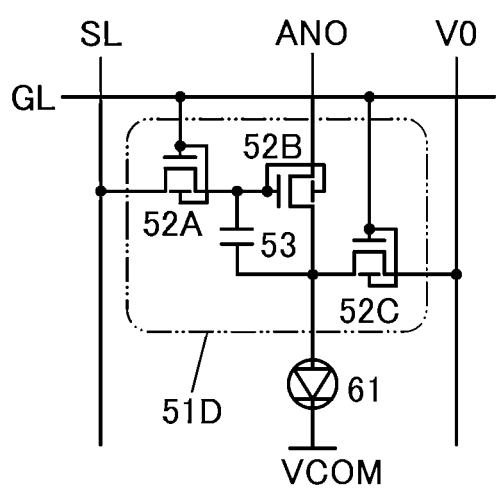

A pixel circuit 51C illustrated in FIG. 11C is an example of the case where a transistor in which a pair of gates are electrically connected to each other is used as each of the transistor 52A and the transistor 52B of the pixel circuit 51A. A pixel circuit 51D illustrated in FIG. 11D is an example of the case where such transistors are used in the pixel circuit 51B. Thus, the current that can flow through the transistor can be increased. Note that although a transistor in which a pair of gates are electrically connected to each other is used for each of the transistors here, one embodiment of the present invention is not limited thereto. A transistor that includes a pair of gates electrically connected to different wirings may be used. When, for example, a transistor in which one of the gates is electrically connected to the source is used, the reliability can be increased.

Figure 12A:
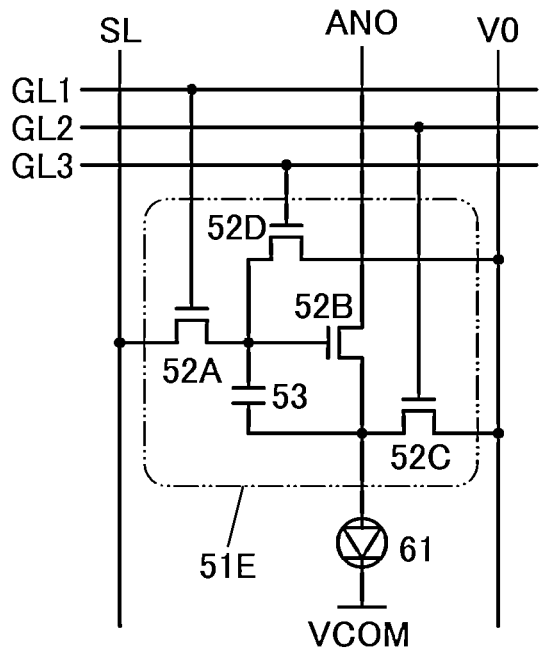
FIG. 12A to FIG. 12D are diagrams illustrating structure examples of a display apparatus.

A pixel circuit 51E illustrated in FIG. 12A has a structure in which a transistor 52D is added to the pixel circuit 51B. The wiring GL1, the wiring GL2, and a wiring GL3 functioning as gate lines are electrically connected to the pixel circuit 51E. Note that in this embodiment and the like, the wiring GL1, the wiring GL2, and the wiring GL3 are collectively referred to as the wiring GL in some cases. Thus, the wiring GL is not limited to one wiring and consists of a plurality of wirings in some cases.

A gate of the transistor 52D is electrically connected to the wiring GL3, one of a source and a drain of the transistor 52D is electrically connected to the gate of the transistor 52B, and the other of the source and the drain of the transistor 52D is electrically connected to the wiring V0. The gate of the transistor 52A is electrically connected to the wiring GL1, and the gate of the transistor 52C is electrically connected to the wiring GL2.

When the transistor 52C and the transistor 52D are turned on at the same time, the source and the gate of the transistor 52B have the same potential, so that the transistor 52B can be turned off. Thus, a current flowing to the light-emitting element 61 can be blocked forcibly. Such a pixel circuit is suitable for the case of using a display method in which a display period and a non-lighting period are alternately provided.

Figure 12B:
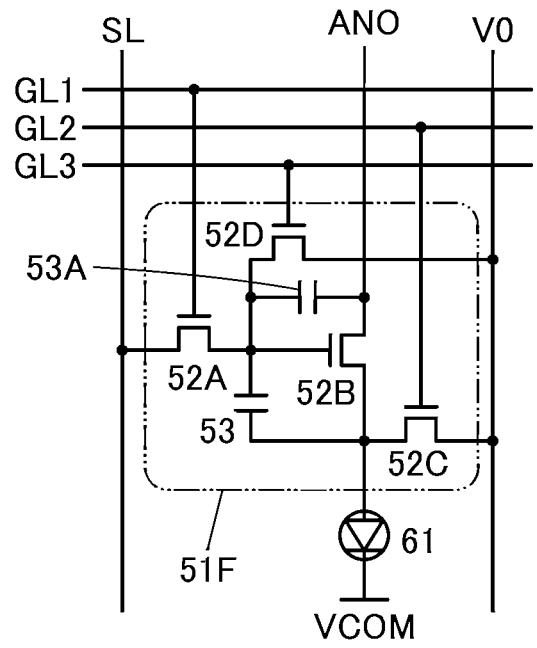

A pixel circuit 51F illustrated in FIG. 12B is an example of the case where a capacitor 53A is added to the pixel circuit 51E. The capacitor 53A functions as a storage capacitor.

Figure 12C:
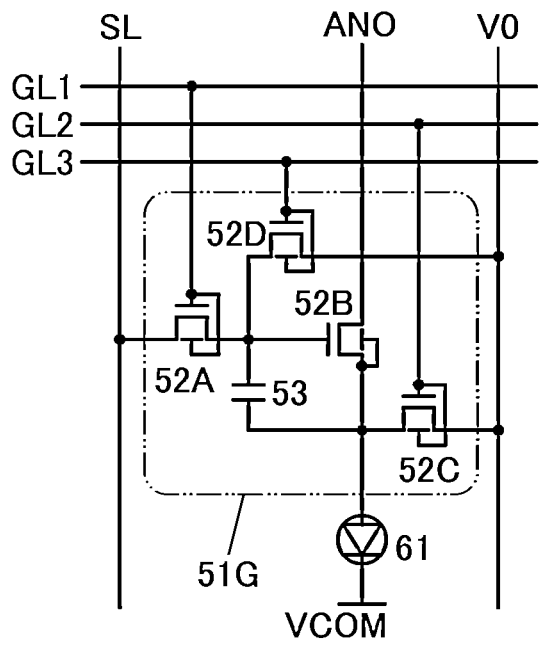
Figure 12D:
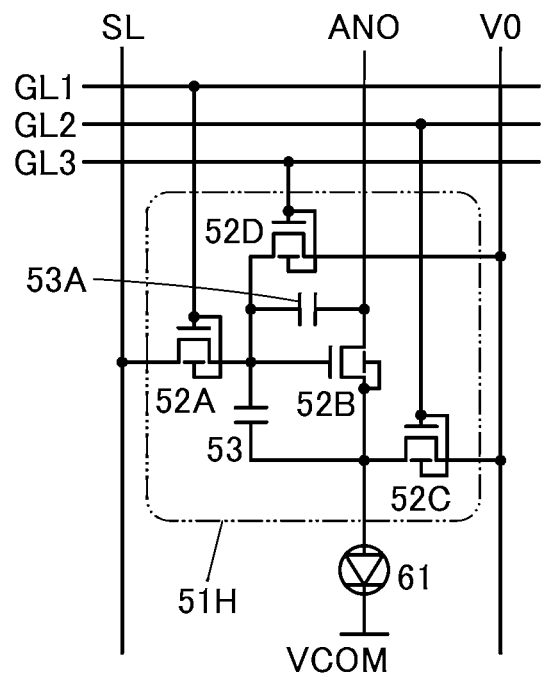

A pixel circuit 51G illustrated in FIG. 12C and a pixel circuit 51H illustrated in FIG. 12D are respectively examples of the cases where transistors each including a pair of gates are used in the pixel circuit 51E and the pixel circuit 51F. A transistor in which a pair of gates are electrically connected to each other is used as each of the transistor 52A, the transistor 52C, and the transistor 52D, and a transistor in which one of gates is electrically connected to a source is used as the transistor 52B.

Next, an example of a method for driving a display apparatus in which the pixel circuit 51E is used will be described. Note that a similar driving method can be applied to display apparatuses in which the pixel circuits 51F, 51G, and 51H are used.

Figure 13:
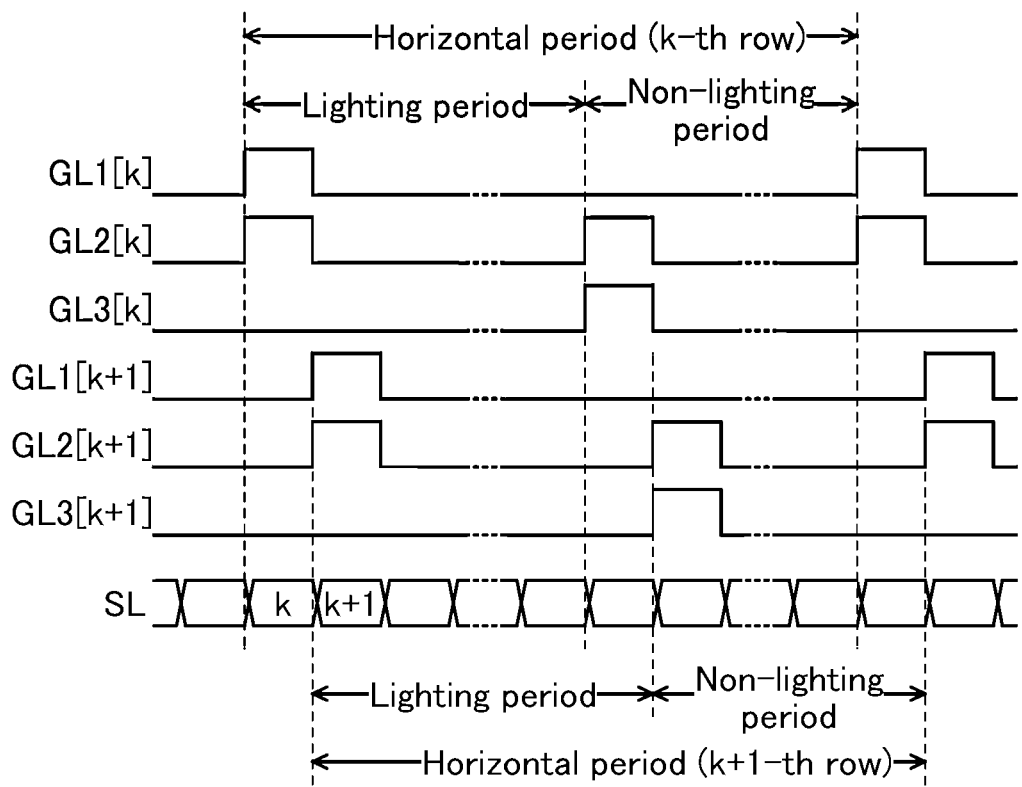
FIG. 13 is a timing chart illustrating a driving method of a display apparatus.

FIG. 13 shows a timing chart of a method for driving the display apparatus in which the pixel circuit 51E is used. Changes in the potentials of a wiring GL1[k], a wiring GL2[k], and a wiring GL3[k] that are gate lines of the k-th row and changes in the potentials of a wiring GL1[k+1], a wiring GL2[k+1], and a wiring GL3[k+1] that are gate lines of the k+1-th row are shown here. FIG. 13 also shows the timing of supplying a signal to the wiring SL functioning as a source line.

Here, an example of the driving method in which one horizontal period is divided into a lighting period and a non-lighting period is shown. A horizontal period of the k-th row is shifted from a horizontal period of the k+1-th row by a selection period of the gate line.

In the lighting period of the k-th row, first, the wiring GL1[k] and the wiring GL2[k] are supplied with a high-level potential and the wiring SL is supplied with a source signal. Thus, the transistor 52A and the transistor 52C are turned on, so that a potential corresponding to the source signal is written from the wiring SL to the gate of the transistor 52B. After that, the wiring GL1[k] and the wiring GL2[k] are supplied with a low-level potential, so that the transistor 52A and the transistor 52C are turned off and the gate potential of the transistor 52B is retained.

Subsequently, in a lighting period of the k+1-th row, data is written by an operation similar to that described above.

Next, the non-lighting period is described. In the non-lighting period of the k-th row, the wiring GL2[k] and the wiring GL3[k] are supplied with a high-level potential. Accordingly, the transistor 52C and the transistor 52D are turned on, and the source and the gate of the transistor 52B are supplied with the same potential, so that almost no current flows through the transistor 52B. Thus, the light-emitting element 61 is turned off. All the subpixels that are positioned in the k-th row are turned off. The subpixels of the k-th row remain in the non-lighting state until the next lighting period.

Subsequently, in a non-lighting period of the k+1-th row, all the subpixels of the k+1-th row are in the non-lighting state in a manner similar to that described above.

Such a driving method described above, in which the subpixels are not constantly on through one horizontal period and a non-lighting period is provided in one horizontal period, can be called duty driving. With duty driving, an afterimage phenomenon can be inhibited at the time of displaying moving images; therefore, a display apparatus with high performance in displaying moving images can be obtained. Particularly in a VR device and the like, a reduction in an afterimage can reduce what is called VR sickness.

In the duty driving, the proportion of the lighting period in one horizontal period can be called a duty cycle. For example, a duty cycle of 50% means that the lighting period and the non-lighting period have the same length. Note that the duty cycle can be set freely and can be adjusted appropriately within a range higher than 0% and lower than or equal to 100%, for example.

A structure different from the structures of the above-described pixel circuits will be described with reference to FIG. 14A and FIG. 14B.

Figure 14A:
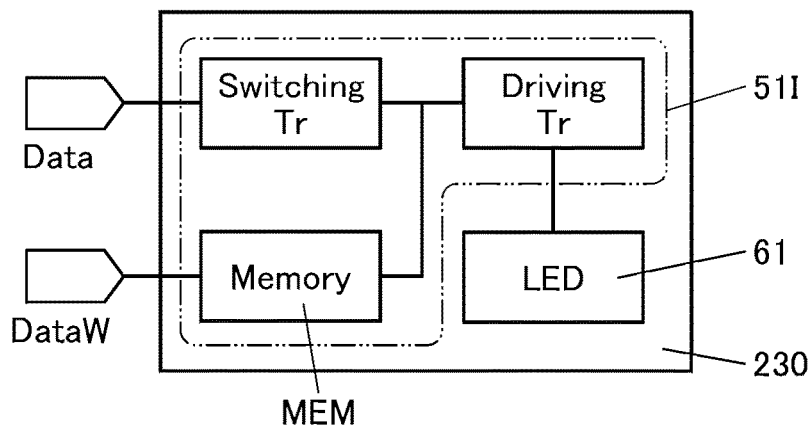
FIG. 14A and FIG. 14B are diagrams illustrating a structure example of a display apparatus.

FIG. 14A is a block diagram of the pixel 230. The pixel illustrated in FIG. 14A includes a memory circuit MEM (Memory) in addition to a switching transistor (Switching Tr), a driving transistor (Driving Tr), and a light-emitting element (LED).

Data DataW is supplied to the memory circuit MEM through a wiring SL2 and the transistor 52A. When the data DataW is supplied to the pixel in addition to image data Data, a current flowing through the light-emitting element becomes large, so that the display apparatus can have high luminance.

Figure 14B:
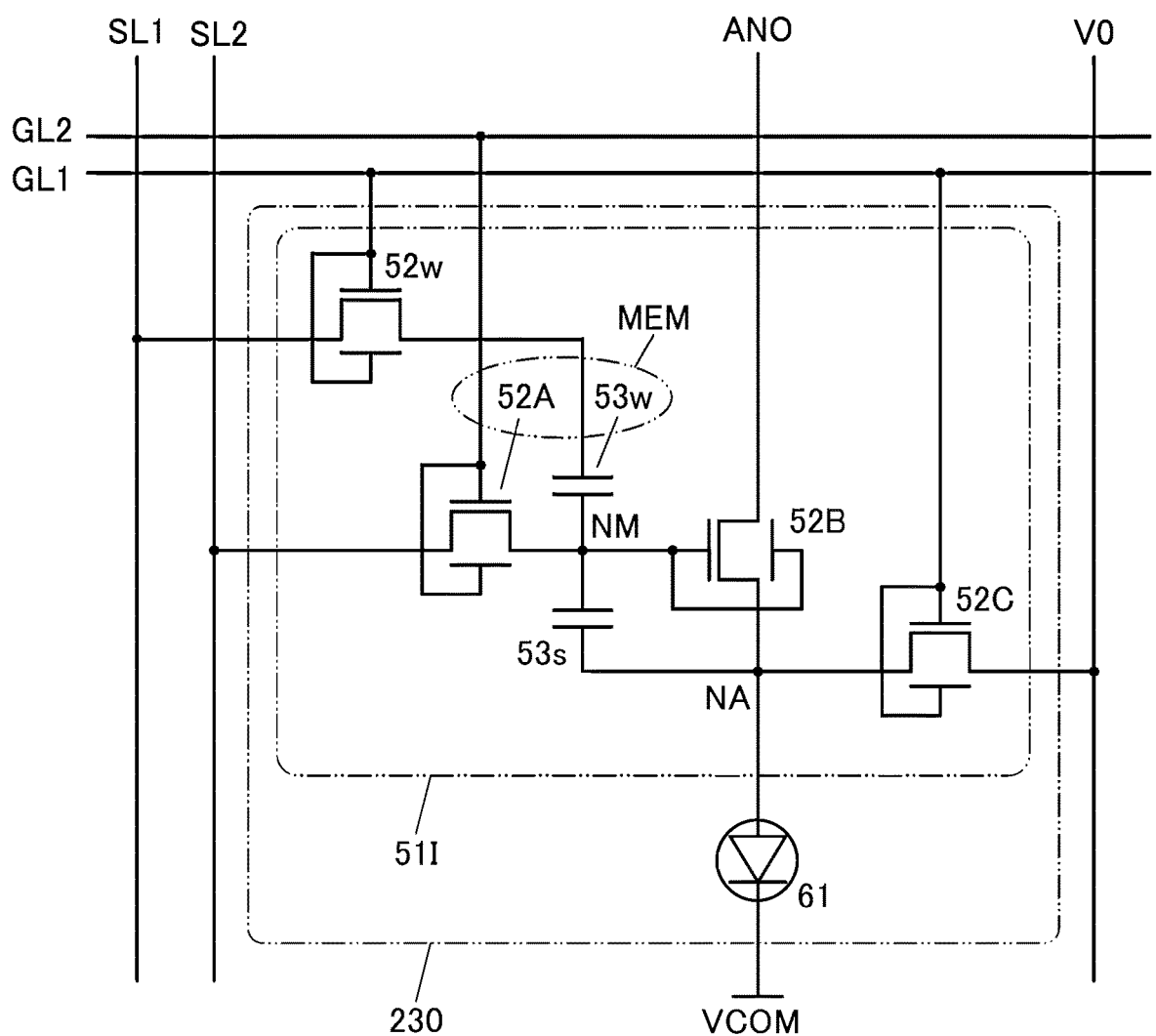

FIG. 14B is a specific circuit diagram of a pixel circuit 51I.

The pixel circuit 51I illustrated in FIG. 14B includes a transistor 52w, the transistor 52A, the transistor 52B, the transistor 52C, a capacitor 53s, and a capacitor 53w. FIG. 14B illustrates the light-emitting element 61 connected to the pixel circuit 51I.

The transistor 52w functions as a switching transistor. The transistor 52B functions as a driving transistor. One of a source and a drain of the transistor 52w is electrically connected to one electrode of the capacitor 53w. The other electrode of the capacitor 53w is electrically connected to one of the source and the drain of the transistor 52A. The one of the source and the drain of the transistor 52A is electrically connected to the gate of the transistor 52B. The gate of the transistor 52B is electrically connected to one electrode of the capacitor 53s. The other electrode of the capacitor 53s is electrically connected to one of the source and the drain of the transistor 52B. The one of the source and the drain of the transistor 52B is electrically connected to one of a source and a drain of the transistor 52C. The one of the source and the drain of the transistor 52C is electrically connected to one electrode of the light-emitting element 61. The transistors illustrated in FIG. 14B each include a back gate electrically connected to its gate; however, the connection of the back gate is not limited thereto. The transistors do not necessarily include the back gates.

Here, a node to which the other electrode of the capacitor 53w, the one of the source and the drain of the transistor 52A, the gate of the transistor 52B, and the one electrode of the capacitor 53s are connected is referred to as a node NM. A node to which the other electrode of the capacitor 53s, the one of the source and the drain of the transistor 52B, the one of the source and the drain of the transistor 52C, and the one electrode of the light-emitting element 61 are connected is referred to as a node NA.

A gate of the transistor 52w is electrically connected to the wiring GL1. The gate of the transistor 52C is electrically connected to the wiring GL1. The gate of the transistor 52A is electrically connected to the wiring GL2. The other of the source and the drain of the transistor 52w is electrically connected to a wiring SL1. The other of the source and the drain of the transistor 52C is electrically connected to the wiring V0. The other of the source and the drain of the transistor 52A is electrically connected to a wiring SL2. Note that in this embodiment and the like, the wiring SL1 and the wiring SL2 are collectively referred to as the wiring SL in some cases. Thus, the wiring SL is not limited to one wiring and consists of a plurality of wirings in some cases.

The other of the source and the drain of the transistor 52B is electrically connected to the wiring ANO. The other electrode of the light-emitting element 61 is electrically connected to the wiring VCOM.

The wiring GL1 and the wiring GL2 can have a function of signal lines for controlling the operation of the transistors. The wiring SL1 can have a function of a signal line for supplying the image data Data to the pixel. The wiring SL2 can have a function of a signal line for writing the data DataW to the memory circuit MEM. For example, the wiring SL2 can have a function of a signal line for supplying a correction signal to the pixel. The wiring V0 has a function of a monitor line for obtaining the electrical characteristics of the transistor 52B. A specific potential is supplied from the wiring V0 to the other electrode of the capacitor 53s through the transistor 52C, whereby writing of an image signal can be stable.

The transistor 52A and the capacitor 53w constitute the memory circuit MEM. The node NM is a memory node; when the transistor 52A is turned on, the data DataW supplied from the wiring SL2 can be written to the node NM. The use of an OS transistor with an extremely low off-state current as the transistor 52A allows the potential of the node NM to be retained for a long time.

In the pixel circuit 51I, the image data Data supplied from the wiring SL1 is supplied to the capacitor 53w through the transistor 52w. One of the source and the drain of the transistor 52w and the node NM are capacitively coupled. Thus, the potential of the node NM to which the data DataW is written changes depending on the image data Data. Furthermore, the node NA and the node NM are capacitively coupled through the capacitor 53s. Thus, the potential of the node NA changes depending on the data DataW and the image data Data.

Note that the transistor 52w functions as a selection transistor for determining whether or not the image data Data is to be supplied. The transistor 52C functions as a reset transistor for determining whether or not to set the potential of the node NA to be equal to that of the wiring V0.

The display apparatus of one embodiment of the present invention can detect a defective pixel using the functional circuit 40 provided to overlap with the pixel circuit group 55. Information on the defective pixel can be used to correct a display defect due to the defective pixel, leading to normal display.

Some or all of steps of a correction method described below as an example may be performed by a circuit provided outside the display apparatus. Alternatively, some of the steps of the correction method may be performed by the functional circuit 40 and the other steps may be performed by a circuit provided outside the display apparatus.

Figure 15A:
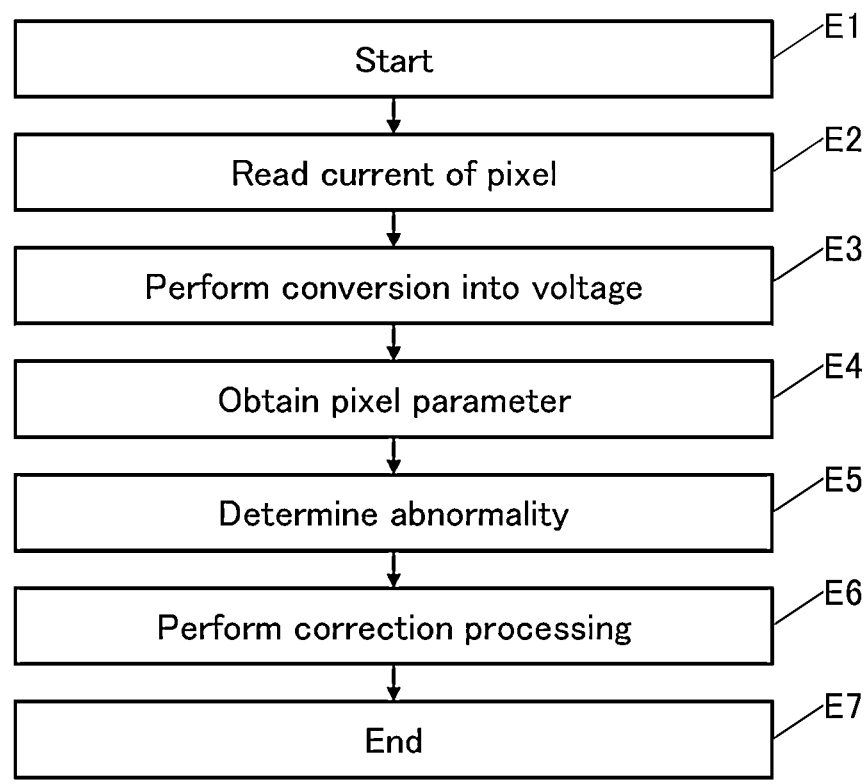
FIG. 15A and FIG. 15B are diagrams illustrating operation examples of a display apparatus.

A more specific example of the correction method will be described below. FIG. 15A is a flow chart of the correction method described below.

First, a correction operation starts in Step E1.

Next, currents of the pixels are read in Step E2. For example, each of the pixels can be driven so as to output a current to a monitor line electrically connected to the pixel.

In the case where the pixel circuit group 55 is divided into a plurality of sections 59 as in a later-described display apparatus 10B or the like, current reading operations can be performed simultaneously for each of the sections 59. With the pixel circuit group 55 divided into the plurality of sections 59, the time required to read currents of all pixels can be extremely short.

Then, the read currents are converted into voltages in Step E3. In the case of using a digital signal in later processing, conversion to digital data can be performed in Step E3. For example, analog data can be converted into digital data using an analog-digital converter circuit (ADC).

Next, pixel parameters of the pixels are obtained on the basis of the obtained data in Step E4. Examples of the pixel parameter include the threshold voltage and field-effect mobility of the driving transistor, the threshold voltage of the light-emitting element, and a current value at a certain voltage.

Subsequently, each of the pixels is determined to be abnormal or not on the basis of the pixel parameter in Step E5. For example, a pixel is determined to be abnormal when its pixel parameter has a value exceeding (or lower than) a predetermined threshold value.

Examples of abnormality include a dark spot defect with luminance significantly lower than that corresponding to an input data potential, and a bright spot defect with luminance significantly higher than that corresponding to an input data potential.

The address of the abnormal pixel and the kind of the defect can be specified and obtained in Step E5.

Then, correction processing is performed in Step E6.

Figure 15B:
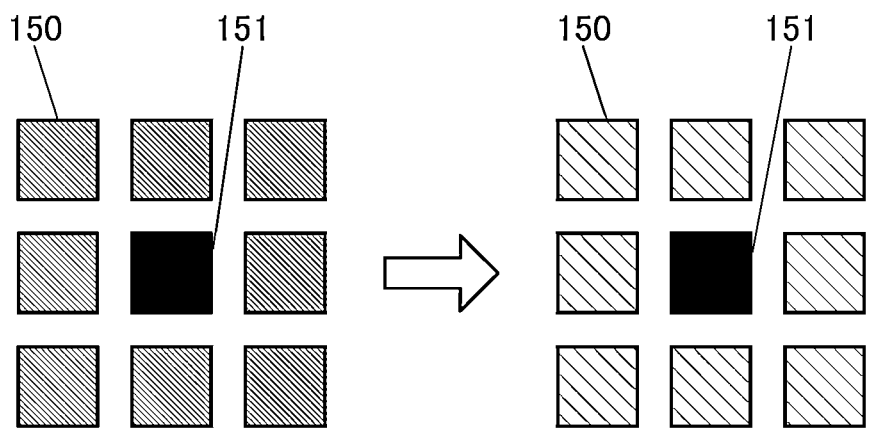

An example of the correction processing is described with reference to FIG. 15B. FIG. 15B schematically illustrates 3×3 pixels each of which includes a pair of the pixel circuit 51 and the light-emitting element 61. Here, the pixel at the center is regarded as a pixel 151 having a dark spot defect. FIG. 15B schematically illustrates a state where the pixel 151 is off and pixels 150 around the pixel 151 are on with predetermined luminance.

A dark spot defect is due to a pixel unlikely to have normal luminance even when correction for increasing a data potential input to the pixel is performed. Hence, correction for increasing luminance is performed on the pixels 150 around the pixel 151 having a dark spot defect, as illustrated in FIG. 15B. As a result, a normal image can be displayed even when a dark spot defect is caused.

In the case of a bright spot defect, the luminance of pixels around the defect is decreased, so that the bright spot defect can be less noticeable.

Such a correction method for compensating for an abnormal pixel by pixels around the abnormal pixel is effective particularly in the case of a display apparatus with a high resolution (e.g., 1000 ppi or higher), in which it is difficult to see a plurality of adjacent pixels separately from each other.

It is preferable that correction be performed such that a data potential is not input to a pixel in which abnormality such as a dark spot defect or a bright spot defect has been caused.

As described above, a correction parameter can be set for each pixel. When the correction parameter is applied to image data to be input, correction image data which enables the display apparatus 10A to display an optimal image can be generated.

As well as in an abnormal pixel and pixels around the abnormal pixel, pixel parameters vary in pixels not determined to be abnormal; thus, display unevenness due to the variation might be recognized when an image is displayed, in some cases. Hence, correction parameters for the pixels not determined to be abnormal can be set so as to cancel (level off) the variation of the pixel parameters. For example, a reference value based on the mean value, average value, or the like of pixel parameters of some or all of the pixels can be set, and a correction value used for canceling a difference of a pixel parameter of a certain pixel from the reference value can be set as a correction parameter of the pixel.

For each of pixels around an abnormal pixel, it is preferable to set correction data that takes into consideration both a correction amount for compensating for the abnormal pixel and a correction amount for canceling pixel parameter variation.

Next, the correction operation ends in Step E7.

After that, an image can be displayed on the basis of the correction parameters obtained in the correction operation and image data to be input.

Note that a neural network may be used in a step of the correction operation. In the neural network, correction parameters can be determined on the basis of inference results obtained by machine learning, for example. In the case where correction parameters are determined by a neural network, for example, high-accuracy correction can be performed to make an abnormal pixel less noticeable without using a detailed algorithm for correction.

The above is the description of the correction method.

Modification Example 1

Figure 16A:
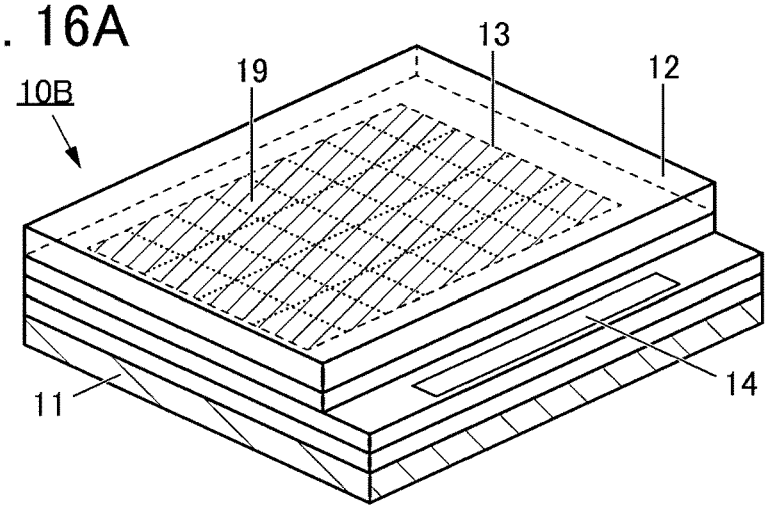
FIG. 16A and FIG. 16B are diagrams illustrating a structure example of a display apparatus.
Figure 16B:
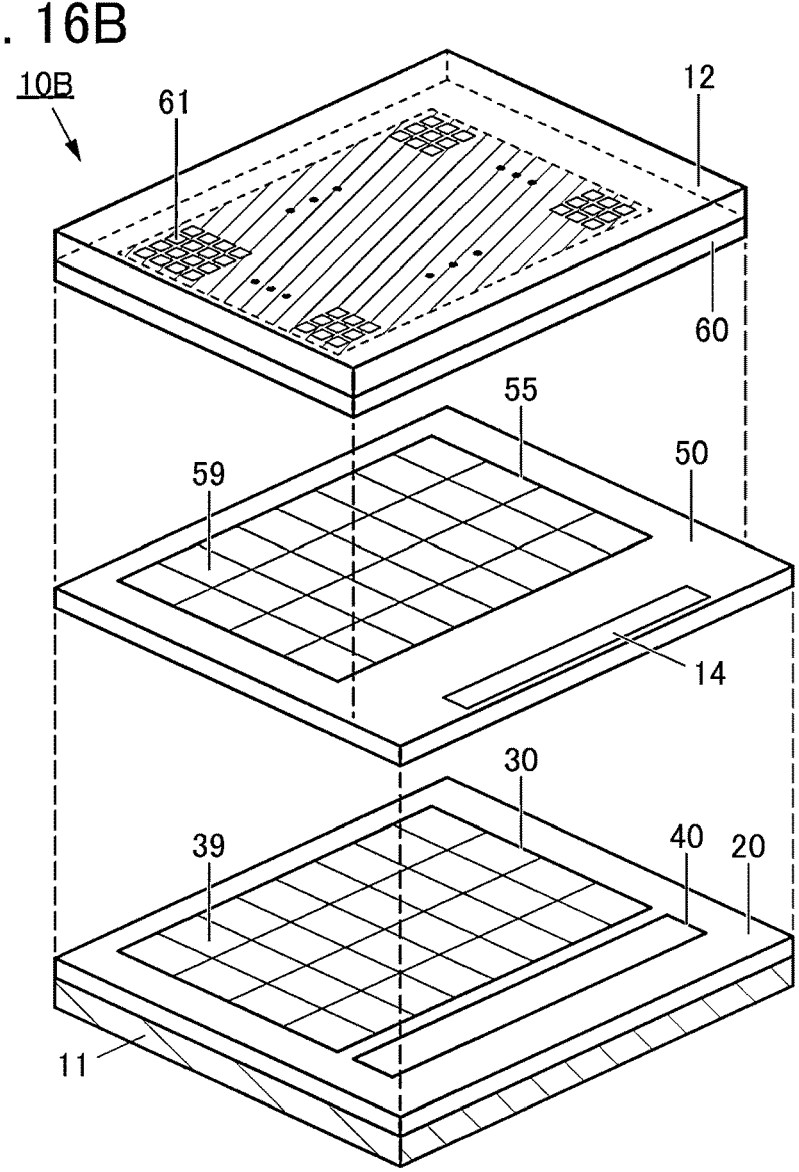

FIG. 16A and FIG. 16B are perspective views of the display apparatus 10B, which is a modification example of the display apparatus 10A. FIG. 16B is a perspective view for illustrating structures of layers included in the display apparatus 10B. Note that description is made mainly on portions different from those of the display apparatus 10A to reduce repeated description.

In the display apparatus 10B, the driver circuit 30 and the pixel circuit group 55 including the plurality of pixel circuits 51 overlap with each other. In the display apparatus 10B, the pixel circuit group 55 is divided into the plurality of sections 59 and the driver circuit 30 is divided into a plurality of sections 39. The plurality of sections 39 each include the source driver circuit 31 and the gate driver circuit 33.

Figure 17A:
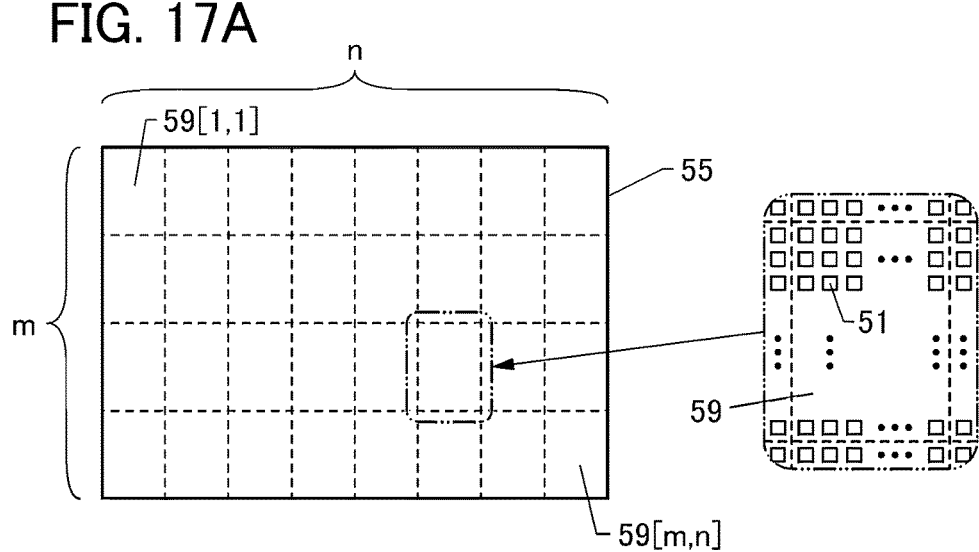
FIG. 17A to FIG. 17D are diagrams illustrating structure examples of a display apparatus.
Figure 17B:
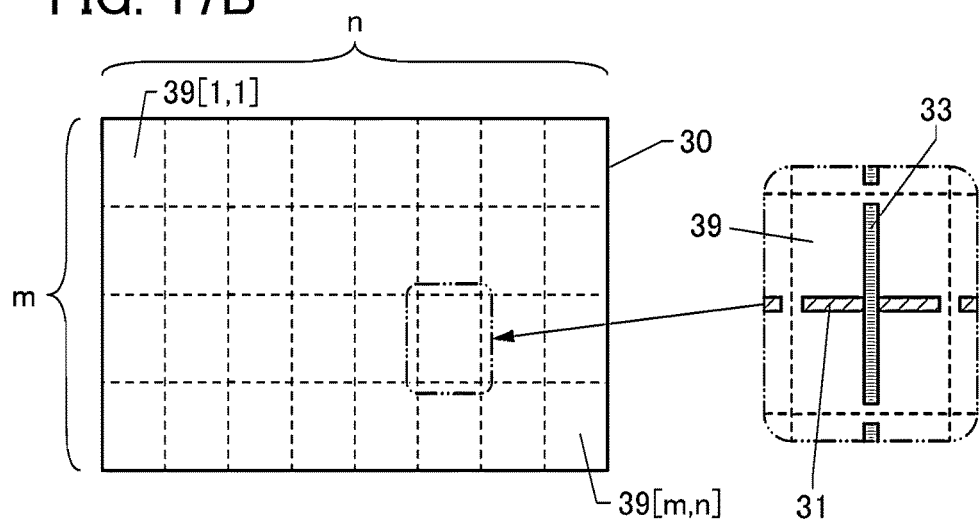

FIG. 17A illustrates a structure example of the pixel circuit group 55 included in the display apparatus 10B. FIG. 17B illustrates a structure example of the driver circuit 30 included in the display apparatus 10B. The sections 59 and the sections 39 are each arranged in a matrix of m rows and n columns (m and n are each an integer greater than or equal to 1). In this specification and the like, the section 59 in the first row and the first column is denoted by a section 59[1,1], and the section 59 in the m-th row and the n-th column is denoted by a section 59[$m,n$]. Similarly, the section 39 in the first row and the first column is denoted by a section 39[1,1], and the section 39 in the m-th row and the n-th column is denoted by a section 39[$m,n$]. FIG. 17A and FIG. 17B illustrate a case where m is 4 and n is 8. That is, the pixel circuit group 55 and the driver circuit 30 are each divided into 32 sections.

The plurality of sections 59 each include the plurality of pixel circuits 51, a plurality of wirings SL, and a plurality of wirings GL. In each of the plurality of sections 59, one of the plurality of pixel circuits 51 is electrically connected to at least one of the plurality of wirings SL and at least one of the plurality of wirings GL.

Figure 17C:
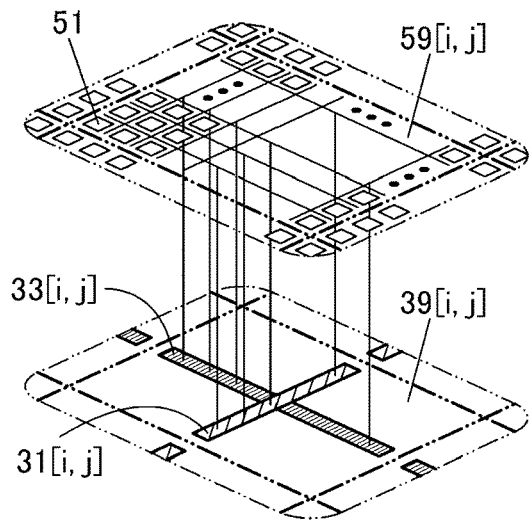

One of the sections 59 and one of the sections 39 are provided to overlap with each other (see FIG. 17C). For example, a section 59[$i,j$] (i is an integer greater than or equal to 1 and less than or equal to m, and j is an integer greater than or equal to 1 and less than or equal to n) and a section 39[$i,j$] are provided to overlap with each other. A source driver circuit 31[$i,j$] included in the section 39[$i,j$] is electrically connected to the wiring SL included in the section 59[$i,j$]. A gate driver circuit 33[$i,j$] included in the section 39[$i,j$] is electrically connected to the wiring GL included in the section 59[$i,j$]. The source driver circuit 31[$i,j$] and the gate driver circuit 33[$i,j$] have a function of controlling the plurality of pixel circuits 51 included in the section 59[$i,j$].

When the section 59[$i,j$] and the section 39[$i,j$] are provided to overlap with each other, a connection distance (wiring length) between the pixel circuit 51 included in the section 59[$i,j$] and each of the source driver circuit 31 and the gate driver circuit 33 included in the section 39[$i,j$] can be made extremely short. As a result, the wiring resistance and the parasitic capacitance are reduced, and thus time taken for charging and discharging can be reduced and high-speed driving can be achieved. Moreover, power consumption can be reduced. Furthermore, the size and weight of the display apparatus can be reduced.

In addition, the display apparatus 10B includes the source driver circuit 31 and the gate driver circuit 33 in each of the sections 39. Thus, the display portion 13 can be divided into the sections 59 corresponding to the sections 39, and image data rewriting can be performed in each section. For example, in the display portion 13, image rewriting can be performed only in a section where an image has been changed and image data can be retained in a section with no change, so that power consumption can be reduced.

In this embodiment and the like, one section of the display portion 13 divided into the sections 59 is referred to as a sub-display portion 19. Thus, it can also be said that the sub-display portions 19 are divided to correspond to the sections 39. In the display apparatus 10B described with reference to FIG. 16 and FIG. 17, the display portion 13 is divided into 32 of the sub-display portions 19 (see FIG. 16A). Each of the sub-display portions 19 includes the plurality of pixels 230 illustrated in FIG. 10 and the like. Specifically, one of the sub-display portions 19 includes one of the sections 59 including the plurality of pixel circuits 51, and the plurality of light-emitting elements 61. Each of the sections 39 has a function of controlling the plurality of pixels 230 included in one of the sub-display portions 19.

In the display apparatus 10B, driving frequency at the time of displaying an image can be set freely for each of the sub-display portions 19 by the timing controller 44 included in the functional circuit 40. The functional circuit 40 has a function of controlling operations in the plurality of sections 39 and the plurality of sections 59. In other words, the functional circuit 40 has a function of controlling driving frequency and operation timing of each of the plurality of sub-display portions 19 arranged in a matrix. In addition, the functional circuit 40 has a function of adjusting synchronization between the sub-display portions.

Figure 17D:
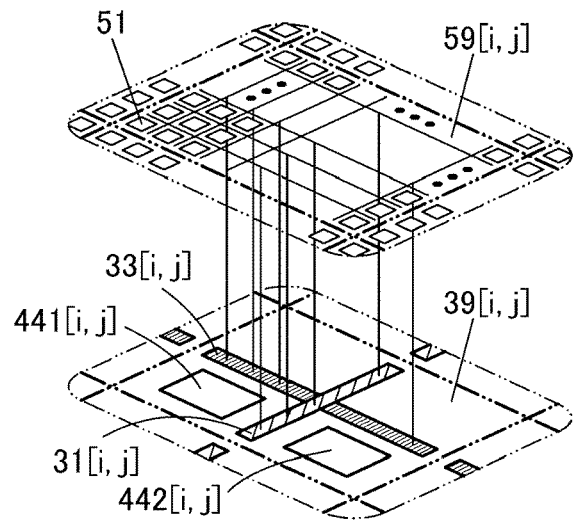

A timing controller 441 and an input/output circuit 442 may be provided for each of the sections 39 (see FIG. 17D). For the input/output circuit 442, an I2C (Inter-Integrated Circuit) interface can be used, for example. The timing controller 441 included in the section 39[i,j] is denoted as a timing controller 441[i,j] in FIG. 17. Furthermore, the input/output circuit 442 included the section 39[i,j] is denoted as an input/output circuit 442[i,j].

The functional circuit 40 supplies setting signals for the scan direction and driving frequency of the gate driver circuit 33[i,j] and operation parameters, such as the number of pixels in image data reduced for decreasing definition (the number of pixels where image data rewriting is not performed at the time of image data rewriting), to the input/output circuit 442[i,j], for example. The source driver circuit 31[i,j] and the gate driver circuit 33[i,j] operate in accordance with the operation parameters.

In the case where the sub-display portions 19 each include a light-receiving element described later, the input/output circuit 442 outputs information obtained by photoelectric conversion by the light-receiving element to the functional circuit 40.

In the display apparatus 10B in the electronic device of one embodiment of the present invention, the pixel circuit 51 and the driver circuit 30 are stacked and the driving frequency is different in each of the sub-display portions 19 in accordance with the motion of the user's gaze, whereby low power consumption can be achieved.

Figure 18A:
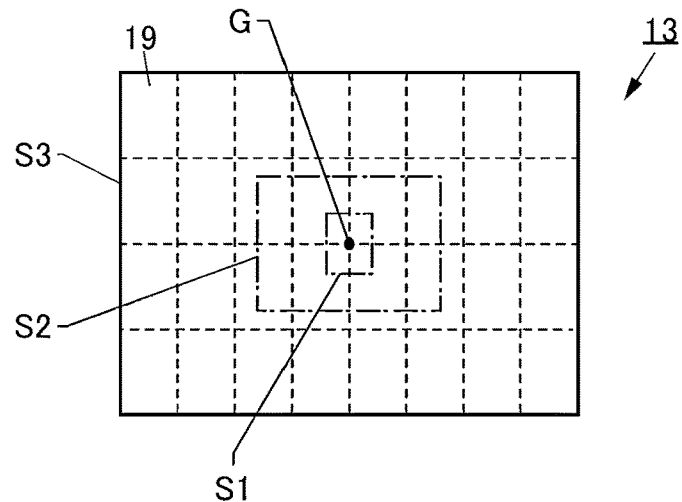
FIG. 18A to FIG. 18C are diagrams illustrating structure examples of a display apparatus.
Figure 18B:
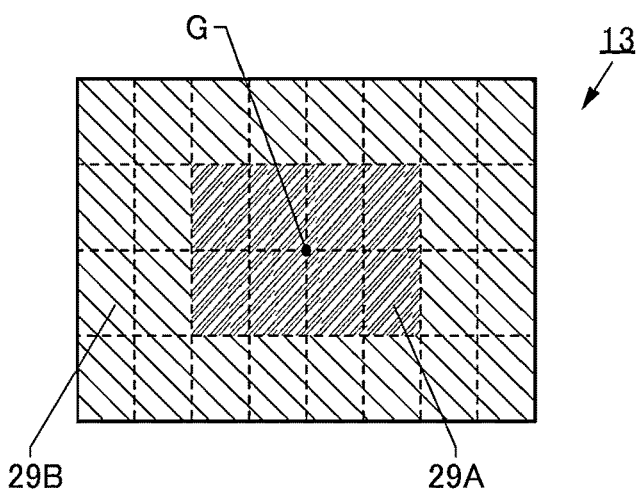

FIG. 18A illustrates the display portion 13 including the sub-display portions 19 in four rows and eight columns. FIG. 18A also illustrates the first region S1 to the third region S3 with the gaze point G as a center. The arithmetic portion 103 divides the plurality of sub-display portions 19 between a first section 29A overlapping with the first region S1 or the second region S2 and a second section 29B overlapping with the third region S3. In other words, the arithmetic portion 103 divides the plurality of sections 39 between the first section 29A and the second section 29B. In this case, the first section 29A overlapping with the first region S1 or the second region S2 includes a region overlapping with the gaze point G. Furthermore, the second section 29B includes the sub-display portions 19 positioned outside the first section 29A (see FIG. 18B).

The operations of the driver circuits (the source driver circuit 31 and the gate driver circuit 33) included in each of the plurality of sections 39 are controlled by the functional circuit 40. For example, the second section 29B is a section overlapping with the third region S3 including the above-described stable visual field, inducting visual field, and supplementary visual field, and is hard for the user to discriminate. Thus, the user perceives a small reduction in practical display quality (hereinafter also referred to as "practical display quality") even when the number of times of image data rewriting per unit time (hereinafter also referred to as "image rewriting frequency") at the time of displaying an image is smaller in the second section 29B than in the first section 29A. In other words, a reduction in practical display quality is small even when driving frequency of the sub-display portion 19 included in the second section 29B (also referred to as "second driving frequency") is lower than driving frequency of the sub-display portions 19 included in the first section 29A (also referred to as "first driving frequency").

A decrease in the driving frequency can result in a reduction in power consumption of the display apparatus. On the other hand, a decrease in the driving frequency reduces the display quality. In particular, the display quality in displaying a moving image is reduced. According to one embodiment of the present invention, the second driving frequency is made lower than the first driving frequency; thus, power consumption can be reduced in a section where the visibility by the user is low and the reduction of the practical display quality can be inhibited. According to one embodiment of the present invention, both display quality maintenance and a reduction in power consumption can be achieved.

The first driving frequency can be higher than or equal to 30 Hz and lower than or equal to 500 Hz, preferably higher than or equal to 60 Hz and lower than or equal to 500 Hz. The second driving frequency is preferably lower than or equal to the first driving frequency, further preferably lower than or equal to a half of the first driving frequency, still further preferably lower than or equal to one fifth of the first driving frequency.

Figure 18C:
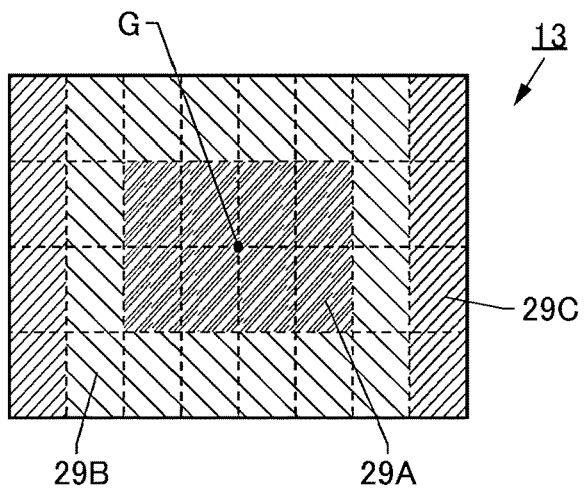

A section of the sub-display portions 19 overlapping with the third region S3 that is farther from the first section 29A may be set as a third section 29C (see FIG. 18C), and driving frequency of the sub-display portions 19 included in the third section 29C (also referred to as "third driving frequency") may be made lower than the driving frequency in the second section 29B. The third driving frequency is preferably lower than or equal to the second driving frequency, further preferably lower than or equal to a half of the second driving frequency, still further preferably lower than or equal to one fifth of the second driving frequency. By significantly lowering image rewriting frequency, power consumption can be further reduced. Note that rewriting of image data may be stopped if necessary. By stopping rewriting of image data, power consumption can be further reduced.

In the case where such a driving method is employed, a transistor with an extremely low off-state current is suitably used as a transistor included in the pixel circuit 51. For example, an OS transistor is suitably used as the transistor included in the pixel circuit 51. An OS transistor has an extremely low off-state current and thus can achieve long-term retention of image data supplied to the pixel circuit 51. It is particularly suitable to use an OS transistor as the transistor 52A.

In some cases, an image whose brightness, contrast, color tone, or the like is greatly different from that of the previous image is displayed as in the case where a video scene displayed on the display portion 13 is changed, for example. Such a case causes a mismatch of the timing at which an image is changed between the first section 29A and a section whose driving frequency is lower than that of the first section 29A. This might cause a great difference in the brightness, contrast, color tone, or the like between the sections, leading to the loss of the practical display quality. In such a case where a video scene is changed, image data rewriting can be temporarily performed in the section other than the first section 29A at a driving frequency which is the same as that of the first section 29A, and then the driving frequency of the section other than the first section 29A can be decreased.

Furthermore, in the case where the fluctuation amount of the gaze point G is judged to be exceeding a certain value, image data rewriting may be performed in the section other than the first section 29A at a driving frequency which is the same as that of the first section 29A, and the driving frequency of the section other than the first section 29A may be decreased when the fluctuation amount is judged to be within the certain value. In the case where the fluctuation amount of the gaze point G is judged to be small, the driving frequency of the section other than the first section 29A may be further decreased.

In the case where the display apparatus 10B does not include a frame memory, which is a memory device for temporarily retaining image data, or includes one frame memory for the entire display portion 13, each of the second driving frequency and the third driving frequency needs to be an integral submultiple of the first driving frequency.

When the plurality of sub-display portions 19 are provided with respective frame memories, each of the second driving frequency and the third driving frequency can be set to a given value without limitation to an integral submultiple of the first driving frequency. When the second driving frequency and the third driving frequency are set to given values, the degree of freedom in setting the driving frequencies can be increased. As a result, a reduction in the practical display quality can be small.

Figure 19:
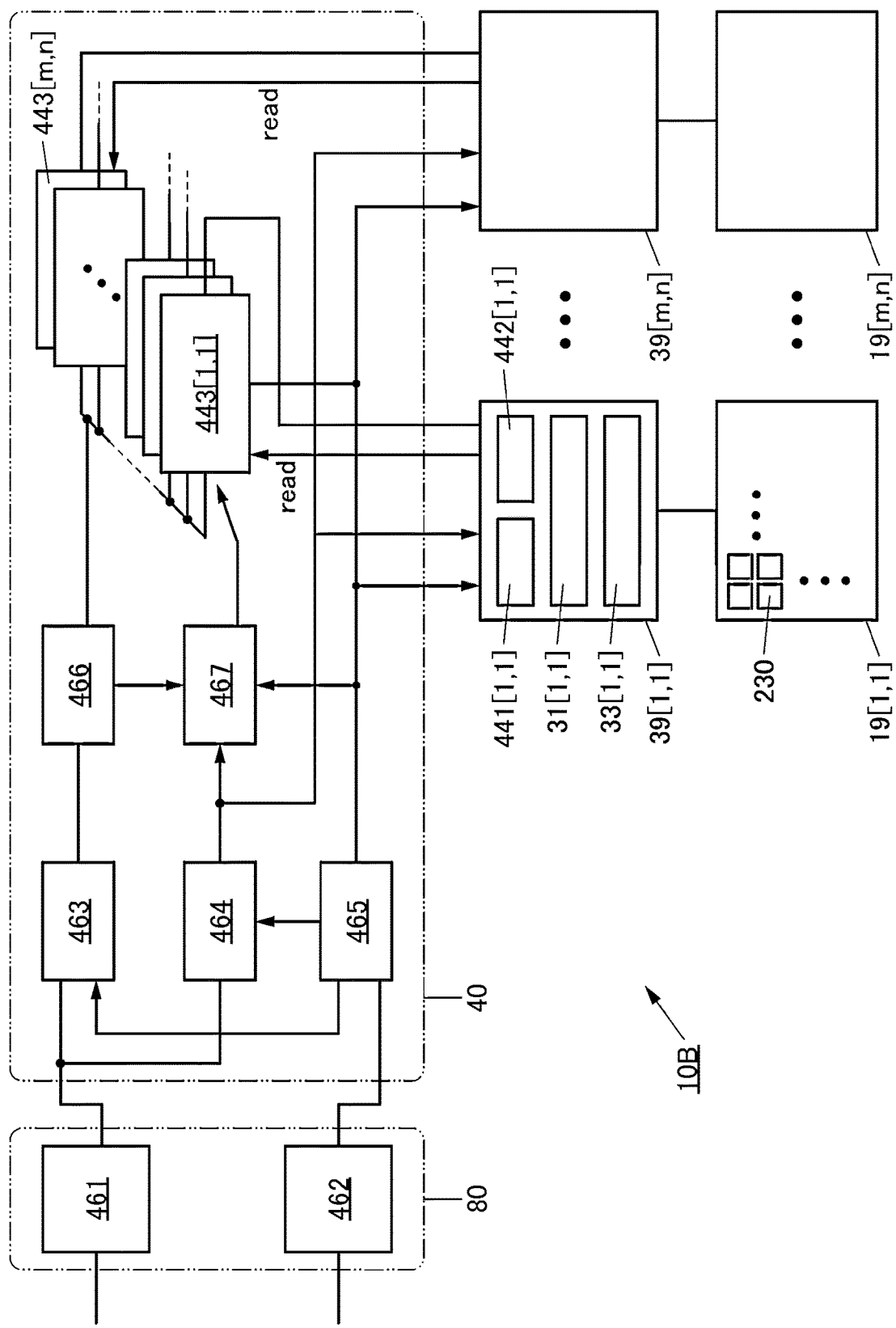
FIG. 19 is a block diagram illustrating a structure example of a display apparatus.

FIG. 19 is a block diagram illustrating a structure example of the display apparatus 10B including a frame memory 443 for each of the sub-display portions 19. In FIG. 19, the input/output circuit 80 includes an image information input portion 461 and a clock signal input portion 462. The functional circuit 40 includes an image data temporary retention portion 463, an operation parameter setting portion 464, an internal clock signal generating portion 465, an image processing portion 466, a memory controller 467, and a plurality of frame memories 443.

Each of the plurality of frame memories 443 has a function of retaining image data to be displayed on one of the plurality of sub-display portions 19. For example, a frame memory 443[1,1] has a function of retaining image data to be displayed on a sub-display portion 19[1,1]. Similarly, a frame memory 443[m,n] has a function of retaining image data to be displayed on a sub-display portion 19[m,n].

Each of the plurality of sub-display portions 19 is electrically connected to one of the plurality of sections 39. In FIG. 19, each of the plurality of sections 39 includes the source driver circuit 31, the gate driver circuit 33, the timing controller 441, and the input/output circuit 442.

Image data to be displayed on the display portion 13 and operation parameters of the display apparatus 10B are supplied to the image information input portion 461 from the outside. A clock signal is supplied to the clock signal input portion 462 from the outside. The clock signal is supplied to the internal clock signal generating portion 465 via the clock signal input portion 462.

The internal clock signal generating portion 465 has a function of generating a clock signal used in the display apparatus 10B (also referred to as "internal clock signal") with the use of the clock signal supplied from the outside. The internal clock signal is supplied to the image data temporary retention portion 463, the operation parameter setting portion 464, the memory controller 467, the section 39, and the like and used for matching operation timing between the circuits included in the display apparatus 10B, for example.

The image data input via the image information input portion 461 is supplied to the image data temporary retention portion 463. The operation parameters input via the image information input portion 461 are supplied to the operation parameter setting portion 464.

The image data temporary retention portion 463 retains the supplied image data, and supplies the image data to the image processing portion 466 in synchronization with the internal clock signal. Providing the image data temporary retention portion 463 can eliminate a mismatch between the timing at which image data is supplied from the outside and the timing at which the image data is processed in the display apparatus 10B.

The operation parameter setting portion 464 has a function of retaining the supplied operation parameters. The operation parameters include information for determining the driving frequency, scan direction, definition, or the like for each of the plurality of sub-display portions 19.

The image processing portion 466 has a function of performing arithmetic processing of the image data retained in the image data temporary retention portion 463. For example, the image processing portion 466 has a function of performing contrast adjustment, brightness adjustment, and gamma correction of the image data. Furthermore, the image processing portion 466 has a function of dividing the image data retained in the image data temporary retention portion 463 for the sub-display portions 19.

The memory controller 467 has a function of controlling the operations of the plurality of frame memories 443. The image data is retained in the plurality of frame memories 443 after being divided by the image processing portion 466 for the sub-display portions 19. Each of the plurality of frame memories 443 has a function of supplying image data to the corresponding section 39 in response to a read request signal (read) from the section 39.

Figure 20:
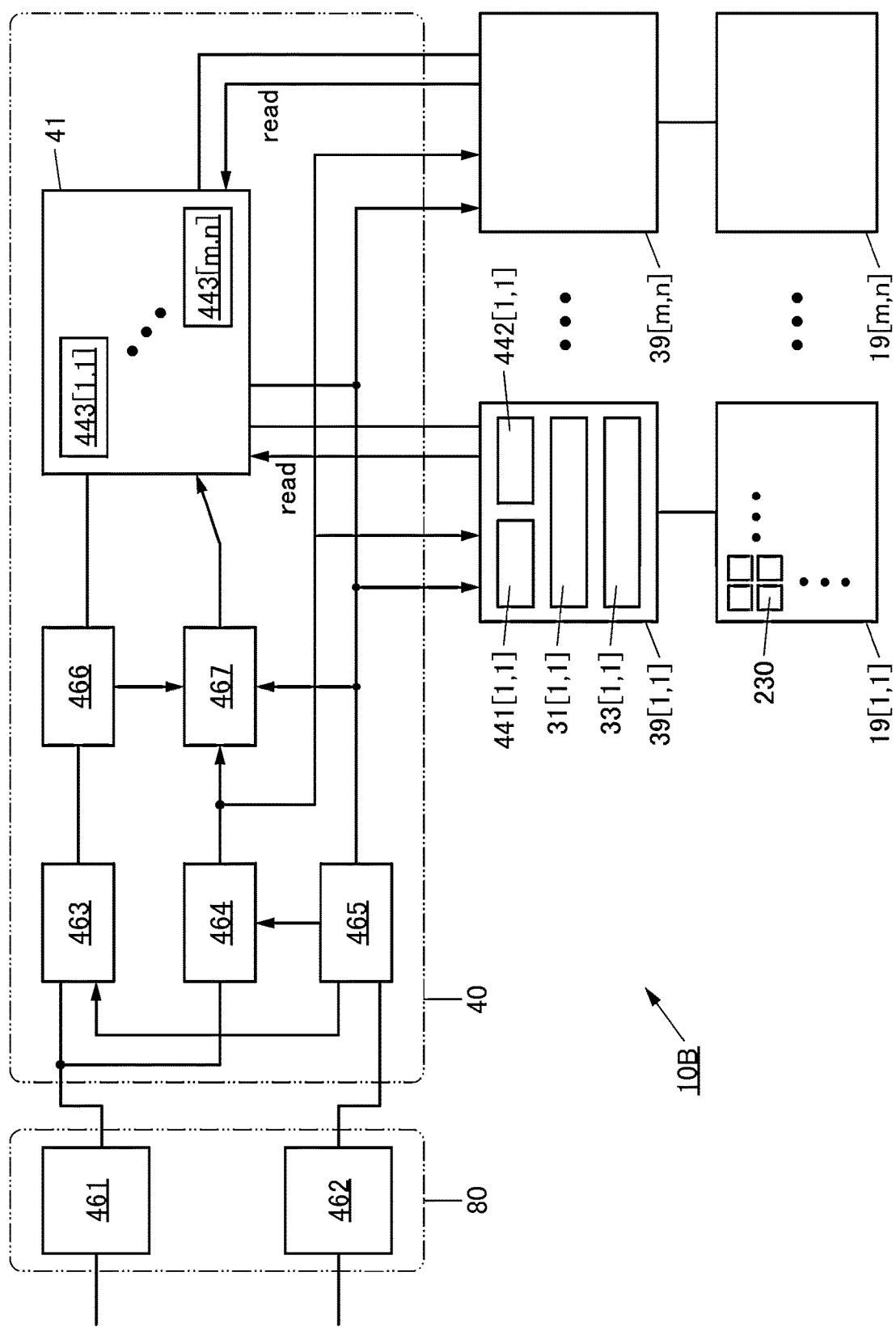
FIG. 20 is a block diagram illustrating a structure example of a display apparatus.

Note that the memory device 41 may be used as the frame memories 443 as illustrated in FIG. 20. In other words, image data divided for the sub-display portions 19 may be retained in the memory device 41.

The frame memories 443 may be provided in a component other than the functional circuit 40. Alternatively, the frame memory 443 may be provided in a semiconductor device other than the display apparatus 10B.

Note that sections set for the display portion 13 are not limited to the three sections of the first section 29A, the second section 29B, and the third section 29C. The display portion 13 may include four or more sections. When a plurality of sections are set for the display portion 13 and the driving frequencies of the sections gradually decreases, a reduction in the practical display quality can be smaller.

The above-described upconversion processing may be performed on an image to be displayed on the first section 29A. When an image obtained by the upconversion processing is displayed on the first section 29A, the display quality can be increased. The above-described upconversion processing may be performed on an image to be displayed on the section other than the first section 29A. When an image obtained by the upconversion processing is displayed on the section other than the first section 29A, a reduction in the practical display quality that occurs in the case where the driving frequency of the section other than the first section 29A is decreased can be smaller.

Note that the upconversion processing of an image to be displayed on the first section 29A may be performed using an algorithm with high accuracy, and the upconversion processing of an image to be displayed on the section other than the first section 29A may be performed using an algorithm with low accuracy. A reduction in the practical display quality that occurs in the case where the driving frequency of the section other than the first section 29A is decreased can be smaller also in such a case.

When image data rewriting performed in each of the sub-display portions 19 is performed concurrently in all of the sub-display portions 19, high-speed rewriting can be achieved. In other words, when image data rewriting performed in each of the sections 39 is performed concurrently in all of the sections 39, high-speed rewriting can be achieved.

In general, while pixels in one row are selected by a gate driver circuit, a source driver circuit writes image data to all of the pixels in one row concurrently in the case of line sequential driving. In the case where the display portion 13 is not divided into the sub-display portions 19 and the definition is 4000×2000 pixels, for example, image data needs to be written to 4000 pixels by the source driver circuit while the pixels in one row are selected by the gate driver circuit. In the case where the frame frequency is 120 Hz, one frame period is approximately 8.3 msec. Accordingly, the gate driver circuit needs to select pixels in 2000 rows in approximately 8.3 msec, and the time for selecting pixels in one row, that is, the time for writing image data to each pixel is approximately 4.17 μsec. In other words, it becomes more difficult to ensure sufficient time for rewriting image data as the definition of the display portion increases or as the frame frequency increases.

The display portion 13 of the display apparatus 10B described as an example in this embodiment is divided into four parts in the row direction. Thus, the time for writing image data to each pixel in one sub-display portion 19 can be four times as long as that of the case where the display portion 13 is not divided. According to one embodiment of the present invention, the time for rewriting image data can be easily ensured even in the case where frame frequency is 240 Hz or 360 Hz; thus, a display apparatus with high display quality can be achieved.

Since the display portion 13 of the display apparatus 10B described as an example in this embodiment is divided into four parts in the row direction, the length of the wiring SL electrically connecting the source driver circuit and the pixel circuit becomes one fourth. Accordingly, each of the resistance value and parasitic capacitance of the wiring SL becomes one fourth, whereby the time required for writing (rewriting) image data can be shortened.

In addition, the display portion 13 of the display apparatus 10B described as an example in this embodiment is divided into eight parts in the column direction; thus, the length of the wiring GL electrically connecting the gate driver circuit and the pixel circuit becomes one eighth. Accordingly, each of the resistance value and parasitic capacitance of the wiring GL becomes one eighth, whereby degradation and delay of a signal can be inhibited and the time for rewriting image data can be easily ensured.

According to the display apparatus 10B of one embodiment of the present invention, sufficient time for writing image data can be easily ensured, and thus high-speed rewriting of a display image can be achieved. Thus, a display apparatus with high display quality can be achieved. In particular, a display apparatus that excels in displaying a moving image can be achieved.

Modification Example 2

Figure 21A:
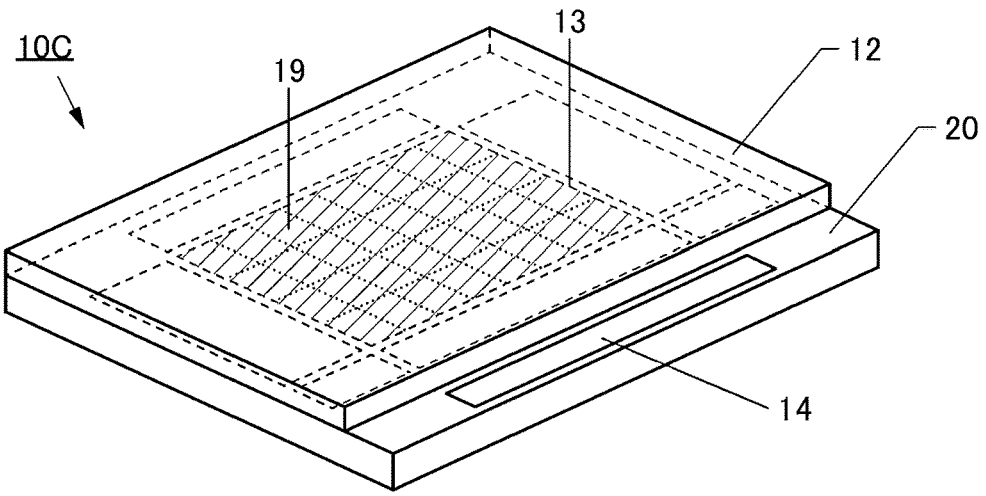
FIG. 21A and FIG. 21B are diagrams illustrating a structure example of a display apparatus.
Figure 21B:
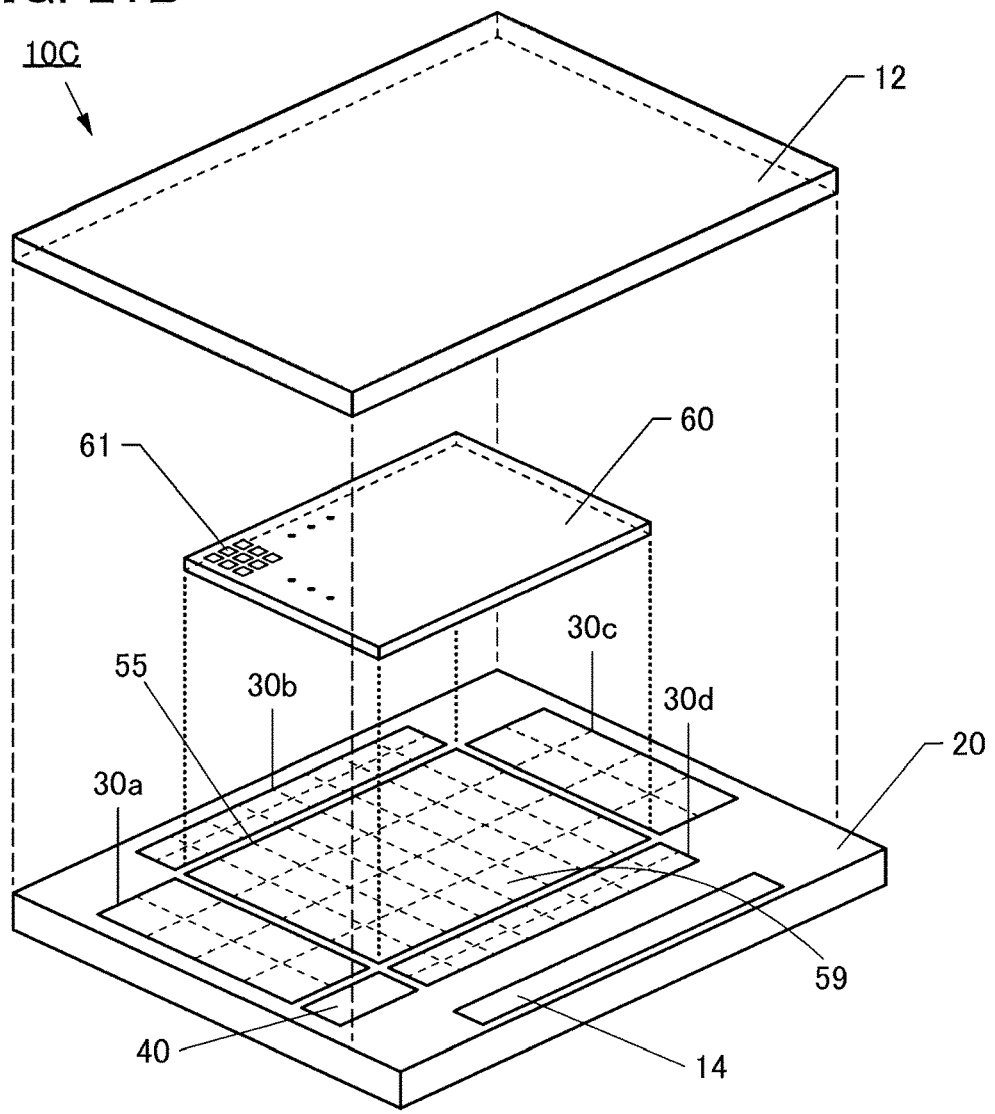

FIG. 21A and FIG. 21B are perspective views of a display apparatus 10C, which is a modification example of the display apparatus 10A. Note that the display apparatus 10C is also a modification example of the display apparatus 10B. FIG. 21B is a perspective view illustrating structures of layers included in the display apparatus 10C. Note that description is made mainly on portions different from those of the display apparatus 10A and the display apparatus 10B to reduce repeated description.

The pixel circuit group 55 including the plurality of pixel circuits 51, the driver circuit 30, the functional circuit 40, and the terminal portion 14 may be provided in the same layer. In the display apparatus 10C, the pixel circuit group 55, the driver circuit 30, the functional circuit 40, and the terminal portion 14 are provided in the layer 20. Since the pixel circuit group 55, the driver circuit 30, and the functional circuit 40 are provided in the same layer, wirings electrically connecting the circuits can be short. Thus, wiring resistance and parasitic capacitance are reduced, leading to lower power consumption.

In the case where a c-Si transistor is used as a transistor included in the display apparatus 10C, for example, a single crystal silicon substrate can be used as the layer 20 and the pixel circuit group 55, the driver circuit 30, the functional circuit 40, and the terminal portion 14 can be provided. When a single crystal silicon substrate is used as the layer 20, the substrate 11 can be omitted. As a result, a reduction in the weight of the display apparatus 10C can be achieved. In addition, the cost of manufacturing the display apparatus 10C can be reduced. Thus, the productivity of the display apparatus 10C can be improved.

Note that a transistor used in the display apparatus 10C is not limited to a c-Si transistor. Any of a variety of transistors such as a Poly-Si transistor or an OS transistor can be employed as the transistor used in the display apparatus 10C.

Figure 22:
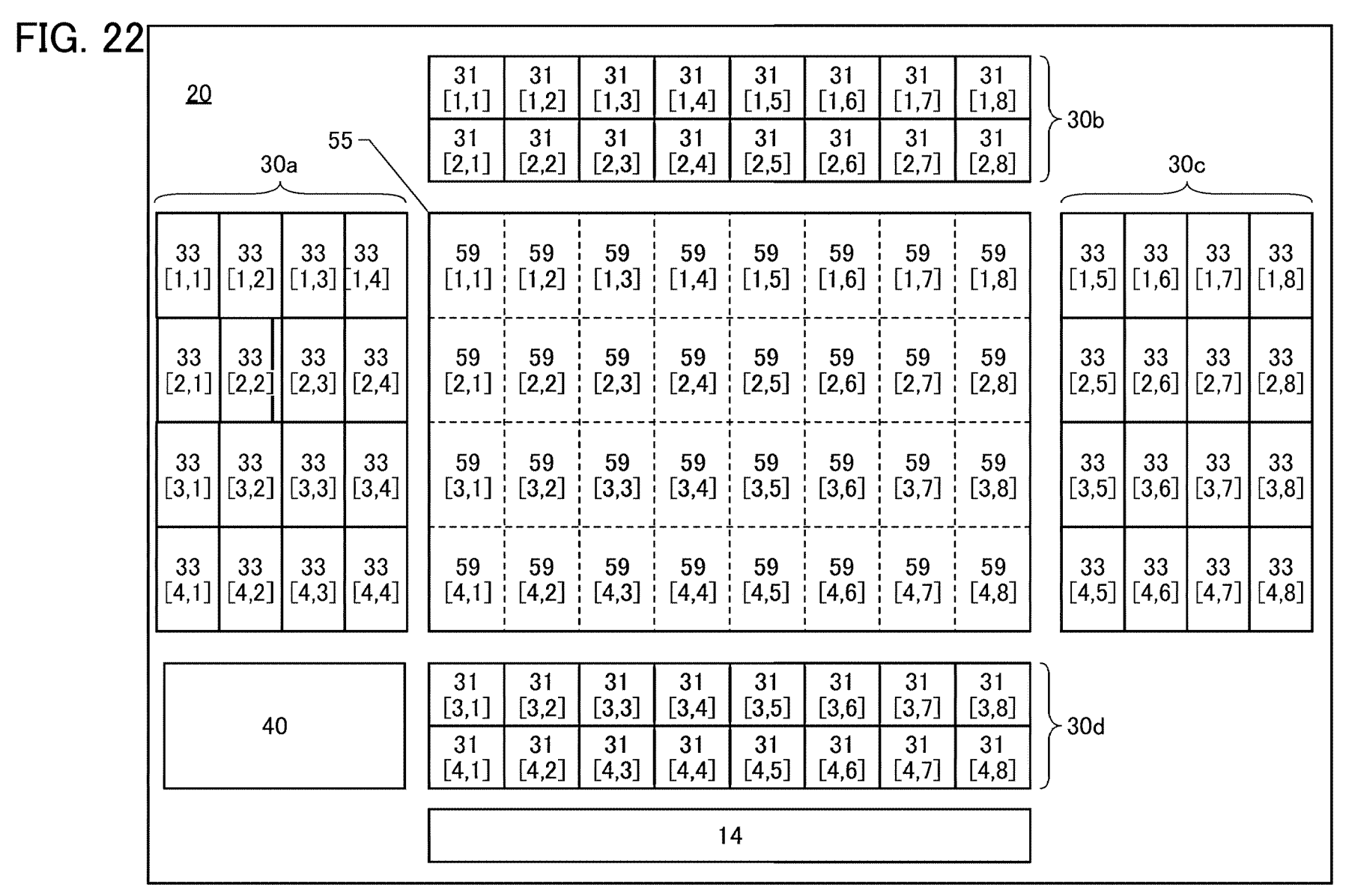

In the display apparatus 10C illustrated in FIG. 21, the display portion 13 is composed of the sub-display portions 19 arranged in a matrix of m rows and n columns. Accordingly, the pixel circuit group 55 is divided into the sections 59 arranged in a matrix of m rows and n columns. FIG. 22 illustrates a planar layout of the layer 20. FIG. 22 illustrates the sections 59 of the case where m is 4 and n is 8.

The driver circuit 30 is provided in the display apparatus 10C as four divided regions: a driver circuit 30a, a driver circuit 30b, a driver circuit 30c, and a driver circuit 30d. The driver circuit 30a, the driver circuit 30b, the driver circuit 30c, and the driver circuit 30d are provided outside the pixel circuit group 55. Specifically, the driver circuit 30a is provided on a first side of the four sides of the pixel circuit group 55, the driver circuit 30c is provided on a third side that faces the first side with the pixel circuit group 55 positioned therebetween, the driver circuit 30b is provided on a second side, and the driver circuit 30d is provided on a fourth side that faces the second side with the pixel circuit group 55 positioned therebetween.

The driver circuit 30a and the driver circuit 30c each include 16 of the gate driver circuits 33. The driver circuit 30b and the driver circuit 30d each include 16 of the source driver circuits 31. One of the gate driver circuits 33 is electrically connected to the plurality of pixel circuits 51 included in the section 59. One of the source driver circuits 31 is electrically connected to the plurality of pixel circuits 51 included in the section 59.

The gate driver circuit 33 electrically connected to the section 59[1,1] is denoted as a gate driver circuit 33[1,1], and the source driver circuit 31 electrically connected to the section 59[1,1] is denoted as a source driver circuit 31[1,1] in FIG. 22. Similarly, the gate driver circuit 33 electrically connected to a section 59[4,8] is denoted as a gate driver circuit 33[4,8], and the source driver circuit 31 electrically connected to the section 59[4,8] is denoted as a source driver circuit 31[4,8].

The driver circuit 30a includes the gate driver circuit 33[1,1] to a gate driver circuit 33[1,4], a gate driver circuit 33[2,1] to a gate driver circuit 33[2,4], a gate driver circuit 33[3,1] to a gate driver circuit 33[3,4], and a gate driver circuit 33[4,1] to a gate driver circuit 33[4,4]. The driver circuit 30b includes the source driver circuit 31[1,1] to a source driver circuit 31[1,8] and a source driver circuit 31[2,1] to a source driver circuit 31[2,8]. The driver circuit 30c includes a gate driver circuit 33[1,5] to a gate driver circuit 33[1,8], a gate driver circuit 33[2,5] to a gate driver circuit 33[2,8], a gate driver circuit 33[3,5] to a gate driver circuit 33[3,8], and a gate driver circuit 33[4,5] to the gate driver circuit 33[4,8]. The driver circuit 30d includes a source driver circuit 31[3,1] to a source driver circuit 31[3,8] and a source driver circuit 31[4,1] to the source driver circuit 31[4,8].

Figure 23:
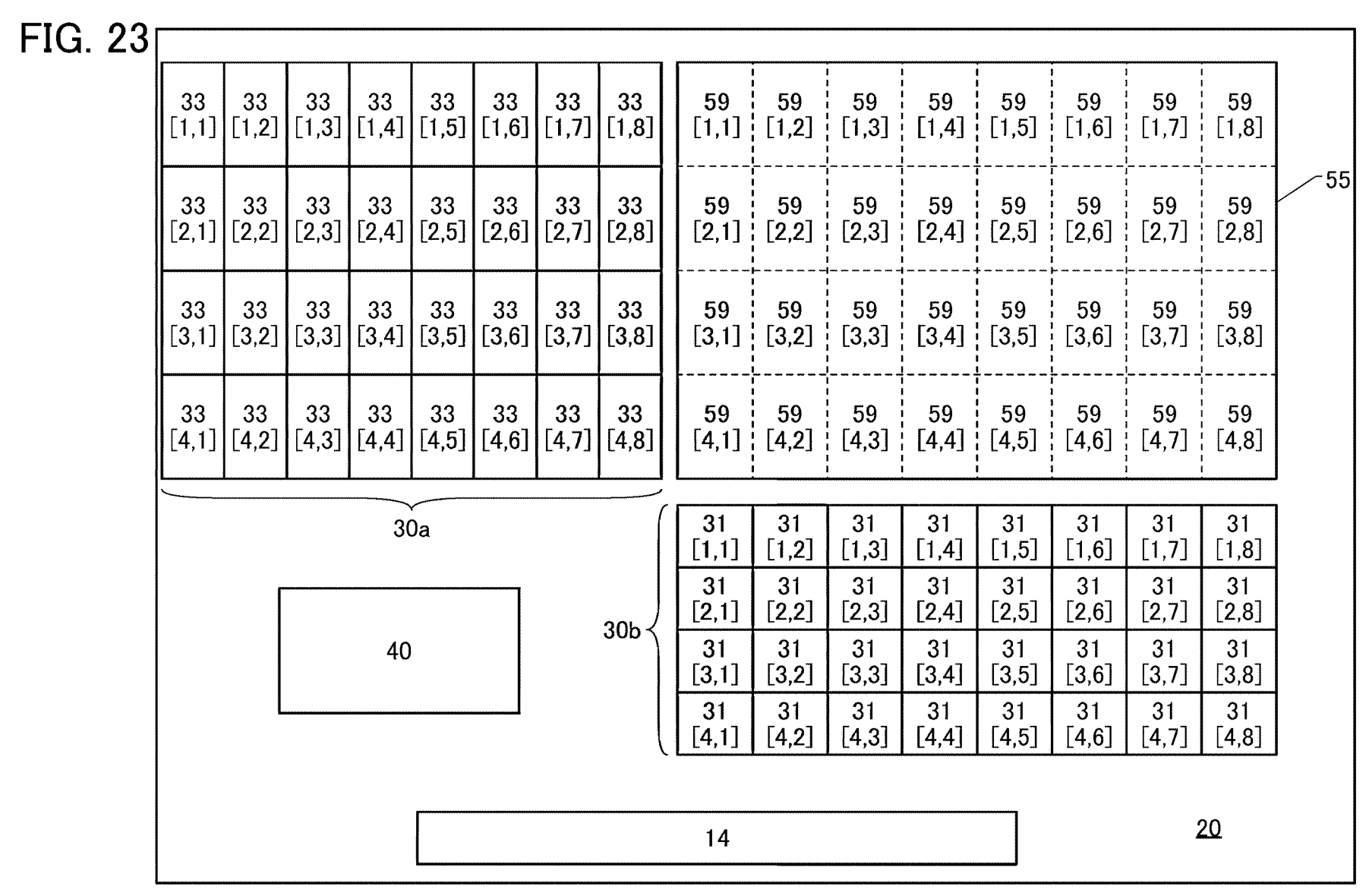

The positions of the pixel circuit group 55, the driver circuit 30, and the functional circuit 40 provided in the layer 20 are not limited to those illustrated in FIG. 22. For example, a structure illustrated in FIG. 23 may be employed. In FIG. 23, the driver circuit 30 is provided as two divided regions: the driver circuit 30a and the driver circuit 30b. For example, the driver circuit 30a includes 32 of the gate driver circuits 33 (the gate driver circuit 33[1,1] to the gate driver circuit 33[4,8]) and the driver circuit 30b includes 32 of the source driver circuits 31 (the source driver circuit 31[1,1] to the source driver circuit 31[4,8]).

Note that the display apparatus 10B and the display apparatus 10C according to one embodiment of the present invention are each an example in which the display portion 13 is divided into the 32 sub-display portions 19. However, the division number of the display portion 13 in each of the display apparatus 10B and the display apparatus 10C of one embodiment of the present invention may be 16, 64, 128, or the like, without limitation to 32. As the division number of the display portion 13 increases, a reduction in practical display quality perceived by the user can be smaller.

At least part of the structure examples, the drawings corresponding thereto, and the like described in this embodiment as an example can be combined with the other structure examples, the other drawings, and the like as appropriate.

Embodiment 2

Figure 24A:
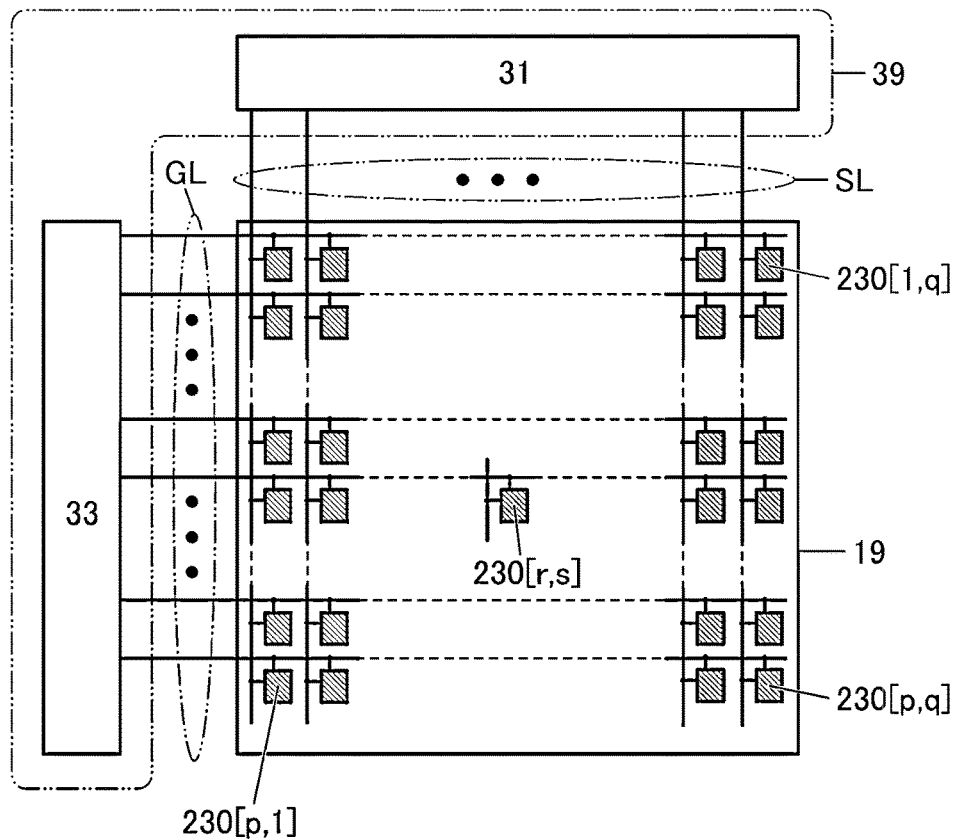
FIG. 24A is a diagram illustrating a sub-display portion.
Figure 24A:
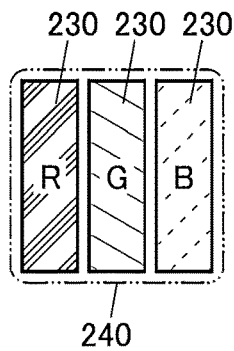
Figure 24A:
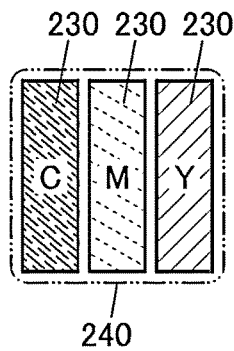
Figure 24A:
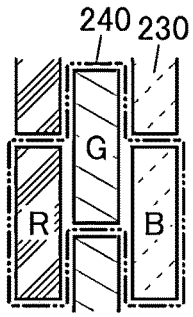
Figure 24A:
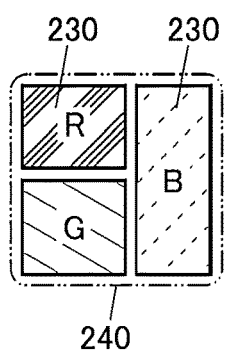
Figure 24A:
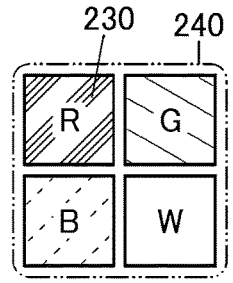
Figure 24A:
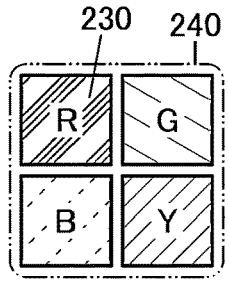
Figure 24A:
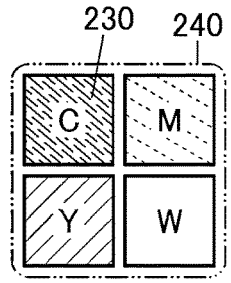

In this embodiment, a structure example of the sub-display portion 19 including the plurality of pixels 230 arranged in a matrix of p rows and q columns (p and q are each an integer greater than or equal to 2) will be described. FIG. 24A is a block diagram illustrating the sub-display portion 19. The sub-display portion 19 is electrically connected to the source driver circuit 31 and the gate driver circuit 33 which are provided in the section 39.

In FIG. 24A, the pixel 230 in the p-th row and the first column is denoted as a pixel 230[p,1], the pixel 230 in the first row and the q-th column is denoted as a pixel 230[1,q], and the pixel 230 in the p-th row and the q-th column is denoted as a pixel 230[p,q].

A circuit included in the gate driver circuit 33 functions as, for example, a scan line driver circuit. A circuit included in the source driver circuit 31 functions as, for example, a signal line driver circuit.

For example, OS transistors may be used as the transistors included in the pixels 230 and Si transistors may be used as the transistors included in a driver circuit. The off-state current of an OS transistor is low, so that power consumption can be reduced. Since a Si transistor has a higher operation speed than an OS transistor, a Si transistor is suitably used in a driver circuit. The display apparatus may include OS transistors as both the transistors included in the pixels 230 and the transistors included in a driver circuit. The display apparatus may include Si transistors as both the transistors included in the pixels 230 and the transistors included in a driver circuit. Alternatively, the display apparatus may include Si transistors as the transistors included in the pixels 230 and OS transistors as the transistors included in a driver circuit.

Both a Si transistor and an OS transistor may be used as the transistors included in the pixels 230. Both a Si transistor and an OS transistor may be used as the transistors included in a driver circuit.

In FIG. 24A, p wirings GL are arranged substantially parallel to each other and the potentials thereof are controlled by the gate driver circuit 33, and q wirings SL are arranged substantially parallel to each other and the potentials thereof are controlled by the source driver circuit 31. For example, the pixels 230 arranged in the r-th row (r represents a given number and is an integer greater than or equal to 1 and less than or equal to p in this embodiment and the like) are electrically connected to the gate driver circuit 33 through the r-th wiring GL. The pixels 230 arranged in the s-th column (s represents a given number and is an integer greater than or equal to 1 and less than or equal to q in this embodiment and the like) are electrically connected to the source driver circuit 31 through the s-th wiring SL.

Note that the number of the wirings GL electrically connected to the pixels 230 included in one row is not limited to one. Furthermore, the number of the wirings SL electrically connected to the pixels 230 included in one column is not limited to one. The wiring GL and the wiring SL are examples, and wirings connected to the pixels 230 are not limited to the wiring GL and the wiring SL.

Full-color display can be achieved by making the pixel 230 that controls red light, the pixel 230 that controls green light, and the pixel 230 that controls blue light, which are arranged in a stripe pattern, collectively function as one pixel 240 and by controlling the amount of light emission (emission luminance) from each of the pixels 230. In other words, each of the three pixels 230 functions as a subpixel. That is, three subpixels control the emission amount or the like of red light, green light, and blue light (see FIG. 24B1). Note that the colors of light controlled by the three subpixels are not limited to a combination of red (R), green (G), and blue (B) and may be cyan (C), magenta (M), and yellow (Y) (see FIG. 24B2)

By using the pixels 240 arranged in a matrix of 1920× 1080, the display portion 13 can achieve full-color display with a so-called 2K definition. For example, by using the pixels 240 arranged in a matrix of 3840×2160, the display portion 13 can achieve full-color display with a so-called 4K definition. For example, by using the pixels 240 arranged in a matrix of 7680×4320, the display portion 13 can achieve full-color display with a so-called 8K definition. By increasing the number of pixels 240, the display portion 13 that can perform full-color display with 16K or 32K definition can also be obtained.

Alternatively, three pixels 230 constituting one pixel 240 may be arranged in a delta arrangement (see FIG. 24B3). Specifically, three pixels 230 constituting one pixel 240 may be arranged such that the lines connecting the center points of the three pixels 230 form a triangle. Note that the arrangement of the pixels 230 is not limited to a stripe arrangement or a delta arrangement. The pixels 230 may be arranged in a zigzag arrangement, an S-stripe arrangement, a Bayer arrangement, or a PenTile arrangement.

The three subpixels (pixels 230) do not necessarily have the same area. In the case where the emission efficiency, reliability, and the like vary depending on emission colors, the subpixel area may be changed depending on the emission color (see FIG. 24B4).

Four subpixels may collectively function as one pixel. For example, a subpixel that controls white light may be added to the three subpixels that control red light, green light, and blue light (see FIG. 24B5). The addition of the subpixel that controls white light can increase the luminance of a display region. Alternatively, a subpixel that controls yellow light may be added to the three subpixels that control red light, green light, and blue light (see FIG. 24B6). Further alternatively, a subpixel that controls white light may be added to the three subpixels that control cyan light, magenta light, and yellow light (see FIG. 24B7).

When the number of subpixels functioning as one pixel is increased and subpixels that control light of red, green, blue, cyan, magenta, yellow, and the like are used in an appropriate combination, the reproducibility of halftones can be increased. Thus, display quality can be improved.

The display apparatus of one embodiment of the present invention can reproduce the color gamut of various standards. For example, the display apparatus of one embodiment of the present invention can reproduce the color gamut of the PAL (Phase Alternating Line) standard and the NTSC (National Television System Committee) standard used for TV broadcasting; the sRGB (standard RGB) standard and the Adobe RGB standard widely used for display apparatuses used in electronic devices such as personal computers, digital cameras, and printers; the ITU-R BT.709 (International Telecommunication Union Radiocommunication Sector Broadcasting Service (Television) 709) standard used for HDTV (High Definition Television, also referred to as Hi-Vision); the DCI-P3 (Digital Cinema Initiatives P3) standard used for digital cinema projection; the ITU-R BT.2020 (REC.2020 (Recommendation 2020)) standard used for UHDTV (Ultra High Definition Television, also referred to as Super Hi-Vision); and the like.

A pixel 231 including a light-receiving element in one pixel 240 may be provided. In the pixel 240 illustrated in FIG. 25A, a pixel 230(G) exhibiting green light, a pixel 230(B) exhibiting blue light, a pixel 230(R) exhibiting red light, and a pixel 231(S) including a light-receiving element are arranged in a stripe pattern. Note that in this specification and the like, the pixel 231 is also referred to as an "imaging pixel".

A light-receiving element included in the pixel 231 is preferably an element that detects visible light and is further preferably an element that detects one or more of blue light, violet light, bluish violet light, green light, yellowish green light, yellow light, orange light, red light, and the like. The light-receiving element included in the pixel 231 may be an element that detects infrared light.

Figure 25A:
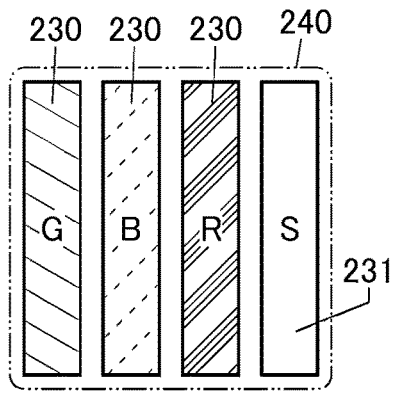
FIG. 25A to FIG. 25G are diagrams illustrating structure examples of pixels.

The pixel 240 illustrated in FIG. 25A employs a stripe arrangement. Note that in the case where the pixel 231 including a light-receiving element detects light of a specific color, the pixel 230 exhibiting light of the color is preferably disposed to be adjacent to the pixel 231, whereby detection accuracy can be increased.

Figure 25B:
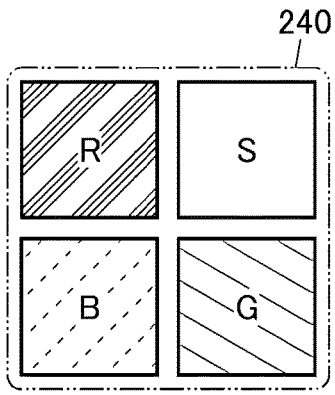

Three pixels 230 and one pixel 231 are arranged in a matrix in the pixel 240 illustrated in FIG. 25B. Although FIG. 25B illustrates an example in which the pixel 230 exhibiting red light is adjacent to the pixel 231 including a light-receiving element in the row direction and the pixel 230 exhibiting blue light is adjacent to the pixel 230 exhibiting green light in the row direction, one embodiment of the present invention is not limited thereto.

Figure 25C:
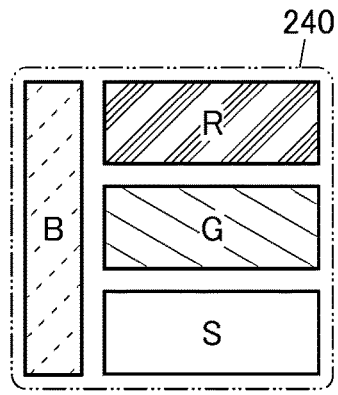

The pixel 240 illustrated in FIG. 25C has a structure in which the pixel 231 is added to an S-stripe arrangement. The pixel 240 in FIG. 25C includes one vertically oriented pixel 230, two horizontally oriented pixels 230, and one horizontally oriented pixel 231. Note that the vertically oriented pixel 230 may be any one of R, G, and S, and there is no particular limitation on the arrangement order of the horizontally oriented subpixels.

Figure 25D:
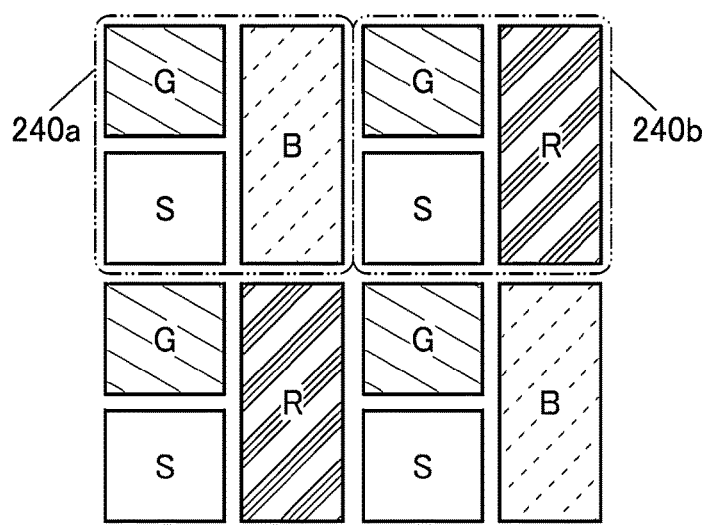

FIG. 25D illustrates an example in which a pixel 240a and a pixel 240b are alternately arranged. The pixel 240a includes the pixel 230 exhibiting blue light, the pixel 230 exhibiting green light, and the pixel 231 including a light-receiving element. The pixel 240b includes the pixel 230 exhibiting red light, the pixel 230 exhibiting green light, and the pixel 231 including a light-receiving element. The pixel 240a and the pixel 240b function as one pixel 240. Although FIG. 25D illustrates the pixel 240a and the pixel 240b each including the pixel 230 exhibiting green light and the pixel 231, one embodiment of the present invention is not limited thereto. When the pixel 240a and the pixel 240b each include the pixel 231, the resolution of an imaging pixel can be increased.

Figure 25E:
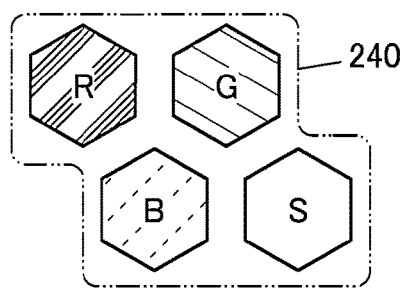

FIG. 25E illustrates an example in which a hexagonal close-packed layout is used for the arrangement of the pixels 230 and the pixel 231. The hexagonal close-packed layout is preferable because the aperture ratio of each subpixel can be increased. In FIG. 25E, an example in which the top surface shapes of the pixels 230 and the pixel 231 are hexagonal is illustrated.

Figure 25F:
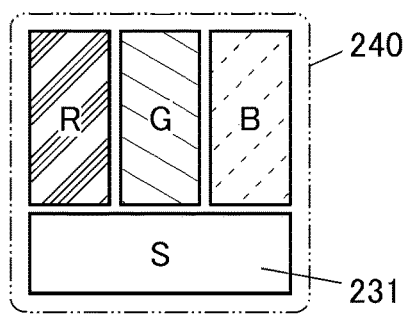

The pixel 240 illustrated in FIG. 25F is an example in which the pixels 230 are arranged horizontally in one line and the pixel 231 is placed beneath the pixels 230.

Figure 25G:
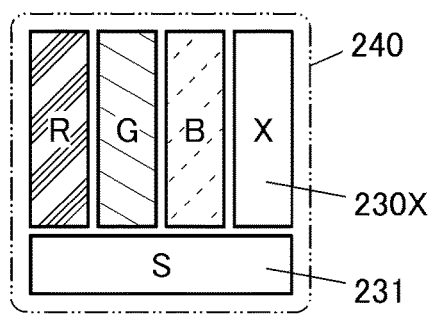

The pixel 240 illustrated in FIG. 25G is an example in which the pixels 230 and a pixel 230X are arranged horizontally in one line and the pixel 231 is placed beneath the pixels 230 and the pixel 230X.

As the pixel 230X, for example, the pixel 230 that exhibits infrared light (IR) can be used. That is, the pixel 230X includes the light-emitting element 61 that emits infrared light (IR). In that case, the pixel 231 preferably includes a light-receiving element that detects infrared light. For example, while an image is displayed by the pixel 230 emitting visible light, the pixel 231 can detect reflected light of infrared light emitted by a subpixel X.

A plurality of pixels 231 may be provided in one pixel 240. In that case, light detected by the plurality of pixels 231 may have the same wavelength range or different wavelength ranges. For example, part of the plurality of pixels 231 may detect visible light and another part may detect infrared light.

The pixel 231 is not necessarily provided in all the pixels 240. The pixel 240 including the pixel 231 may be provided for every certain number of pixels.

By using the pixel 231 or using the pixel 231 and the sensor 125, for example, information for personal authentication using a fingerprint, a palm print, an iris, a retina, a shape of a blood vessel (including the shape of a vein and a shape of an artery), can be detected. Furthermore, by using the pixel 231 or using the pixel 231 and the sensor 125, the number of blinks, eyelid behavior, pupil size, body temperature, pulse, oxygen saturation in blood, or the like of the user may be measured, so that the user's fatigue level, health condition, and the like can be detected.

The electronic device can be operated using the motion of gaze, the number of blinks, the rhythm of blinks, and the like of the user. Specifically, by using the pixel 231 or using the pixel 231 and the sensor 125, information on the motion of gaze, the number of blinks, the rhythm of blinks, and the like of the user are detected, and one or more combinations of these information may be used as an operation signal of the electronic device. For example, it is possible to replace a blink with a clicking of a mouse. When the motion of a gaze and a blink are detected, the user can perform an input operation of the electronic device with holding nothing in his/her hand. Thus, the operability of the electronic device can be improved.

When a plurality of imaging pixels (the pixels 231) are provided in the display apparatus 10, the plurality of imaging pixels can be used as the gaze detection portion 102. Thus, the number of components of the electronic device can be reduced. Accordingly, improvement in productivity, reductions in weight and costs, and the like of the electronic device can be achieved.

Figure 26:
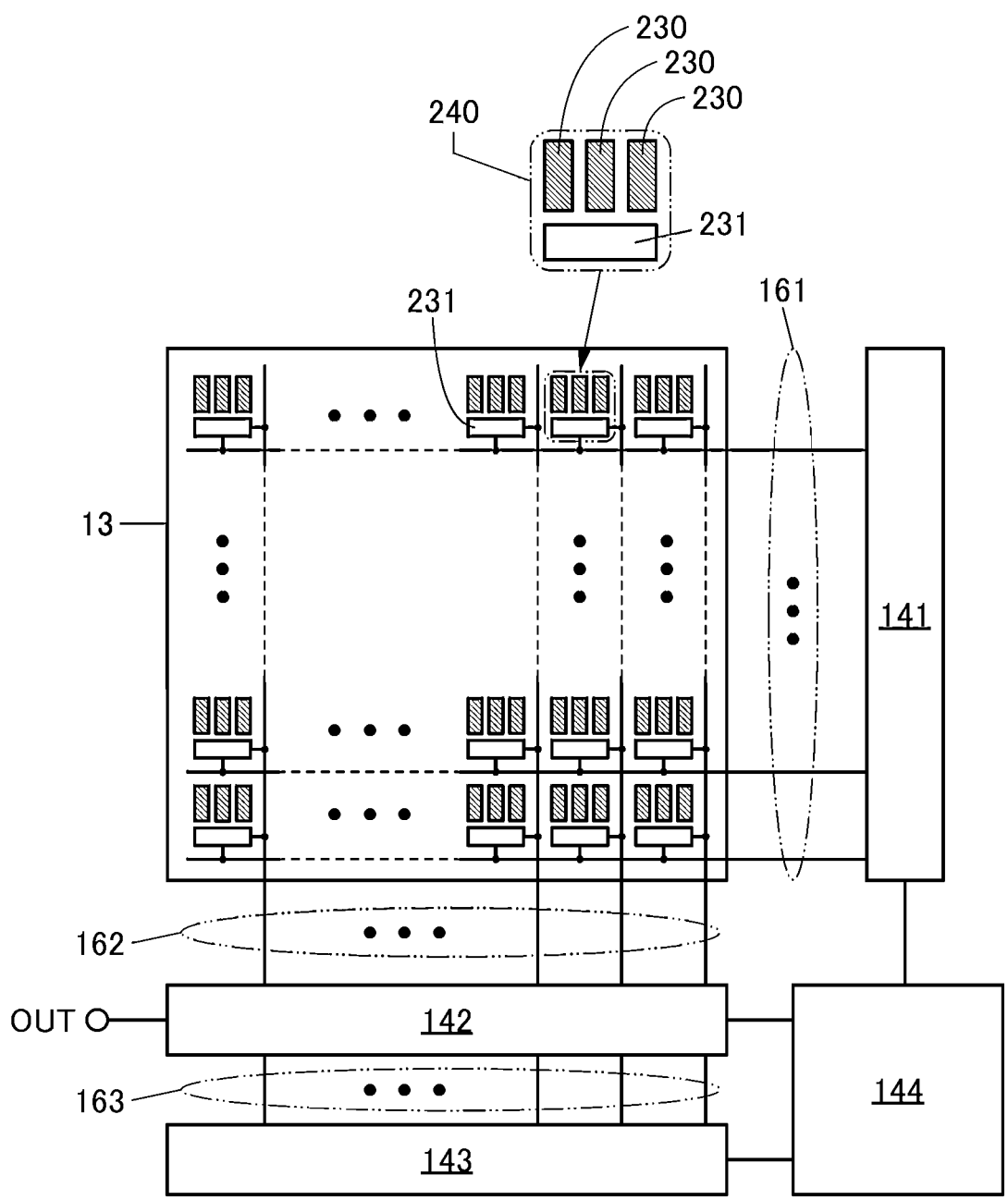
FIG. 26 is a diagram illustrating a display portion.

FIG. 26 illustrates a structure example of the display portion 13 in the case where the pixel 240 includes the pixel 231 including a light-receiving element. FIG. 26 is a block diagram illustrating the display portion 13 including the pixel 231. The display portion 13 includes a plurality of pixels 240 arranged in a matrix. FIG. 26 illustrates the pixel structure in FIG. 25F as the pixel 240.

In FIG. 26, the display portion 13 is electrically connected to a first driver portion 141, a second driver portion 143, and a reading portion 142. Specifically, the first driver portion 141 is electrically connected to the plurality of pixels 231 through a plurality of wirings 161. One wiring 161 is electrically connected to the plurality of pixels 231 arranged in one row. The reading portion 142 is electrically connected to the plurality of pixels 231 through a plurality of wirings 162. One wiring 162 is electrically connected to the plurality of pixels 231 arranged in one column. The second driver portion 143 is electrically connected to the reading portion 142 through a plurality of wirings 163.

Note that wirings connected to one pixel 231 are not limited to the wiring 161 and the wiring 162. A wiring other than the wiring 161 and the wiring 162 may be connected to the pixel 231.

The first driver portion 141, the reading portion 142, and the second driver portion 143 are electrically connected to a control portion 144. The control portion 144 has a function of controlling the operation of the first driver portion 141, the reading portion 142, and the second driver portion 143.

The first driver portion 141 has a function of selecting the pixels 231 row by row. The pixels 231 in the row selected by the first driver portion 141 output imaging data to the reading portion 142 through the wirings 162.

The reading portion 142 retains imaging data supplied from the pixels 231, and performs noise removal and the like. As the noise removal, for example, CDS (Correlated Double Sampling) treatment may be performed. The reading portion 142 may have a function of amplifying imaging data, an AD conversion function of imaging data, or the like.

The second driver portion 143 has a function of sequentially selecting imaging data retained in the reading portion 142 and outputting the imaging data from an output terminal OUT to the outside.

Note that although the plurality of pixels 230 are electrically connected to the source driver circuit 31 and the gate driver circuit 33 as illustrated in FIG. 24, the source driver circuit 31 and the gate driver circuit 33 are not illustrated in FIG. 26. Although FIG. 26 illustrates an example in which one first driver portion 141, one reading portion 142, one second driver portion 143, and one control portion 144 are provided in the display portion 13, they may be provided for each of the sub-display portions 19.

When the first driver portion 141, the reading portion 142, the second driver portion 143, and the control portion 144 are provided for each of the sub-display portions 19, the operation speed of the first driver portion 141, the reading portion 142, the second driver portion 143, and the control portion 144 in a region where an imaging operation is judged to be unnecessary can be decreased or the operation can be stopped. Thus, power consumption of the display apparatus can be reduced.

The first driver portion 141, the reading portion 142, the second driver portion 143, and the control portion 144 may be provided in the layer 20 like the source driver circuit 31 and the gate driver circuit 33.

<Circuit Structure Example of Pixel 231>

Figure 27A:
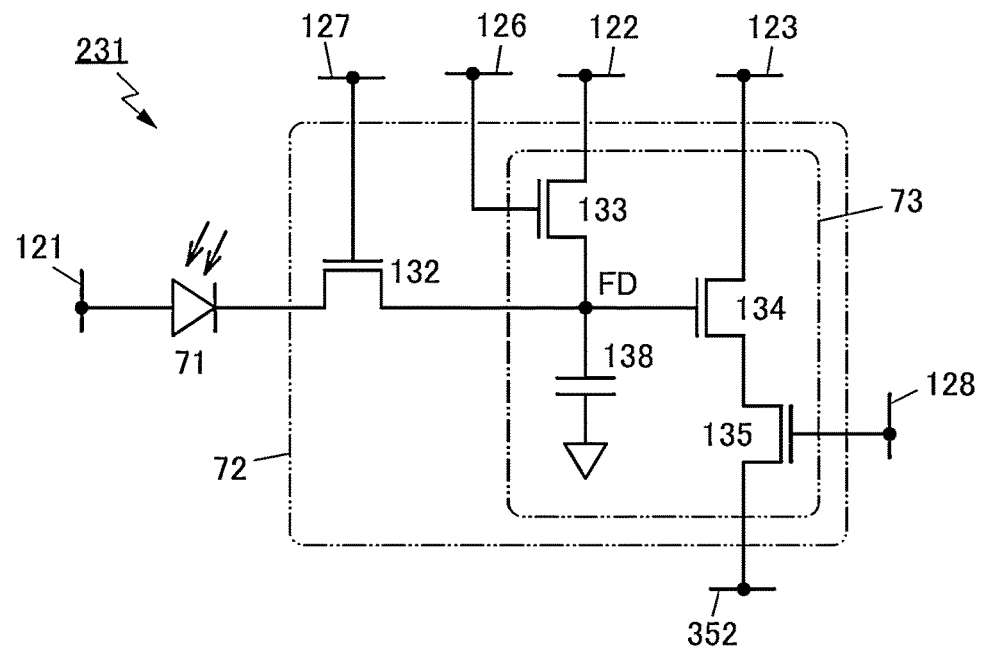
FIG. 27A and FIG. 27B are diagrams illustrating structure examples of a display apparatus.

FIG. 27A is a circuit diagram illustrating a circuit structure example of the pixel 231. The pixel 231 includes a light-receiving element 71 (also referred to as a "photoelectric conversion element" or an "imaging element") and a pixel circuit 72. Note that in this specification and the like, the pixel circuit 72 is referred to as an "imaging pixel circuit" in some cases.

The pixel circuit 72 includes a transistor 132 and a reading circuit 73. The reading circuit 73 includes a transistor 133, a transistor 134, a transistor 135, and a capacitor 138. Note that a structure in which the capacitor 138 is not provided may be employed.

One electrode (cathode) of the light-receiving element 71 is electrically connected to one of a source and a drain of the transistor 132. The other of the source and the drain of the transistor 132 is electrically connected to one of a source and a drain of the transistor 133. The one of the source and the drain of the transistor 133 is electrically connected to one electrode of the capacitor 138. The one electrode of the capacitor 138 is electrically connected to a gate of the transistor 134. One of a source and a drain of the transistor 134 is electrically connected to one of a source and a drain of the transistor 135.

Here, a wiring that connects the other of the source and the drain of the transistor 132, the one of the source and the drain of the transistor 133, the one electrode of the capacitor 138, and the gate of the transistor 134 is a node FD. The node FD can function as a charge detection portion.

The other electrode (anode) of the light-receiving element 71 is electrically connected to a wiring 121. A gate of the transistor 132 is electrically connected to a wiring 127. The other of the source and the drain of the transistor 133 is electrically connected to a wiring 122. The other of the source and the drain of the transistor 134 is electrically connected to a wiring 123. A gate of the transistor 133 is electrically connected to a wiring 126. A gate of the transistor 135 is electrically connected to a wiring 128. The other electrode of the capacitor 138 is electrically connected to a reference potential line such as a GND wiring, for example. The other of the source and the drain of the transistor 135 is electrically connected to a wiring 352.

The wiring 127, the wiring 126, and the wiring 128 each have a function of a signal line controlling on and off states of the corresponding transistor. The wiring 352 has a function as an output line.

The wiring 121, the wiring 122, and the wiring 123 each have a function of a power supply line. In the structure illustrated in FIG. 27A, the cathode side of the light-receiving element 71 is electrically connected to the transistor 132, and the node FD can be reset to a high potential. Thus, the wiring 122 is at a high potential (a potential higher than that of the wiring 121).

Although the cathode side of the light-receiving element 71 is electrically connected to the node FD in FIG. 27A, the anode side of the light-receiving element 71 may be electrically connected to the one of the source and the drain of the transistor 132. In that case, since the node FD is reset to a low potential in the operation in the structure, the wiring 122 is set to a low potential (a potential lower than that of the wiring 121).

The transistor 132 has a function of controlling the potential of the node FD. The transistor 132 is also referred to as a "transfer transistor". The transistor 133 has a function of resetting the potential of the node FD. The transistor 133 is also referred to as a "reset transistor". The transistor 134 functions as a source follower circuit and can output the potential of the node FD as image data to the wiring 352. The transistor 135 has a function of selecting a pixel to which the image data is output. The transistor 134 is also referred to as an "amplifier transistor". The transistor 135 is also referred to as a "selection transistor".

Figure 27B:
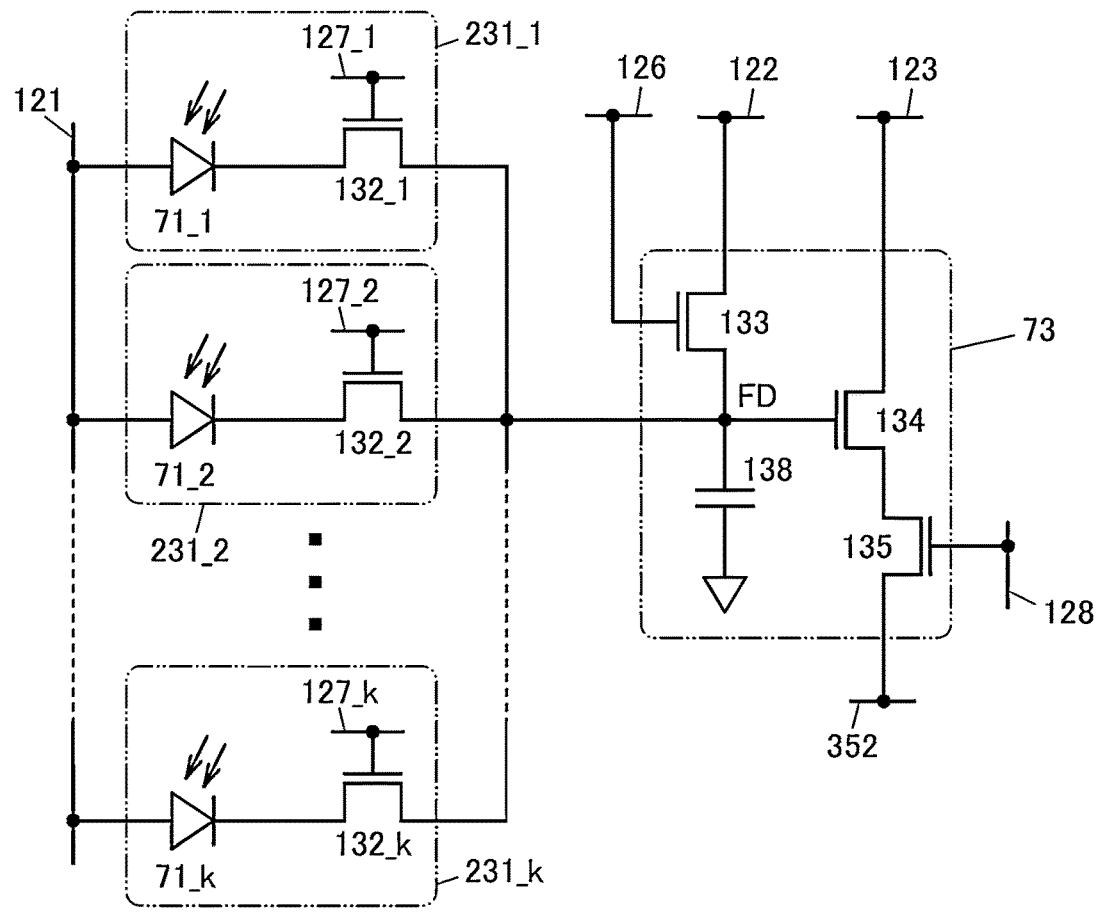

With the light-receiving element 71 and the transistor 132 regarded as one set as illustrated in FIG. 27B, a plurality of sets of light-receiving elements 71 and transistors 132 may be electrically connected to one node FD. That is, the plurality of sets of light-receiving elements 71 and transistors 132 may be electrically connected to one reading circuit 73.

When one reading circuit 73 is shared by the plurality of sets of light-receiving elements 71 and transistors 132, the area occupied by one pixel 231 can be reduced. Thus, the packing density of the pixels 231 can be increased. For example, the reading circuit 73 may be formed in the layer 20 and the light-receiving element 71 and the transistor 132 may be formed in the layer 50. Alternatively, the light-receiving element 71 may be formed in the layer 60.

In FIG. 27B, the light-receiving element 71 and the transistor 132 in the first set are shown as a light-receiving element 71_1 and a transistor 132_1, respectively. A gate of the transistor 132_1 is electrically connected to a wiring 127_1. The light-receiving element 71 and the transistor 132 in the second set are shown as a light-receiving element 71_2 and a transistor 132_2, respectively. A gate of the transistor 132_2 is electrically connected to a wiring 1272. The light-receiving element 71 and the transistor 132 in the k-th set (k is an integer greater than or equal to 1) are shown as a light-receiving element 71_k and a transistor 132_k, respectively. A gate of the transistor 132_k is electrically connected to a wiring 127_k.

In the case of the structure illustrated in FIG. 27B, one set of the light-receiving element 71 and the transistor 132 can be regarded as one pixel 231. In FIG. 27B, the pixel 231 that includes the light-receiving element 71_1 and the transistor 132_1 is shown as a pixel 231_1. The pixel 231 that includes the light-receiving element 71_2 and the transistor 132_2 is shown as a pixel 231_2. The pixel 231 that includes the light-receiving element 71_k and the transistor 132_k is shown as a pixel 231_k. In the case of the structure illustrated in FIG. 27B, the transistor 132 corresponds to the pixel circuit 72.

<Structure Example of Light-Emitting Element>

The light-emitting element 61 that can be used in the display apparatus according to one embodiment of the present invention will be described.

Figure 28A:
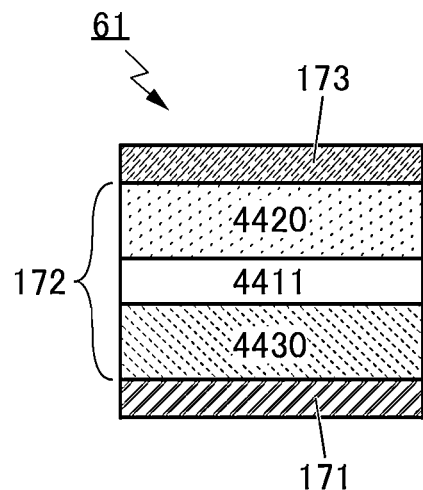
FIG. 28A to FIG. 28D are diagrams illustrating structure examples of a light-emitting element.

As illustrated in FIG. 28A, the light-emitting element 61 includes an EL layer 172 between a pair of electrodes (a conductor 171 and a conductor 173). The EL layer 172 can be formed of a plurality of layers such as a layer 4420, a light-emitting layer 4411, and a layer 4430. The layer 4420 can include, for example, a layer containing a substance with a high electron-injection property (an electron-injection layer) and a layer containing a substance with a high electron-transport property (an electron-transport layer). The light-emitting layer 4411 contains a light-emitting compound, for example. The layer 4430 can include, for example, a layer containing a substance with a high hole-injection property (a hole-injection layer) and a layer containing a substance with a high hole-transport property (a hole-transport layer).

The structure including the layer 4420, the light-emitting layer 4411, and the layer 4430, which are provided between the pair of electrodes, can function as a single light-emitting unit, and the structure in FIG. 28A is referred to as a single structure in this specification and the like.

Figure 28B:
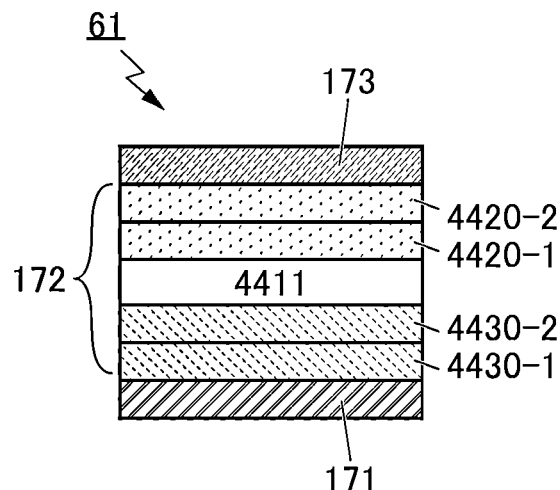

FIG. 28B illustrates a modification example of the EL layer 172 included in the light-emitting element 61 illustrated in FIG. 28A. Specifically, the light-emitting element 61 illustrated in FIG. 28B includes a layer 4430-1 over the conductor 171, a layer 4430-2 over the layer 4430-1, the light-emitting layer 4411 over the layer 4430-2, a layer 4420-1 over the light-emitting layer 4411, a layer 4420-2 over the layer 4420-1, and the conductor 173 over the layer 4420-2. In the case where the conductor 171 is an anode and the conductor 173 is a cathode, for example, the layer 4430-1 functions as a hole-injection layer, the layer 4430-2 functions as a hole-transport layer, the layer 4420-1 functions as an electron-transport layer, and the layer 4420-2 functions as an electron-injection layer. Alternatively, in the case where the conductor 171 is a cathode and the conductor 173 is an anode, the layer 4430-1 functions as an electron-injection layer, the layer 4430-2 functions as an electron-transport layer, the layer 4420-1 functions as a hole-transport layer, and the layer 4420-2 functions as a hole-injection layer. With such a layered structure, carriers can be efficiently injected to the light-emitting layer 4411, and the efficiency of the recombination of carriers in the light-emitting layer 4411 can be enhanced.

Figure 28C:
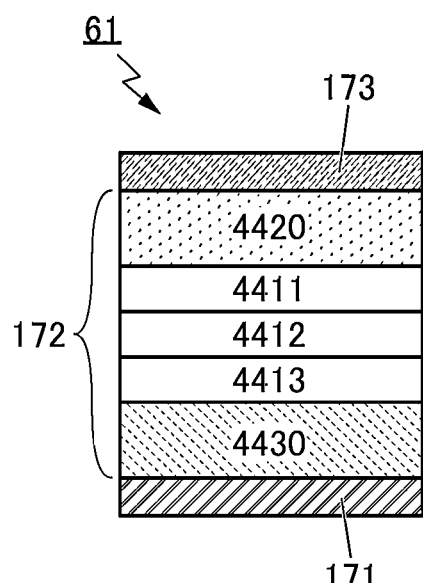

Note that the structure in which a plurality of light-emitting layers (the light-emitting layer 4411, a light-emitting layer 4412, and a light-emitting layer 4413) are provided between the layer 4420 and the layer 4430 as illustrated in FIG. 28C is also an example of the single structure.

Figure 28D:
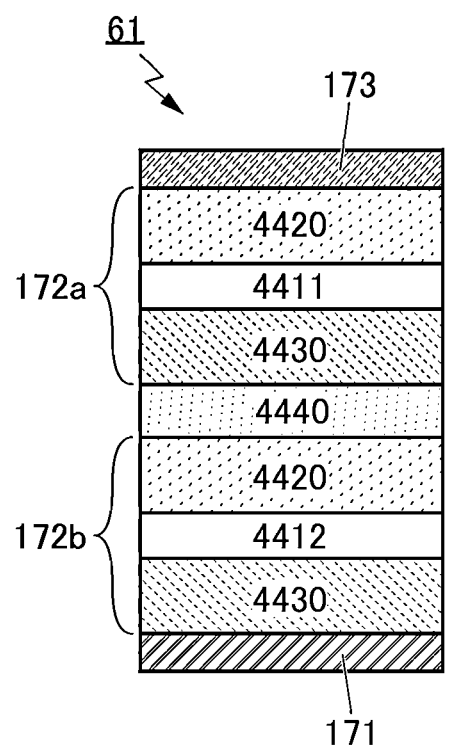

The structure in which a plurality of light-emitting units (an EL layer 172a and an EL layer 172b) are connected in series with an intermediate layer (charge-generation layer) 4440 therebetween as illustrated in FIG. 28D is referred to as a tandem structure or a stack structure in this specification and the like. The tandem structure enables a light-emitting element capable of high luminance light emission.

In the case where the light-emitting element 61 has the tandem structure illustrated in FIG. 28D, the EL layer 172a and the EL layer 172b may emit light of the same color. For example, the EL layer 172a and the EL layer 172b may both emit green light.

Note that full-color display can be achieved by using the light-emitting element 61 emitting red light (R), the light-emitting element 61 emitting green light (G), and the light-emitting element 61 emitting blue light (B) as subpixels and constituting one pixel with these three subpixels. In the case where one pixel includes three kinds of subpixels of R, G, and B, the light-emitting elements 61 may each have a tandem structure. Specifically, the EL layer 172a and the EL layer 172b in the subpixel of R each contain a material capable of emitting red light, the EL layer 172a and the EL layer 172b in the subpixel of G each contain a material capable of emitting green light, and the EL layer 172a and the EL layer 172b in the subpixel of B each contain a material capable of emitting blue light. In other words, the light-emitting layer 4411 and the light-emitting layer 4412 may contain the same material. When the EL layer 172a and the EL layer 172b emit light of the same color, the current density per unit emission luminance can be reduced. Thus, the reliability of the light-emitting element 61 can be increased.

The emission color of the light-emitting element can be red, green, blue, cyan, magenta, yellow, white, or the like depending on the material that constitutes the EL layer 172. Furthermore, the color purity can be further increased when the light-emitting element has a microcavity structure.

The light-emitting layer may contain two or more light-emitting substances that emit light of red (R), green (G), blue (B), yellow (Y), orange (O), or the like. The light-emitting element that emits white light preferably contains two or more kinds of light-emitting substances in the light-emitting layer. To obtain white light emission, two or more light-emitting substances are selected such that their emission colors are complementary colors. For example, when the emission color of a first light-emitting layer and the emission color of a second light-emitting layer have a relationship of complementary colors, it is possible to obtain a light-emitting element which emits white light as a whole. The same applies to a light-emitting element including three or more light-emitting layers.

The light-emitting layer preferably contains two or more light-emitting substances that emit light of R (red), G (green), B (blue), Y (yellow), O (orange), or the like. Alternatively, the light-emitting layer preferably contains two or more light-emitting substances that emit light containing two or more of spectral components of R, G, and B. Alternatively, as the light-emitting substance, a substance that emits near-infrared light can be used.

Examples of a light-emitting substance include a substance that emits fluorescent light (a fluorescent material), a substance that emits phosphorescent light (a phosphorescent material), an inorganic compound (a quantum dot material and the like), and a substance that exhibits thermally acti-vated delayed fluorescence (a thermally activated delayed fluorescence (TADF) material).

<Method for Forming Light-Emitting Element>

An example of a method for forming the light-emitting element 61 will be described below.

Figure 29A:
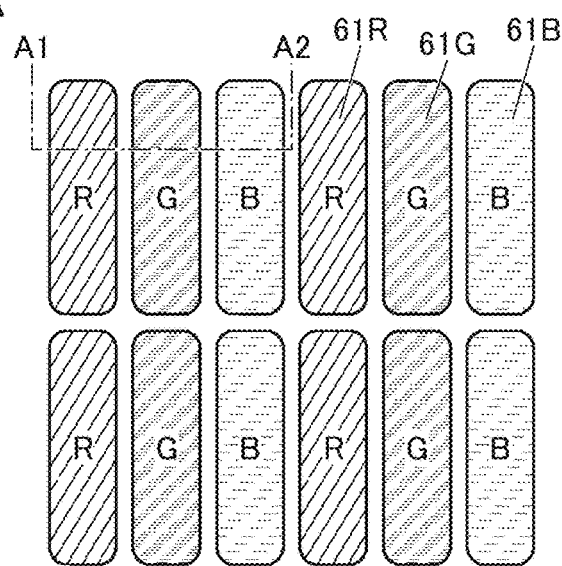
FIG. 29A to FIG. 29D are diagrams illustrating structure examples of light-emitting elements.

FIG. 29A illustrates a schematic top view of the light-emitting element 61. The light-emitting element 61 includes a plurality of light-emitting elements 61R exhibiting red, a plurality of light-emitting elements 61G exhibiting green, and a plurality of light-emitting elements 61B exhibiting blue. In FIG. 29A, light-emitting regions of the light-emitting elements are denoted by R, G, and B to easily differentiate the light-emitting elements. Although FIG. 29A illustrates the structure having three emission colors of red (R), green (G), and blue (B), one embodiment of the present invention is not limited thereto. For example, the structure may have four or more colors.

The light-emitting elements 61R, the light-emitting elements 61G, and the light-emitting elements 61B are arranged in a matrix. Although FIG. 29A illustrates what is called a stripe arrangement in which the light-emitting elements of the same color are arranged in one direction, the arrangement method of the light-emitting elements is not limited thereto.

As the light-emitting element 61R, the light-emitting element 61G, and the light-emitting element 61B, an organic EL element such as an OLED (Organic Light Emitting Diode) or a QOLED (Quantum-dot Organic Light Emitting Diode) is preferably used. As examples of a light-emitting substance contained in the EL element, a substance that emits fluorescent light (a fluorescent material), a substance that emits phosphorescent light (a phosphorescent material), an inorganic compound (e.g., a quantum dot material), a substance exhibiting thermally activated delayed fluorescence (a thermally activated delayed fluorescence (TADF) material), and the like can be given.

Figure 29B:
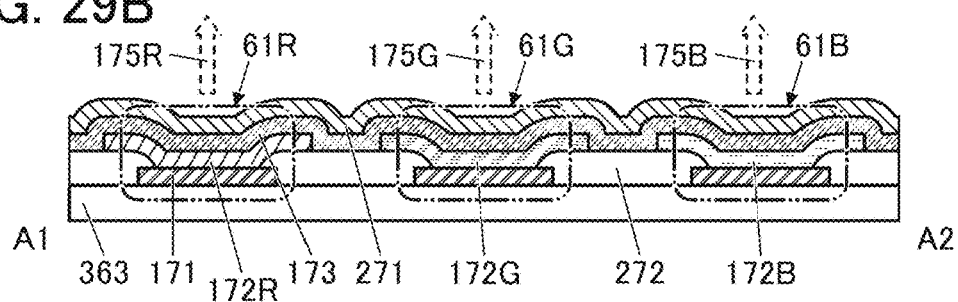

FIG. 29B is a cross-sectional schematic view taken along dashed-dotted line A1-A2 in FIG. 29A. FIG. 29B illustrates cross sections of the light-emitting element 61R, the light-emitting element 61G, and the light-emitting element 61B. The light-emitting element 61R, the light-emitting element 61G, and the light-emitting element 61B are each provided over an insulator 363 and include the conductor 171 functioning as a pixel electrode and the conductor 173 functioning as a common electrode. For the insulator 363, one or both of an inorganic insulating film and an organic insulating film can be used. An inorganic insulating film is preferably used as the insulator 363. Examples of the inorganic insulating film include an oxide insulating film and a nitride insulating film such as a silicon oxide film, a silicon oxynitride film, a silicon nitride oxide film, a silicon nitride film, an aluminum oxide film, an aluminum oxynitride film, and a hafnium oxide film.

The light-emitting elements 61R each include an EL layer 172R between the conductor 171 functioning as a pixel electrode and the conductor 173 functioning as a common electrode. The EL layer 172R contains at least a light-emitting organic compound that emits light with an intensity in a red wavelength range. An EL layer 172G included in the light-emitting element 61G contains at least a light-emitting organic compound that emits light with an intensity in a green wavelength range. An EL layer 172B included in the light-emitting element 61B contains at least a light-emitting organic compound that emits light with an intensity in a blue wavelength range.

The EL layer 172R, the EL layer 172G, and the EL layer 172B may each include one or more of an electron-injection layer, an electron-transport layer, a hole-injection layer, and a hole-transport layer in addition to the layer containing a light-emitting organic compound (the light-emitting layer).

The conductor 171 functioning as a pixel electrode is provided in each of the light-emitting elements. The conductor 173 functioning as a common electrode is provided as a continuous layer shared by the light-emitting elements. A conductive film that has a property of transmitting visible light is used for either the conductor 171 functioning as a pixel electrode or the conductor 173 functioning as a common electrode, and conductive film that has a reflective property is used for the other. When the conductor 171 functioning as a pixel electrode has a light-transmitting property and the conductor 173 functioning as a common electrode has a reflective property, a bottom-emission display apparatus can be obtained, whereas when the conductor 171 functioning as a pixel electrode has a reflective property and the conductor 173 functioning as a common electrode has a light-transmitting property, a top-emission display apparatus can be obtained. Note that when both the conductor 171 functioning as a pixel electrode and the conductor 173 functioning as a common electrode have a light-transmitting property, a dual-emission display apparatus can be obtained.

For example, in the case where the light-emitting element 61R has a top-emission structure, light 175R is emitted from the light-emitting element 61R to the conductor 173 side. In the case where the light-emitting element 61R has a top-emission structure, light 175G is emitted from the light-emitting element 61G to the conductor 173 side. In the case where the light-emitting element 61B has a top-emission structure, light 175B is emitted from the light-emitting element 61B to the conductor 173 side.

An insulator 272 is provided to cover end portions of the conductor 171 functioning as a pixel electrode. End portions of the insulator 272 are preferably tapered. For the insulator 272, a material similar to the material that can be used for the insulator 363 can be used.

The insulator 272 is provided to prevent an unintentional electric short-circuit between adjacent light-emitting elements 61 and unintended light emission therefrom. The insulator 272 also has a function of preventing the contact of a metal mask with the conductor 171 in the case where the metal mask is used to form the EL layer 172.

The EL layer 172R, the EL layer 172G, and the EL layer 172B each include a region in contact with a top surface of the conductor 171 functioning as a pixel electrode and a region in contact with a surface of the insulator 272. End portions of the EL layer 172R, the EL layer 172G, and the EL layer 172B are positioned over the insulator 272.

As illustrated in FIG. 29B, there is a gap between the two EL layers of the light-emitting elements with different colors. In this manner, the EL layer 172R, the EL layer 172G, and the EL layer 172G are preferably provided so as not to be in contact with each other. This suitably prevents unintentional light emission (also referred to as crosstalk) from being caused by current flowing through two adjacent EL layers. As a result, the contrast can be increased to achieve a display apparatus with high display quality.

The EL layer 172R, the EL layer 172G, and the EL layer 172G can be formed separately by a vacuum evaporation method or the like using a shadow mask such as a metal mask. Alternatively, these layers may be formed separately by a photolithography method. The use of a photolithography method achieves a display apparatus with high resolution, which is difficult to obtain in the case of using a metal mask.

In this specification and the like, a device formed using a metal mask or an FMM (fine metal mask, high-resolution metal mask) may be referred to as a device having an MM (metal mask) structure. In addition, in this specification and the like, a device fabricated without using a metal mask or an FMM is sometimes referred to as a device having an MML (metal maskless) structure. A display apparatus having an MML structure is fabricated without using a metal mask and thus has higher flexibility in designing the pixel arrangement, the pixel shape, and the like than a display apparatus having an MM structure.

A protective layer 271 is provided over the conductor 173 functioning as a common electrode so as to cover the light-emitting element 61R, the light-emitting element 61G, and the light-emitting element 61B. The protective layer 271 has a function of preventing diffusion of impurities such as water into the light-emitting elements from above.

The protective layer 271 can have, for example, a single-layer structure or a stacked-layer structure at least including an inorganic insulating film. Examples of the inorganic insulating film include an oxide film or a nitride film such as a silicon oxide film, a silicon oxynitride film, a silicon nitride oxide film, a silicon nitride film, an aluminum oxide film, an aluminum oxynitride film, and a hafnium oxide film. Alternatively, a semiconductor material such as indium gallium oxide or indium gallium zinc oxide (IGZO) may be used for the protective layer 271. Note that the protective layer 271 is formed by an ALD method, a CVD method, or a sputtering method. Although the protective layer 271 includes an inorganic insulating film in this example, one embodiment of the present invention is not limited thereto. For example, the protective layer 271 may have a stacked-layer structure of an inorganic insulating film and an organic insulating film.

Note that in this specification, a nitride oxide refers to a compound that contains more nitrogen than oxygen. An oxynitride refers to a compound that contains more oxygen than nitrogen. The content of each element can be measured by Rutherford backscattering spectrometry (RBS), for example.

In the case where an indium gallium zinc oxide is used for the protective layer 271, the indium gallium zinc oxide can be processed by a wet etching method or a dry etching method. For example, in the case where IGZO is used as the protective layer 271, a chemical solution of oxalic acid, phosphoric acid, a mixed chemical solution (e.g., a mixed chemical solution of phosphoric acid, acetic acid, nitric acid, and water, which is also referred to as a mixed acid aluminum etchant), or the like can be used. Note that the volume ratio of phosphoric acid, acetic acid, nitric acid, and water in the mixed acid aluminum etchant can be 53.3:6.7:3.3:36.7 or in the vicinity thereof.

Note that the structure illustrated in FIG. 29B may be referred to as an SBS structure described later.

Figure 29C:
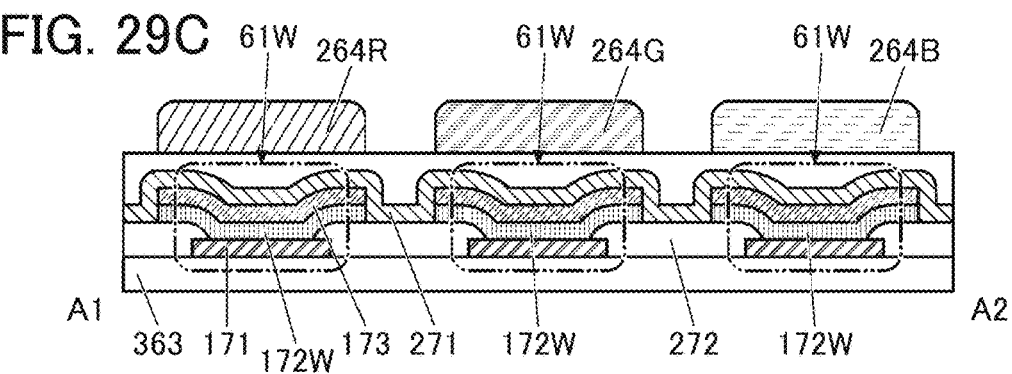

FIG. 29C illustrates an example different from the above. Specifically, in FIG. 29C, light-emitting elements 61W that exhibit white light are provided. The light-emitting elements 61W each include an EL layer 172W that exhibits white light between the conductor 171 functioning as a pixel electrode and the conductor 173 functioning as a common electrode.

The EL layer 172W can have, for example, a structure in which two or more light-emitting layers that are selected so as to emit light of complementary colors are stacked. It is also possible to use a stacked EL layer in which a charge-generation layer is provided between light-emitting layers.

FIG. 29C illustrates three light-emitting elements 61W side by side. A coloring layer 264R is provided above the light-emitting element 61W on the left. The coloring layer 264R functions as a band path filter that transmits red light. Similarly, a coloring layer 264G that transmits green light is provided above the light-emitting element 61W in the middle, and a coloring layer 264B that transmits blue light is provided above the light-emitting element 61W on the right. Thus, the display apparatus can display an image with colors.

Here, the EL layer 172W and the conductor 173 functioning as a common electrode are each separated between two adjacent light-emitting elements 61W. This can prevent unintentional light emission from being caused by current flowing through the EL layers 172W of the two adjacent light-emitting elements 61W. Particularly when stacked EL layers in which a charge-generation layer is provided between two light-emitting layers are used as the EL layer 172W, crosstalk is more significant as the resolution increases, i.e., as the distance between adjacent pixels decreases, leading to lower contrast. Thus, the above structure can achieve a display apparatus having both high resolution and high contrast.

The EL layer 172W and the conductor 173 functioning as a common electrode are preferably separated by a photolithography method. This can reduce an interval between light-emitting elements, enabling a display apparatus with a higher aperture ratio than that formed using, for example, a shadow mask such as a metal mask.

Note that in the case of a bottom-emission light-emitting element, a coloring layer may be provided between the conductor 171 functioning as a pixel electrode and the insulator 363.

Figure 29D:
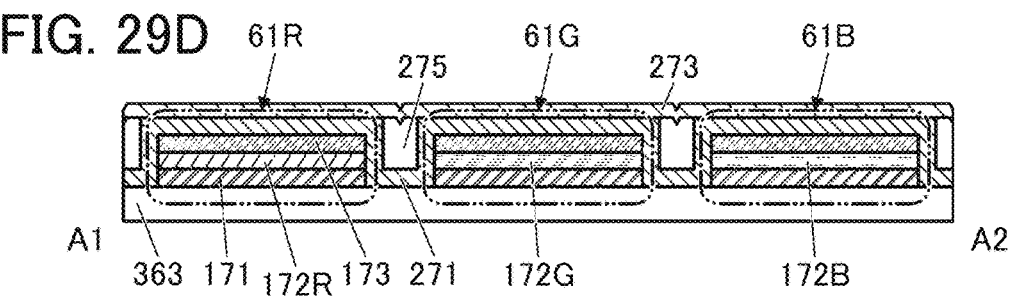

FIG. 29D illustrates an example different from the above. Specifically, in FIG. 29D, the insulators 272 are not provided between the light-emitting element 61R, the light-emitting element 61G, and the light-emitting element 61B. With such a structure, the display apparatus can have a high aperture ratio. When the insulators 272 are not provided, unevenness formed by the light-emitting elements 61 can be reduced, thereby improving the viewing angle of the display apparatus. Specifically, the viewing angle can be greater than or equal to 150° and less than 180°, preferably greater than or equal to 160° and less than 180°.

The protective layer 271 covers the side surfaces of the EL layer 172R, the EL layer 172G, and the EL layer 172B. With this structure, impurities (typically, water or the like) can be inhibited from entering the EL layer 172R, the EL layer 172G, and the EL layer 172B through their side surfaces. In addition, leakage current between adjacent light-emitting elements 61 is reduced, so that color saturation and contrast ratio are improved and power consumption is reduced.

In the structure illustrated in FIG. 29D, the top shapes of the conductor 171, the EL layer 172R, and the conductor 173 are substantially the same. This structure can be formed in such a manner that the conductor 171, the EL layer 172R, and the conductor 173 are formed and collectively processed using a resist mask or the like. In this process, the EL layer 172R and the conductor 173 are processed using the conductor 173 as a mask, and thus this process can be called self-alignment patterning. Although the EL layer 172R is described here, the EL layer 172G and the EL layer 172B can each have a similar structure.

In FIG. 29D, a protective layer 273 is further provided over the protective layer 271. For example, the protective layer 271 can be formed with an apparatus that can deposit a film with excellent coverage (typically, an ALD apparatus), and the protective layer 273 can be formed with an apparatus that can deposit a film with coverage inferior to that of the protective layer 271 (typically, a sputtering apparatus), whereby a region 275 can be provided between the protective layer 271 and the protective layer 273. In other words, the regions 275 are positioned between the EL layer 172R and the EL layer 172G and between the EL layer 172G and the EL layer 172B.

Note that the region 275 includes, for example, any one or more selected from air, nitrogen, oxygen, carbon dioxide, and Group 18 elements (typically, helium, neon, argon, xenon, and krypton). Furthermore, for example, a gas used during the deposition of the protective layer 273 is sometimes included in the region 275. For example, in the case where the protective layer 273 is deposited using a sputtering method, any one or more of the above-described Group 18 elements is sometimes included in the region 275. In the case where a gas is included in the region 275, a gas can be identified with a gas chromatography method or the like. Alternatively, in the case where the protective layer 273 is deposited by a sputtering method, a gas used in the sputtering is sometimes contained in the protective layer 273. In this case, an element such as argon is sometimes detected when the protective layer 273 is analyzed by an energy dispersive X-ray analysis (EDX analysis) or the like.

In the case where the refractive index of the region 275 is lower than the refractive index of the protective layer 271, light emitted from the EL layer 172R, the EL layer 172G, or the EL layer 172B is reflected at the interface between the protective layer 271 and the region 275. Thus, light emitted from the EL layer 172R, the EL layer 172G, or the EL layer 172B can be inhibited from entering an adjacent pixel in some cases. This can inhibit color mixture of light emitted from adjacent pixels and thus can improve the display quality of the display apparatus.

In the case of the structure illustrated in FIG. 29D, a region between the light-emitting element 61R and the light-emitting element 61G or a region between the light-emitting element 61G and the light-emitting element 61B (hereinafter simply referred to as a distance between the light-emitting elements) can be small. Specifically, the distance between the light-emitting elements can be less than or equal to 1 m, preferably less than or equal to 500 nm, further preferably less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or less than or equal to 10 nm. In other words, the display apparatus includes a region in which an interval between the side surface of the EL layer 172R and the side surface of the EL layer 172G or an interval between the side surface of the EL layer 172G and the side surface of the EL layer 172B is less than or equal to 1 μm, preferably less than or equal to 0.5 μm (500 nm), further preferably less than or equal to 100 nm.

In the case where the region 275 includes a gas, the light-emitting elements can be separated from each other and color mixing of light or crosstalk between the light-emitting elements can be inhibited.

The region 275 may be a space or may be filled with a filler. Examples of the filler include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. Alternatively, a photoresist may be used as the filler. The photoresist used as the filler may be a positive photoresist or a negative photoresist.

Figure 30A:
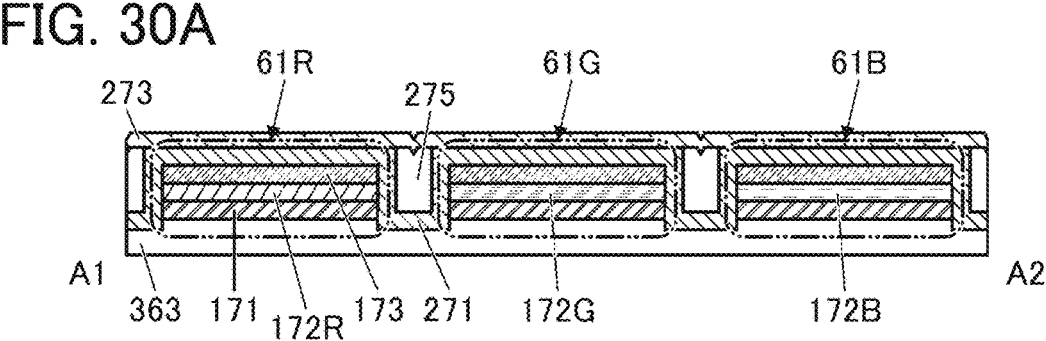
FIG. 30A to FIG. 30D are diagrams illustrating structure examples of light-emitting elements.

FIG. 30A illustrates an example different from the above. Specifically, the structure illustrated in FIG. 30A is different from the structure illustrated in FIG. 29D in the structure of the insulator 363. The top surface of the insulator 363 is partly removed when the light-emitting element 61R, the light-emitting element 61G, and the light-emitting element 61B are processed, so that the insulator 363 has a depressed portion. In addition, the protective layer 271 is formed in the depressed portion. In other words, in the cross-sectional view, a region is provided, in which the bottom surface of the protective layer 271 is positioned below the bottom surface of the conductor 171. With the region, impurities (typically, water or the like) can be suitably inhibited from entering the light-emitting element 61R, the light-emitting element 61G, and the light-emitting element 61B from the bottom. It is likely that the depressed portion can be formed when impurities (also referred to as residue) that could be attached to the side surfaces of the light-emitting element 61R, the light-emitting element 61G, and the light-emitting element 61B in processing of the light-emitting elements are removed by e.g., wet etching. After the residue is removed, the side surfaces of the light-emitting elements are covered with the protective layer 271, whereby a highly reliable display apparatus can be provided.

Figure 30B:
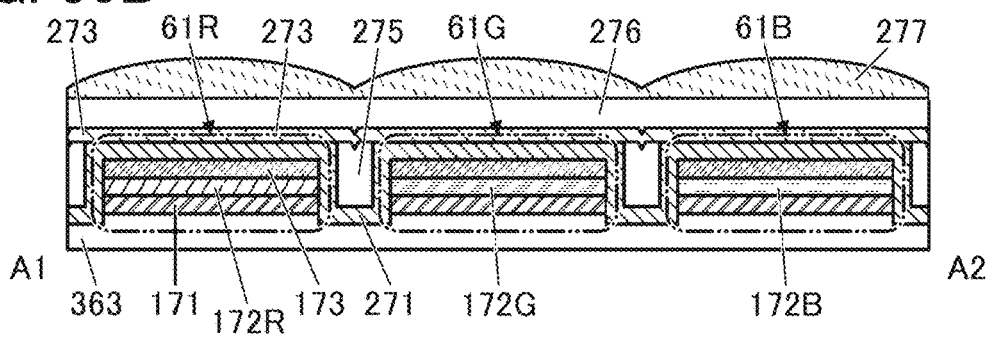

FIG. 30B illustrates an example different from the above. Specifically, the structure illustrated in FIG. 30B includes an insulator 276 and a microlens array 277 in addition to the structure illustrated in FIG. 30A. The insulator 276 functions as an adhesive layer. Note that when the refractive index of the insulator 276 is lower than that of the microlens array 277, the microlens array 277 can condense light emitted from the light-emitting element 61R, the light-emitting element 61G, and the light-emitting element 61B. This can increase the light extraction efficiency of the display apparatus. In particular, this is suitable, because a user can see bright images when the user sees the display surface from the front of the display apparatus. As the insulator 276, a variety of curable adhesives, e.g., a photocurable adhesive such as an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferred. Alternatively, a two-liquid-mixture-type resin may be used. An adhesive sheet or the like may be used.

Figure 30C:
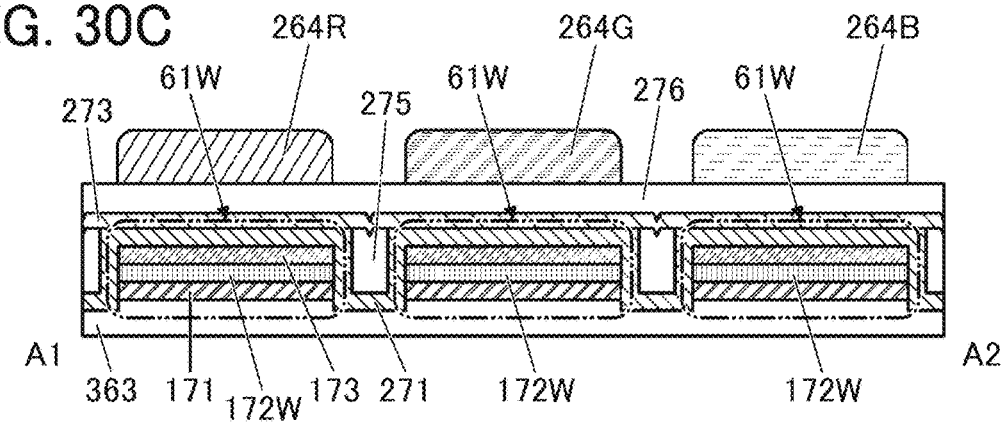

FIG. 30C illustrates an example different from the above. Specifically, the structure illustrated in FIG. 30C includes three light-emitting elements 61W instead of the light-emitting element 61R, the light-emitting element 61G, and the light-emitting element 61B in the structure illustrated in FIG. 30A. In addition, the insulator 276 is provided over the three light-emitting elements 61W, and the coloring layer 264R, the coloring layer 264G, and the coloring layer 264B are provided over the insulator 276. Specifically, the coloring layer 264R that transmits red light is provided at a position overlapping with the light-emitting element 61W on the left, the coloring layer 264G that transmits green light is provided at a position overlapping with the light-emitting element 61W in the middle, and the coloring layer 264B that transmits blue light is provided at a position overlapping with the light-emitting element 61W on the right. Thus, the semiconductor device can display an image with colors. The structure illustrated in FIG. 30C is also a modification example of the structure illustrated in FIG. 29C.

Figure 30D:
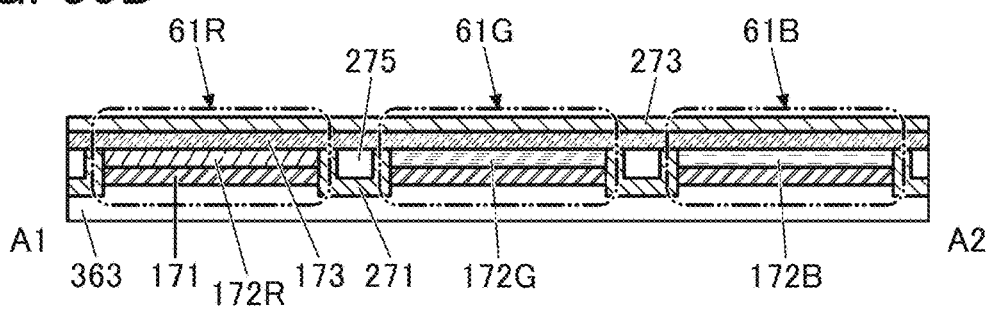

FIG. 30D illustrates an example different from the above. Specifically, in the structure illustrated in FIG. 30D, the protective layer 271 is provided adjacent to the side surfaces of the conductor 171 and the EL layer 172. The conductor 173 is provided as a continuous layer shared by the light-emitting elements. In the structure illustrated in FIG. 30D, the region 275 is preferably filled with a filler.

Furthermore, the color purity of emitted light can be further increased when the light-emitting element 61 has a microcavity structure. In order that the light-emitting element 61 has a microcavity structure, a product of a distance d between the conductor 171 and the conductor 173 and a refractive index n of the EL layer 172 (optical path length) is set to m times half of a wavelength $\lambda$ (m is an integer greater than or equal to 1). The distance d can be obtained by Formula 1.

$$d = m \times \lambda (2 \times n) \quad \text{Formula 1}$$

According to Formula 1, in the light-emitting element 61 having the microcavity structure, the distance d is determined in accordance with the wavelength (emission color) of emitted light. The distance d corresponds to the thickness of the EL layer 172. Thus, the EL layer 172G is provided to have a larger thickness than the EL layer 172B, and the EL layer 172R is provided to have a larger thickness than the EL layer 172G in some cases.

To be exact, the distance d is a distance from a reflection region in the conductor 171 functioning as a reflective electrode to a reflection region in the conductor 173 functioning as an electrode having properties of transmitting and reflecting emitted light (a semi-transmissive and semi-reflective electrode). For example, in the case where the conductor 171 is a stack of silver and ITO (Indium Tin Oxide) that is a transparent conductive film and the ITO is positioned on the EL layer 172 side, the distance d suitable for the emission color can be set by adjusting the thickness of the ITO. That is, even when the EL layer 172R, the EL layer 172G, and the EL layer 172B have the same thickness, the distance d suitable for the emission color can be obtained by adjusting the thickness of the ITO.

However, it is sometimes difficult to determine the exact position of the reflection region in each of the conductor 171 and the conductor 173. In that case, it is assumed that the effect of the microcavity structure can be fully obtained with a certain position in each of the conductor 171 and the conductor 173 being supposed as the reflection region.

The light-emitting element 61 includes a hole-injection layer, a hole-transport layer, a light-emitting layer, an electron-transport layer, an electron-injection layer, and the like. Note that a specific structure example of the light-emitting element 61 will be described in another embodiment. In order to increase the outcoupling efficiency in the microcavity structure, the optical path length from the conductor 171 functioning as a reflective electrode to the light-emitting layer is preferably set to an odd multiple of $\lambda/4$. In order to achieve this optical distance, the thicknesses of the layers in the light-emitting element 61 are preferably adjusted as appropriate.

In the case where light is emitted from the conductor 173 side, the reflectance of the conductor 173 is preferably higher than the transmittance thereof. The light transmittance of the conductor 173 is preferably higher than or equal to 2% and lower than or equal to 50%, further preferably higher than or equal to 2% and lower than or equal to 30%, still further preferably higher than or equal to 2% and lower than or equal to 10%. When the transmittance of the conductor 173 is set low (the reflectance is set high), the effect of the microcavity can be enhanced.

Figure 31A:
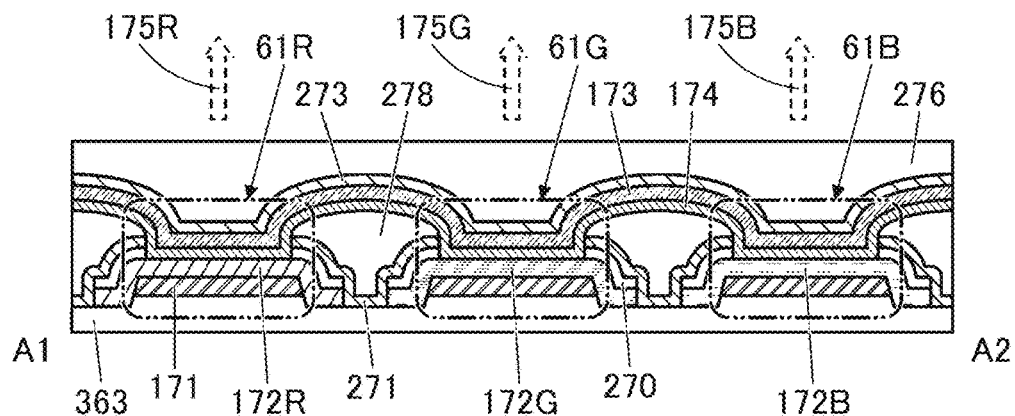
FIG. 31A to FIG. 31C are diagrams illustrating structure examples of light-emitting elements.

FIG. 31A illustrates an example different from the above. Specifically, in the structure illustrated in FIG. 31A, the EL layer 172 extends beyond the end portions of the conductor 171 in each of the light-emitting element 61R, the light-emitting element 61G, and the light-emitting element 61B. For example, in the light-emitting element 61R, the EL layer 172R extends beyond the end portions of the conductor 171. In the light-emitting element 61G, the EL layer 172G extends beyond the end portions of the conductor 171. In the light-emitting element 61B, the EL layer 172B extends beyond the end portions of the conductor 171.

The light-emitting element 61R, the light-emitting element 61G, and the light-emitting element 61B each include a region where the EL layer 172 overlaps with the protective layer 271 with an insulator 270 therebetween. In a region between adjacent light-emitting elements 61, an insulator 278 is provided over the protective layer 271.

Examples of the insulator 278 include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. Alternatively, a photoresist may be used as the insulator 278. The photoresist used as the insulator 278 may be a positive photoresist or a negative photoresist.

A common layer 174 is provided over the light-emitting element 61R, the light-emitting element 61G, the light-emitting element 61B, and the insulator 278, and the conductor 173 is provided over the common layer 174. The common layer 174 includes a region in contact with the EL layer 172R, a region in contact with the EL layer 172G, and a region in contact with the EL layer 172B. The common layer 174 is shared by the light-emitting element 61R, the light-emitting element 61G, and the light-emitting element 61B.

As the common layer 174, one or more of a hole-injection layer, a hole-transport layer, a hole-blocking layer, an electron-blocking layer, an electron-transport layer, and an electron-injection layer can be used. For example, the common layer 174 may be a carrier-injection layer (a hole-injection layer or an electron-injection layer). The common layer 174 can also be regarded as part of the EL layer 172. Note that the common layer 174 is provided as necessary. In the case where the common layer 174 is provided, a layer having the same function as the common layer 174 among the layers included in the EL layer 172 is not necessarily provided.

The protective layer 273 is provided over the conductor 173, and the insulator 276 is provided over the protective layer 273.

Figure 31B:
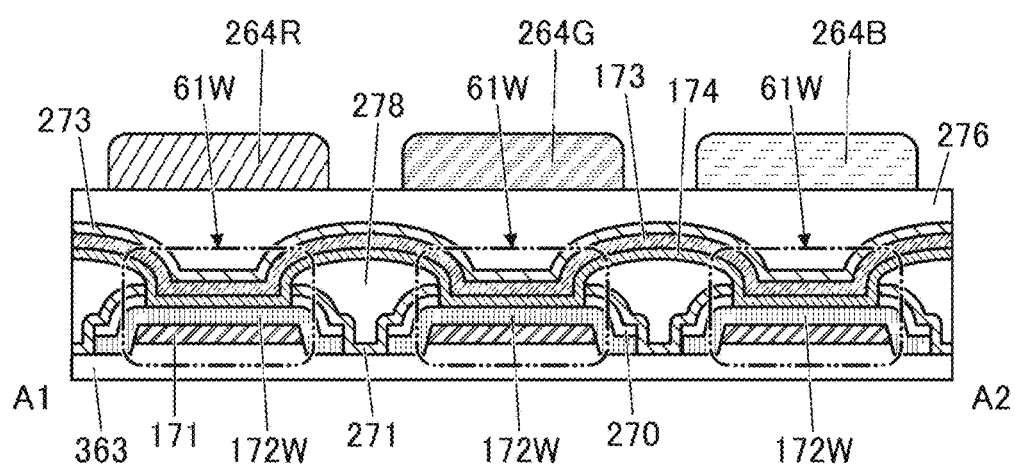

FIG. 31B illustrates an example different from the above. Specifically, the structure illustrated in FIG. 31B includes three light-emitting elements 61W instead of the light-emitting element 61R, the light-emitting element 61G, and the light-emitting element 61B in the structure illustrated in FIG. 31A. In addition, the insulator 276 is provided over the three light-emitting elements 61W, and the coloring layer 264R, the coloring layer 264G, and the coloring layer 264B are provided over the insulator 276. Specifically, the coloring layer 264R that transmits red light is provided at a position overlapping with the light-emitting element 61W on the left, the coloring layer 264G that transmits green light is provided at a position overlapping with the light-emitting element 61W in the middle, and the coloring layer 264B that transmits blue light is provided at a position overlapping with the light-emitting element 61W on the right. Thus, the semiconductor device can display an image with colors. The structure illustrated in FIG. 31B is also a modification example of the structure illustrated in FIG. 30C.

Figure 31C:
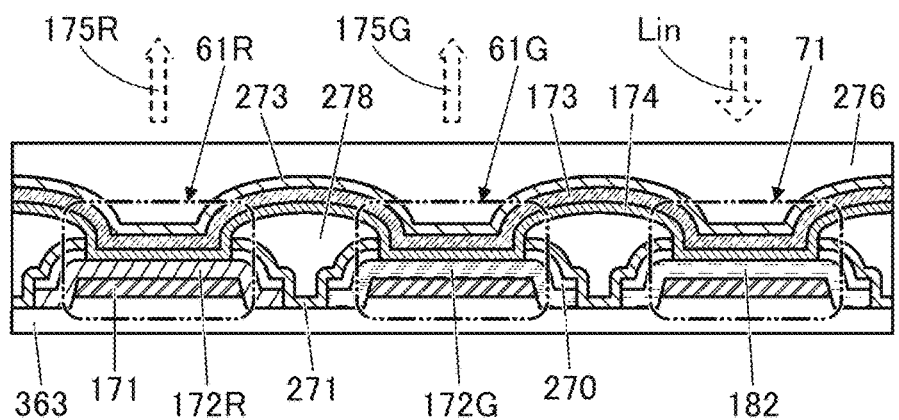

As illustrated in FIG. 31C, the light-emitting element 61R, the light-emitting element 61G, and the light-receiving element 71 may be provided over the insulator 363. The light-receiving element 71 illustrated in FIG. 31C is achieved by replacing the EL layer 172 of the light-emitting element 61 with an active layer 182 (also referred to as a "light-receiving layer") functioning as a photoelectric conversion layer. The active layer 182 has a feature of changing a resistance value depending on the wavelength and intensity of the incident light. The active layer 182 can be formed with an organic compound similar to that of the EL layer 172. Note that an inorganic material such as silicon may be used for the active layer 182.

The light-receiving element 71 has a function of detecting light Lin entering from the outside of the display apparatus and passing through the protective layer 273, the conductor 173, and the common layer 174. A coloring layer transmitting light in a given wavelength range may be provided on the incident side of the light Lin so as to overlap with the light-emitting element 71.

<Materials that can be Used for Light-Emitting Element and Light-Receiving Element>

Materials that can be used for the light-emitting element and the light-receiving element will be described.

The hole-injection layer is a layer injecting holes from an anode to the hole-transport layer, and a layer containing a material having a high hole-injection property. Examples of a material having a high hole-injection property include an aromatic amine compound and a composite material containing a hole-transport material and an acceptor material (electron-accepting material).

The hole-transport layer is a layer transporting holes, which are injected from the anode by the hole-injection layer, to the light-emitting layer. The hole-transport layer is a layer containing a hole-transport material. For the hole-transport material, a substance having a hole mobility higher than or equal to $1 \times 10^{-6}$ cm$^2$/Vs is preferable. Note that other substances can also be used as long as they have a property of transporting more holes than electrons. As the hole-transport material, materials having a high hole-transport property, such as a Tc-electron rich heteroaromatic compound (e.g., a carbazole derivative, a thiophene derivative, and a furan derivative) and an aromatic amine (a compound having an aromatic amine skeleton), are preferable.

The electron-transport layer is a layer transporting electrons, which are injected from a cathode by the electron-injection layer, to the light-emitting layer. The electron-transport layer is a layer containing an electron-transport material. As the electron-transport material, a substance having an electron mobility greater than or equal to $1 \times 10^{-6}$ cm$^2$/Vs is preferable. Note that other substances can also be used as long as they have a property of transporting more electrons than holes. As the electron-transport material, it is possible to use a material having a high electron-transport property, such as a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, or a π-electron deficient heteroaromatic compound such as a nitrogen-containing heteroaromatic compound.

The electron-injection layer is a layer injecting electrons from the cathode to the electron-transport layer and a layer containing a material having a high electron-injection property. As the material having a high electron-injection property, an alkali metal, an alkaline earth metal, or a compound thereof can be used. As the material having a high electron-injection property, a composite material containing an electron-transport material and a donor material (an electron-donating material) can also be used.

As the electron-injection layer, an alkali metal, an alkaline earth metal, or a compound thereof, such as lithium, cesium, ytterbium, lithium fluoride (LiF), cesium fluoride (CsF), calcium fluoride (CaF$_x$, where x is a given number), 8-(quinolinolato)lithium (abbreviation: Liq), 2-(2-pyridyl)phenolatolithium (abbreviation: LiPP), 2-(2-pyridyl)-3-pyridinolato lithium (abbreviation: LiPPy), 4-phenyl-2-(2-pyridyl) phenolatolithium (abbreviation: LiPPP), lithium oxide (LiOx), or cesium carbonate can be used, for example. In addition, the electron-injection layer may have a stacked-layer structure of two or more layers. For example, it is possible to employ a structure where lithium fluoride is used for a first layer and ytterbium is used for a second layer as the stacked-layer structure.

Alternatively, the electron-injection layer may be formed using an electron-transport material. For example, a compound having an unshared electron pair and an electron deficient heteroaromatic ring can be used for the electron-transport material. Specifically, a compound having at least one of a pyridine ring, a diazine ring (a pyrimidine ring, a pyrazine ring, and a pyridazine ring), and a triazine ring can be used.

Note that the lowest unoccupied molecular orbital (LUMO) of the organic compound having an unshared electron pair is preferably greater than or equal to −3.6 eV and less than or equal to −2.3 eV. In general, the highest occupied molecular orbital (HOMO) level and the LUMO level of an organic compound can be estimated by CV (cyclic voltammetry), photoelectron spectroscopy, optical absorption spectroscopy, inverse photoelectron spectroscopy, or the like.

For example, 4,7-diphenyl-1,10-phenanthroline (abbreviation: BPhen), 2,9-di(naphthalen-2-yl)-4,7-diphenyl-1,10-phenanthroline (abbreviation: NBPhen), diquinoxalino[2,3-a:2',3'-c]phenazine (abbreviation: HATNA), 2,4,6-tris[3'-(pyridin-3-yl)biphenyl-3-yl]-1,3,5-triazine (abbreviation: TmPPPyTz), or the like can be used for the organic compound having an unshared electron pair. Note that NBPhen has a higher glass transition temperature (Tg) than BPhen and thus has high heat resistance.

The light-receiving element includes at least an active layer that functions as a photoelectric conversion layer between a pair of electrodes. In this specification and the like, one of the pair of electrodes may be referred to as a pixel electrode and the other may be referred to as a common electrode.

One of the pair of electrodes of the light-receiving element functions as an anode, and the other electrode functions as a cathode. The case where the pixel electrode functions as an anode and the common electrode functions as a cathode is described below as an example. When the light-receiving element is driven by application of reverse bias between the pixel electrode and the common electrode, light entering the light-receiving element can be detected and charge can be generated and extracted as current. Alternatively, the pixel electrode may function as a cathode and the common electrode may function as an anode.

The active layer included in the light-receiving element includes a semiconductor. Examples of the semiconductor include an inorganic semiconductor such as silicon and an organic semiconductor including an organic compound. This embodiment shows an example in which an organic semiconductor is used as the semiconductor included in the active layer. The use of an organic semiconductor is preferable because the light-emitting layer and the active layer can be formed by the same method (e.g., a vacuum evaporation method) and thus the same manufacturing apparatus can be used.

Examples of an n-type semiconductor material included in the active layer include electron-accepting organic semiconductor materials such as fullerene (e.g., $C_{60}$ and $C_{70}$) and fullerene derivatives. Fullerene has a soccer ball-like shape, which is energetically stable. Both the HOMO level and the LUMO level of fullerene are deep (low). Having a deep LUMO level, fullerene has an extremely high electron-accepting property (acceptor property). When π-electron conjugation (resonance) spreads on a plane as in benzene, an electron-donating property (donor property) usually increases; however, fullerene has a spherical shape, and thus has a high electron-accepting property although π-electron conjugation widely spreads therein. The high electron-accepting property efficiently causes rapid charge separation and is useful for a light-receiving element. Both $C_{60}$ and $C_{70}$ have a wide absorption band in the visible light region, and $C_{70}$ is especially preferable because of having a larger π-electron conjugation system and a wider absorption band in the long wavelength region than $C_{60}$. Other examples of fullerene derivatives include [6,6]-Phenyl-C71-butyric acid methyl eSter (abbreviation: PC70BM), [6,6]-Phenyl-C61-butyric acid methyl ester (abbreviation: PC60BM), and 1',1''',4',4'''-Tetrahydro-di[1,4]methanonaphthaleno[1,2:2',3', 56,60:2''',3'''][5,6]fullerene-C60 (abbreviation: ICBA).

Another example of an n-type semiconductor material is a perylenetetracarboxylic derivative such as N,N-dimethyl-3,4,9,10-perylenetetracarboxylic diimide (abbreviation: Me-PTCDI).

Another example of an n-type semiconductor material is 2,2'-(5,5'-(thieno[3,2-b]thiophene-2,5-diyl)bis(thiophene-5, 2-diyl)) bis(methan-1-yl-1-ylidene)dimalononitrile (abbreviation: FT2TDMN).

Other examples of an n-type semiconductor material include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, and a quinone derivative.

Examples of a p-type semiconductor material contained in the active layer include electron-donating organic semiconductor materials such as copper(II) phthalocyanine (CuPc), tetraphenyldibenzoperiflanthene (DBP), zinc phthalocyanine (ZnPc), tin phthalocyanine (SnPc), quinacridone, and rubrene.

Examples of a p-type semiconductor material include a carbazole derivative, a thiophene derivative, a furan derivative, and a compound having an aromatic amine skeleton.

Furthermore, other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a rubrene derivative, a tetracene derivative, a polyphenylene vinylene derivative, a polyparaphenylene derivative, a polyfluorene derivative, a polyvinylcarbazole derivative, and a polythiophene derivative.

The HOMO level of the electron-donating organic semiconductor material is preferably shallower (higher) than the HOMO level of the electron-accepting organic semiconductor material. The LUMO level of the electron-donating organic semiconductor material is preferably shallower (higher) than the LUMO level of the electron-accepting organic semiconductor material.

Fullerene having a spherical shape is preferably used as the electron-accepting organic semiconductor material, and an organic semiconductor material having a substantially planar shape is preferably used as the electron-donating organic semiconductor material. Molecules of similar shapes tend to aggregate, and aggregated molecules of similar kinds, which have molecular orbital energy levels close to each other, can increase a carrier-transport property.

For example, the active layer is preferably formed by co-evaporation of an n-type semiconductor and a p-type semiconductor. Alternatively, the active layer may be formed by stacking an n-type semiconductor and a p-type semiconductor.

In addition to the active layer, the light-receiving element may further include a layer containing any of a substance having a high hole-transport property, a substance having a high electron-transport property, a substance having a bipolar property (a substance having a high electron-transport property and a high hole-transport property), and the like. Without limitation to the above, the light-receiving element may further include a layer containing any of a substance having a high hole-injection property, a hole-blocking material, a material having a high electron-injection property, an electron-blocking material, or the like.

Either a low molecular compound or a high molecular compound can be used for the light-receiving element, and an inorganic compound may be contained. Each of the layers included in the light-receiving element can be formed by an evaporation method (including a vacuum evaporation method), a transfer method, a printing method, an inkjet method, a coating method, or the like.

As the hole-transport material or the electron-blocking material, a high molecular compound such as poly(3,4-ethylenedioxythiophene)/(polystyrenesulfonic acid) (abbreviation: PEDOT/PSS), or an inorganic compound such as a molybdenum oxide or copper iodide (CuI) can be used, for example. As the electron-transport material or the hole-blocking material, an inorganic compound such as zinc oxide (ZnO), or an organic compound such as polyethylenimine ethoxylate (PEIE) can be used. The light-receiving element may include a mixed film of PEIE and ZnO, for example.

For the active layer, a high molecular compound such as poly[[4,8-bis[5-(2-ethylhexyl)-2-thienyl]benzo[1,2-b:4,5-b']dithiophene-2,6-diyl]-2,5-thiophenediyl[5,7-bis(2-ethylhexyl)-4,8-dioxo-4H,8H-benzo[1,2-c:4,5-c']dithiophene-1,3-diyl]] polymer (abbreviation: PBDB-T) or a PBDB-T derivative, which functions as a donor, can be used. For example, a method in which an acceptor material is dispersed to PBDB-T or a PBDB-T derivative can be used.

The active layer may contain a mixture of three or more kinds of materials. For example, a third material may be mixed with an n-type semiconductor material and a p-type semiconductor material in order to extend the wavelength range. In this case, the third material may be a low molecular compound or a high molecular compound.

At least part of the structure examples, the drawings corresponding thereto, and the like described in this embodiment as an example can be combined with the other structure examples, the other drawings, and the like as appropriate.

Embodiment 3

In this embodiment, a cross-sectional structure example of the display apparatus 10 (the display apparatus 10A, the display apparatus 10B, or the display apparatus 10C) of one embodiment of the present invention will be described.

Figure 32:
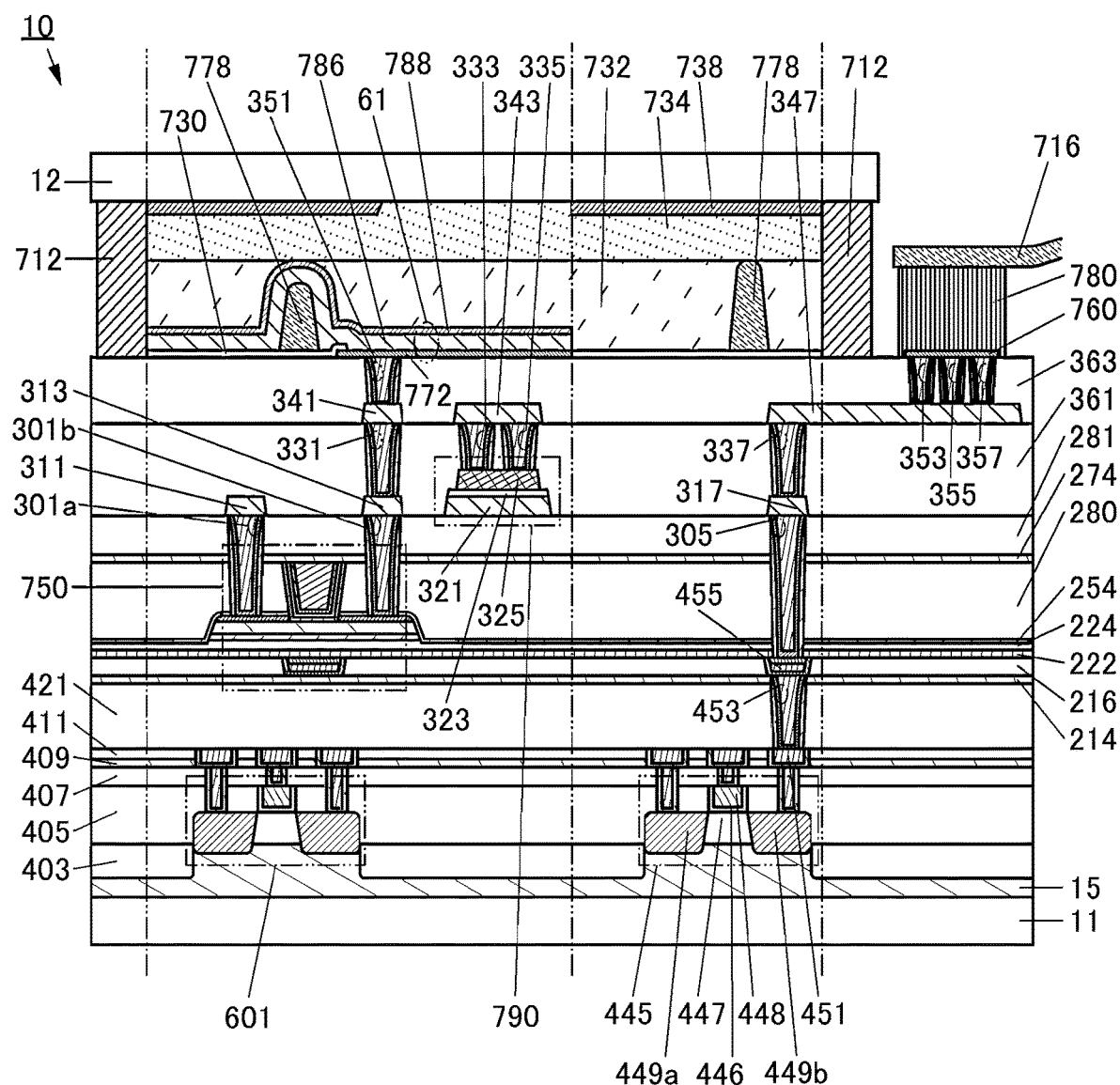
FIG. 32 is a diagram illustrating a structure example of a display apparatus.

FIG. 32 is a cross-sectional view illustrating a structure example of the display apparatus 10. The display apparatus 10 includes the substrate 11 and the substrate 12, and the substrate 11 and the substrate 12 are attached to each other with a sealant 712.

As the substrate 11, for example, a substrate such as a glass substrate or a single crystal silicon substrate can be used.

A semiconductor substrate 15 is provided over the substrate 11, and provided with a transistor 445 and a transistor 601. The transistor 445 and the transistor 601 can each be the transistor 21 provided in the layer 20 described in Embodiment 1.

The transistor 445 is formed of a conductor 448 having a function of a gate electrode, an insulator 446 having a function of a gate insulator, and part of the substrate 11 and includes a semiconductor region 447 including a channel formation region, a low-resistance region 449a having a function of one of a source region and a drain region, and a low-resistance region 449b having a function of the other of the source region and the drain region. The transistor 445 can be a p-channel transistor or an n-channel transistor.

The transistor 445 is electrically isolated from other transistors by an element isolation layer 403. FIG. 32 illustrates the case where the transistor 445 and the transistor 601 are electrically isolated from each other by the element isolation layer 403. The element isolation layer 403 can be formed by a LOCOS (LOCal Oxidation of Silicon) method, an STI (Shallow Trench Isolation) method, or the like.

Here, in the transistor 445 illustrated in FIG. 32, the semiconductor region 447 has a projecting shape. Moreover, the conductor 448 is provided to cover the side surface and the top surface of the semiconductor region 447 with the insulator 446 therebetween. Note that FIG. 32 does not illustrate the state where the conductor 448 covers the side surface of the semiconductor region 447. A material for adjusting a work function can be used for the conductor 448.

A transistor having a projecting semiconductor region, like the transistor 445, can be referred to as a fin-type transistor because a projecting portion of a semiconductor substrate is used. An insulator having a function of a mask for forming a projecting portion may be provided in contact with the top surface of the projecting portion. Although FIG. 32 illustrates the structure in which the projecting portion is formed by processing part of the substrate 11, a semiconductor having a projecting shape may be formed by processing an SOI substrate.

Note that the structure of the transistor 445 illustrated in FIG. 32 is only an example; the structure of the transistor 445 is not limited thereto and can be changed as appropriate in accordance with the circuit structure, an operation method of the circuit, or the like. For example, the transistor 445 may be a planar transistor.

The transistor 601 can have a structure similar to that of the transistor 445.

An insulator 405, an insulator 407, an insulator 409, and an insulator 411 are provided over the substrate 11, in addition to the element isolation layer 403, the transistor 445, and the transistor 601. A conductor 451 is embedded in the insulator 405, the insulator 407, the insulator 409, and the insulator 411. Here, the top surface of the conductor 451 and the top surface of the insulator 411 can be substantially level with each other.

An insulator 421 and an insulator 214 are provided over the conductor 451 and the insulator 411. A conductor 453 is embedded in the insulator 421 and the insulator 214. Here, the top surface of the conductor 453 and the top surface of the insulator 214 can be substantially level with each other.

An insulator 216 is provided over the conductor 453 and the insulator 214. A conductor 455 is embedded in the insulator 216. Here, the top surface of the conductor 455 and the top surface of the insulator 216 can be substantially level with each other.

An insulator 222, an insulator 224, an insulator 254, an insulator 280, an insulator 274, and an insulator 281 are provided over the conductor 455 and the insulator 216. A conductor 305 is embedded in the insulator 222, the insulator 224, the insulator 254, the insulator 280, the insulator 274, and the insulator 281. Here, the top surface of the conductor 305 and the top surface of the insulator 281 can be substantially level with each other.

An insulator 361 is provided over the conductor 305 and the insulator 281. A conductor 317 and a conductor 337 are embedded in the insulator 361. Here, the top surface of the conductor 337 and the top surface of the insulator 361 can be substantially level with each other.

An insulator 363 is provided over the conductor 337 and the insulator 361. A conductor 347, a conductor 353, a conductor 355, and a conductor 357 are embedded in the insulator 363. Here, the top surfaces of the conductor 353, the conductor 355, and the conductor 357 and the top surface of the insulator 363 can be substantially level with each other.

A connection electrode 760 is provided over the conductor 353, the conductor 355, the conductor 357, and the insulator 363. In addition, an anisotropic conductor 780 is provided to be electrically connected to the connection electrode 760, and an FPC (Flexible Printed Circuit) 716 is provided to be electrically connected to the anisotropic conductor 780. A variety of signals and the like are supplied to the display apparatus 10 from the outside of the display apparatus 10 through the FPC 716.

As illustrated in FIG. 32, the low-resistance region 449b having a function of the other of the source region and the drain region of the transistor 445 is electrically connected to the FPC 716 through the conductor 451, the conductor 453, the conductor 455, the conductor 305, the conductor 317, the conductor 337, the conductor 347, the conductor 353, the conductor 355, the conductor 357, the connection electrode 760, and the anisotropic conductor 780. Although FIG. 32 illustrates three conductors of the conductor 353, the conductor 355, and the conductor 357 as conductors that electrically connect the connection electrode 760 and the conductor 347, one embodiment of the present invention is not limited thereto. The number of conductors having a function of electrically connecting the connection electrode 760 and the conductor 347 may be one, two, or four or more. Providing a plurality of conductors having a function of electrically connecting the connection electrode 760 and the conductor 347 can reduce the contact resistance.

A transistor 750 is provided over the insulator 214. The transistor 750 can be the transistor 52 provided in the layer 50 described in Embodiment 1. For example, the transistor 750 can be the transistor provided in the pixel circuit 51. An OS transistor can be suitably used as the transistor 750. The OS transistor has a feature of an extremely low off-state current. Consequently, the retention time for image data or the like can be increased, so that the frequency of the refresh operation can be reduced. Thus, power consumption of the display apparatus 10 can be reduced.

A conductor 301a and a conductor 301b are embedded in the insulator 254, the insulator 280, the insulator 274, and the insulator 281. The conductor 301a is electrically connected to one of a source and a drain of the transistor 750, and the conductor 301b is electrically connected to the other of the source and the drain of the transistor 750. Here, the top surfaces of the conductor 301a and the conductor 301b and the top surface of the insulator 281 can be substantially level with each other.

A conductor 311, a conductor 313, a conductor 331, a capacitor 790, a conductor 333, and a conductor 335 are embedded in the insulator 361. The conductor 311 and the conductor 313 are electrically connected to the transistor 750 and have a function of a wiring. The conductor 333 and the conductor 335 are electrically connected to the capacitor 790. Here, the top surfaces of the conductor 331, the conductor 333, and the conductor 335 and the top surface of the insulator 361 can be substantially level with each other.

A conductor 341, a conductor 343, and a conductor 351 are embedded in the insulator 363. Here, the top surface of the conductor 351 and the top surface of the insulator 363 can be substantially level with each other.

The insulator 405, the insulator 407, the insulator 409, the insulator 411, the insulator 421, the insulator 214, the insulator 280, the insulator 274, the insulator 281, the insulator 361, and the insulator 363 have a function of an interlayer film and may also have a function of a planarization film that covers unevenness thereunder. For example, the top surface of the insulator 363 may be planarized by planarization treatment using a chemical mechanical polishing (CMP) method or the like to have increased planarity.

As illustrated in FIG. 32, the capacitor 790 includes a lower electrode 321 and an upper electrode 325. An insulator 323 is provided between the lower electrode 321 and the upper electrode 325. That is, the capacitor 790 has a stacked-layer structure in which the insulator 323 functioning as a dielectric is held between the pair of electrodes. Although FIG. 32 illustrates an example in which the capacitor 790 is provided over the insulator 281, the capacitor 790 may be provided over an insulator different from the insulator 281.

In the example illustrated in FIG. 32, the conductor 301a, the conductor 301b, and the conductor 305 are formed in the same layer. The conductor 311, the conductor 313, and the conductor 317 and the lower electrode 321 are formed in the same layer. The conductor 331, the conductor 333, the conductor 335, and the conductor 337 are formed in the same layer. The conductor 341, the conductor 343, and the conductor 347 are formed in the same layer. The conductor 351, the conductor 353, the conductor 355, and the conductor 357 are formed in the same layer. Forming a plurality of conductors in the same layer simplifies the manufacturing process of the display apparatus 10 and thus the manufacturing cost of the display apparatus 10 can be reduced. Note that these conductors may be formed in different layers or may contain different types of materials.

The display apparatus 10 illustrated in FIG. 32 includes the light-emitting element 61. The light-emitting element 61 includes a conductor 772, an EL layer 786, and a conductor 788. The EL layer 786 contains an organic compound or an inorganic compound such as quantum dots.

Examples of materials that can be used as an organic compound include a fluorescent material and a phosphorescent material. Examples of materials that can be used as quantum dots include a colloidal quantum dot material, an alloyed quantum dot material, a core-shell quantum dot material, and a core quantum dot material.

The conductor 772 is electrically connected to the other of the source and the drain of the transistor 750 through the conductor 351, the conductor 341, the conductor 331, the conductor 313, and the conductor 301b. The conductor 772 is formed over the insulator 363 and has a function of a pixel electrode.

A material having a visible-light-transmitting property or a material having a visible-light-reflecting property can be used for the conductor 772. As a light-transmitting material, for example, an oxide material containing indium, zinc, tin, or the like is preferably used. As a reflective material, for example, a material containing aluminum, silver, or the like is preferably used.

Although not illustrated in FIG. 32, an optical member (optical substrate) such as a polarizing member, a retardation member, or an anti-reflection member can be provided in the display apparatus 10, for example.

On the substrate 12 side, a light-blocking layer 738 and an insulator 734 that is in contact with the light-blocking layer 738 are provided. The light-blocking layer 738 has a function of blocking light emitted from adjacent regions. Alternatively, the light-blocking layer 738 has a function of preventing external light from reaching the transistor 750 or the like.

In the display apparatus 10 illustrated in FIG. 32, an insulator 730 is provided over the insulator 363. Here, the insulator 730 can cover part of the conductor 772. Here, the light-emitting element 61 is a top-emission light-emitting element, which includes the conductor 788 having a light-transmitting property.

The light-blocking layer 738 is provided to include a region overlapping with the insulator 730. The light-blocking layer 738 is covered with the insulator 734. A space between the light-emitting element 61 and the insulator 734 is filled with a sealing layer 732.

A component 778 is provided between the insulator 730 and the EL layer 786. Moreover, the component 778 is provided between the insulator 730 and the insulator 734.

Figure 33:
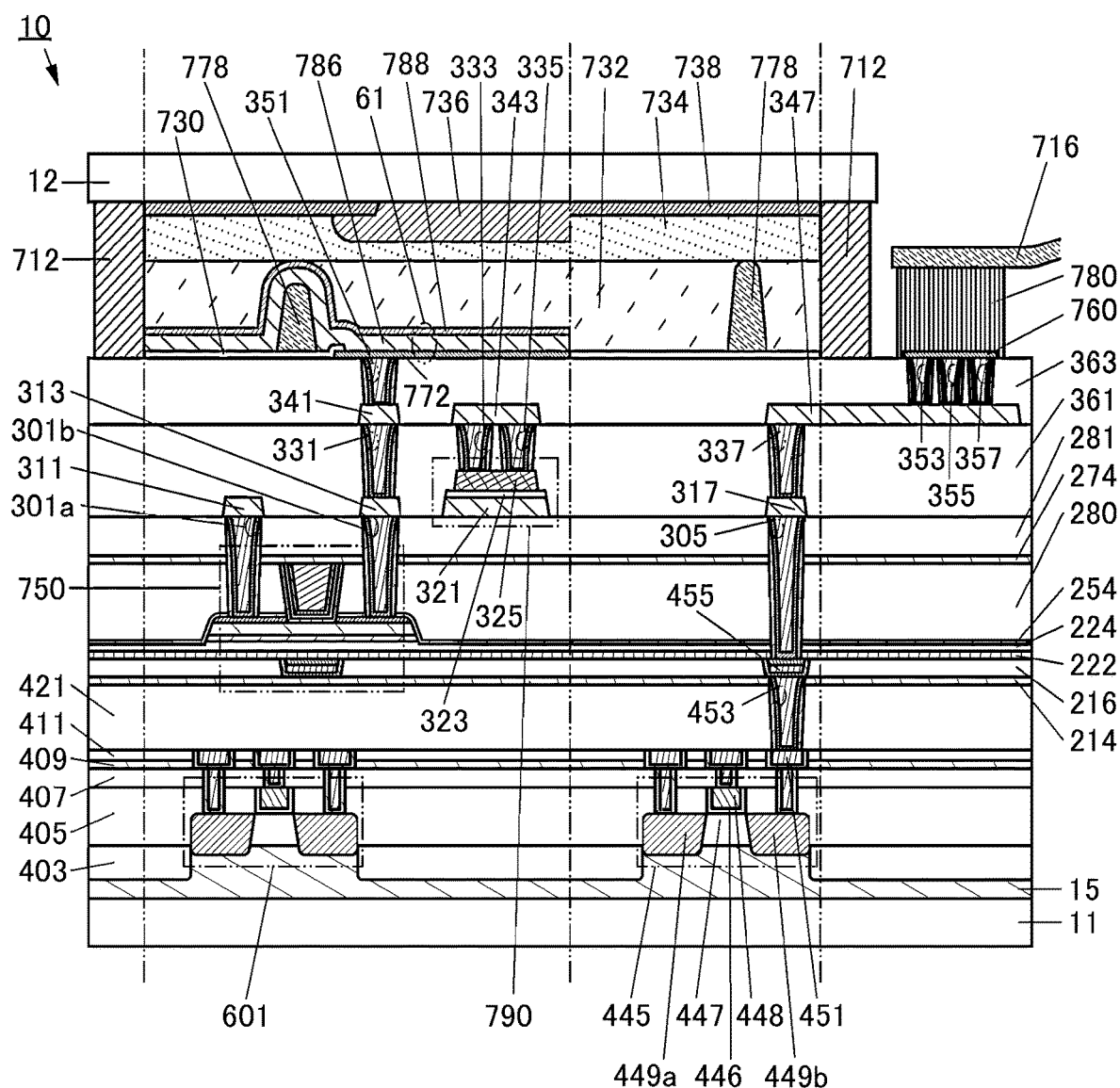
FIG. 33 is a diagram illustrating a structure example of a display apparatus.

FIG. 33 illustrates a modification example of the display apparatus 10 illustrated in FIG. 32. The display apparatus 10 illustrated in FIG. 33 is different from the display apparatus 10 illustrated in FIG. 32 in that a coloring layer 736 is provided. Note that the coloring layer 736 is provided to have a region overlapping with the light-emitting element 61. Providing the coloring layer 736 can improve the color purity of light extracted from the light-emitting element 61. Thus, the display apparatus 10 can display high-quality images. Furthermore, all the light-emitting elements 61, for example, in the display apparatus 10 can be light-emitting elements that emit white light; hence, the EL layers 786 are not necessarily formed separately for each color, leading to higher resolution of the display apparatus 10.

The light-emitting element 61 can have a micro-optical resonator (microcavity) structure. Thus, light of predetermined colors (e.g., RGB) can be extracted without a coloring layer, and the display apparatus 10 can perform color display. The structure without a coloring layer can prevent light absorption by the coloring layer. As a result, the display apparatus 10 can display high-luminance images, and power consumption of the display apparatus 10 can be reduced.

Note that a structure without a coloring layer can be employed even when the EL layer 786 is formed into an island shape for each pixel or formed into a stripe shape for each pixel column, i.e., the EL layers 786 are formed by separate coloring. Note that the luminance of the display apparatus 10 can be, for example, higher than or equal to 500 $cd/m^2$, preferably higher than or equal to 1000 $cd/m^2$ and lower than or equal to 10000 $cd/m^2$, further preferably higher than or equal to 2000 $cd/m^2$ and lower than or equal to 5000 $cd/m^2$.

At least part of the structure examples, the drawings corresponding thereto, and the like described in this embodiment as an example can be combined with the other structure examples, the other drawings, and the like as appropriate.

Embodiment 4

In this embodiment, a cross-sectional structure example of the display apparatus 10 that is different from that in Embodiment 3 will be described.

Figure 34A:
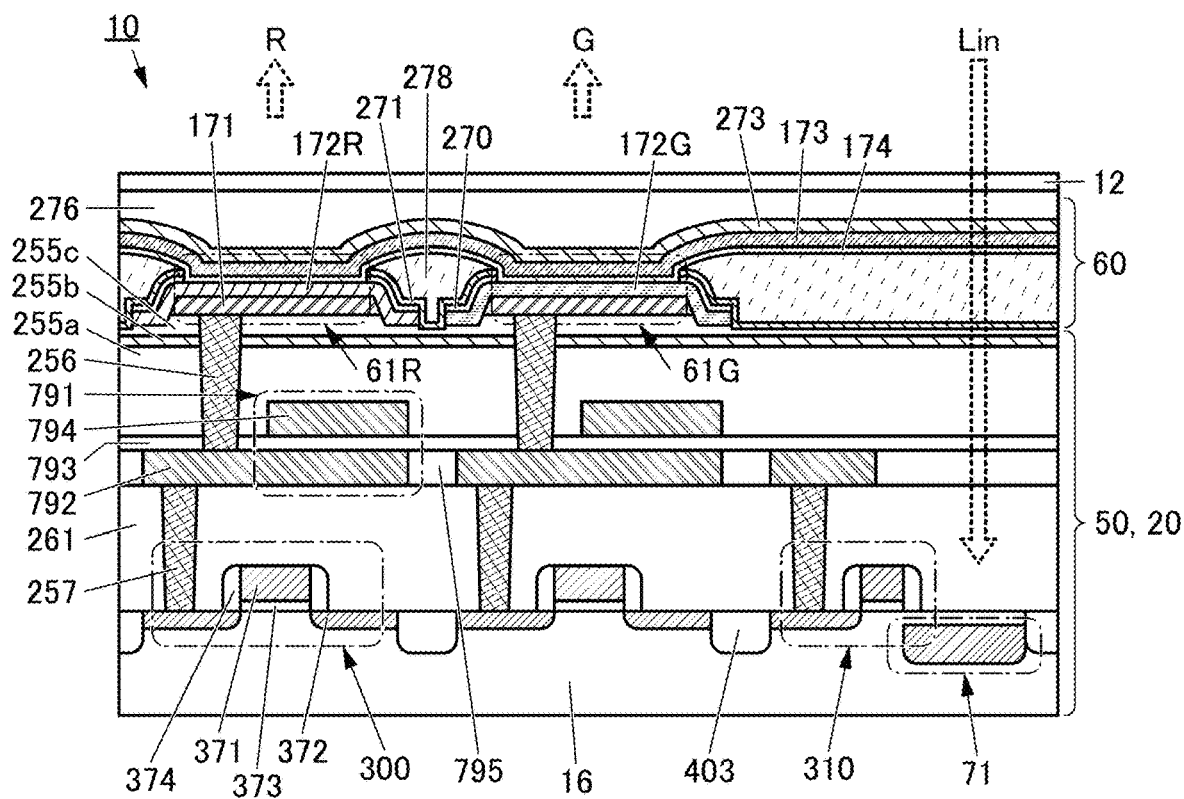
FIG. 34A and FIG. 34B are diagrams illustrating structure examples of a display apparatus.

FIG. 34A illustrates a cross-sectional structure example of the display apparatus 10. The display apparatus 10 illustrated in FIG. 34A includes a substrate 16, the light-emitting element 61R, the light-emitting element 61G, the light-receiving element 71, a transistor 300, and a transistor 310.

The light-emitting element 61R has a function of exhibiting red light (R). The light-emitting element 61G has a function of exhibiting green light (G). The transistor 300 and the transistor 310 include a channel formation region in the substrate 16. As the substrate 16, a semiconductor substrate such as a single crystal silicon substrate can be used, for example. The transistor 300 and transistor 310 each include part of the substrate 16, a conductor 371, a low-resistance region 372, an insulator 373, and an insulator 374. The conductor 371 functions as a gate electrode. The insulator 373 is positioned between the substrate 16 and the conductor 371 and functions as a gate insulator. The low-resistance region 372 is a region where the substrate 16 is doped with an impurity, and functions as a source or a drain. The insulator 374 is provided to cover the side surface of the conductor 371.

The transistor 300, for example, corresponds to the transistor 52B described in the above embodiment. The transistor 310, for example, corresponds to the transistor 132 described in the above embodiment.

The element isolation layer 403 is provided between two adjacent transistors 300 to be embedded in the substrate 16.

An insulator 261 is provided to cover the transistor 310, and a capacitor 791 is provided over the insulator 261.

The capacitor 791 includes a conductor 792, a conductor 794, and an insulator 793 positioned therebetween. The conductor 792 functions as one electrode of the capacitor 791, the conductor 794 functions as the other electrode of the capacitor 791, and the insulator 793 functions as a dielectric of the capacitor 791.

The conductor 792 is provided over the insulator 261 and is embedded in a conductor 795. The conductor 792 is electrically connected to one of a source and a drain of the transistor 300 through a plug 257 embedded in the insulator 261. The insulator 793 is provided to cover the conductor 792. The conductor 792 has a region overlapping with the conductor 794 with the insulator 793 provided therebetween.

An insulator 255a is provided to cover the capacitor 791, an insulator 255b is provided over the insulator 255a, and an insulator 255c is provided over the insulator 255b. The light-emitting element 61R and the light-emitting element 61G are provided over the insulator 255c. An insulator is provided in a region between adjacent light-emitting devices and a region between a light-emitting device and a light-receiving device adjacent to each other. In FIG. 34A and the like, the protective layer 271 and the insulator 278 over the protective layer 271 are provided in the region.

The insulator 270 is provided over each of the EL layer 172R included in the light-emitting element 61R and the EL layer 172G included in the light-emitting element 61G. The common layer 174 is provided over the EL layer 172R, the EL layer 172G, and the insulator 278, and the conductor 173 is provided over the common layer 174. The protective layer 273 is provided over the conductor 173.

The conductor 171 is electrically connected to one of a source and a drain of the transistor 310 through a plug 256 embedded in the insulator 793, the insulator 255a, the insulator 255b, and the insulator 255c, the conductor 792 embedded in the conductor 795, and the plug 257 embedded in the insulator 261. The level of the top surface of the insulator 255c is equal to or substantially equal to the level of the top surface of the plug 256. A variety of conductive materials can be used for the plugs.

The insulator 276 is provided over the light-emitting element 61R, the light-emitting element 61G, and the light-receiving element 71. The components from the conductor 171 to the insulator 276 corresponds to the layer 60. The substrate 12 is provided over the insulator 276. The insulator 276 functions as an adhesive layer. A stacked-layer structure from the substrate 16 to the insulator 255c corresponds to the layer 50 of the display apparatus 10A and the display apparatus 10B, and the layer 20 of the display apparatus 10C.

In the structure example illustrated in FIG. 34A, a light-emitting element is formed in the layer 60, and a light-receiving element is formed in the layer 50 or the layer 20.

The light-receiving element 71 has a function of detecting the light Lin entering from the outside of the display apparatus through the insulator 276, the insulator 255a, the insulator 261, and the like.

Figure 34B:
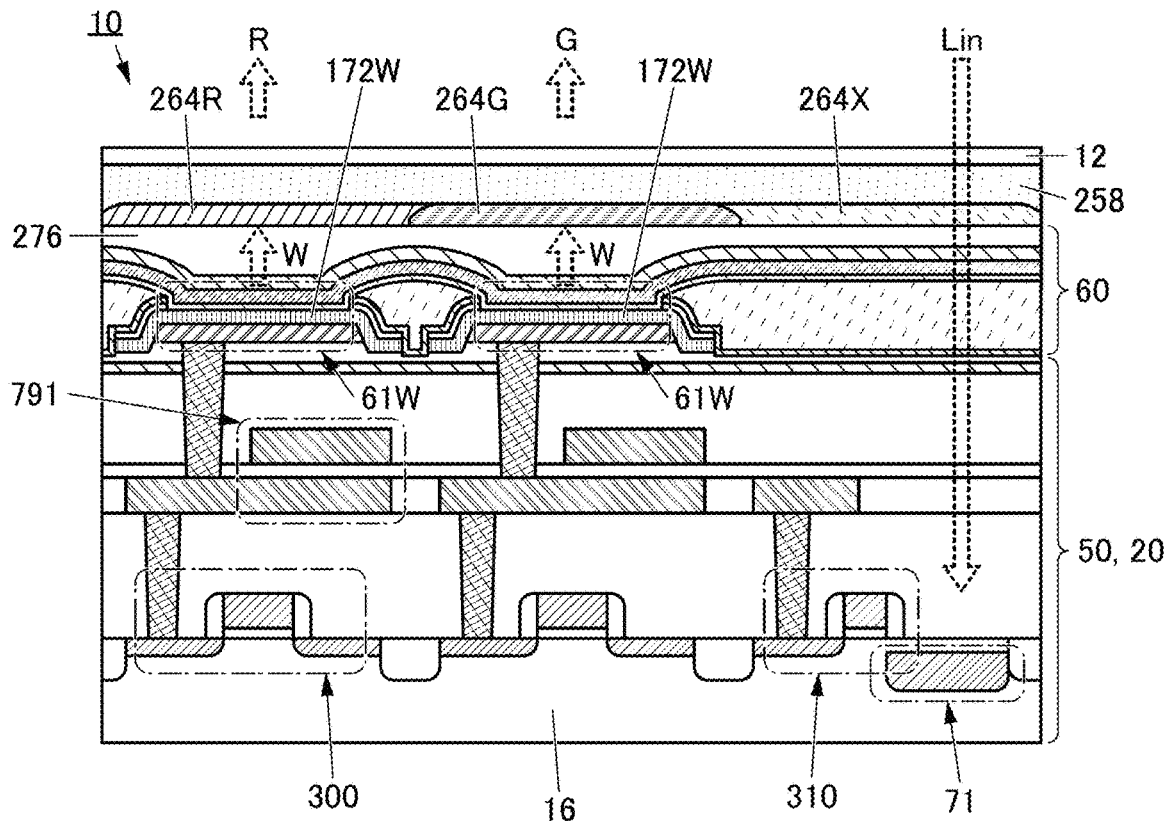

FIG. 34B illustrates a cross-sectional structure example that is different from the cross-sectional structure example of the display apparatus 10 illustrated in FIG. 34A. FIG. 34B is a modification example of FIG. 34A. The display apparatus 10 illustrated in FIG. 34B is provided with the light-emitting elements 61W instead of the light-emitting element 61R and the light-emitting element 61G and includes coloring layers in a region overlapping with the light-emitting elements 61W over the insulator 276. FIG. 34B illustrates a cross-sectional structure example of the display apparatus 10 including the coloring layer 264R overlapping with one light-emitting element 61W and the coloring layer 264G overlapping with another light-emitting element 61W.

The light-emitting element 61W has a function of exhibiting white light. The coloring layer 264R has a function of transmitting red light, and the coloring layer 264G has a function of transmitting green light. White light (W) emitted from the light-emitting element 61W is emitted as red light to the outside of the display apparatus through the coloring layer 264R. Furthermore, white light (W) emitted from the light-emitting element 61W is emitted as green light to the outside of the display apparatus through the coloring layer 264G. Although not illustrated in FIG. 34B, a coloring layer that transmits light in a wavelength range other than red light and green light, such as blue light, may be used.

A coloring layer 264X may be provided in a region overlapping with the light-receiving element 71 over the insulator 276. As the coloring layer 264X, a coloring layer that transmits light in a given wavelength range can be provided. By providing the coloring layer 264X, the light-receiving element 71 can detect only light passing through the coloring layer 264X.

The display apparatus 10 illustrated in FIG. 34B includes an insulator 258 over the coloring layer 264R, the coloring layer 264G, and the coloring layer 264X, and includes the substrate 12 over the insulator 258. The insulator 258 functions as an adhesive layer.

Figure 35A:
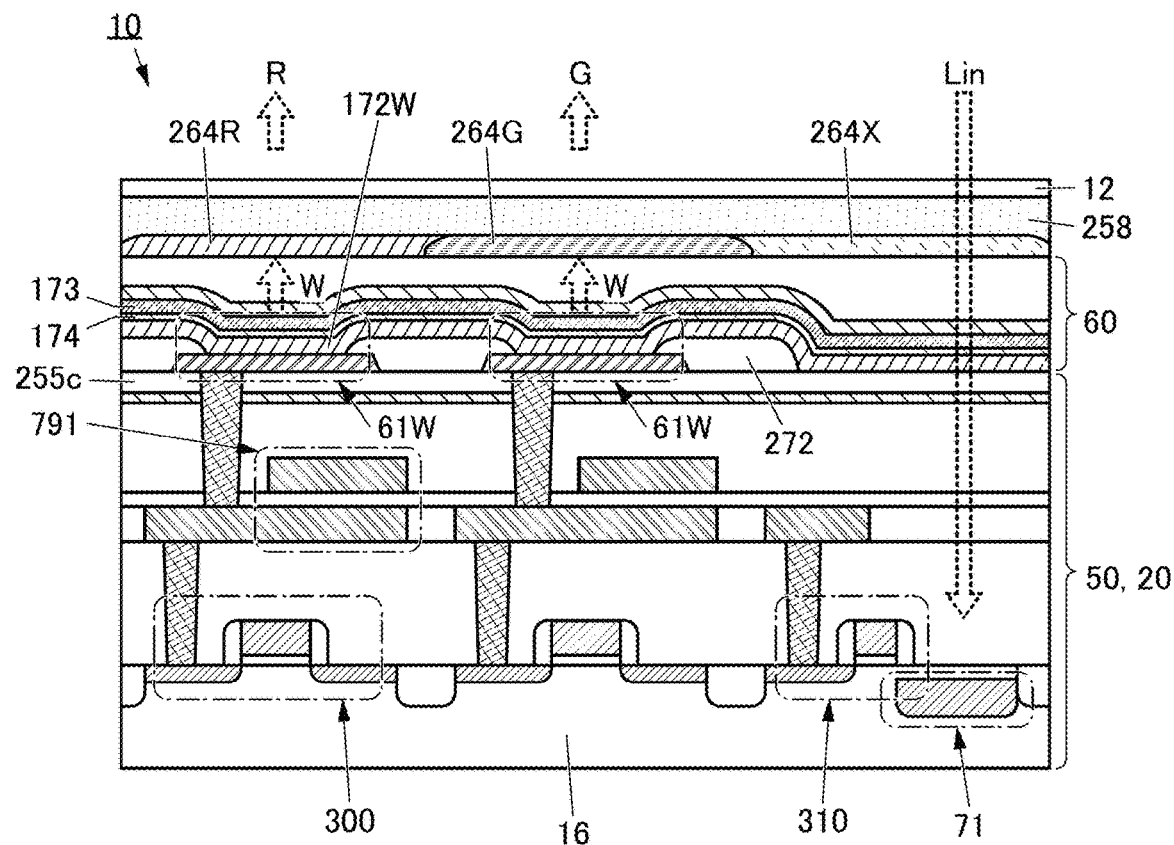
FIG. 35A and FIG. 35B are diagrams illustrating structure examples of a display apparatus.

FIG. 35A illustrates a modification example of the display apparatus 10 illustrated in FIG. 34B. The display apparatus 10 illustrated in FIG. 35A has a structure in which the EL layer 172W is employed to be shared by adjacent light-emitting elements 61W. Furthermore, the EL layer 172W remains also in a region overlapping with the light-receiving element 71. When the EL layer 172W has a thickness that allows transmission of the light Lin, the light Lin can be detected even when the EL layer 172W remains in the region overlapping with the light-receiving element 71.

Figure 35B:
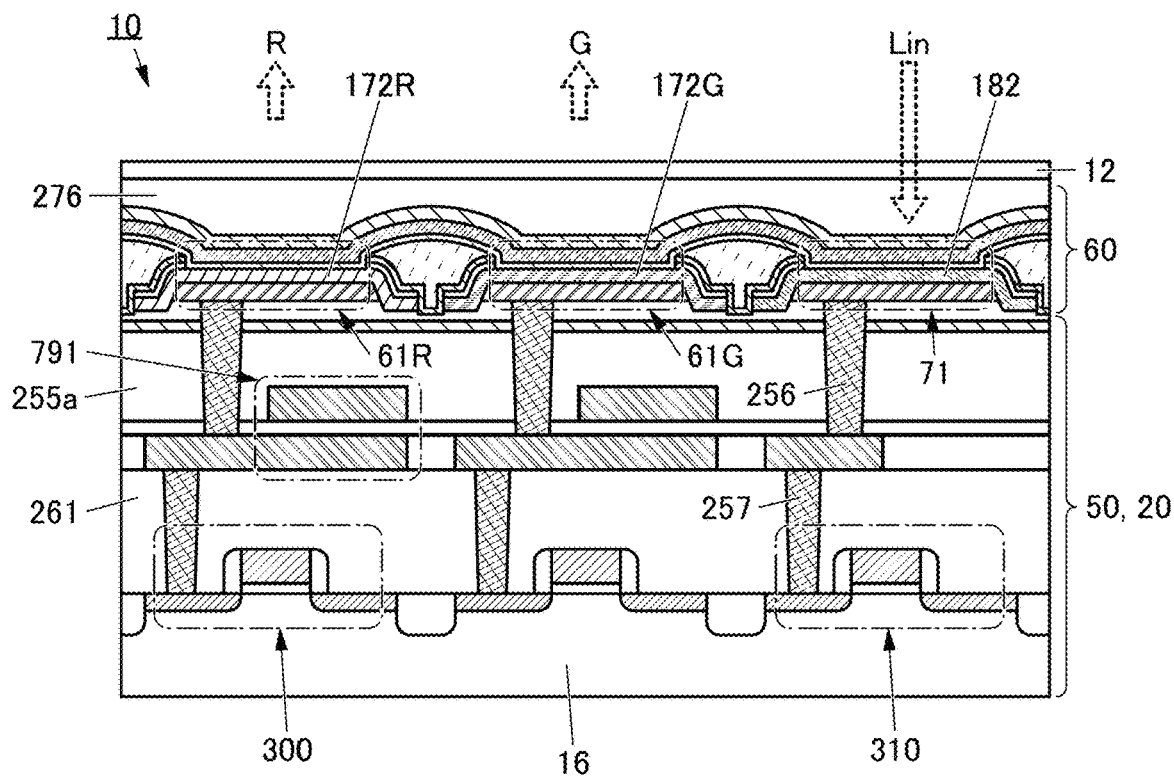

FIG. 35B illustrates a modification example of the display apparatus 10 illustrated in FIG. 34A. As described in the above embodiment, the light-receiving element 71 can be obtained by replacing the EL layer 172 of the light-emitting element 61 with the active layer 182 functioning as a photoelectric conversion layer.

In the display apparatus 10 illustrated in FIG. 35B, the light-emitting element 61 and the light-receiving element 71 are provided in the layer 60. The light-receiving element 71 provided in the layer 60 is electrically connected to the one of the source and the drain of the transistor 310 through the plug 256 and the plug 257.

Figure 36A:
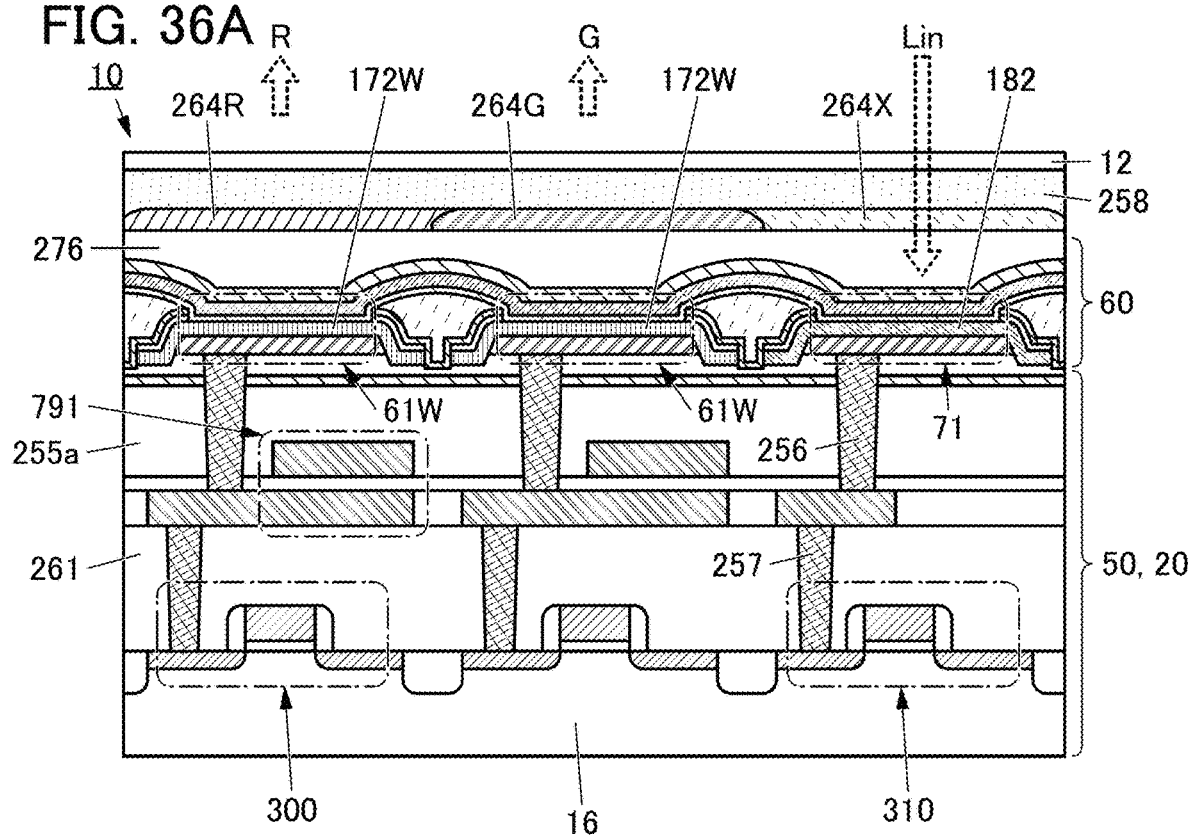
FIG. 36A and FIG. 36B are diagrams illustrating structure examples of a display apparatus.

As illustrated in FIG. 36A, the coloring layer 264R and the coloring layer 264G may be provided to overlap with the light-emitting element 61W, and the coloring layer 264X may be provided to overlap with the light-receiving element 71.

Figure 36B:
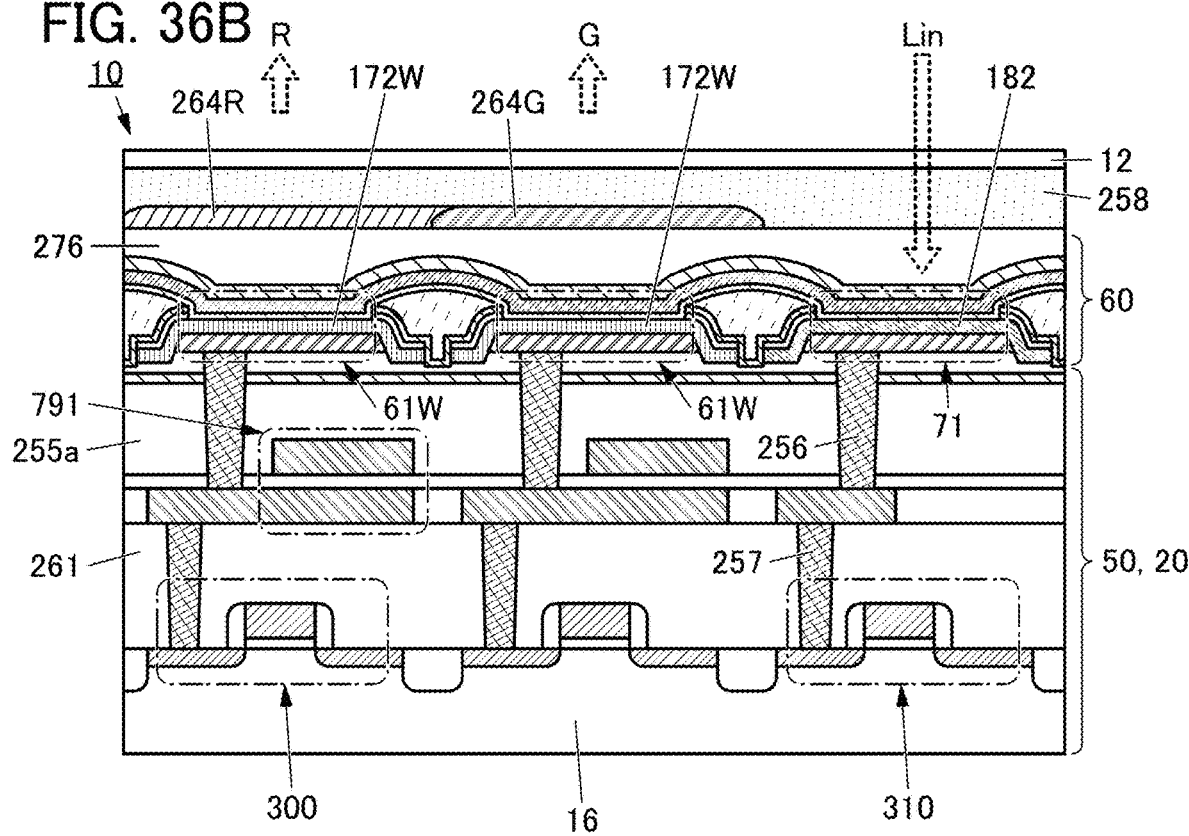

Alternatively, as illustrated in FIG. 36B, a structure in which the coloring layer 264R and the coloring layer 264G are provided to overlap with the light-emitting element 61W and a coloring layer is not provided over the light-receiving element 71 may be employed.

Figure 37:
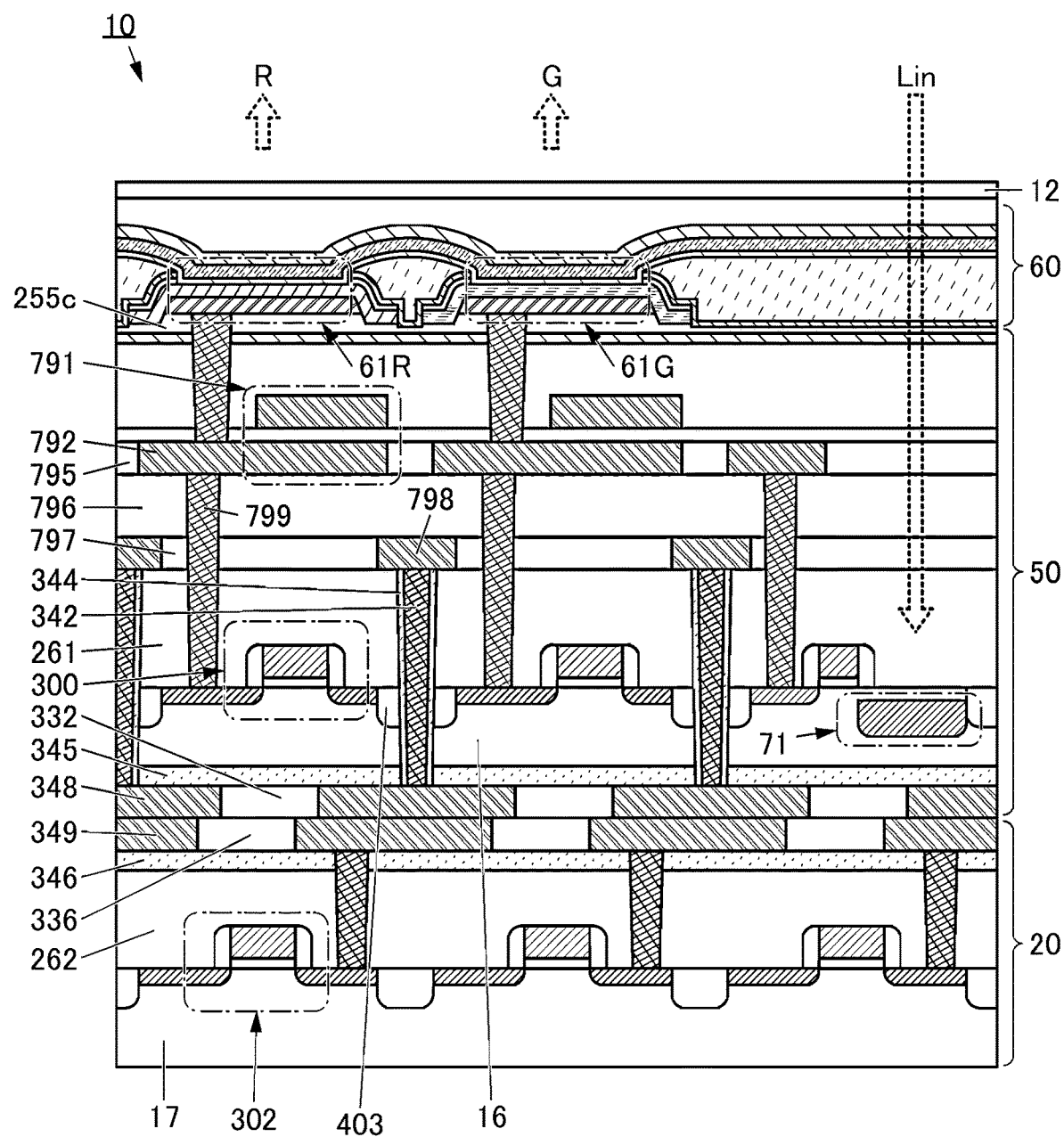
FIG. 37 is a diagram illustrating a structure example of a display apparatus.

FIG. 37 illustrates a modification example of the display apparatus 10 illustrated in FIG. 34A. The display apparatus 10 illustrated in FIG. 37 has a structure in which the transistor 300 and a transistor 302 are stacked. In the transistor 300, a channel is formed in the substrate 16.

In the transistor 302, a channel is formed in a substrate 17. Semiconductor substrates are used for both the substrate 16 and the substrate 17.

In the display apparatus 10 illustrated in FIG. 37, the substrate 16 provided with the transistor 300, the capacitor 791, and light-receiving element 71 is bonded to the substrate 17 provided with the transistor 302.

Here, an insulator 345 is preferably provided on the bottom surface of the substrate 16. An insulator 346 is preferably provided over the insulator 262 provided over the substrate 17. The insulator 345 and the insulator 346 are insulators functioning as protective layers and can inhibit diffusion of impurities into the substrate 16 and the substrate 17.

An insulator 796 and an insulator 797 may be provided between the insulator 261 and the conductor 792. A conductor 798 may be provided over the insulator 261. The conductor 798 is preferably provided to be embedded in the insulator 797.

The substrate 16 is provided with a plug 342 that penetrates the substrate 16 and the insulator 345. An insulator 344 is preferably provided to cover the side surface of the plug 342. The insulator 344 functions as a protective layer and can inhibit diffusion of impurities into the substrate 16. In the case where the substrate 16 is a silicon substrate, the plug 342 is also referred to as a through silicon via (TSV).

A conductor 348 is provided under the insulator 345 on the rear surface of the substrate 16 (the surface opposite to the substrate 12). The conductor 348 is preferably provided to be embedded in an insulator 332. The bottom surfaces of the conductor 348 and the insulator 332 are preferably planarized. Here, the conductor 348 is electrically connected to the conductor 798 through the plug 342.

Over the substrate 17, a conductor 349 is provided over the insulator 346. The conductor 349 is preferably provided to be embedded in the insulator 336. The top surfaces of the conductor 349 and the insulator 336 are preferably planarized.

The conductor 348 and the conductor 349 are bonded to each other, whereby the substrate 17 and the substrate 16 are electrically connected to each other. Here, improving the planarity of a plane formed by the conductor 348 and the insulator 332 and a plane formed by the conductor 349 and the insulator 336 allows the conductor 348 and the conductor 349 to be bonded to each other favorably.

For the conductor 348 and the conductor 349, the same conductive material is preferably used. For example, a metal film containing an element selected from Al, Cr, Cu, Ta, Ti, Mo, and W, a metal nitride film containing the above element as a component (a titanium nitride film, a molybdenum nitride film, or a tungsten nitride film), or the like can be used. Copper is particularly preferably used for the conductor 348 and the conductor 349. In that case, it is possible to employ Cu-to-Cu (copper-to-copper) direct bonding (a technique for achieving electrical continuity by connecting Cu (copper) pads).

In the display apparatus 10 illustrated in FIG. 37, a stacked-layer structure from the conductor 348 and the insulator 332 to the insulator 255c corresponds to the layer 50 of the display apparatus 10A and the display apparatus 10B. Furthermore, a stacked-layer structure from the substrate 17 to the conductor 349 and the insulator 336 corresponds to the layer 20 of the display apparatus 10A and the display apparatus 10B.

Figure 38:
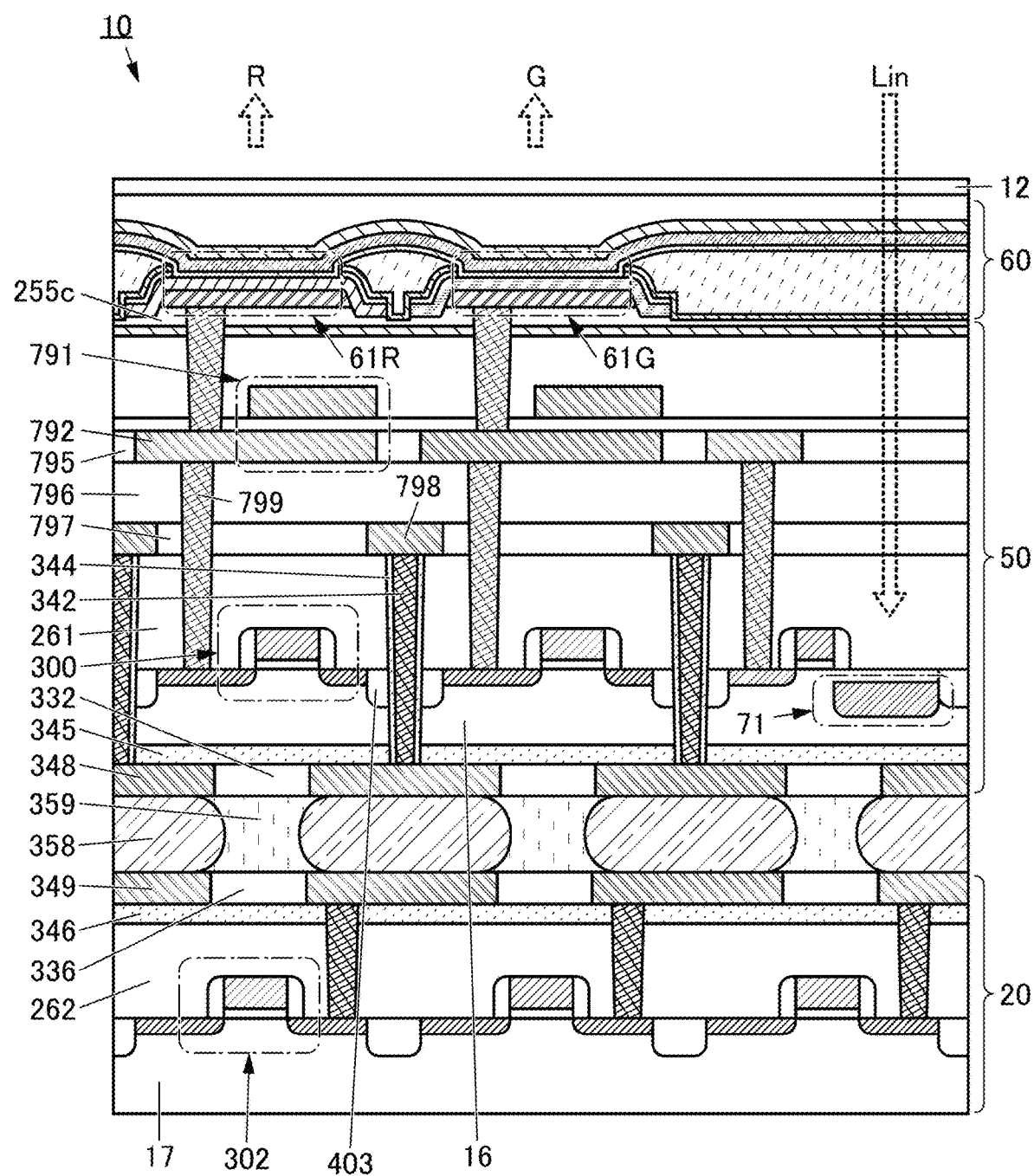
FIG. 38 is a diagram illustrating a structure example of a display apparatus.

As in the display apparatus 10 illustrated in FIG. 38, a bump 358 may be provided between the conductor 348 and the conductor 349, and the conductor 348 and the conductor 349 may be electrically connected to each other through the bump 358. The bump 358 can be formed using a conductive material containing gold (Au), nickel (Ni), indium (In), tin (Sn), or the like, for example. For another example, solder may be used for the bump 358. A bonding layer 359 may be provided between the insulator 332 and the insulator 336. In the case where the bump 358 is provided, the insulator 332 and the insulator 336 are not necessarily provided.

Figure 39:
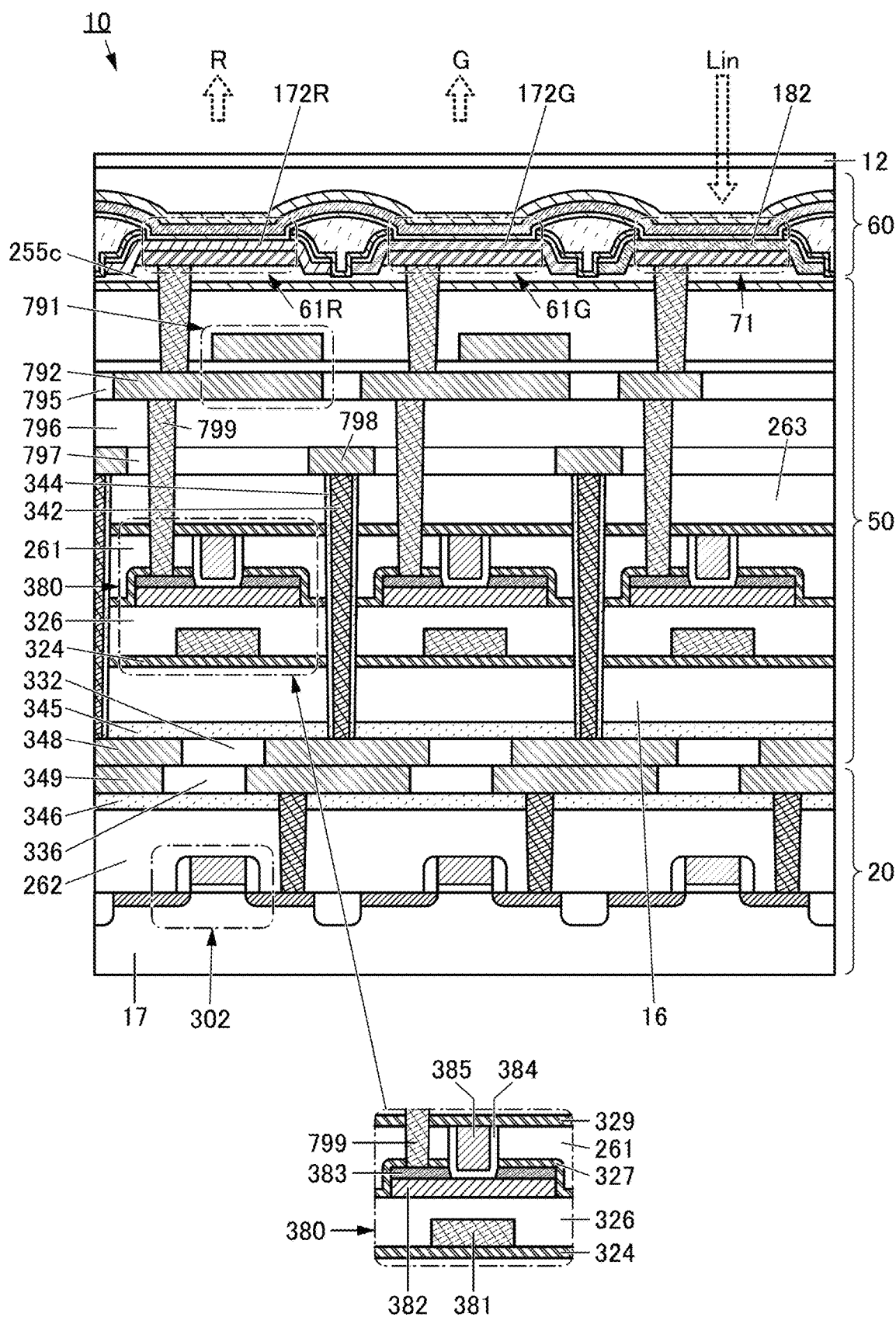
FIG. 39 is a diagram illustrating a structure example of a display apparatus.

FIG. 39 illustrates a modification example of the display apparatus 10 illustrated in FIG. 36. The display apparatus 10 illustrated in FIG. 39 includes a transistor 380 over the substrate 16. Accordingly, the display apparatus 10 illustrated in FIG. 39 has a structure in which the transistor 380 and the transistor 302 are stacked. The transistor 380 is a transistor having a back gate. A semiconductor substrate may be used as the substrate 16, or a substrate of another material may be used.

In FIG. 39, the light-receiving element 71 illustrated in FIG. 35B is used as the light-receiving element 71. Specifically, an organic semiconductor is used for an active layer functioning as a photoelectric conversion layer.

The transistor 380 includes a semiconductor 382, an insulator 384, a conductor 385, a pair of conductors 383, an insulator 326, and a conductor 381. An oxide semiconductor may be used as the semiconductor 382, for example.

In the display apparatus 10 illustrated in FIG. 39, an insulator 324 is provided over the substrate 16. The insulator 324 functions as a barrier layer that prevents diffusion of impurities such as water or hydrogen from the substrate 16 side into the transistor 380 and release of oxygen from the semiconductor 382 to the insulator 324 side. As the insulator 324, for example, a film through which hydrogen or oxygen is less likely to diffuse than in a silicon oxide film, such as an aluminum oxide film, a hafnium oxide film, or a silicon nitride film, can be used.

The conductor 381 is provided over the insulator 324, and the insulator 326 is provided to cover the conductor 381. An oxide insulating film such as a silicon oxide film is preferably used as at least part of the insulator 326 that is in contact with the semiconductor 382. The top surface of the insulator 326 is preferably planarized.

The semiconductor 382 is provided over the insulator 326. The pair of conductors 383 are provided over and in contact with the semiconductor 382 and function as a source electrode and a drain electrode.

An insulator 327 is provided to cover the top and side surfaces of the pair of conductors 383, the side surface of the semiconductor 382, and the like, and the insulator 261 is provided over the insulator 327. The insulator 327 functions as a barrier layer that prevents diffusion of impurities such as water or hydrogen from the insulator 261 and the like into the semiconductor 382 and release of oxygen from the semiconductor 382. As the insulator 327, an insulating film similar to the insulator 324 can be used.

An opening reaching the semiconductor 382 is provided in the insulator 327 and the insulator 261. The insulator 384 in contact with the side surfaces of the insulator 261, the insulator 327, and the conductors 383 and the top surface of the semiconductor 382, and the conductor 385 in contact with the insulator 384 are embedded in the opening.

The conductor 385 functions as a first gate electrode of the transistor 380 and the insulator 384 functions as a first gate insulator. The conductor 381 functions as a second gate electrode of the transistor 380 and part of the insulator 326 functions as a second gate insulator.

In the case where one of the first gate electrode and the second gate electrode is referred to as a "gate" or a "gate electrode", the other of the first gate electrode and the second gate electrode is referred to as a "back gate" or a "back gate electrode" in some cases.

The top surface of the conductor 385, the top surface of the insulator 384, and the top surface of the insulator 261 are subjected to planarization treatment so that their levels are equal to or substantially equal to each other, and an insulator 329 and an insulator 263 are provided to cover these surfaces.

The insulator 261 and the insulator 263 each function as an interlayer insulator. The insulator 329 functions as a barrier layer that prevents diffusion of impurities such as water or hydrogen from the insulator 263 side or the like into the transistor 380. As the insulator 329, an insulating film similar to the insulator 327 and the insulator 324 can be used.

A plug 799 electrically connected to one of the pair of conductors 383 is provided to be embedded in an opening provided in the insulator 796, the insulator 797, the insulator 263, the insulator 329, the insulator 261, and the insulator 327.

Here, the plug 799 is preferably formed using a conductive material through which hydrogen and oxygen are less to likely to diffuse into a portion in contact with the side surfaces of the opening in the insulator 796, the insulator 797, the insulator 263, the insulator 329, the insulator 261, and the insulator 327 and a portion in contact with part of the conductor 383 in the bottom portion of the opening.

In the display apparatus 10 illustrated in FIG. 39, the plug 342 is provided to penetrate the insulator 263, the insulator 329, the insulator 261, the insulator 327, the insulator 326, the insulator 324, the substrate 16, and the insulator 345. As described above, the insulator 344 is preferably provided to cover the side surface of the plug 342.

Figure 40:
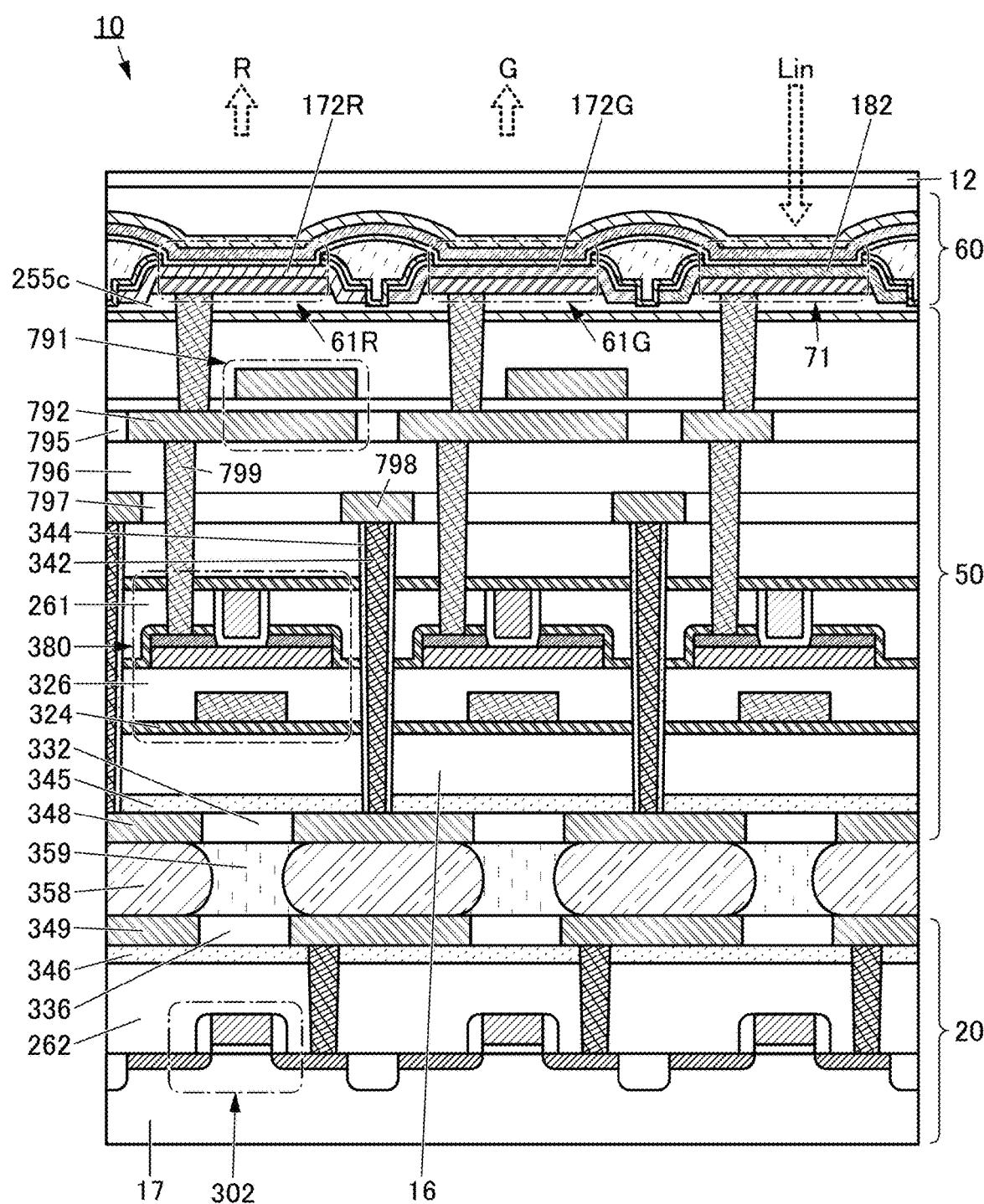
FIG. 40 is a diagram illustrating a structure example of a display apparatus.

As in the display apparatus 10 illustrated in FIG. 40, the bump 358 may be provided between the conductor 348 and the conductor 349, and the conductor 348 and the conductor 349 may be electrically connected to each other through the bump 358. A bonding layer 359 may be provided between the insulator 332 and the insulator 336. The display apparatus 10 illustrated in FIG. 40 is a modification example of the display apparatus 10 illustrated in FIG. 39 but also a modification example of the display apparatus 10 illustrated in FIG. 37.

As illustrated in FIG. 35A, the coloring layer 264X may be provided to overlap with the light-receiving element 71.

At least part of the structure examples, the drawings corresponding thereto, and the like described in this embodiment as an example can be combined with the other structure examples, the other drawings, and the like as appropriate.

Embodiment 5

<Structure Example of OS Transistor>

Figure 41A:
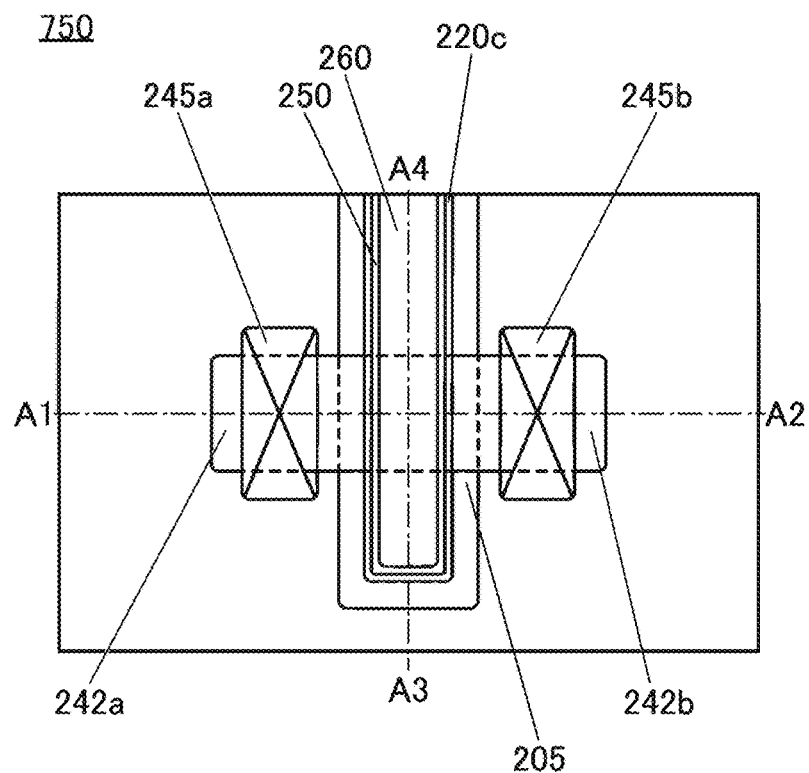
FIG. 41A to FIG. 41C are diagrams illustrating a structure example of a display apparatus.
Figure 41C:
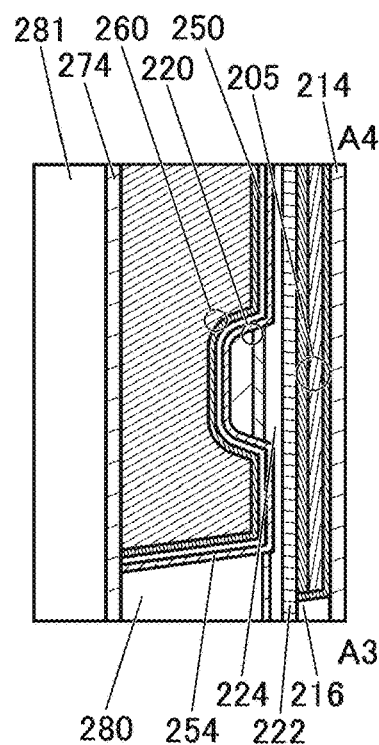
Figure 41B:
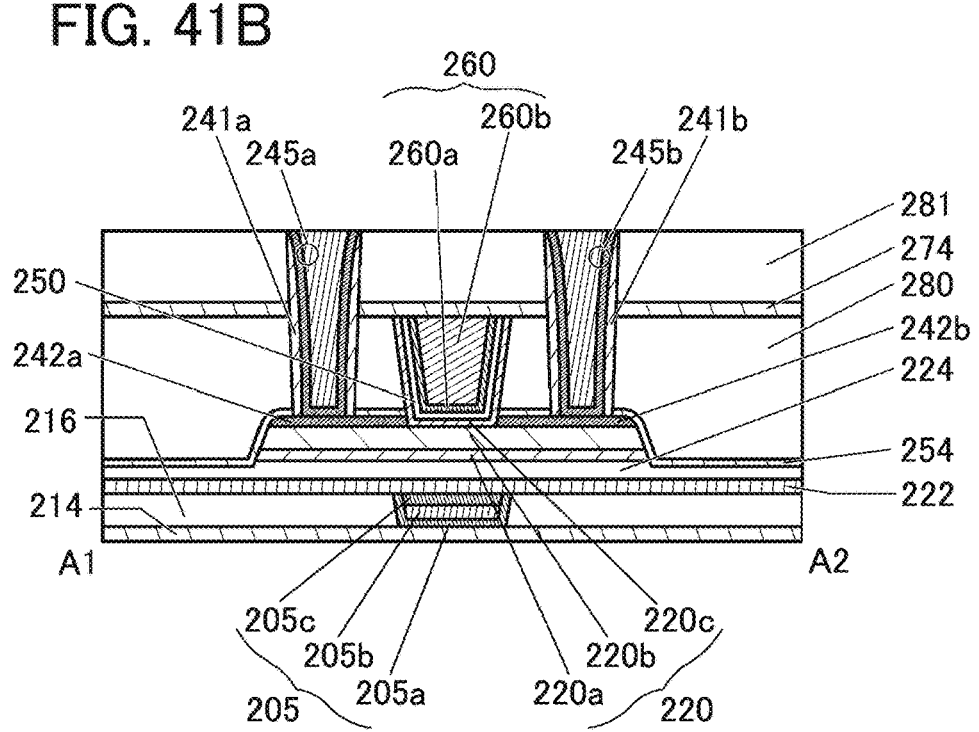

In this embodiment, a structure example of an OS transistor that can be used in the display apparatus of one embodiment of the present invention will be described. FIG. 41A, FIG. 41B, and FIG. 41C are a top view and cross-sectional views of the transistor 750 that can be used in the display apparatus of one embodiment of the present invention, and the periphery of the transistor 750. The transistor 750 can also be used as the transistor 380 or the like.

FIG. 41A is the top view of the transistor 750. FIG. 41B and FIG. 41C are the cross-sectional views of the transistor 750. FIG. 41B is a cross-sectional view taken along dashed-dotted line A1-A2 in FIG. 41A, which corresponds to a cross-sectional view of the transistor 750 in the channel length direction. FIG. 41C is a cross-sectional view taken along the dashed-dotted line A3-A4 in FIG. 41A, which corresponds to a cross-sectional view of the transistor 750 in the channel width direction. Note that for simplification of the drawing, some components are not illustrated in the top view in FIG. 41A.

As illustrated in FIG. 41 to FIG. 41C, the transistor 750 includes a metal oxide 220a placed over a substrate (not illustrated); a metal oxide 220b placed over the metal oxide 220a; a conductor 242a and a conductor 242b that are placed apart from each other over the metal oxide 220b; the insulator 280 that is placed over the conductor 242a and the conductor 242b and has an opening between the conductor 242a and the conductor 242b; a conductor 260 placed in the opening; an insulator 250 placed between the conductor 260 and the metal oxide 220b, the conductor 242a, the conductor 242b, and the insulator 280; and a metal oxide 220c placed between the insulator 250 and the metal oxide 220b, the conductor 242a, the conductor 242b, and the insulator 280. Here, it is preferable that the top surface of the conductor 260 be substantially aligned with the top surfaces of the insulator 250, the insulator 254, the metal oxide 220c, and the insulator 280 as illustrated in FIG. 41B and FIG. 41C. Hereinafter, the metal oxide 220a, the metal oxide 220b, and the metal oxide 220c may be collectively referred to as a metal oxide 220. The conductor 242a and the conductor 242b may be collectively referred to as a conductor 242.

In the transistor 750 illustrated in FIG. 41 to FIG. 41C, the side surfaces of the conductor 242a and the conductor 242b on the conductor 260 side are substantially perpendicular. Note that the transistor 750 illustrated in FIG. 41 to FIG. 41C is not limited thereto, and the angle formed between the side surfaces and the bottom surfaces of the conductor 242a and the conductor 242b may be greater than or equal to 10° and less than or equal to 80°, preferably greater than or equal to 30° and less than or equal to 60°. The side surfaces of the conductor 242a and the conductor 242b that face each other may have a plurality of surfaces.

As illustrated in FIG. 41 to FIG. 41C, the insulator 254 is preferably provided between the insulator 280 and the insulator 224, the metal oxide 220a, the metal oxide 220b, the conductor 242a, the conductor 242b, and the metal oxide 220c. Here, as illustrated in FIG. 41B and FIG. 41C, the insulator 254 is preferably in contact with the side surface of the metal oxide 220c, the top surface and the side surface of the conductor 242a, the top surface and the side surface of the conductor 242b, the side surfaces of the metal oxide 220a and the metal oxide 220b, and the top surface of the insulator 224.

In the transistor 750, three layers of the metal oxide 220a, the metal oxide 220b, and the metal oxide 220c are stacked in and around the region where the channel is formed (hereinafter also referred to as channel formation region); however, the present invention is not limited thereto. For example, a two-layer structure of the metal oxide 220b and the metal oxide 220c or a stacked-layer structure of four or more layers may be employed. Although the conductor 260 has a two-layer structure in the transistor 750, the present invention is not limited thereto. For example, the conductor 260 may have a single-layer structure or a stacked-layer structure of three or more layers. Alternatively, each of the metal oxide 220a, the metal oxide 220b, and the metal oxide 220c may have a stacked-layer structure of two or more layers.

For example, when the metal oxide 220c has a stacked-layer structure including a first metal oxide and a second metal oxide over the first metal oxide, the first metal oxide preferably has a composition similar to that of the metal oxide 220b and the second metal oxide preferably has a composition similar to that of the metal oxide 220a.

Here, the conductor 260 functions as a gate electrode of the transistor and the conductor 242a and the conductor 242b function as a source electrode and a drain electrode. As described above, the conductor 260 is formed to be embedded in the opening of the insulator 280 and the region between the conductor 242a and the conductor 242b. Here, the positions of the conductor 260, the conductor 242a, and the conductor 242b with respect to the opening of the insulator 280 are selected in a self-aligned manner. That is, in the transistor 750, the gate electrode can be placed between the source electrode and the drain electrode in a self-aligned manner. Thus, the conductor 260 can be formed without an alignment margin, resulting in a reduction in the area occupied by the transistor 750. Accordingly, the display apparatus can have a high resolution. In addition, the bezel of the display apparatus can be narrowed.

As illustrated in FIG. 41 to FIG. 41C, the conductor 260 preferably includes a conductor 260a provided on the inner side of the insulator 250 and a conductor 260b provided to be embedded on the inner side of the conductor 260a.

The transistor 750 preferably includes the insulator 214 placed over the substrate (not illustrated); the insulator 216 placed over the insulator 214; a conductor 205 placed to be embedded in the insulator 216; the insulator 222 placed over the insulator 216 and the conductor 205; and the insulator 224 placed over the insulator 222. The metal oxide 220a is preferably placed over the insulator 224.

The insulator 274 and the insulator 281 functioning as interlayer films are preferably placed over the transistor 750. Here, the insulator 274 is preferably placed in contact with the top surfaces of the conductor 260, the insulator 250, the insulator 254, the metal oxide 220c, and the insulator 280.

The insulator 222, the insulator 254, and the insulator 274 preferably have a function of inhibiting diffusion of hydrogen (e.g., at least one of a hydrogen atom and a hydrogen molecule). For example, the insulator 222, the insulator 254, and the insulator 274 preferably have lower hydrogen permeability than the insulator 224, the insulator 250, and the insulator 280. Moreover, the insulator 222 and the insulator 254 preferably have a function of inhibiting diffusion of oxygen (e.g., at least one of an oxygen atom and an oxygen molecule). For example, the insulator 222 and the insulator 254 preferably have lower oxygen permeability than the insulator 224, the insulator 250, and the insulator 280.

Here, the insulator 224, the metal oxide 220, and the insulator 250 are separated by the insulator 222 and the insulator 274. This can inhibit entry of excess oxygen and impurities such as hydrogen contained in layers above the insulator 274 and layers below the insulator 222 into the insulator 224, the metal oxide 220, and the insulator 250.

A conductor 245 (a conductor 245a and a conductor 245b) that is electrically connected to the transistor 750 and functions as a plug is preferably provided. Note that an insulator 241 (an insulator 241a and an insulator 241b) is provided in contact with the side surface of the conductor 245 functioning as a plug. In other words, the insulator 241 is provided in contact with the inner wall of an opening in the insulator 254, the insulator 280, the insulator 274, and the insulator 281. A structure may be employed in which a first conductor of the conductor 245 is provided in contact with the side surface of the insulator 241 and a second conductor of the conductor 245 is provided on the inner side of the first conductor. Here, the top surface of the conductor 245 and the top surface of the insulator 281 can be substantially level with each other. Although the first conductor of the conductor 245 and the second conductor of the conductor 245 are stacked in the transistor 750, the present invention is not limited thereto. For example, the conductor 245 may have a single-layer structure or a stacked-layer structure of three or more layers. In the case where a component has a stacked-layer structure, layers may be distinguished by ordinal numbers corresponding to the formation order.

In the transistor 750, a metal oxide functioning as an oxide semiconductor (hereinafter also referred to as an oxide semiconductor) is preferably used for the metal oxide 220 including the channel formation region (the metal oxide 220a, the metal oxide 220b, and the metal oxide 220c). For example, it is preferable to use a metal oxide having a band gap of 2 eV or more, preferably 2.5 eV or more as the metal oxide to be the channel formation region of the metal oxide 220.

The metal oxide preferably contains at least indium (In) or zinc (Zn). In particular, the metal oxide preferably contains indium (In) and zinc (Zn). In addition to them, the element M is preferably contained. As the element M, one or more of aluminum (Al), gallium (Ga), yttrium (Y), tin (Sn), boron (B), titanium (Ti), iron (Fe), nickel (Ni), germanium (Ge), zirconium (Zr), molybdenum (Mo), lanthanum (La), cerium (Ce), neodymium (Nd), hafnium (Hf), tantalum (Ta), tungsten (W), magnesium (Mg), and cobalt (Co) can be used. In particular, the element M is preferably one or more of aluminum (Al), gallium (Ga), yttrium (Y), and tin (Sn). Furthermore, the element M preferably contains one or both of Ga and Sn.

As illustrated in FIG. 41B, the metal oxide 220b may have a smaller thickness in a region not overlapping with the conductor 242 than in a region overlapping with the conductor 242. The thin region is formed when part of the top surface of the metal oxide 220b is removed at the time of forming the conductor 242a and the conductor 242b. When a conductive film to be the conductor 242 is formed, a low-resistance region is sometimes formed on the top surface of the metal oxide 220b in the vicinity of the interface with the conductive film. Removing the low-resistance region positioned between the conductor 242a and the conductor 242b on the top surface of the metal oxide 220b in this manner can prevent formation of the channel in the region.

According to one embodiment of the present invention, a display apparatus that includes small-size transistors and has a high resolution can be provided. A display apparatus that includes a transistor with a high on-state current and has high luminance can be provided. A display apparatus that includes a transistor operating at high speed and thus operates at high speed can be provided. A display apparatus that includes a transistor having stable electrical characteristics and is highly reliable can be provided. A display apparatus that includes a transistor with a low off-state current and has low power consumption can be provided.

The structure of the transistor 750 that can be used in the display apparatus of one embodiment of the present invention is described in detail.

The conductor 205 is placed to include a region overlapping with the metal oxide 220 and the conductor 260. Furthermore, the conductor 205 is preferably provided to be embedded in the insulator 216.

The conductor 205 includes a conductor 205a, a conductor 205b, and a conductor 205c. The conductor 205a is provided in contact with the bottom surface and the side wall of the opening provided in the insulator 216. The conductor 205b is provided to be embedded in a depressed portion formed by the conductor 205a. Here, the level of the top surface of the conductor 205b is lower than the levels of the top surfaces of the conductor 205a and the insulator 216. The conductor 205c is provided in contact with the top surface of the conductor 205b and the side surface of the conductor 205a. Here, the top surface of the conductor 205c is substantially level with the top surfaces of the conductor 205a and the insulator 216. That is, the conductor 205b is surrounded by the conductor 205a and the conductor 205c.

The conductor 205a and the conductor 205c are preferably formed using a conductive material having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Alternatively, the conductor 205a and the conductor 205c are preferably formed using a conductive material having a function of inhibiting diffusion of oxygen (e.g., at least one of an oxygen atom, an oxygen molecule, and the like).

When the conductor 205a and the conductor 205c are formed using a conductive material having a function of inhibiting diffusion of hydrogen, impurities such as hydrogen contained in the conductor 205b can be inhibited from diffusing into the metal oxide 220 through the insulator 224 and the like. When the conductor 205a and the conductor 205c are formed using a conductive material having a function of inhibiting diffusion of oxygen, the conductivity of the conductor 205b can be inhibited from being lowered because of oxidation. As the conductive material having a function of inhibiting diffusion of oxygen, for example, titanium, titanium nitride, tantalum, tantalum nitride, ruthenium, or ruthenium oxide is preferably used. Thus, the conductor 205a may be a single layer or a stacked layer of the above conductive materials. For example, titanium nitride may be used for the conductor 205a.

A conductive material containing tungsten, copper, or aluminum as its main component is preferably used for the conductor 205b. For example, tungsten may be used for the conductor 205b.

The conductor 260 sometimes functions as a first gate (also referred to as top gate) electrode. The conductor 205 sometimes functions as a second gate (also referred to as bottom gate) electrode. In that case, by changing a potential applied to the conductor 205 independently of a potential applied to the conductor 260, $V_{th}$ of the transistor 750 can be controlled. In particular, by applying a negative potential to the conductor 205, $V_{th}$ of the transistor 750 can be higher than 0 V and the off-state current can be reduced. Thus, a drain current at the time when a potential applied to the conductor 260 is 0 V can be lower in the case where a negative potential is applied to the conductor 205 than in the case where the negative potential is not applied to the conductor 205.

The conductor 205 is preferably provided to be larger than the channel formation region in the metal oxide 220. In particular, it is preferable that the conductor 205 extend beyond an end portion of the metal oxide 220 that intersects with the channel width direction, as illustrated in FIG. 41C. In other words, the conductor 205 and the conductor 260 preferably overlap with each other with the insulator positioned therebetween, in a region on the outer side of the side surface of the metal oxide 220 in the channel width direction.

With the above structure, the channel formation region in the metal oxide 220 can be electrically surrounded by an electric field of the conductor 260 having a function of the first gate electrode and an electric field of the conductor 205 having a function of the second gate electrode.

As illustrated in FIG. 41C, the conductor 205 extends to function as a wiring as well. However, without limitation to this structure, a structure in which a conductor functioning as a wiring is provided below the conductor 205 may be employed.

The insulator 214 preferably functions as a barrier insulating film that inhibits entry of an impurity such as water or hydrogen to the transistor 750 from the substrate side. Accordingly, it is preferable to use, for the insulator 214, an insulating material having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom (an insulating material through which the above impurities are less likely to pass). Alternatively, it is preferable to use an insulating material having a function of inhibiting diffusion of oxygen (e.g., at least one of an oxygen atom, an oxygen molecule, and the like) (an insulating material through which the oxygen is less likely to pass).

For example, aluminum oxide or silicon nitride is preferably used for the insulator 214. Accordingly, it is possible to inhibit diffusion of an impurity such as water or hydrogen to the transistor 750 side from the substrate side through the insulator 214. Alternatively, it is possible to inhibit diffusion of oxygen contained in the insulator 224 and the like to the substrate side through the insulator 214.

The permittivity of each of the insulator 216, the insulator 280, and the insulator 281 functioning as an interlayer film is preferably lower than that of the insulator 214. When a material with a low permittivity is used for an interlayer film, the parasitic capacitance generated between wirings can be reduced. For example, for the insulator 216, the insulator 280, and the insulator 281, silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, or the like may be used as appropriate.

The insulator 222 and the insulator 224 each have a function of a gate insulator.

Here, the insulator 224 in contact with the metal oxide 220 preferably releases oxygen by heating. In this specification, oxygen that is released by heating is referred to as excess oxygen in some cases. For example, silicon oxide, silicon oxynitride, or the like can be used as appropriate for the insulator 224. When an insulator containing oxygen is provided in contact with the metal oxide 220, oxygen vacancies in the metal oxide 220 can be reduced, leading to improved reliability of the transistor 750.

Specifically, an oxide material that releases part of oxygen by heating is preferably used for the insulator 224. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS (Thermal Desorption Spectroscopy) analysis. Note that the temperature of the film surface in the TDS analysis is preferably in the range of 100° C. to 700° C. or 100° C. to 400° C.

As illustrated in FIG. 41C, the insulator 224 is sometimes thinner in a region overlapping with neither the insulator 254 nor the metal oxide 220b than in the other regions. In the insulator 224, the region overlapping with neither the insulator 254 nor the metal oxide 220b preferably has a thickness with which the above oxygen can be adequately diffused.

Like the insulator 214 or the like, the insulator 222 preferably functions as a barrier insulating film that inhibits entry of an impurity such as water or hydrogen into the transistor 750 from the substrate side. For example, the insulator 222 preferably has lower hydrogen permeability than the insulator 224. When the insulator 224, the metal oxide 220, the insulator 250, and the like are surrounded by the insulator 222, the insulator 254, and the insulator 274, entry of an impurity such as water or hydrogen into the transistor 750 from the outside can be inhibited.

Furthermore, it is preferable that the insulator 222 have a function of inhibiting diffusion of oxygen (e.g., at least one of an oxygen atom, an oxygen molecule, and the like) (it is preferable that the above oxygen be less likely to pass through the insulator 222). For example, the insulator 222 preferably has lower oxygen permeability than the insulator 224. The insulator 222 preferably has a function of inhibiting diffusion of oxygen and impurities in which case oxygen contained in the metal oxide 220 can be inhibited from diffusing to the substrate side. Moreover, the conductor 205 can be inhibited from reacting with oxygen contained in the insulator 224 or the metal oxide 220.

As the insulator 222, an insulator containing an oxide of one or both of aluminum and hafnium, which is an insulating material, is preferably used. As the insulator containing an oxide of one or both of aluminum and hafnium, aluminum oxide, hafnium oxide, an oxide containing aluminum and hafnium (hafnium aluminate), or the like is preferably used. In the case where the insulator 222 is formed using such a material, the insulator 222 functions as a layer inhibiting release of oxygen from the metal oxide 220 and entry of impurities such as hydrogen into the metal oxide 220 from the periphery of the transistor 750.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. Silicon oxide, silicon oxynitride, or silicon nitride may be stacked over the above insulator.

The insulator 222 may be a single layer or a stacked layer formed using an insulator containing what is called a high-k material, such as aluminum oxide, hafnium oxide, tantalum oxide, zirconium oxide, lead zirconate titanate (PZT), strontium titanate (SrTiO$_3$), or (Ba,Sr)TiO$_3$ (BST). As miniaturization and high integration of transistors progress, a problem such as a leakage current may arise because of a thinner gate insulator. When a high-k material is used for the insulator functioning as a gate insulator, a gate potential at the time of operation of the transistor can be reduced while the physical thickness is maintained.

Note that the insulator 222 and the insulator 224 may each have a stacked-layer structure of two or more layers. In that case, without limitation to a stacked-layer structure formed of the same material, a stacked-layer structure formed of different materials may be employed. For example, an insulator similar to the insulator 224 may be provided below the insulator 222.

The metal oxide 220 includes the metal oxide 220a, the metal oxide 220b over the metal oxide 220a, and the metal oxide 220c over the metal oxide 220b. When the metal oxide 220 includes the metal oxide 220a under the metal oxide 220b, it is possible to inhibit diffusion of impurities into the metal oxide 220b from the components formed below the metal oxide 220a. Moreover, when the metal oxide 220 includes the metal oxide 220c over the metal oxide 220b, it is possible to inhibit diffusion of impurities into the metal oxide 220b from the components formed above the metal oxide 220c.

Note that the metal oxide 220 preferably has a stacked-layer structure of a plurality of oxide layers that differ in the atomic ratio of metal atoms. For example, in the case where the metal oxide 220 contains at least indium (In) and the element M, the proportion of the number of atoms of the element M contained in the metal oxide 220a to the number of atoms of all elements that constitute the metal oxide 220a is preferably higher than the proportion of the number of atoms of the element M contained in the metal oxide 220b to the number of atoms of all elements that constitute the metal oxide 220b. In addition, the atomic ratio of the element M to In in the metal oxide 220a is preferably higher than the atomic ratio of the element M to In in the metal oxide 220b. Here, a metal oxide that can be used as the metal oxide 220a or the metal oxide 220b can be used as the metal oxide 220c.

The energy of the conduction band minimum of each of the metal oxide 220a and the metal oxide 220c is preferably higher than that of the metal oxide 220b. In other words, the electron affinity of each of the metal oxide 220a and the metal oxide 220c is preferably smaller than that of the metal oxide 220b. In that case, a metal oxide that can be used as the metal oxide 220a is preferably used as the metal oxide 220c. Specifically, the proportion of the number of atoms of the element M contained in the metal oxide 220c to the number of atoms of all elements that constitute the metal oxide 220c is preferably higher than the proportion of the number of atoms of the element M contained in the metal oxide 220b to the number of atoms of all elements that constitute the metal oxide 220b. In addition, the atomic ratio of the element M to In in the metal oxide 220c is preferably higher than the atomic ratio of the element M to In in the metal oxide 220b.

Here, the energy level of the conduction band minimum gently changes at junction portions between the metal oxide 220a, the metal oxide 220b, and the metal oxide 220c. In other words, the energy level of the conduction band minimum at junction portions between the metal oxide 220a, the metal oxide 220b, and the metal oxide 220c continuously changes or is continuously connected. This can be achieved by decreasing the density of defect states in a mixed layer formed at the interface between the metal oxide 220a and the metal oxide 220b and the interface between the metal oxide 220b and the metal oxide 220c.

Specifically, when the metal oxide 220a and the metal oxide 220b or the metal oxide 220b and the metal oxide 220c contain the same element (as a main component) in addition to oxygen, a mixed layer with a low density of defect states can be formed. For example, in the case where the metal oxide 220b is In—Ga—Zn oxide, In—Ga—Zn oxide, Ga—Zn oxide, gallium oxide, or the like may be used as the metal oxide 220a and the metal oxide 220c. The metal oxide 220c may have a stacked-layer structure. For example, a stacked-layer structure of In—Ga—Zn oxide and Ga—Zn oxide over the In—Ga—Zn oxide or a stacked-layer structure of In—Ga—Zn oxide and gallium oxide over the In—Ga—Zn oxide can be employed. In other words, the metal oxide 220c may have a stacked-layer structure of In—Ga—Zn oxide and an oxide that does not contain In.

Specifically, as the metal oxide 220a, a metal oxide having In:Ga:Zn=1:3:4 [atomic ratio] or a composition in the vicinity thereof, or 1:1:0.5 [atomic ratio] or a composition in the vicinity thereof may be used. As the metal oxide 220b, a metal oxide having a composition of In:Ga:Zn=4:2:3 [atomic ratio] or a composition in the vicinity thereof, or 3:1:2 [atomic ratio] or a composition in the vicinity thereof may be used. As the metal oxide 220c, a metal oxide having In:Ga:Zn=1:3:4 [atomic ratio] or a composition in the vicinity thereof, In:Ga:Zn=4:2:3 [atomic ratio] or a composition in the vicinity thereof, Ga:Zn=2:1 [atomic ratio] or a composition in the vicinity thereof, or Ga:Zn=2:5 [atomic ratio] or a composition in the vicinity thereof may be used. Specific examples of a stacked-layer structure of the metal oxide 220c include a stacked-layer structure of a layer with In:Ga:Zn=4:2:3 [atomic ratio] or a composition in the vicinity thereof and a layer with Ga:Zn=2:1 [atomic ratio] or a composition in the vicinity thereof, a stacked-layer structure of a layer with In:Ga:Zn=4:2:3 [atomic ratio] or a composition in the vicinity thereof and a layer with Ga:Zn=2:5 [atomic ratio] or a composition in the vicinity thereof, and a stacked-layer structure of a layer with In:Ga:Zn=4:2:3 [atomic ratio] or a composition in the vicinity thereof and a layer of gallium oxide.

At this time, the metal oxide 220b serves as a main carrier path. When the metal oxide 220a and the metal oxide 220c have the above structure, the density of defect states at the interface between the metal oxide 220a and the metal oxide 220b and the interface between the metal oxide 220b and the metal oxide 220c can be made low. This reduces the influence of interface scattering on carrier conduction, and the transistor 750 can have a high on-state current and high frequency characteristics. Note that in the case where the metal oxide 220c has a stacked-layer structure, not only the effect of reducing the density of defect states at the interface between the metal oxide 220b and the metal oxide 220c, but also the effect of inhibiting diffusion of the constituent element of the metal oxide 220c to the insulator 250 side can be expected. Specifically, the metal oxide 220c has a stacked-layer structure in which the upper layer is an oxide that does not contain In, whereby the amount of In that would diffuse to the insulator 250 side can be reduced. Since the insulator 250 functions as a gate insulator, the transistor would show poor characteristics when In diffuses into the insulator 250. Thus, the metal oxide 220c having a stacked-layer structure allows a highly reliable display apparatus to be provided.

The conductor 242 (the conductor 242a and the conductor 242b) functioning as the source electrode and the drain electrode is provided over the metal oxide 220b. For the conductor 242, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even when absorbing oxygen.

When the conductor 242 is provided in contact with the metal oxide 220, the oxygen concentration of the metal oxide 220 in the vicinity of the conductor 242 sometimes decreases. In addition, a metal compound layer that contains the metal contained in the conductor 242 and the component of the metal oxide 220 is sometimes formed in the metal oxide 220 in the vicinity of the conductor 242. In such a case, the carrier concentration of the region in the metal oxide 220 in the vicinity of the conductor 242 increases, and the region becomes a low-resistance region.

Here, the region between the conductor 242a and the conductor 242b is formed to overlap with the opening of the insulator 280. Accordingly, the conductor 260 can be formed in a self-aligned manner between the conductor 242a and the conductor 242b.

The insulator 250 functions as a gate insulator. The insulator 250 is preferably placed in contact with the top surface of the metal oxide 220c. For the insulator 250, any of silicon oxide, silicon oxynitride, silicon nitride oxide, silicon nitride, silicon oxide to which fluorine is added, silicon oxide to which carbon is added, silicon oxide to which carbon and nitrogen are added, and porous silicon oxide can be used. In particular, silicon oxide and silicon oxynitride are preferable because of their thermal stability.

As in the insulator 224, the concentration of an impurity such as water or hydrogen is preferably reduced in the insulator 250. The thickness of the insulator 250 is preferably greater than or equal to 1 nm and less than or equal to 20 nm.

A metal oxide may be provided between the insulator 250 and the conductor 260. The metal oxide preferably inhibits oxygen diffusion from the insulator 250 into the conductor 260. Accordingly, oxidation of the conductor 260 due to oxygen in the insulator 250 can be inhibited.

The metal oxide has a function of part of the gate insulator in some cases. Therefore, when silicon oxide, silicon oxynitride, or the like is used for the insulator 250, a metal oxide that is a high-k material with a high dielectric constant is preferably used as the metal oxide. When the gate insulator has a stacked-layer structure of the insulator 250 and the metal oxide, the stacked-layer structure can be thermally stable and have a high dielectric constant. Accordingly, a gate potential applied during operation of the transistor can be lowered while the physical thickness of the gate insulator is maintained. In addition, the equivalent oxide thickness (EOT) of the insulator functioning as the gate insulator can be reduced.

Specifically, a metal oxide containing one or more of hafnium, aluminum, gallium, yttrium, zirconium, tungsten, titanium, tantalum, nickel, germanium, magnesium, and the like can be used. It is preferable to use an insulator containing an oxide of one or both of aluminum and hafnium, such as aluminum oxide, hafnium oxide, or an oxide containing aluminum and hafnium (hafnium aluminate), in particular.

Although FIG. 41 to FIG. 41C illustrates the conductor 260 having a two-layer structure, the conductor 260 may have a single-layer structure or a stacked-layer structure of three or more layers.

The conductor 260a is preferably formed using the aforementioned conductor having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Alternatively, the conductor 260a is preferably formed using a conductive material having a function of inhibiting diffusion of oxygen (e.g., at least one of an oxygen atom, an oxygen molecule, and the like).

When the conductor 260a has a function of inhibiting diffusion of oxygen, the conductivity of the conductor 260b can be inhibited from being lowered because of oxidation due to oxygen contained in the insulator 250. As a conductive material having a function of inhibiting oxygen diffusion, for example, tantalum, tantalum nitride, ruthenium, ruthenium oxide, or the like is preferably used.

A conductive material containing tungsten, copper, or aluminum as its main component is preferably used for the conductor 260b. The conductor 260 also functions as a wiring and thus is preferably formed using a conductor having high conductivity. For example, a conductive material containing tungsten, copper, or aluminum as its main component can be used. The conductor 260b may have a stacked-layer structure, for example, a stacked-layer structure of any of the above conductive materials and titanium or titanium nitride.

As illustrated in FIG. 41A and FIG. 41C, the side surface of the metal oxide 220 is covered with the conductor 260 in a region where the metal oxide 220b does not overlap with the conductor 242, that is, the channel formation region of the metal oxide 220. Accordingly, the electric field of the conductor 260 functioning as the first gate electrode is likely to act on the side surface of the metal oxide 220. Hence, the transistor 750 can have a higher on-state current and higher frequency characteristics.

Like the insulator 214 or the like, the insulator 254 preferably functions as a barrier insulating film that inhibits entry of an impurity such as water or hydrogen into the transistor 750 from the insulator 280 side. The insulator 254 preferably has lower hydrogen permeability than the insulator 224, for example. Furthermore, as illustrated in FIG. 41B and FIG. 41C, the insulator 254 is preferably in contact with the side surface of the metal oxide 220c, the top surface and the side surface of the conductor 242a, the top surface and the side surface of the conductor 242b, the side surfaces of the metal oxide 220a and the metal oxide 220b, and the top surface of the insulator 224. Such a structure can inhibit entry of hydrogen contained in the insulator 280 into the metal oxide 220 through the top surfaces or the side surfaces of the conductor 242a, the conductor 242b, the metal oxide 220a, the metal oxide 220b, and the insulator 224.

Furthermore, it is preferable that the insulator 254 have a function of inhibiting diffusion of oxygen (e.g., at least one of an oxygen atom, an oxygen molecule, and the like) (it is preferable that the above oxygen be less likely to pass through the insulator 254). For example, the insulator 254 preferably has lower oxygen permeability than the insulator 280 or the insulator 224.

The insulator 254 is preferably formed by a sputtering method. When the insulator 254 is formed by a sputtering method in an oxygen-containing atmosphere, oxygen can be added to the vicinity of a region of the insulator 224 which is in contact with the insulator 254. Thus, oxygen can be supplied from the region into the metal oxide 220 through the insulator 224. Here, with the insulator 254 having a function of inhibiting upward oxygen diffusion, oxygen can be prevented from diffusing from the metal oxide 220 into the insulator 280. Moreover, with the insulator 222 having a function of inhibiting downward oxygen diffusion, oxygen can be prevented from diffusing from the metal oxide 220 to the substrate side. In the above manner, oxygen is supplied to the channel formation region of the metal oxide 220. Accordingly, oxygen vacancies in the metal oxide 220 can be reduced, so that the transistor can be inhibited from having normally-on characteristics.

As the insulator 254, an insulator containing an oxide of one or both of aluminum and hafnium is formed, for example. As the insulator containing an oxide of one or both of aluminum and hafnium, aluminum oxide, hafnium oxide, an oxide containing aluminum and hafnium (hafnium aluminate), or the like is preferably used.

The insulator 224, the insulator 250, and the metal oxide 220 are covered with the insulator 254 having a barrier property against hydrogen, whereby the insulator 280 is isolated from the insulator 224, the metal oxide 220, and the insulator 250 by the insulator 254. This can inhibit entry of impurities such as hydrogen from the outside of the transistor 750, resulting in favorable electrical characteristics and high reliability of the transistor 750.

The insulator 280 is provided over the insulator 224, the metal oxide 220, and the conductor 242 with the insulator 254 therebetween. The insulator 280 preferably includes, for example, silicon oxide, silicon oxynitride, silicon nitride oxide, silicon oxide to which fluorine is added, silicon oxide to which carbon is added, silicon oxide to which carbon and nitrogen are added, or porous silicon oxide. Silicon oxide and silicon oxynitride are particularly preferable because of their thermal stability. In particular, materials such as silicon oxide, silicon oxynitride, and porous silicon oxide are preferably used, in which case a region containing oxygen to be released by heating can be easily formed.

The concentration of an impurity such as water or hydrogen in the insulator 280 is preferably reduced. In addition, the top surface of the insulator 280 may be planarized.

Like the insulator 214 or the like, the insulator 274 preferably functions as a barrier insulating film that inhibits entry of an impurity such as water or hydrogen into the insulator 280 from above. As the insulator 274, for example, the insulator that can be used as the insulator 214, the insulator 254, and the like can be used.

The insulator 281 functioning as an interlayer film is preferably provided over the insulator 274. As in the insulator 224 or the like, the concentration of an impurity such as water or hydrogen is preferably reduced in the insulator 281.

The conductor 245a and the conductor 245b are placed in an opening formed in the insulator 281, the insulator 274, the insulator 280, and the insulator 254. The conductor 245a and the conductor 245b are provided to face each other with the conductor 260 therebetween. Note that the top surfaces of the conductor 245a and the conductor 245b may be level with the top surface of the insulator 281.

The insulator 241a is provided in contact with the inner wall of the opening in the insulator 281, the insulator 274, the insulator 280, and the insulator 254, and a first conductor of the conductor 245a is formed in contact with the side surface of the insulator 241a. The conductor 242a is positioned on at least part of the bottom portion of the opening, and the conductor 245a is in contact with the conductor 242a. Similarly, the insulator 241b is provided in contact with the inner wall of the opening in the insulator 281, the insulator 274, the insulator 280, and the insulator 254, and a first conductor of the conductor 245b is formed in contact with the side surface of the insulator 241b. The conductor 242b is positioned on at least part of the bottom portion of the opening, and the conductor 245b is in contact with the conductor 242b.

The conductor 245a and the conductor 245b are preferably formed using a conductive material containing tungsten, copper, or aluminum as its main component. The conductor 245a and the conductor 245b may each have a stacked-layer structure.

In the case where the conductor 245 has a stacked-layer structure, the aforementioned conductor having a function of inhibiting diffusion of an impurity such as water or hydrogen is preferably used as the conductor in contact with the metal oxide 220a, the metal oxide 220b, the conductor 242, the insulator 254, the insulator 280, the insulator 274, and the insulator 281. For example, tantalum, tantalum nitride, titanium, titanium nitride, ruthenium, ruthenium oxide, or the like is preferably used. The conductive material having a function of inhibiting diffusion of an impurity such as water or hydrogen can be used as a single layer or stacked layers. The use of the conductive material can inhibit oxygen added to the insulator 280 from being absorbed by the conductor 245a and the conductor 245b. Moreover, an impurity such as water or hydrogen can be inhibited from entering the metal oxide 220 through the conductor 245a and the conductor 245b from a layer above the insulator 281.

As the insulator 241a and the insulator 241b, the insulator that can be used as the insulator 254 or the like can be used, for example. Since the insulator 241a and the insulator 241b are provided in contact with the insulator 254, an impurity such as water or hydrogen in the insulator 280 or the like can be inhibited from entering the metal oxide 220 through the conductor 245a and the conductor 245b. Furthermore, oxygen contained in the insulator 280 can be inhibited from being absorbed by the conductor 245a and the conductor 245b.

Although not illustrated, a conductor functioning as a wiring may be provided in contact with the top surface of the conductor 245a and the top surface of the conductor 245b. For the conductor functioning as a wiring, a conductive material containing tungsten, copper, or aluminum as its main component is preferably used. Furthermore, the conductor may have a stacked-layer structure and may be a stack of any of the above conductive materials and titanium or titanium nitride. Note that the conductor may be formed to be embedded in an opening provided in an insulator.

<Materials for Transistor>

Materials that can be used for the transistor will be described.

[Substrate]

As a substrate over which the transistor is formed, for example, an insulator substrate, a semiconductor substrate, or a conductor substrate may be used. Examples of the insulator substrate include a glass substrate, a quartz substrate, a sapphire substrate, a stabilized zirconia substrate (e.g., an yttria-stabilized zirconia substrate), and a resin substrate. Examples of the semiconductor substrate include a semiconductor substrate of silicon, germanium, or the like and a compound semiconductor substrate of silicon carbide, silicon germanium, gallium arsenide, indium phosphide, zinc oxide, or gallium oxide. Other examples include any of the above semiconductor substrates including an insulator region, e.g., an SOI (Silicon On Insulator) substrate. Examples of the conductor substrate include a graphite substrate, a metal substrate, an alloy substrate, and a conductive resin substrate. Other examples include a substrate including a metal nitride and a substrate including a metal oxide. Other examples include an insulator substrate provided with a conductor or a semiconductor, a semiconductor substrate provided with a conductor or an insulator, and a conductor substrate provided with a semiconductor or an insulator. Alternatively, these substrates provided with elements may be used. Examples of the elements provided over the substrates include a capacitor element, a resistor, a switching element, a light-emitting element, and a memory element.

[Insulator]

Examples of an insulator include an oxide, a nitride, an oxynitride, a nitride oxide, a metal oxide, a metal oxynitride, and a metal nitride oxide, each of which has an insulating property.

As miniaturization and high integration of transistors progress, for example, a problem such as a leakage current may arise because of a thinner gate insulator. When a high-k material is used for the insulator functioning as a gate insulator, the voltage at the time of operation of the transistor can be reduced while the physical thickness is maintained. By contrast, when a material with a low dielectric constant is used for the insulator functioning as an interlayer film, parasitic capacitance generated between wirings can be reduced. Thus, a material is preferably selected depending on the function of an insulator.

Examples of the insulator having a high dielectric constant include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Examples of the insulator having a low dielectric constant include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin.

When a transistor including an oxide semiconductor is surrounded by insulators having a function of inhibiting the passage of oxygen and impurities such as hydrogen (e.g., the insulator 214, the insulator 222, the insulator 254, and the insulator 274), the electrical characteristics of the transistor can be stable. An insulator having a function of inhibiting the passage of oxygen and impurities such as hydrogen can be formed to have a single-layer structure or a stacked-layer structure including an insulator containing, for example, boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum. Specifically, as the insulator having a function of inhibiting the passage of oxygen and impurities such as hydrogen, a metal oxide such as aluminum oxide, magnesium oxide, gallium oxide, germanium oxide, yttrium oxide, zirconium oxide, lanthanum oxide, neodymium oxide, hafnium oxide, or tantalum oxide or a metal nitride such as aluminum nitride, aluminum titanium nitride, titanium nitride, silicon nitride oxide, or silicon nitride can be used.

An insulator functioning as a gate insulator preferably includes a region containing oxygen to be released by heating. For example, a structure where silicon oxide or silicon oxynitride that includes a region containing oxygen to be released by heating is provided in contact with the metal oxide 220 can compensate for oxygen vacancies in the metal oxide 220.

[Conductor]

For a conductor, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even when absorbing oxygen. A semiconductor having high electrical conductivity, typified by polycrystalline silicon containing an impurity element such as phosphorus, or silicide such as nickel silicide may be used.

A plurality of conductors formed using any of the above materials may be stacked. For example, a stacked-layer structure combining a material containing the above metal element and a conductive material containing oxygen may be employed. Alternatively, a stacked-layer structure combining a material containing the above metal element and a conductive material containing nitrogen may be employed. Alternatively, a stacked-layer structure combining a material containing the above metal element, a conductive material containing oxygen, and a conductive material containing nitrogen may be employed.

In the case where a metal oxide is used for the channel formation region of the transistor, the conductor functioning as the gate electrode preferably employs a stacked-layer structure combining a material containing the above metal element and a conductive material containing oxygen. In that case, the conductive material containing oxygen is preferably provided on the channel formation region side. When the conductive material containing oxygen is provided on the channel formation region side, oxygen released from the conductive material is easily supplied to the channel formation region.

It is particularly preferable to use, for the conductor functioning as the gate electrode, a conductive material containing oxygen and a metal element contained in a metal oxide where the channel is formed. A conductive material containing any of the above metal elements and nitrogen may also be used. For example, a conductive material containing nitrogen such as titanium nitride or tantalum nitride may be used. Indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon is added may be used. Indium gallium zinc oxide containing nitrogen may be used. With the use of such a material, hydrogen contained in the metal oxide where the channel is formed can be captured in some cases. Alternatively, hydrogen entering from a surrounding insulator or the like can be captured in some cases.

<Classification of Crystal Structure of Oxide Semiconductor>

The classification of crystal structures of an oxide semiconductor will be described with reference to FIG. 42A. FIG. 42A shows the classification of crystal structures of an oxide semiconductor, typically IGZO (a metal oxide containing In, Ga, and Zn).

As shown in FIG. 42A, oxide semiconductors are roughly classified into "Amorphous", "Crystalline", and "Crystal". The term "Amorphous" includes completely amorphous. The term "Crystalline" includes CAAC (c-axis-aligned crystalline), nc (nanocrystalline), and CAC (cloud-aligned composite) (excluding single crystal and poly crystal). Note that the term "Crystalline" excludes single crystal, poly crystal, and completely amorphous structures. The term "Crystal" includes single crystal and poly crystal.

Note that the structures in the thick frame in FIG. 42A are in an intermediate state between "Amorphous" and "Crystal", and belong to a new crystalline phase. That is, these structures are completely different from "Amorphous", which is energetically unstable, and "Crystal".

Note that a crystal structure of a film or a substrate can be evaluated with an X-ray diffraction (XRD) spectrum. Here, FIG. 42B shows an XRD spectrum, which is obtained by GIXD (Grazing-Incidence XRD) measurement, of a CAAC-IGZO film classified into "Crystalline". Note that a GIXD method is also referred to as a thin film method or a Seemann-Bohlin method. The XRD spectrum that is shown in FIG. 42B and obtained by GIXD measurement is hereinafter simply referred to as an XRD spectrum. The CAAC-IGZO film in FIG. 42B has a composition of In:Ga:Zn=4:2:3 [atomic ratio] or the vicinity thereof. The CAAC-IGZO film in FIG. 42B has a thickness of 500 nm.

As shown in FIG. 42B, a clear peak indicating crystallinity is detected in the XRD spectrum of the CAAC-IGZO film. Specifically, a peak indicating c-axis alignment is detected at or around $2\theta=31°$ in the XRD spectrum of the CAAC-IGZO film. As shown in FIG. 42B, the peak at or around $2\theta=31°$ is asymmetric with respect to the axis of the angle at which the peak intensity is detected.

A crystal structure of a film or a substrate can also be evaluated with a diffraction pattern obtained by a nanobeam electron diffraction (NBED) method (such a pattern is also referred to as a nanobeam electron diffraction pattern). FIG. 42C shows a diffraction pattern of the CAAC-IGZO film. FIG. 42C shows a diffraction pattern obtained by the NBED method in which an electron beam is incident in the direction parallel to the substrate. The CAAC-IGZO film in FIG. 42C has a composition of In:Ga:Zn=4:2:3 [atomic ratio] or the vicinity thereof. In the nanobeam electron diffraction method, electron diffraction is performed with a probe diameter of 1 nm.

As shown in FIG. 42C, a plurality of spots indicating c-axis alignment are observed in the diffraction pattern of the CAAC-IGZO film.

[Structure of Oxide Semiconductor]

Oxide semiconductors might be classified in a manner different from the one in FIG. 42A when classified in terms of the crystal structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the size of the crystal region may be approximately several tens of nanometers.

In the case of an In-M-Zn oxide (the element M is one or more of aluminum, gallium, yttrium, tin, titanium, and the like), the CAAC-OS tends to have a layered crystal structure (also referred to as a layered structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM image, for example.

When the CAAC-OS film is subjected to structural analysis by out-of-plane XRD measurement with an XRD apparatus using θ/2θ scanning, for example, a peak indicating c-axis alignment is detected at 2θ of 31° or around 31°. Note that the position of the peak indicating c-axis alignment (the value of 2θ) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear grain boundary cannot be observed even in the vicinity of the distortion in the CAAC-OS. That is, formation of a grain boundary is inhibited by the distortion of a lattice arrangement. This is probably because the CAAC-OS can tolerate distortion owing to a low arrangement density of oxygen atoms in the a-b plane direction, an interatomic bond distance changed by substitution of a metal atom, and the like.

A crystal structure in which a clear grain boundary is observed is what is called a polycrystal structure. It is highly probable that the grain boundary becomes a recombination center and traps carriers and thus decreases the on-state current and field-effect mobility of a transistor, for example. Thus, the CAAC-OS in which no clear grain boundary is observed is one of crystalline oxides having a crystal structure suitable for a semiconductor layer of a transistor. Note that Zn is preferably contained to form the CAAC-OS. For example, In—Zn oxide and In—Ga—Zn oxide are suitable because they can inhibit generation of a grain boundary as compared with In oxide.

The CAAC-OS is an oxide semiconductor with high crystallinity in which no clear grain boundary is observed. Thus, in the CAAC-OS, a reduction in electron mobility due to the grain boundary is less likely to occur. Entry of impurities, formation of defects, or the like might decrease the crystallinity of an oxide semiconductor; thus, the CAAC-OS can be referred to as an oxide semiconductor having a small amount of impurities and defects (e.g., oxygen vacancies). Therefore, an oxide semiconductor including the CAAC-OS is physically stable. Accordingly, the oxide semiconductor including the CAAC-OS is resistant to heat and has high reliability. In addition, the CAAC-OS is stable with respect to high temperatures in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. There is no regularity of crystal orientation between different nanocrystals in the nc-OS. Hence, the orientation in the whole film is not observed. Accordingly, the nc-OS cannot be distinguished from an a-like OS and an amorphous oxide semiconductor by some analysis methods. For example, when an nc-OS film is subjected to structural analysis by out-of-plane XRD measurement with an XRD apparatus using θ/2θ scanning, a peak indicating crystallinity is not observed. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in a nanobeam electron diffraction pattern of the nc-OS film obtained using an electron beam with a probe diameter nearly equal to or smaller than the diameter of a nanocrystal (e.g., larger than or equal to 1 nm and smaller than or equal to 30 nm).

[a-Like OS]

The a-like OS is an oxide semiconductor having a structure between those of the nc-OS and the amorphous oxide semiconductor. The a-like OS includes a void or a low-density region. That is, the a-like OS has lower crystallinity than the nc-OS and the CAAC-OS. Moreover, the a-like OS has higher hydrogen concentration than the nc-OS and the CAAC-OS.

[Composition of Oxide Semiconductor]

Next, the CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Here, the atomic ratios of In, Ga, and Zn to the metal elements contained in the CAC-OS in In—Ga—Zn oxide are denoted with [In], [Ga], and [Zn], respectively. For example, the first region in the CAC-OS in the In—Ga—Zn oxide has [In] higher than that in the composition of the CAC-OS film. Moreover, the second region has [Ga] higher than [Ga] in the composition of the CAC-OS film. Alternatively, for example, the first region has [In] higher than [In] in the second region and [Ga] lower than [Ga] in the second region. Moreover, the second region has [Ga] higher than [Ga] in the first region and [In] lower than [In] in the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

For example, in EDX mapping obtained by energy dispersive X-ray spectroscopy (EDX), it is confirmed that the CAC-OS in the In—Ga—Zn oxide has a structure in which the region containing In as its main component (the first region) and the region containing Ga as its main component (the second region) are unevenly distributed and mixed.

In the case where the CAC-OS is used for a transistor, a switching function (on/off switching function) can be given to the CAC-OS owing to the complementary action of the conductivity derived from the first region and the insulating property derived from the second region. That is, the CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, a high on-state current ($I_{on}$), high field-effect mobility ($\mu$), and favorable switching operation can be achieved.

An oxide semiconductor can have any of various structures that show various different properties. Two or more of an amorphous oxide semiconductor, a polycrystalline oxide semiconductor, an a-like OS, the CAC-OS, an nc-OS, and the CAAC-OS may be included in an oxide semiconductor of one embodiment of the present invention.

<Transistor Including Oxide Semiconductor>

Next, a transistor including the above oxide semiconductor is described.

When the oxide semiconductor is used for a transistor, the transistor can have high field-effect mobility. In addition, the transistor can have high reliability.

An oxide semiconductor having a low carrier concentration is preferably used for the transistor. For example, the carrier concentration of an oxide semiconductor is lower than or equal to $1\times10^{17}$ cm$^{-3}$, preferably lower than or equal to $1\times10^{15}$ cm$^{-3}$, further preferably lower than or equal to $1\times10^{13}$ cm$^{-3}$, still further preferably lower than or equal to $1\times10^{11}$ cm$^{-3}$, yet further preferably lower than $1\times10^{10}$ cm$^{-3}$, and higher than or equal to $1\times10^{-9}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and accordingly has a low density of trap states in some cases.

Charge trapped by the trap states in an oxide semiconductor takes a long time to disappear and might behave like fixed charge. A transistor whose channel formation region is formed in an oxide semiconductor having a high density of trap states has unstable electrical characteristics in some cases.

Accordingly, in order to obtain stable electrical characteristics of the transistor, reducing the impurity concentration in the oxide semiconductor is effective. In order to reduce the impurity concentration in the oxide semiconductor, the impurity concentration in a film that is adjacent to the oxide semiconductor is preferably reduced. Examples of impurities include hydrogen, nitrogen, an alkali metal, an alkaline earth metal, iron, nickel, and silicon.

<Impurity>

The influence of impurities in the oxide semiconductor is described.

When silicon or carbon, which is one of Group 14 elements, is contained in the oxide semiconductor, defect states are formed in the oxide semiconductor. Thus, the concentration of silicon and carbon in the oxide semiconductor and the concentration of silicon and carbon in the vicinity of an interface with the oxide semiconductor (the concentration obtained by SIMS) are each set lower than or equal to $2\times10^{18}$ atoms/cm$^3$, preferably lower than or equal to $2\times10^{17}$ atoms/cm$^3$.

When the oxide semiconductor contains an alkali metal or an alkaline earth metal, defect states are formed and carriers are generated in some cases. Thus, a transistor using an oxide semiconductor that contains an alkali metal or an alkaline earth metal is likely to have normally-on characteristics. Thus, the concentration of an alkali metal or an alkaline earth metal in the oxide semiconductor, which is obtained by SIMS, is set lower than or equal to $1\times10^{18}$ atoms/cm$^3$, preferably lower than or equal to $2\times10^{16}$ atoms/cm$^3$.

An oxide semiconductor containing nitrogen easily becomes n-type by generation of electrons serving as carriers and an increase in carrier concentration. A transistor including an oxide semiconductor that contains nitrogen tends to have normally-on characteristics. When nitrogen is contained in the oxide semiconductor, a trap state is sometimes formed. This might make the electrical characteristics of the transistor unstable. Thus, the concentration of nitrogen in the oxide semiconductor, which is measured by SIMS, is set lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in an oxide semiconductor reacts with oxygen bonded to a metal atom to be water, and thus causes an oxygen vacancy in some cases. Entry of hydrogen into the oxygen vacancy generates an electron serving as a carrier in some cases. Furthermore, some hydrogen may be bonded to oxygen bonded to a metal atom and generate an electron serving as a carrier. Thus, a transistor including an oxide semiconductor that contains hydrogen tends to have normally-on characteristics. For this reason, hydrogen in the oxide semiconductor is preferably reduced as much as possible. Specifically, the hydrogen concentration in the oxide semiconductor, which is obtained by SIMS, is set lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for a channel formation region in a transistor, the transistor can have stable electrical characteristics.

At least part of the structure examples, the drawings corresponding thereto, and the like described in this embodiment as an example can be combined with the other structure examples, the other drawings, and the like as appropriate.

<Supplementary Notes on Description in this Specification and the Like>

The following are notes on the description of the foregoing embodiments and the structures in the embodiments.

The structure described in each embodiment can be combined with any of the structures described in the other embodiments as appropriate to constitute one embodiment of the present invention. In addition, in the case where a plurality of structure examples are described in one embodiment, some of the structure examples can be combined as appropriate.

Note that a content (or part thereof) described in one embodiment can be applied to, combined with, or replaced with another content (or part thereof) in the same embodiment or a content (or part thereof) described in another embodiment or other embodiments, for example.

Note that in each embodiment, a content described in the embodiment is a content described with reference to a variety of diagrams or a content described with text disclosed in the specification.

Note that by combining a diagram (or part thereof) described in one embodiment with another part of the diagram, a different diagram (or part thereof) described in the embodiment, or a diagram (or part thereof) described in another embodiment or other embodiments, much more diagrams can be formed.

In this specification and the like, components are classified on the basis of the functions, and shown as blocks independent of one another in block diagrams. However, in an actual circuit and the like, such components are sometimes hard to classify functionally, and there is a case where one circuit is associated with a plurality of functions and a case where a plurality of circuits are associated with one function. Therefore, the blocks in the block diagrams are not limited by the components described in the specification, and the description can be changed appropriately depending on the situation.

In drawings, the size, the layer thickness, or the region is shown arbitrarily for description convenience. Therefore, the size, the layer thickness, or the region is not limited to the illustrated scale. Note that the drawings are schematically shown for clarity, and embodiments of the present invention are not limited to shapes, values, or the like shown in the drawings. For example, variation in signal, voltage, or current due to noise or variation in signal, voltage, or current due to difference in timing can be included.

In this specification and the like, the terms "one of a source and a drain" (or a first electrode or a first terminal) and "the other of the source and the drain" (or a second electrode or a second terminal) are used to describe the connection relationship of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, the terms such as "electrode" and "wiring" do not limit the functions of the components. For example, an "electrode" is used as part of a "wiring" in some cases, and vice versa. Furthermore, the terms such as "electrode" and "wiring" also include the case where a plurality of "electrodes" and "wirings" are formed in an integrated manner, for example.

In this specification and the like, voltage and potential can be replaced with each other as appropriate. The term voltage refers to a potential difference from a reference potential, and when the reference potential is a ground potential, for example, voltage can be replaced with potential. The ground potential does not necessarily mean 0 V. Potentials are relative values, and a potential supplied to a wiring or the like is sometimes changed depending on the reference potential.

In this specification and the like, the terms "film" and "layer" can be interchanged with each other depending on the case or circumstances. For example, the term "conductive layer" can be changed into the term "conductive film" in some cases. Also, for example, the term "insulating film" can be changed into the term "insulating layer" in some cases.

In this specification and the like, a switch has a function of controlling whether a current flows or not by being in a conduction state (an on state) or a non-conduction state (an off state). Alternatively, a switch has a function of selecting and changing a current path.

In this specification and the like, the channel length refers to, for example, the distance between a source and a drain in a region where a semiconductor (or a portion where a current flows in a semiconductor when a transistor is on) and a gate overlap with each other or a region where a channel is formed in a top view of the transistor.

In this specification and the like, the channel width refers to, for example, the length of a region where a channel is formed in a direction orthogonal to a channel length direction in a region where a semiconductor (or a portion where current flows in a semiconductor when a transistor is in an on state) and a gate electrode overlap with each other or a region where a channel is formed.

In this specification and the like, the expression "A and B are connected" means the case where A and B are electrically connected to each other as well as the case where A and B are directly connected to each other. Here, the expression "A and B are electrically connected" means the case where electrical signals can be transmitted and received between A and B when an object having any electric action exists between A and B.

In this specification and the like, a structure in which light-emitting layers in light-emitting devices of different colors (e.g., blue (B), green (G), and red (R)) are separately formed or separately patterned may be referred to as an SBS (Side By Side) structure. In this specification and the like, a light-emitting device capable of emitting white light may be referred to as a white-light-emitting device. Note that a combination of a white light-emitting device with a coloring layer (e.g., a color filter) enables a full-color display apparatus.

Structures of light-emitting devices can be classified roughly into a single structure and a tandem structure. A device having a single structure includes one light-emitting unit between a pair of electrodes, and the light-emitting unit preferably includes one or more light-emitting layers. To obtain white light emission, two or more light-emitting layers are selected such that their emission colors are complementary. For example, when emission colors of a first light-emitting layer and a second light-emitting layer are complementary colors, the light-emitting device can be configured to emit white light as a whole. The same applies to a light-emitting device including three or more light-emitting layers.

A device having a tandem structure includes two or more light-emitting units between a pair of electrodes, and each light-emitting unit preferably includes one or more light-emitting layers. To obtain white light emission, white light may be obtained by combining light emitted from light-emitting layers of a plurality of light-emitting units. Note that a structure for obtaining white light emission is similar to a structure in the case of a single structure. In the device having a tandem structure, it is favorable that an intermediate layer such as a charge-generation layer is provided between a plurality of light-emitting units.

When the white-light-emitting device (having a single structure or a tandem structure) and a light-emitting device having an SBS structure are compared with each other, the light-emitting device having an SBS structure can have lower power consumption than the white-light-emitting device. To reduce power consumption, a light-emitting device having an SBS structure is preferably used. Meanwhile, the white-light-emitting device is preferable in terms of lower manufacturing cost or higher manufacturing yield because the manufacturing process of the white-light-emitting device is simpler than that of a light-emitting device having an SBS structure.

Ordinal numbers such as "first" and "second" in this specification and the like are used in order to avoid confusion among components and do not denote the priority or the order such as the order of steps, the stacking order, or the order of placement. A term without an ordinal number in this specification and the like may be provided with an ordinal number in the SCOPE OF CLAIMS in order to avoid confusion among components. Furthermore, a term with an ordinal number in this specification and the like may be provided with a different ordinal number in the SCOPE OF CLAIMS. Moreover, even when a term is provided with an ordinal number in this specification and the like, the ordinal number might be omitted in the SCOPE OF CLAIMS and the like.

In general, a "capacitor" has a structure where two electrodes face each other with an insulator (dielectric) therebetween. This specification and the like include a case where a "capacitor element" is the above-described "capacitor". That is, this specification and the like include cases where a "capacitor element" is one having a structure in which two electrodes face each other with an insulator therebetween, one having a structure in which two wirings face each other with an insulator therebetween, or one in which two wirings are positioned with an insulator therebetween.

Example

In this example, a reduction in power consumption by changing frame frequency for each of the sub-display portions 19 will be described.

In this example, it was assumed that a display apparatus includes the display portion 13 divided into the sub-display portions 19 in four rows and eight columns, the diagonal size of the display portion 13 is 1.5 inches, and the definition is 3000×4000 pixels, and power consumption was calculated in the case where frame frequency is changed for each of the sub-display portions 19. The simulation software SPICE was used for the power consumption calculation.

In this example, power consumption was calculated for four modes A to D. FIG. 43A to FIG. 43D show an operation state of the display portion 13 in each mode.

Figure 43B:
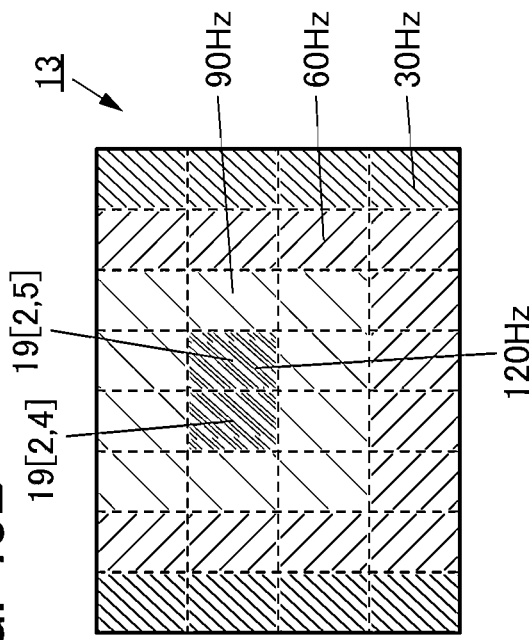
FIG. 43A to FIG. 43D are diagrams describing Example.
Figure 43D:
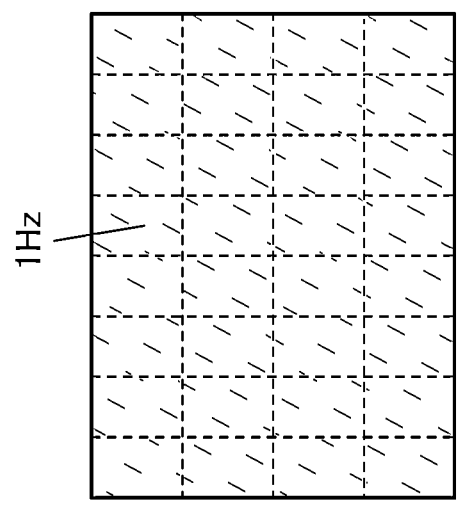
Figure 43A:
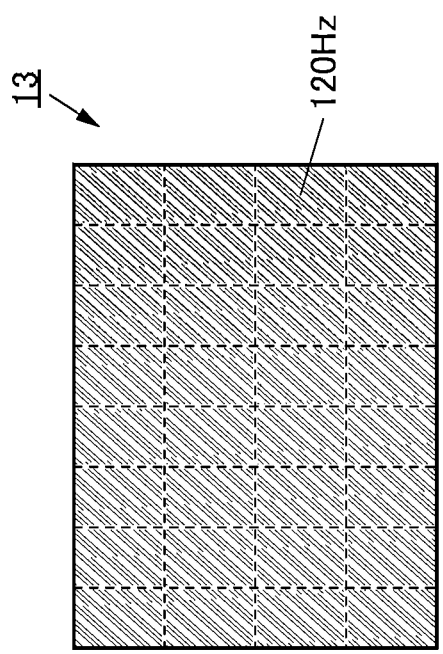

As the mode A, it was assumed that the frame frequencies of all the sub-display portions 19 are 120 Hz (see FIG. 43A).

As the mode B, it was assumed that the frame frequency of the sub-display portion 19 in the second row and the fourth column (a sub-display portion 19[2,4]) and the frame frequency of the sub-display portion 19 in the second row and the fifth column (a sub-display portion 19[2,5]) are 120 Hz, the frame frequency of each of the sub-display portions 19 adjacent to the outside of the sub-display portion 19[2,4] or the sub-display portion 19[2,5] is 90 Hz, the frame frequency of each of the sub-display portions 19 adjacent to further outside of the sub-display portions 19 whose frame frequency is 90 Hz is 60 Hz, and the frame frequency of each of the sub-display portions 19 in the first column and the eighth column is 30 Hz (see FIG. 43B).

Figure 43C:
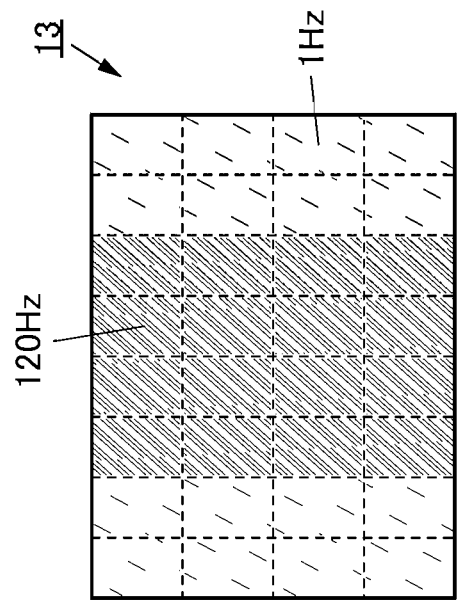

As the mode C, it was assumed that the frame frequency of each of the sub-display portions 19 in third column to the sixth column is 120 Hz, and the frame frequency of each of the sub-display portions 19 in the first column, the second column, the seventh column, and the eighth column is 1 Hz (see FIG. 43C).

As the mode D, it was assumed that the frame frequencies of all the sub-display portions 19 are 1 Hz (see FIG. 43D).

Figure 44:
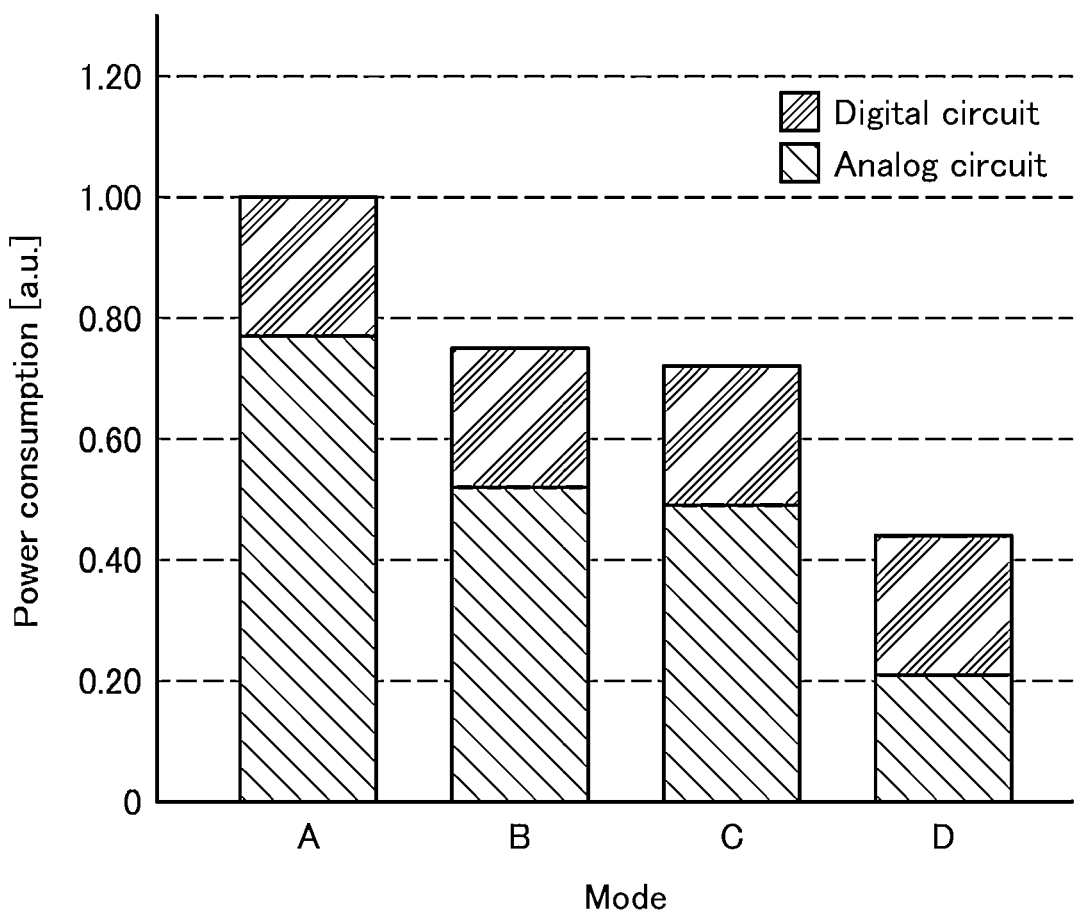
FIG. 44 is a diagram describing Example.

FIG. 44 is a graph showing calculation results of power consumption of each mode. The horizontal axis in FIG. 44 shows each mode. The vertical axis in FIG. 44 shows a normalized value of calculation results of each mode on the basis of calculation results of the mode A. Note that a value of normalized power consumption of each mode is shown in FIG. 44.

In FIG. 44, the power consumption of each mode is divided into the power consumption of a digital circuit and the power consumption of an analog circuit. The digital circuit described in this example is mainly a circuit relating to data transmission and includes a gate driver circuit, a source driver circuit, and the like. The analog circuit is a circuit relating to processing for displaying an image by converting image data into an analog signal and includes a digital-analog converter circuit, an operational amplifier, and the like.

It can be found from FIG. 44 that although the power consumption of the digital circuit do not change in each mode, the power consumption of the analog circuit has changed according to the mode. It was found that power consumption of the mode B and the mode C was approximately 30% lower than that of the mode A. It was found that power consumption of the mode D was approximately 60% lower than that of the mode A.

REFERENCE NUMERALS

10_L: display apparatus, 10_R: display apparatus, 30: driver circuit, 40: functional circuit, 51: pixel circuit, 61: light-emitting element, 100: electronic device, 101: motion detection portion, 102: gaze detection portion, 103: arithmetic portion, 104: communication portion, 105: housing

The invention claimed is:

1. An electronic device comprising:
a display apparatus;
an arithmetic portion; and
a gaze detection portion,
wherein the display apparatus comprises a functional circuit and a display portion divided into a plurality of sub-display portions,
wherein the gaze detection portion is configured to detect a user's gaze,
wherein the arithmetic portion is configured to divide the plurality of sub-display portions into a first section, a second section, a third section, and a fourth section using a detection result of the gaze detection portion,
wherein the first section is entirely surrounded by the second section,
wherein the second section is located inside the third section, and is not entirely surrounded by the third section,
wherein the fourth section is located outside the third section, and
wherein the functional circuit is configured to make a second driving frequency that is a driving frequency of the sub-display portions comprised in the second section lower than a first driving frequency that is a driving frequency of the sub-display portions comprised in the first section, and to make a third driving frequency that is a driving frequency of the sub-display portions comprised in the third section lower than the second driving frequency.

2. The electronic device according to claim 1,
wherein the first section comprises a region overlapping with a user's gaze point.

3. The electronic device according to claim 1,
wherein the second driving frequency is lower than the first driving frequency.

4. The electronic device according to claim 1,
wherein each of the plurality of sub-display portions comprises a plurality of pixel circuits and a plurality of light-emitting elements.

5. The electronic device according to claim 4,
wherein the display apparatus comprises a plurality of gate driver circuits and a plurality of source driver circuits, and
wherein one of the gate driver circuits and one of the source driver circuits are electrically connected to one of the sub-display portions.

6. The electronic device according to claim 5,
wherein each of the plurality of gate driver circuits and the plurality of source driver circuits is provided in a first layer,
wherein the plurality of pixel circuits are provided in a second layer over the first layer, and
wherein the plurality of light-emitting elements are provided in a third layer over the second layer.

7. The electronic device according to claim 1, further comprising:
a memory device,
wherein the memory device is configured to retain image data of each of the plurality of sub-display portions.

8. The electronic device according to claim 1,
wherein the third driving frequency is lower than the second driving frequency.

* * * * *